MEMORY BUS CONTROL UNIT

INVENTOR.
LARS O. ULFSPARRE
BY Thomas & Crickenberger
ATTORNEYS

Jan. 25, 1966 L. O. ULFSPARRE 3,231,863

MEMORY BUS CONTROL UNIT

Filed Dec. 30, 1960 75 Sheets-Sheet 2

Jan. 25, 1966 L. O. ULFSPARRE 3,231,863

MEMORY BUS CONTROL UNIT

Filed Dec. 30, 1960 75 Sheets-Sheet 3

Jan. 25, 1966 L. O. ULFSPARRE 3,231,863

MEMORY BUS CONTROL UNIT

Filed Dec. 30, 1960 75 Sheets-Sheet 5

Jan. 25, 1966 L. O. ULFSPARRE 3,231,863

MEMORY BUS CONTROL UNIT

Filed Dec. 30, 1960 75 Sheets-Sheet 6

MEMORY BUS CONTROL UNIT

Filed Dec. 30, 1960

MEMORY BUS CONTROL UNIT

Filed Dec. 30, 1960 75 Sheets-Sheet 9

MEMORY BUS CONTROL UNIT

Filed Dec. 30, 1960 75 Sheets-Sheet 11

Jan. 25, 1966 L. O. ULFSPARRE 3,231,863

MEMORY BUS CONTROL UNIT

Filed Dec. 30, 1960 75 Sheets-Sheet 14

Jan. 25, 1966 L. O. ULFSPARRE 3,231,863

MEMORY BUS CONTROL UNIT

Filed Dec. 30, 1960 75 Sheets-Sheet 15

MEMORY BUS CONTROL UNIT

Filed Dec. 30, 1960 75 Sheets-Sheet 21

MEMORY BUSY TRIGGERS 109

MEMORY BUSY TRIGGERS 109

Jan. 25, 1966 L. O. ULFSPARRE 3,231,863

MEMORY BUS CONTROL UNIT

Filed Dec. 30, 1960 75 Sheets-Sheet 26

HIGH SPEED EXCHANGE BLOCKING DECODER 117

BASIC EXCHANGE PRIORITY "AND" 125

HIGH SPEED EXCHANGE PRIORITY "AND" 126

LOOK AHEAD PRIORITY "AND" 127

INSTRUCTION UNIT PRIORITY "AND" 128

Jan. 25, 1966 L. O. ULFSPARRE 3,231,863

MEMORY BUS CONTROL UNIT

Filed Dec. 30, 1960 75 Sheets-Sheet 35

Jan. 25, 1966 L. O. ULFSPARRE 3,231,863

MEMORY BUS CONTROL UNIT

Filed Dec. 30, 1960 75 Sheets-Sheet 36

MEMORY BUS CONTROL UNIT

Jan. 25, 1966 L. O. ULFSPARRE 3,231,863

MEMORY BUS CONTROL UNIT

Filed Dec. 30, 1960 75 Sheets-Sheet 42

MEMORY READ OUT CONTROLS 171

MEMORY DATA GATES 181

Jan. 25, 1966 L. O. ULFSPARRE 3,231,863

MEMORY BUS CONTROL UNIT

Filed Dec. 30, 1960 75 Sheets-Sheet 49

Jan. 25, 1966 L. O. ULFSPARRE 3,231,863

MEMORY BUS CONTROL UNIT

Filed Dec. 30, 1960 75 Sheets-Sheet 50

RING OUTPUT PULSE ($O_0 - O_7$) PHASE CONTROL 221

RETURN ADDRESS REGISTER 231

RETURN ADDRESS READ-IN CONTROLS 251

RETURN ADDRESS REGISTER SELECTOR 261

RETURN ADDRESS REGISTER SELECTOR 261

Jan. 25, 1966 L. O. ULFSPARRE 3,231,863

MEMORY BUS CONTROL UNIT

Filed Dec. 30, 1960 75 Sheets-Sheet 61

RETURN ADDRESS REGISTER SELECTOR 261

RETURN ADDRESS REGISTER SELECTOR 261

RETURN ADDRESS REGISTER SELECTOR 261

RETURN ADDRESS REGISTER SELECTOR 261

HIGH SPEED MEMORY DELAY CONTROL 271

Jan. 25, 1966 L. O. ULFSPARRE 3,231,863

MEMORY BUS CONTROL UNIT

Filed Dec. 30, 1960 75 Sheets-Sheet 67

HIGH SPEED MEMORY DELAY CONTROL 271

Jan. 25, 1966 L. O. ULFSPARRE 3,231,863

MEMORY BUS CONTROL UNIT

Filed Dec. 30, 1960 75 Sheets-Sheet 68

RETURN ADDRESS DECODER 281

RETURN REGISTER SELECT 291

RETURN REGISTER SELECT 291

MEMORY BUS SAMPLE PULSES & TIMING

ADDRESS INTERLEAVING

United States Patent Office 3,231,863

Patented Jan. 25, 1966

3,231,863

MEMORY BUS CONTROL UNIT

Lars O. Ulfsparre, Poughkeepsie, N.Y., assignor to International Business Machines Corporation, New York, N.Y., a corporation of New York Filed Dec. 30, 1960, Ser. No. 79,899
13 Claims. (Cl. 340—172.5)

This invention relates to memory access apparatus for electronic data processing systems and, more particularly, to a multimemory arrangement and its controls for expediting the handling of information in a data processing system.

This application shows and describes subject matter claimed in co-pending application 79,591, filed December 30, 1960 for Memory Bus Control Unit by Robert T. Blosk, et al. The invention herein is directed to an improvement over the copending application. More specifically, this improvement relates to a unique arrangement for controlling the return addressing when two or more memory devices having different access speeds are ready at the same time to transmit data signals on an output bus.

In a computer system designed for parallel operation, composed of a central processing unit, two or more core storage units having different accessing speeds, an exchange, and input/output devices, the memory access time is the limiting factor of computer system speed. In order to provide improved performance, it is necessary that the operation of all the elements of the system be controlled so as to enable the operation of memory a maximum percentage of the operating time of the system. A memory bus control unit is the main communication link in the computer system and functions to provide optimum operation of memory.

The memory bus control unit enables a plurality of sources, called requestors, which are running asynchronously, to have access to any of a plurality of memory units having different access speeds through a common input bus and a common output bus. This is provided by a time-sharing principle in which the information flow is maintained much in the manner of a conveyor belt accepting and distributing information. To keep this conveyor belt full and to assure the proper effective use of the computer system, priority schemes of handling of the information from the multiple sources are provided .

In such a flexible system, the requests from the requestors occur in a random pattern because of the asynchronous operation between the requestors. Although simultaneous requests are not the common case, simultaneous requests for the same memory and simultaneous requests for different storage units present possibilities of overlap which are eliminated by this invention.

In earlier types of computing devices, the memory access apparatus employed a separate out bus for each memory of different access speed. This required multiple gates and lines for the receiving registers of the computing devices.

According to the present invention a single out bus is utilized in systems including memories of different access speeds.

A further feature of this invention is to provide a common bus means for information flow from source units to memory units having different access speeds in a digital data processing system.

A still further feature of this invention is the provision of a data processing system in which the successive addresses are distributed among different memory units having different access speeds.

Another feature of this invention is to provide memory bus control unit which enables a plurality of asynchronously operating sources to have access to a plurality of memories having different access speeds in a data processing system.

Still another feature of this invention is to provide means for fetching information from a plurality of memory devices having different access speeds to a plurality of source units in a digital data processing system.

A further feature of this invention is to provide a memory bus control which enables any one of a plurality of input units to receive, transmit or both, while in communication with any one of a plurality of memory devices having different access speeds.

A still further feature of this invention is to provide a memory bus control unit which enables a plurality of asynchronously operating input sources to access a plurality of memory units having different accessing speeds.

A still further feature of this invention is to provide a memory bus control unit which will deliver requested information to the requesting source regardless of the sequence of the request.

Another feature of this invention is to provide a memory bus control unit which is capable of servicing a plurality of memory devices having various speeds of operation.

Still another feature of this invention is to provide by a memory bus control unit the necessary memory delays to prevent higher speed memories from using the memory out bus during the use by a lower speed memory.

In the Memory Bus Control Unit of this invention, data is supplied on a common bus to and from a plurality of memory devices having different access speeds. Address information is supplied to the control unit of this invention to determine the selection of gates to be operated so that a selected memory will accept the data from the common bus, such data being available to all memories. When the data is on the memory out bus, it is available to all the receiving registers of the several requestors and the addressing means are necessary so that the requestor which made a request will obtain the desired data.

In the fetch operation the request for information from a higher speed memory could be available to a common out bus before the lower speed memory could respond to a request prior to such high speed request. The Memory Bus Control Unit of this invention provides the necessary delay of the higher speed memories when interference with the outputs of the lower speed memories would otherwise occur.

In such a computer system, where a plurality of sources are making use of a plurality of memory devices having different accessing speeds, it is further necessary that the proper information be returned to the proper source. The Memory Bus Control Unit of this invention operates to return the information to the source that requested such information regardless of the sequence of occurrence of such information on the memory output bus in relationship to the sequence of original requests.

The foregoing and other objects, features and advantages of the invention will be apparent from the following more particular description of a preferred embodiment of the invention, as illustrated in the accompanying drawings.

FIG. 1A illustrates the manner in which FIGS. 2A through 2I are mechanically arranged to illustrate in block schematic form an electronic data processing system constructed in accordance with the principles of this invention.

FIGS. 2A through 2I comprise a block schematic diagram of an electronic data processing machine constructed in accordance with the principles of this invention.

Figure 1A:
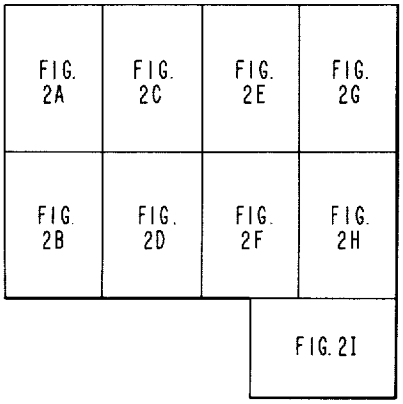
Figure 1B:
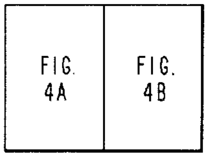
FIGS. 1B through 1J are mechanically arranged to illustrate in block schematic form various components of the system.
Figure 1C:
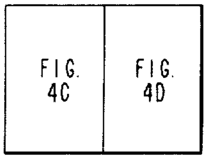
Figure 1D:
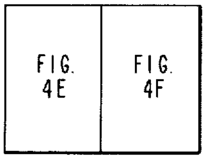
Figure 1E:
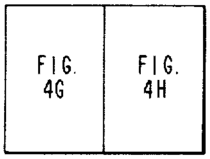
Figure 1F:
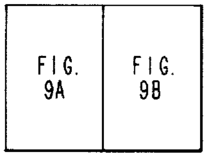
Figure 1G:
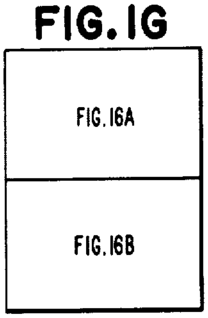
Figure 1H:
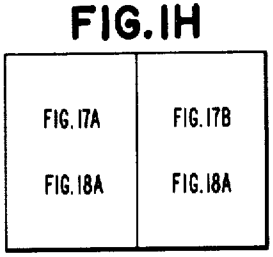
Figure 1I:
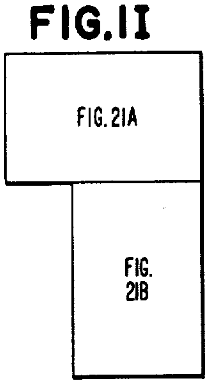
Figure 1J:
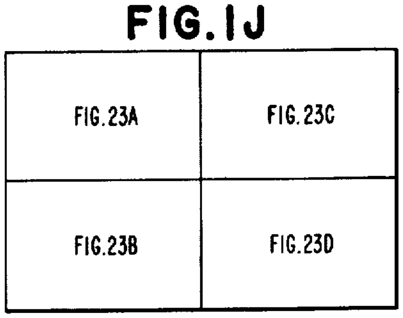
Figure 2A:
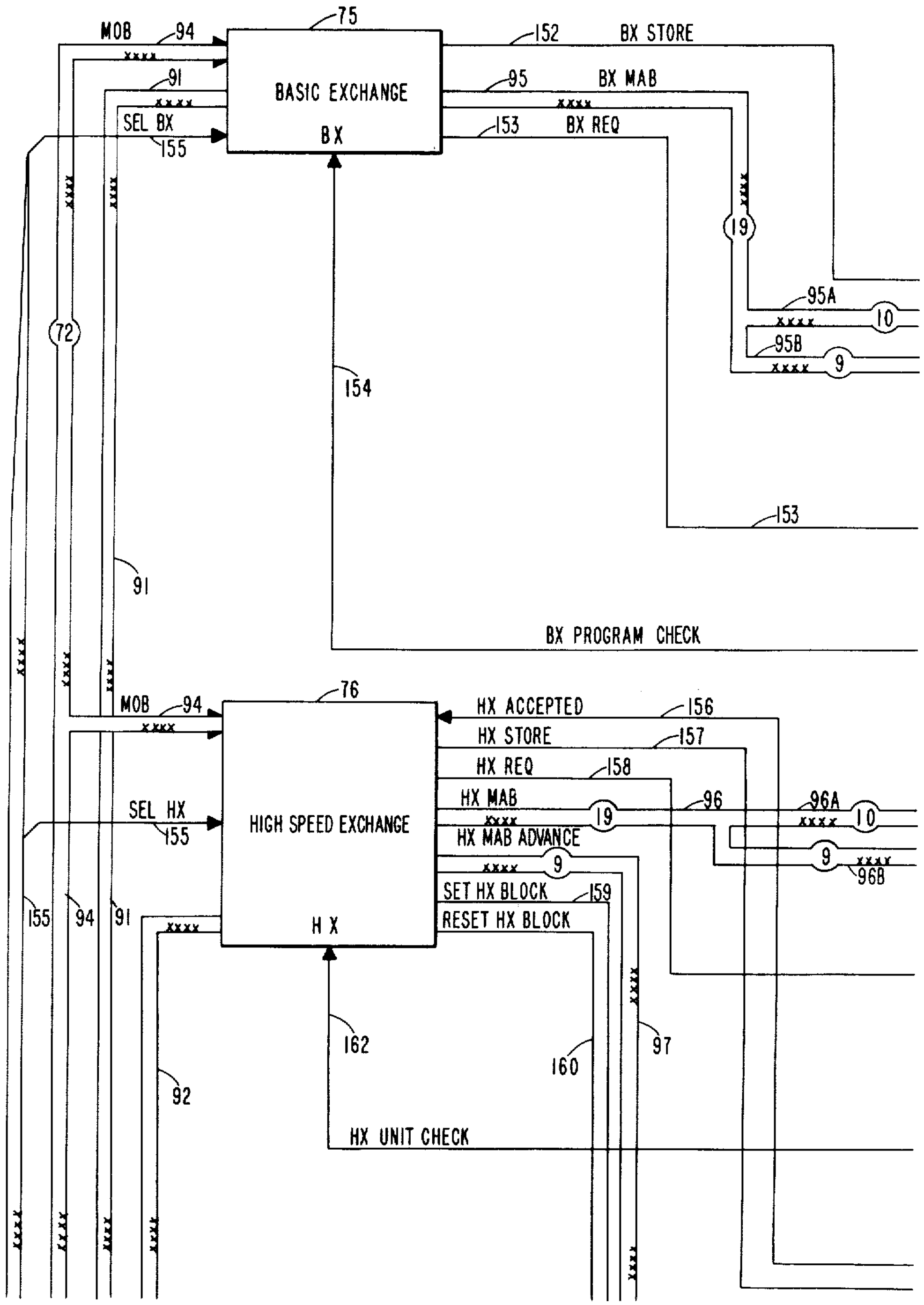
Figure 2B:
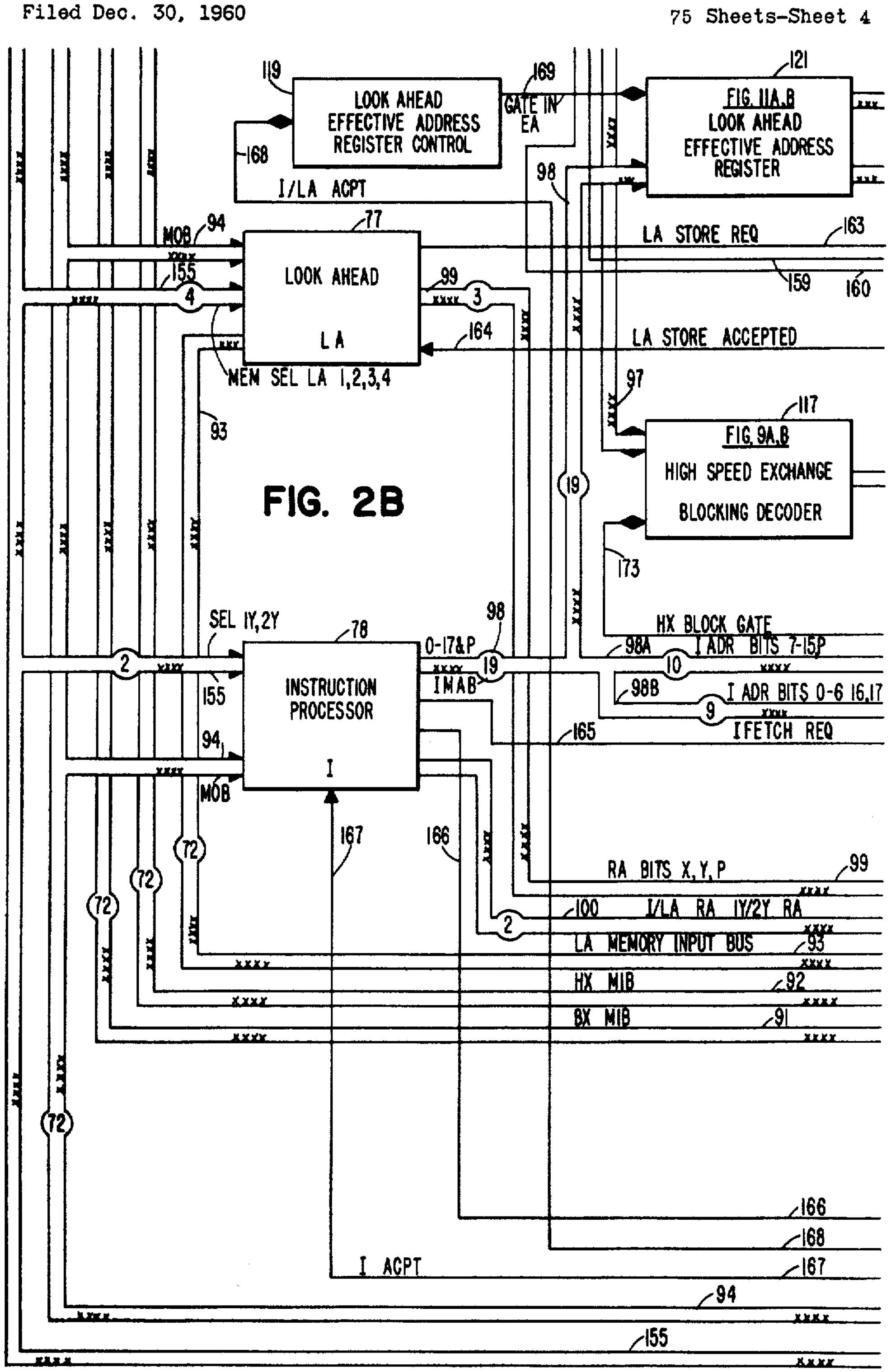
Figure 2C:
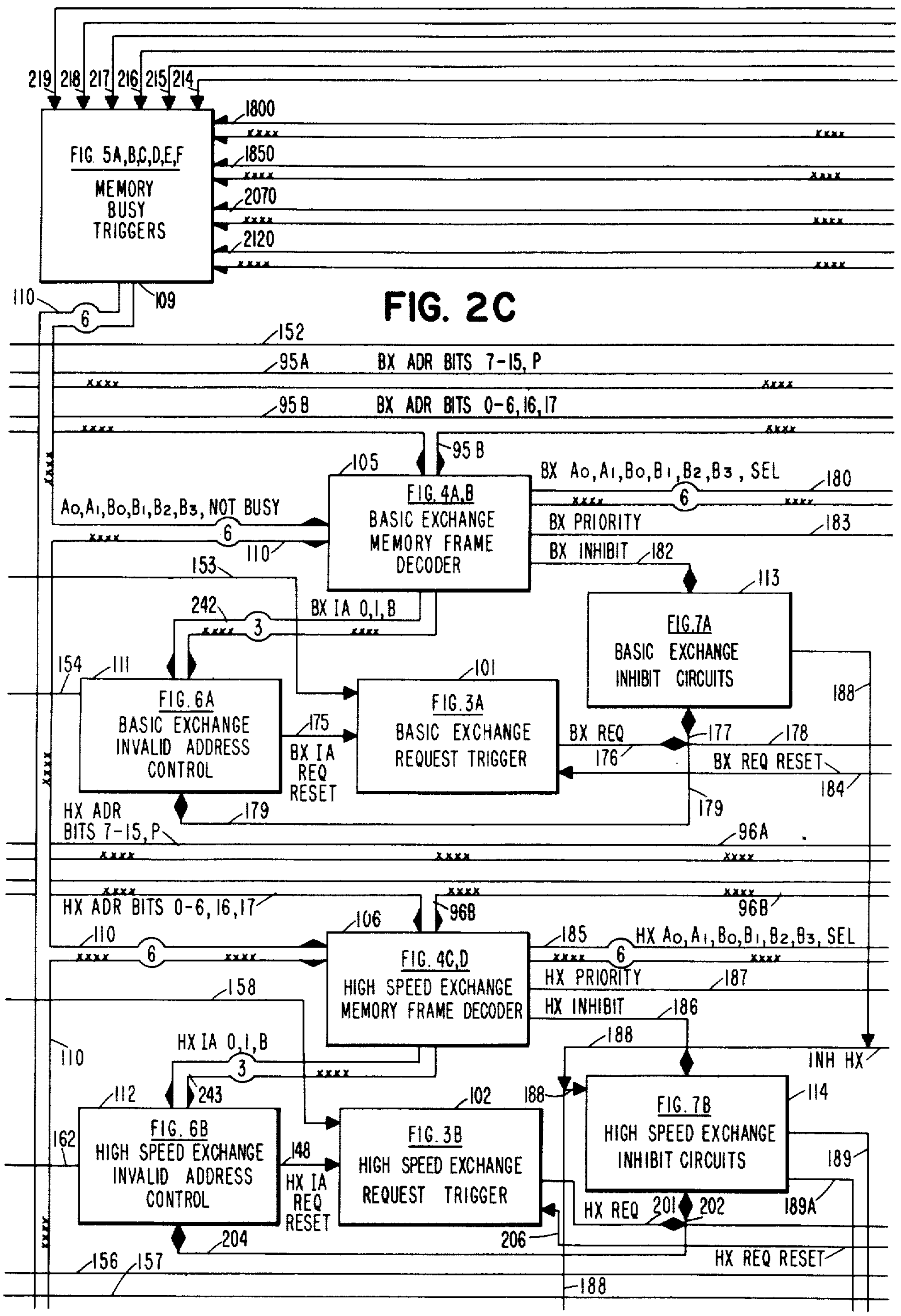
Figure 3A:
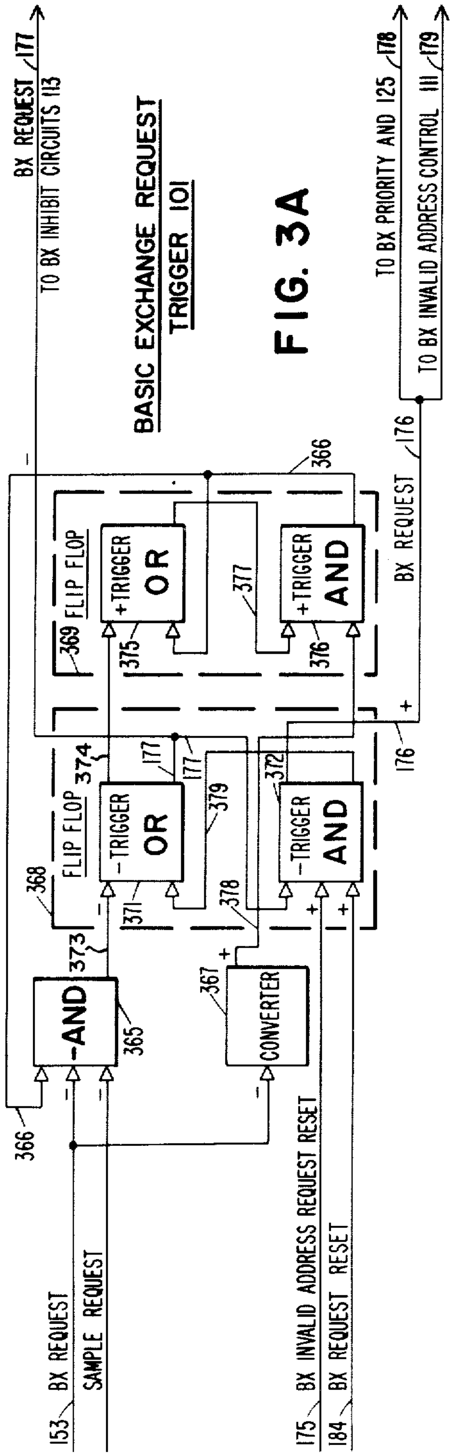

FIG. 3A is a logical diagram of the Basic Exchange Request Trigger indicated as block 101 in FIG. 2C.

Figure 3B:
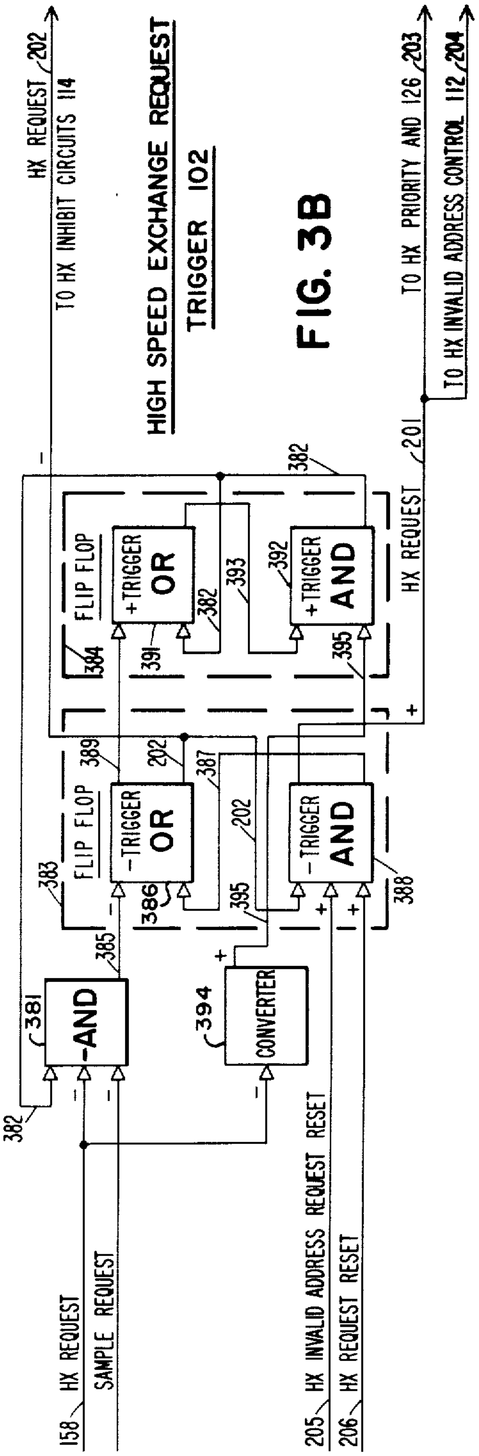

FIG. 3B is a logical diagram of the High Speed Exchange Request Trigger indicated as block 102 in FIG. 2C.

Figure 2D:
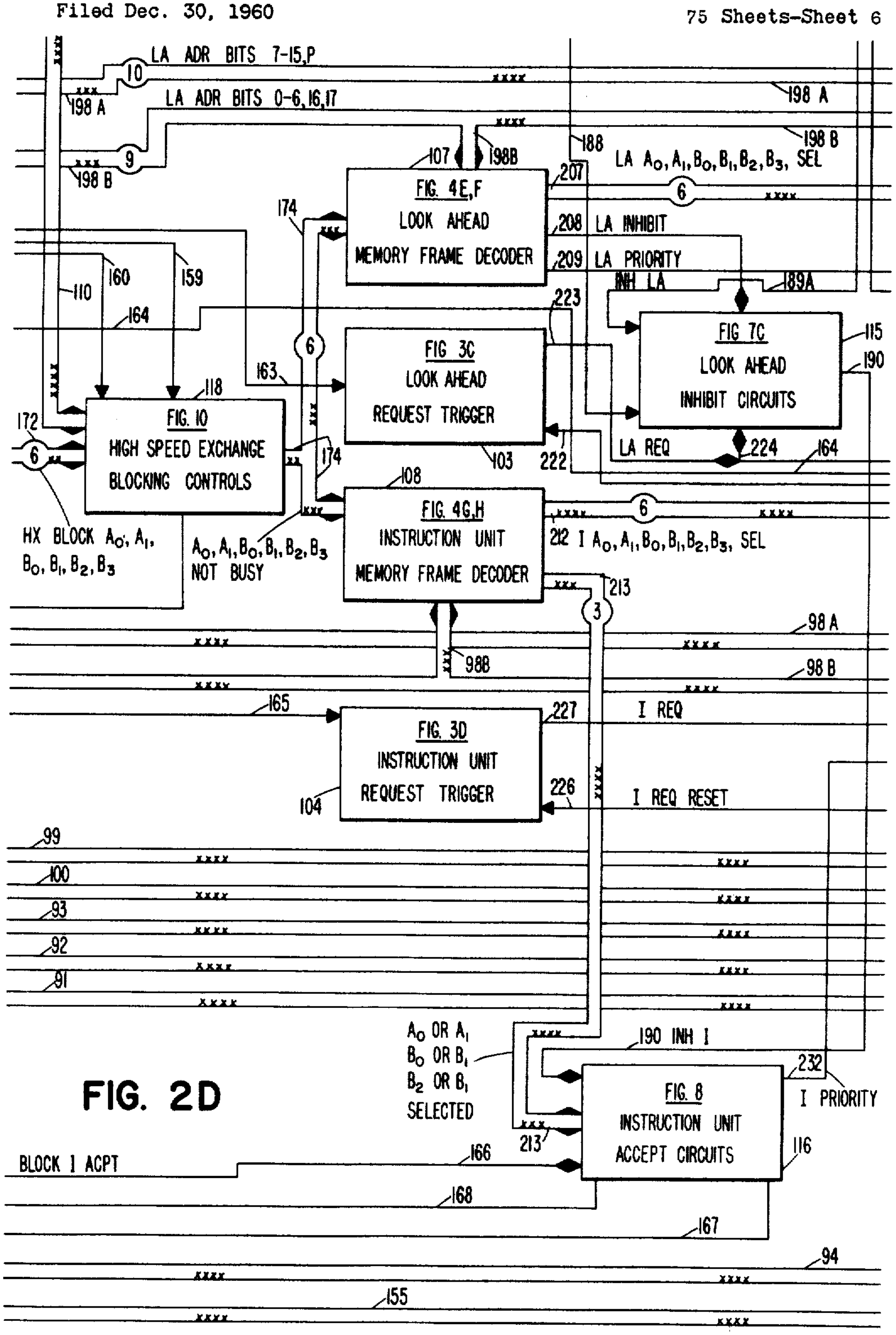
Figure 3C:
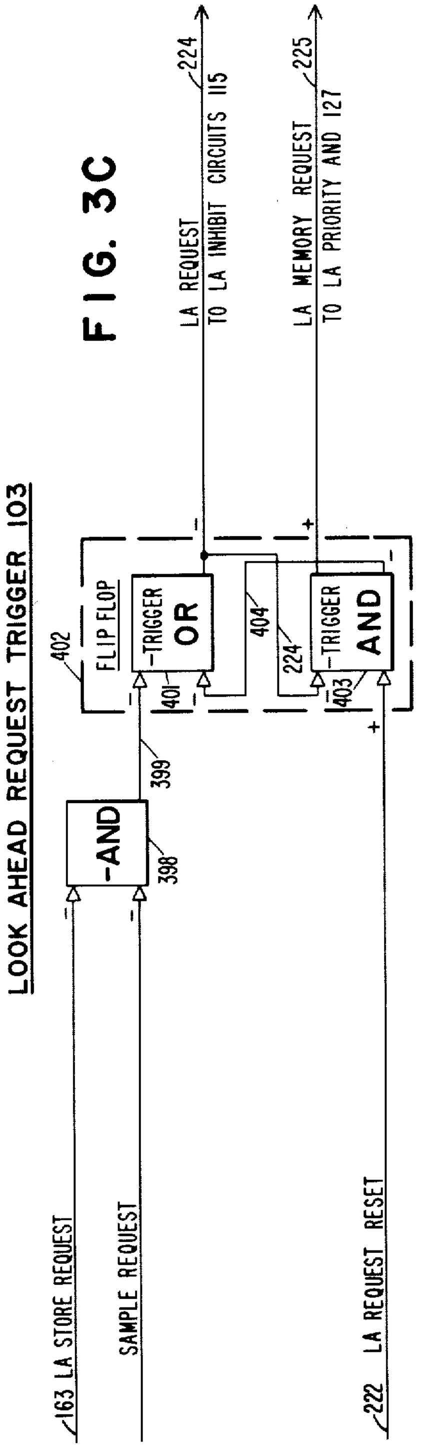

FIG. 3C is a logical diagram of the Look Ahead Request Trigger indicated as block 103 in FIG. 2D.

Figure 3D:
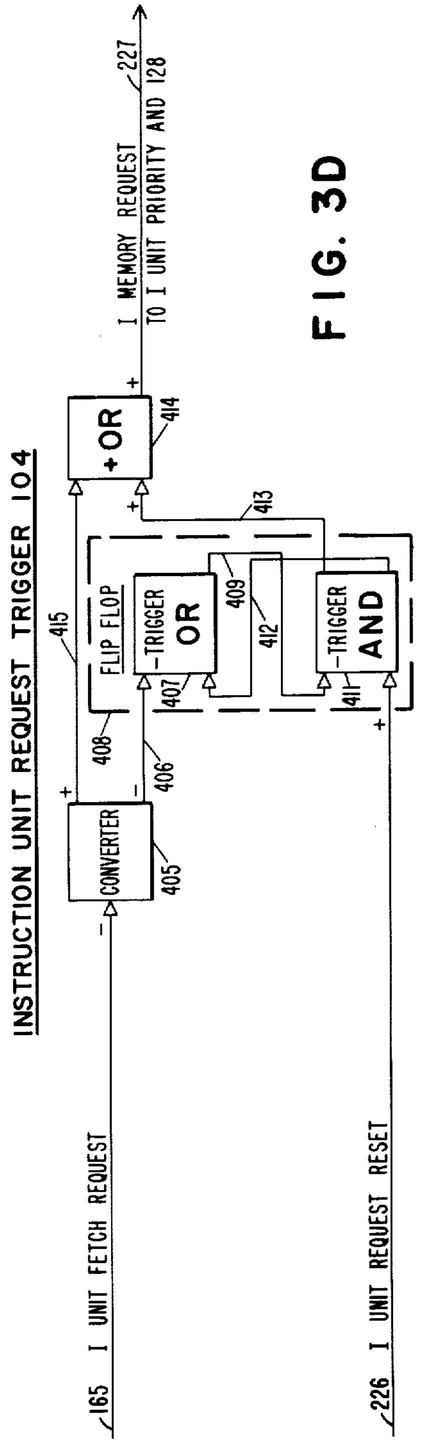

FIG. 3D is a logical diagram of the Instruction Unit Request Trigger indicated as block 104 in FIG. 2D.

Figure 4A:
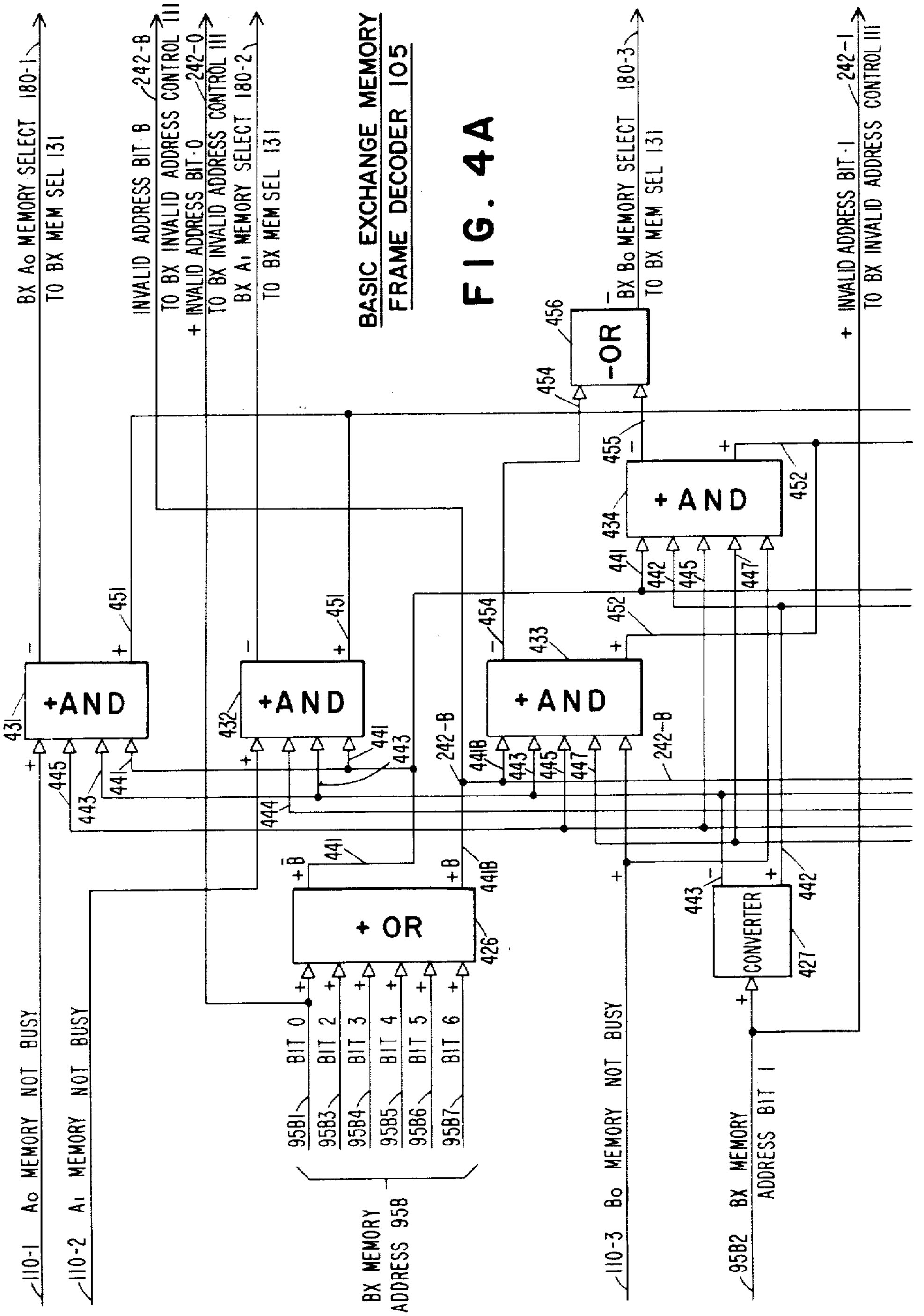
Figure 4B:
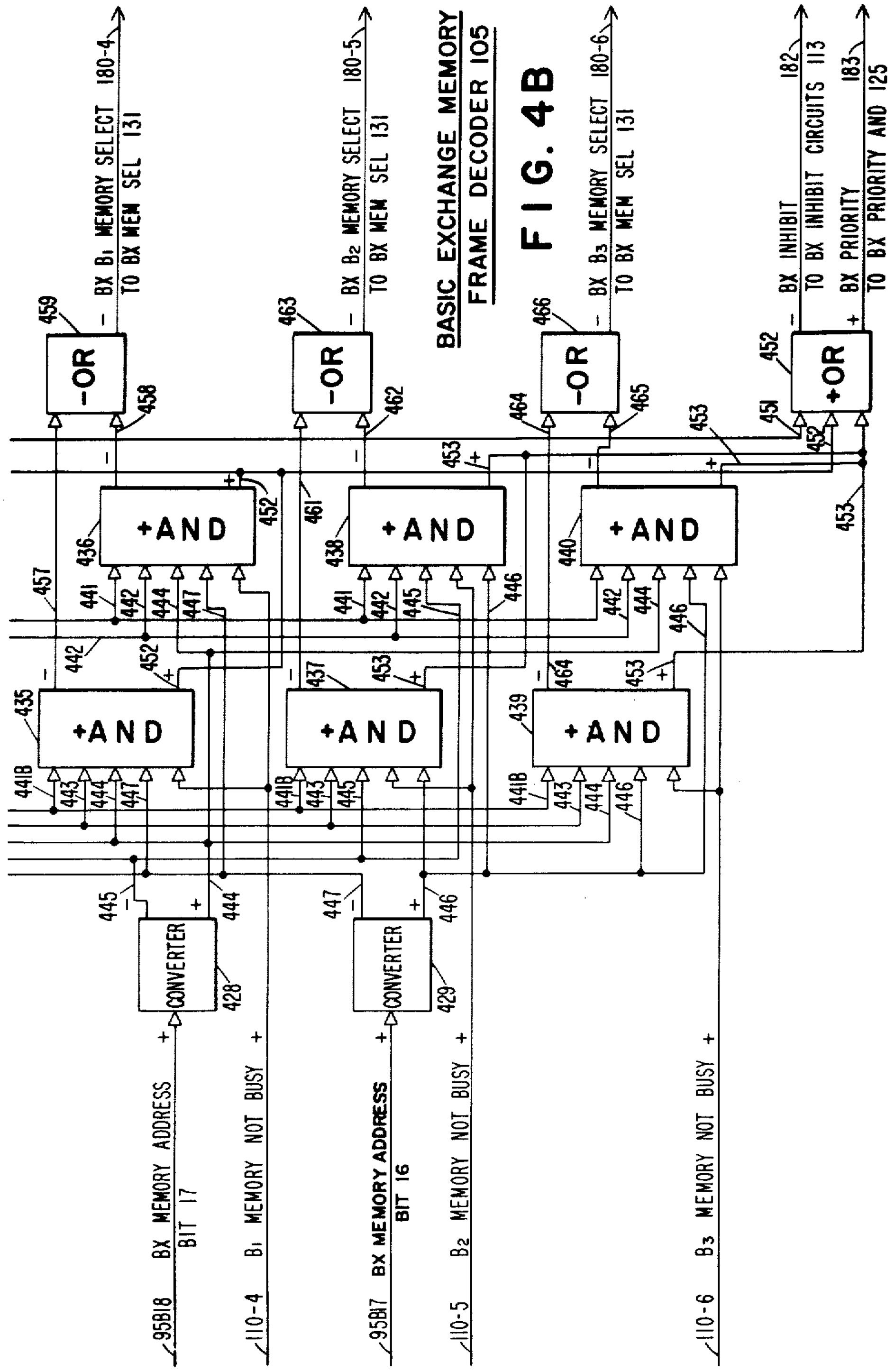

FIGS. 4A and 4B are a logical diagram of the Basic Exchange Memory Frame decoder which is shown as block 105 in FIG. 2C.

Figure 4C:
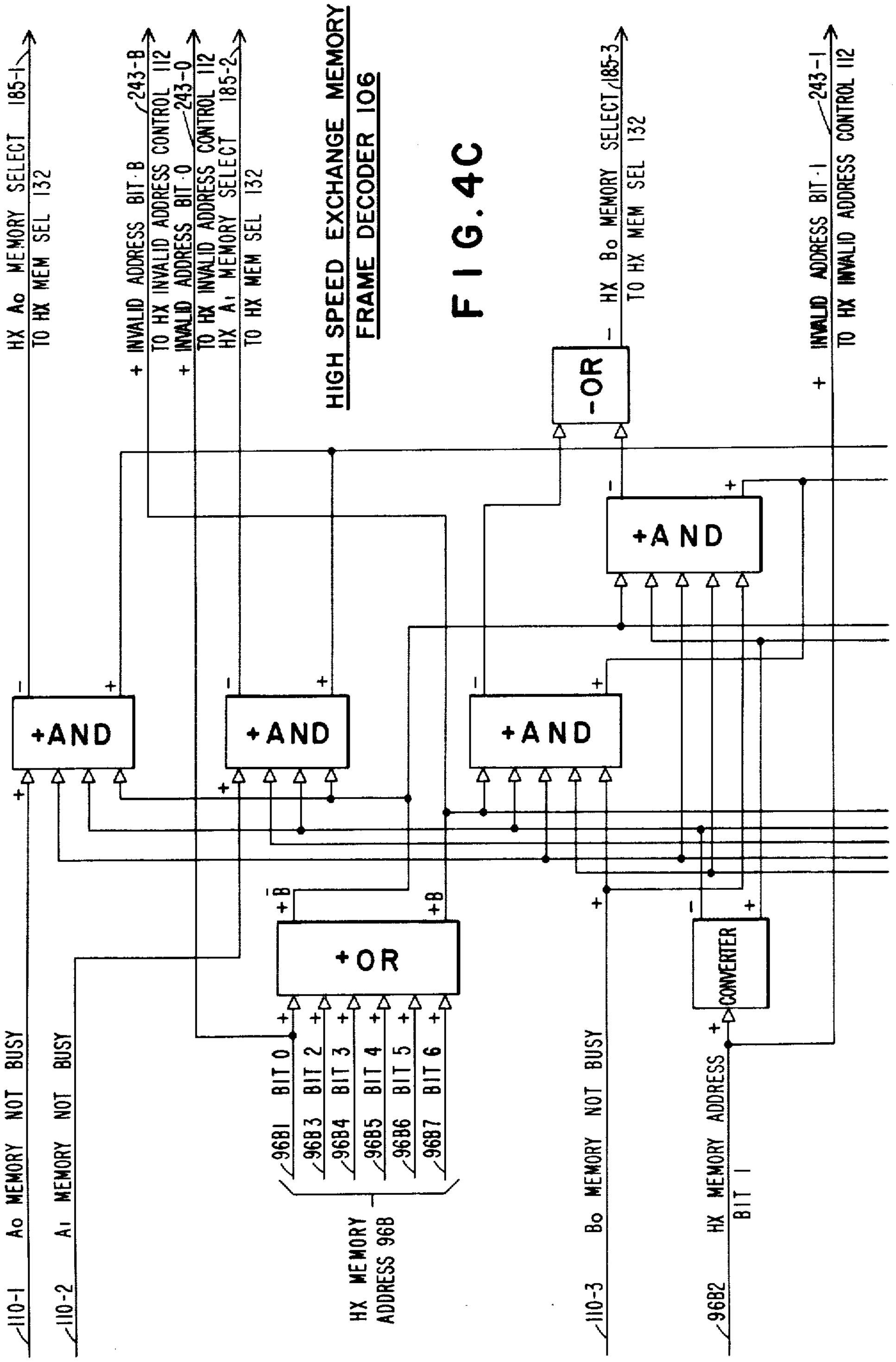
Figure 4D:
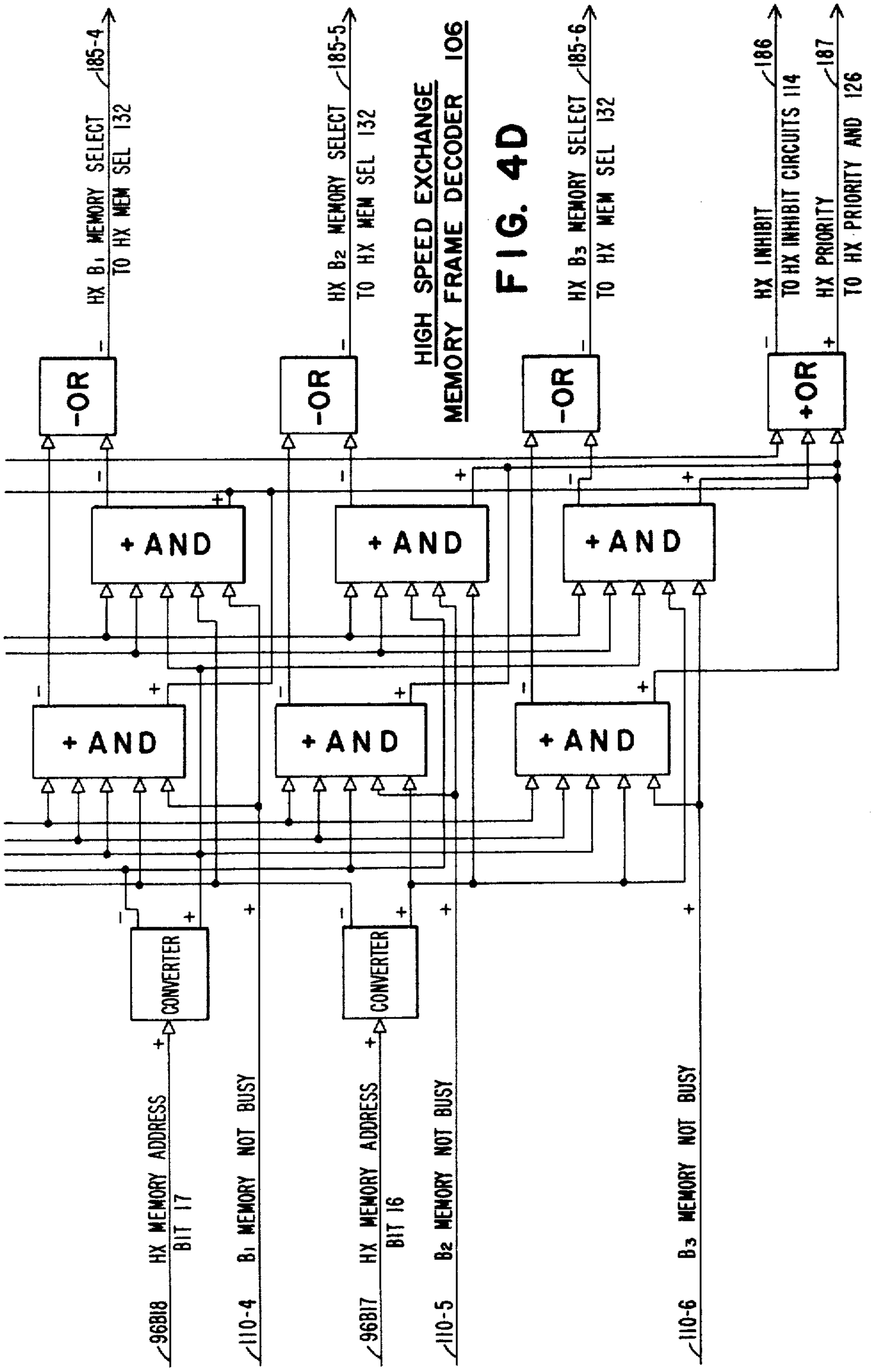

FIGS. 4C and 4D are a logical diagram of the High Speed Exchange Memory Frame Decoder which is shown as block 106 in FIG. 2C.

Figure 4E:
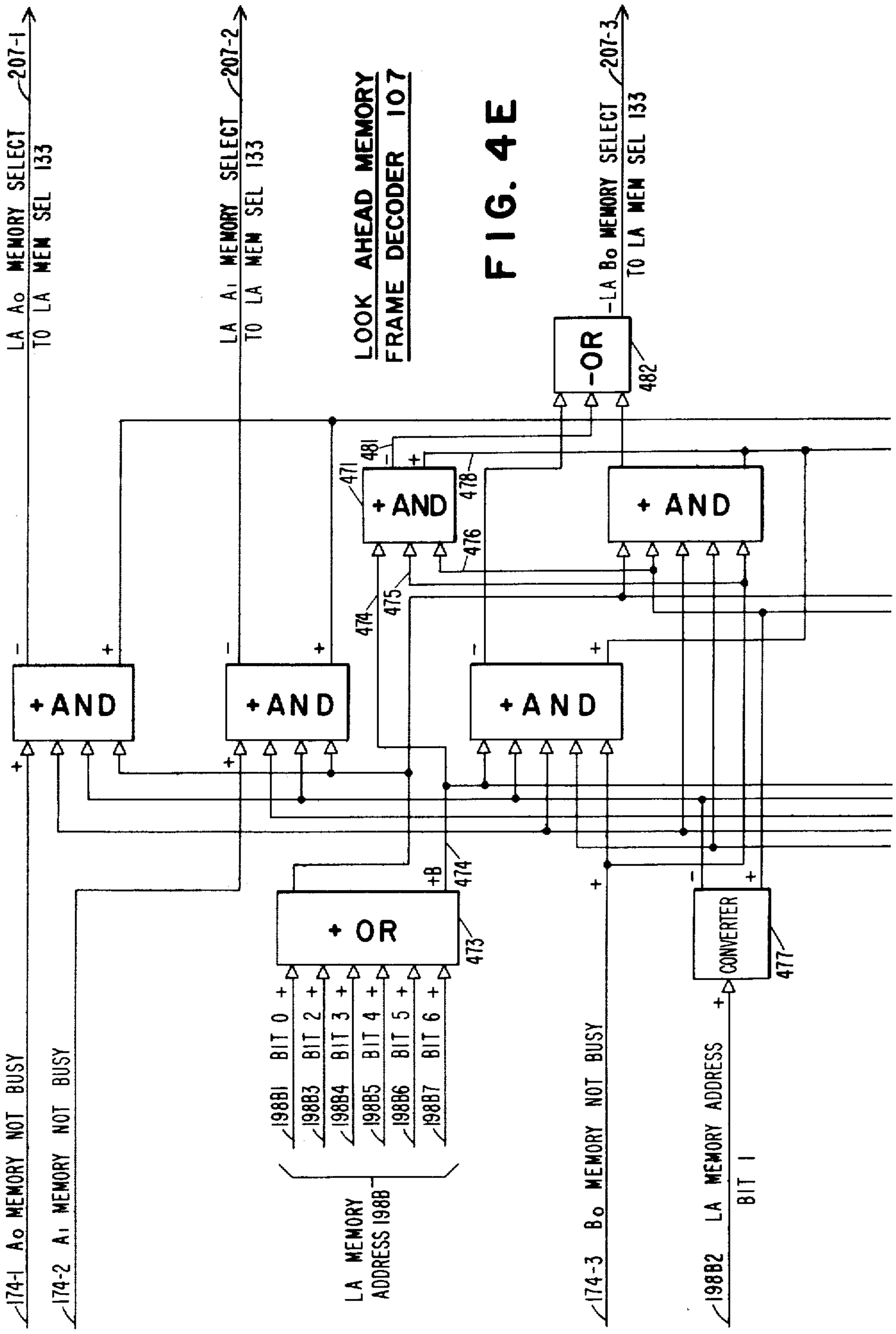
Figure 4F:
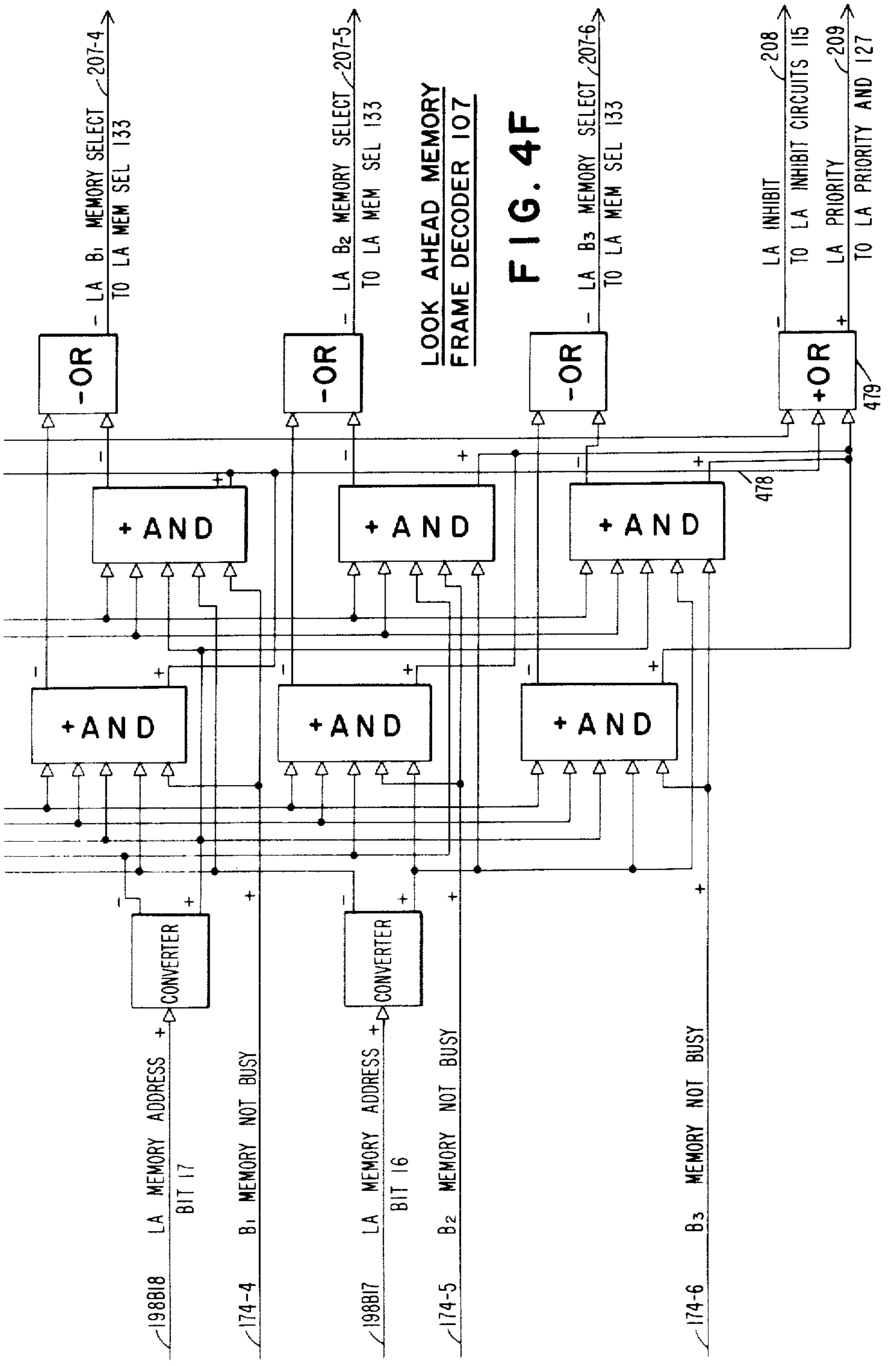

FIGS. 4E and 4F are a logical diagram of the Look Ahead Memory Frame Decoder which is shown as block 107 in FIG. 2D.

Figure 4G:
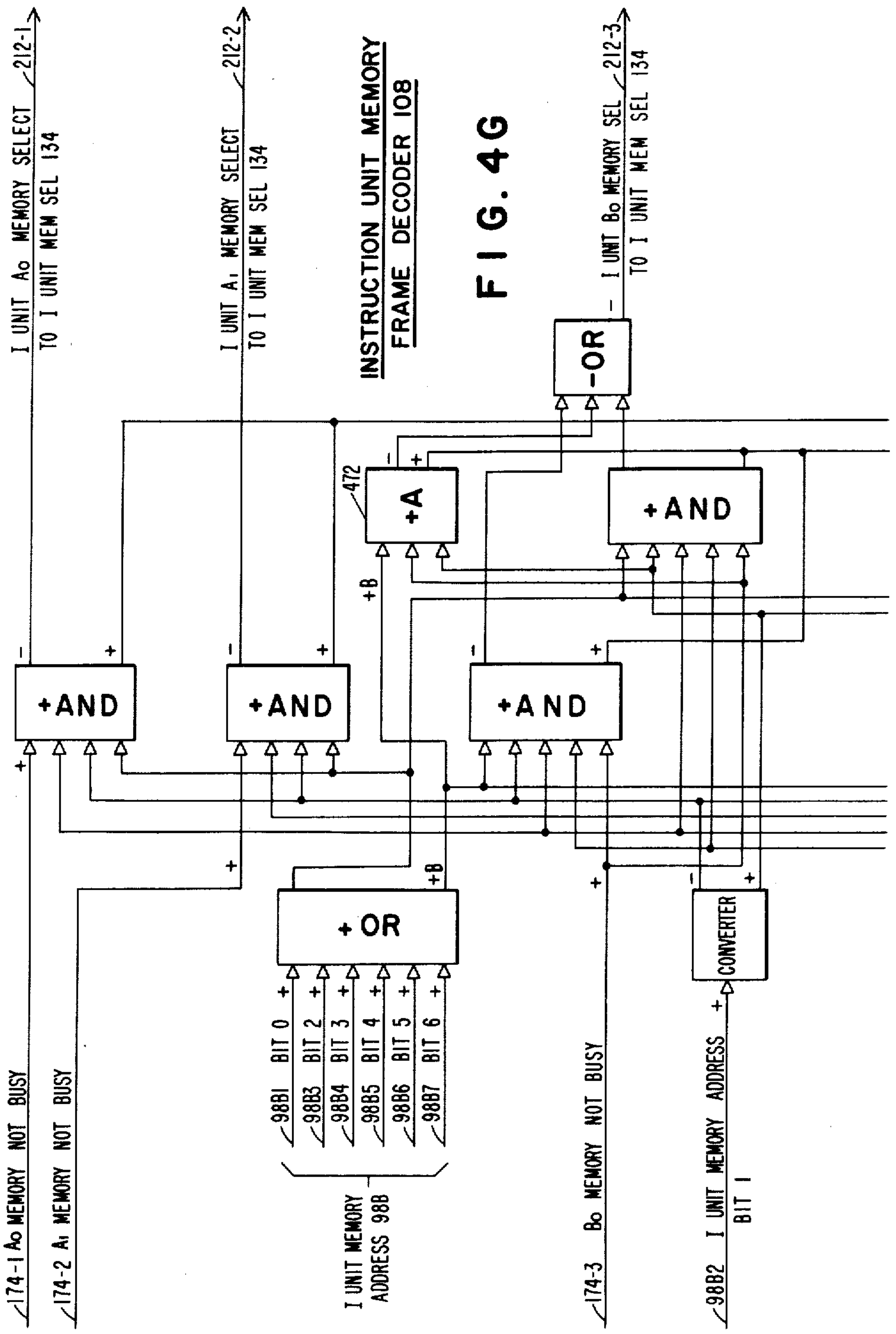
Figure 4H:
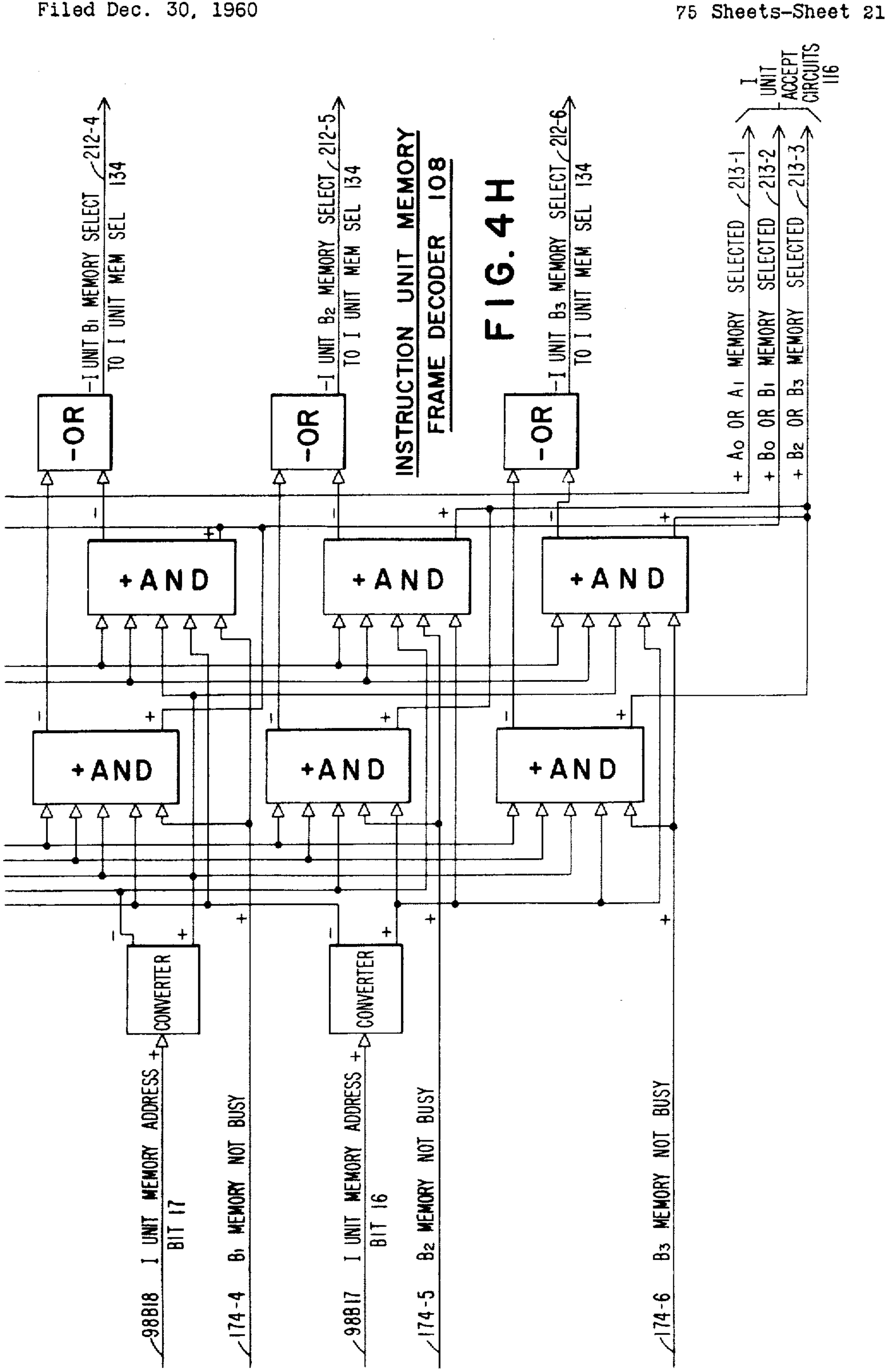

FIGS. 4G and 4H are a logical diagram of the Instruction Unit Memory Frame Decoder shown as block 108 in FIG. 2D.

FIGS. 5A through 5F are a logical diagram of the Memory Busy Triggers indicated as block 109 in FIG. 2C.

Figures 6A, 6B:
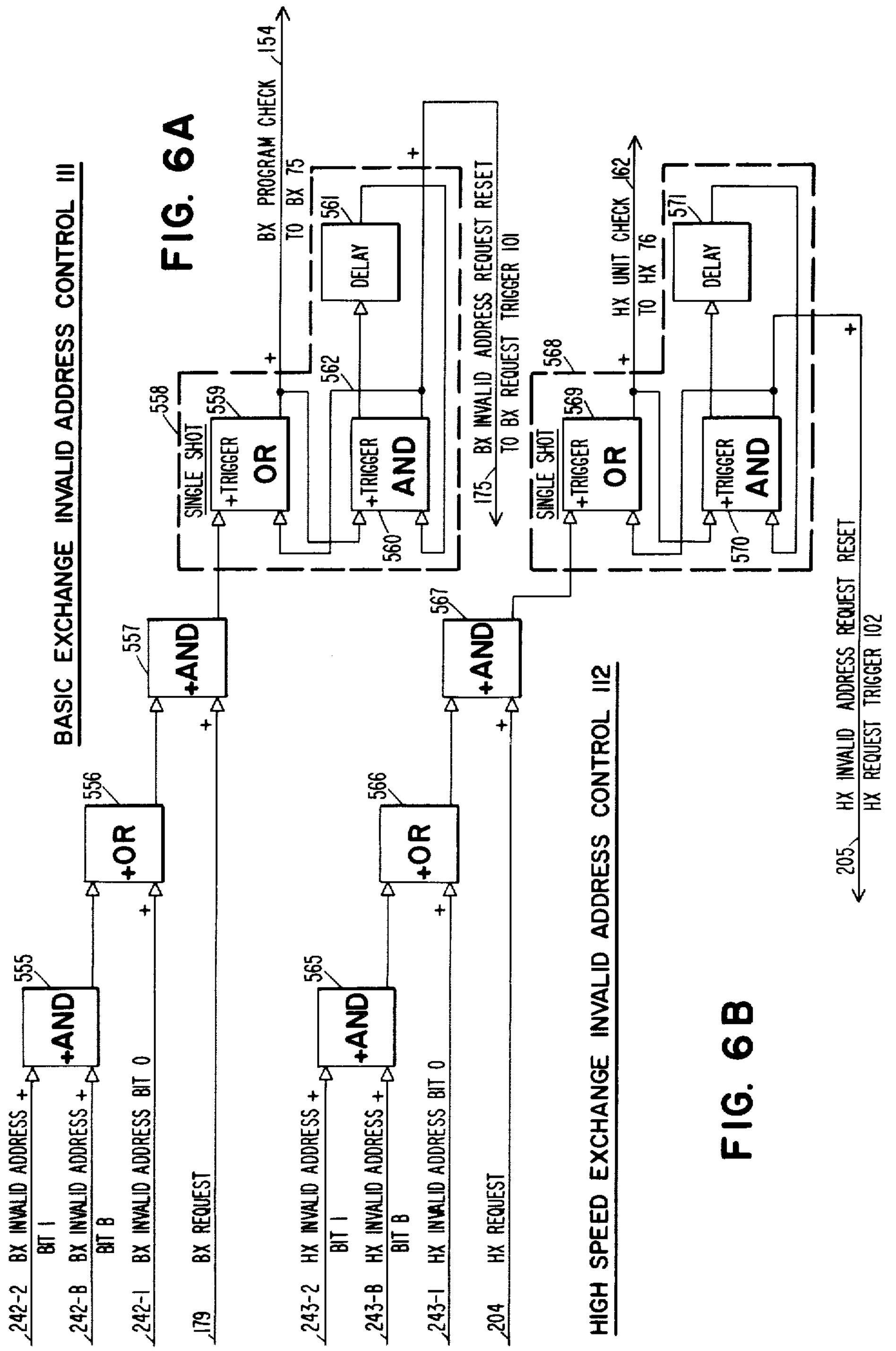

FIG. 6A is a logical diagram of the Basic Exchange Invalid Address Control indicated as block 111 in FIG. 2C.

FIG. 6B is a logical diagram of the High Speed Exchange Invalid Address Control shown as block 112 in FIG. 2C.

Figures 7A, 7B, 7C:
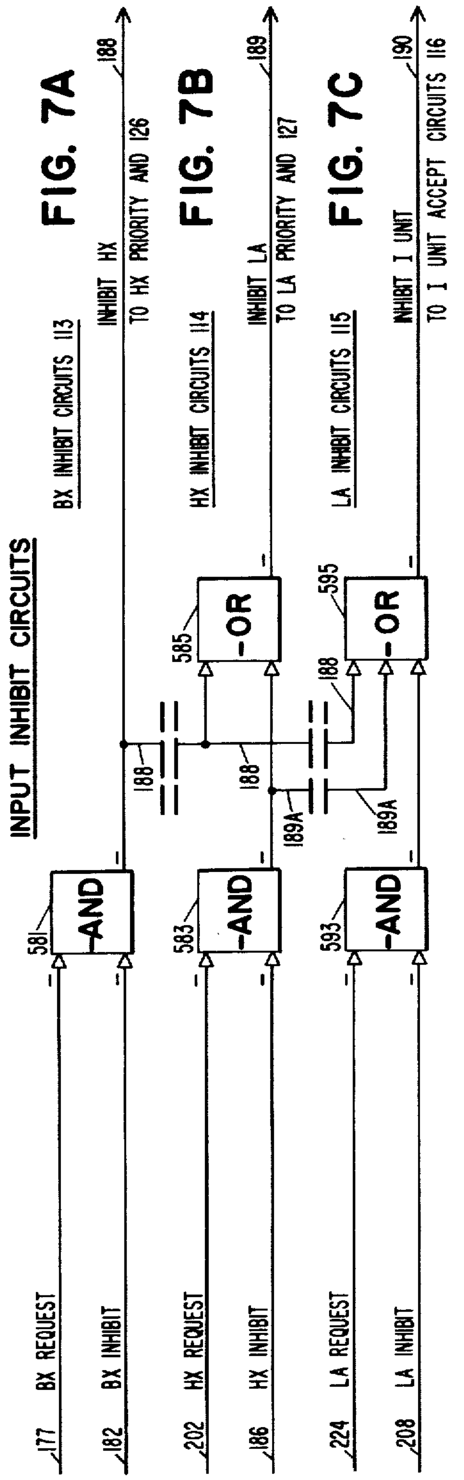

FIG. 7A is a logical diagram of the Basic Exchange Inhibit Circuits shown as block 113 in FIG. 2C.

FIG. 7B is a logical diagram of the High Speed Exchange Inhibit Circuits shown as block 114 in FIG. 2C.

FIG. 7C is a logical diagram of the Look Ahead Inhibit Circuits shown as block 115 in FIG. 2D.

Figure 8:
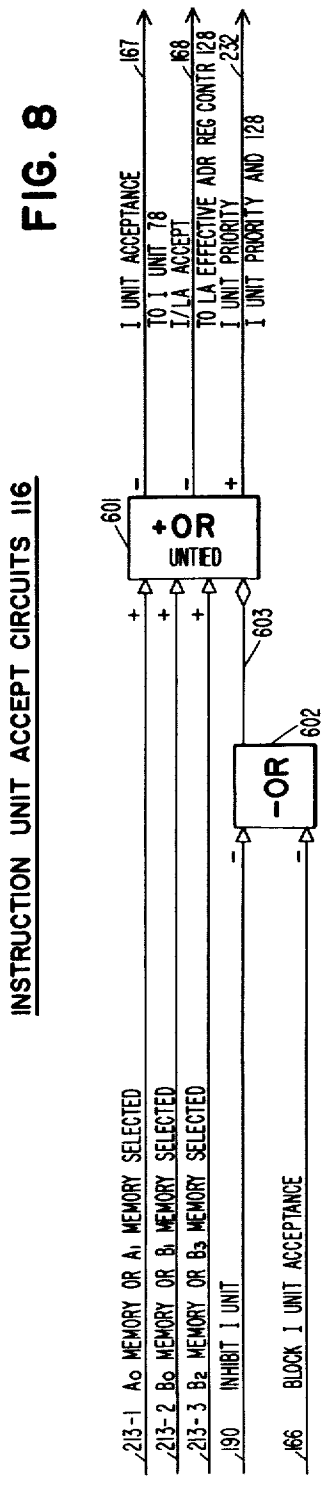

FIG. 8 is a logical diagram of the Instruction Unit Accept Circuits shown as block 116 in FIG. 2D.

Figure 9A:
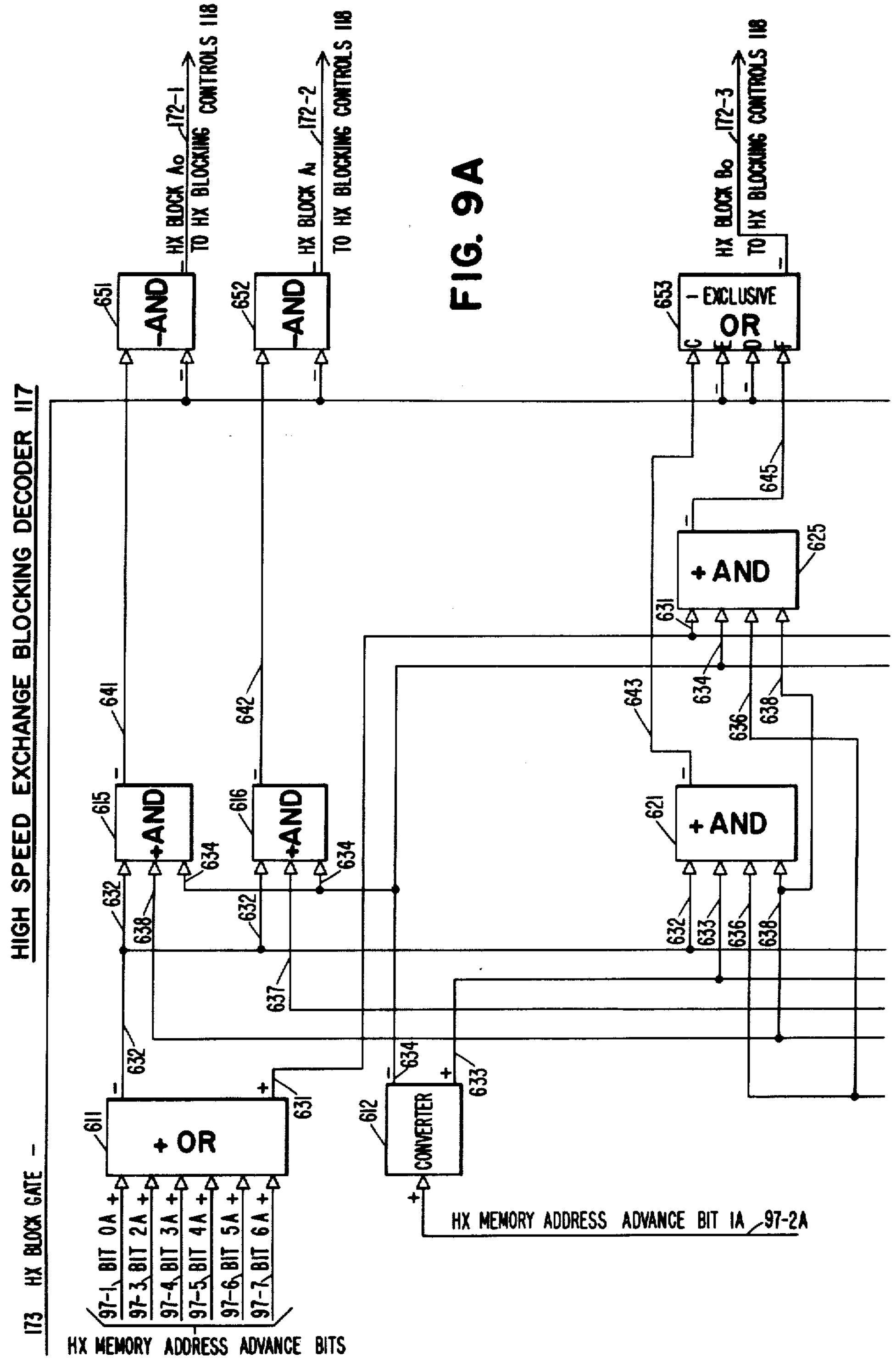
Figure 9B:
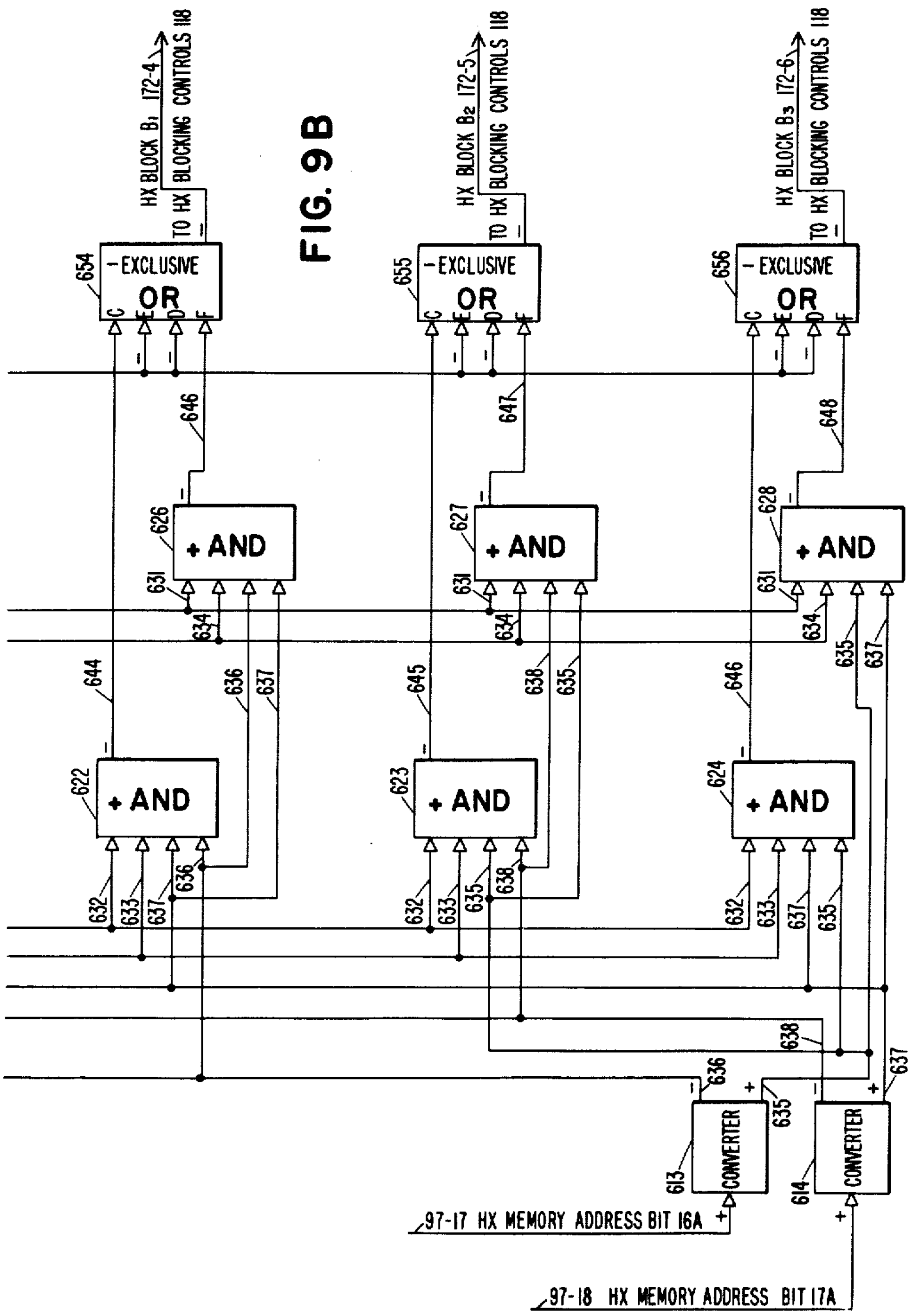

FIGS. 9A and 9B are a logical diagram of the High Speed Exchange Blocking Decoder shown as block 117 in FIG. 2B.

Figure 10:
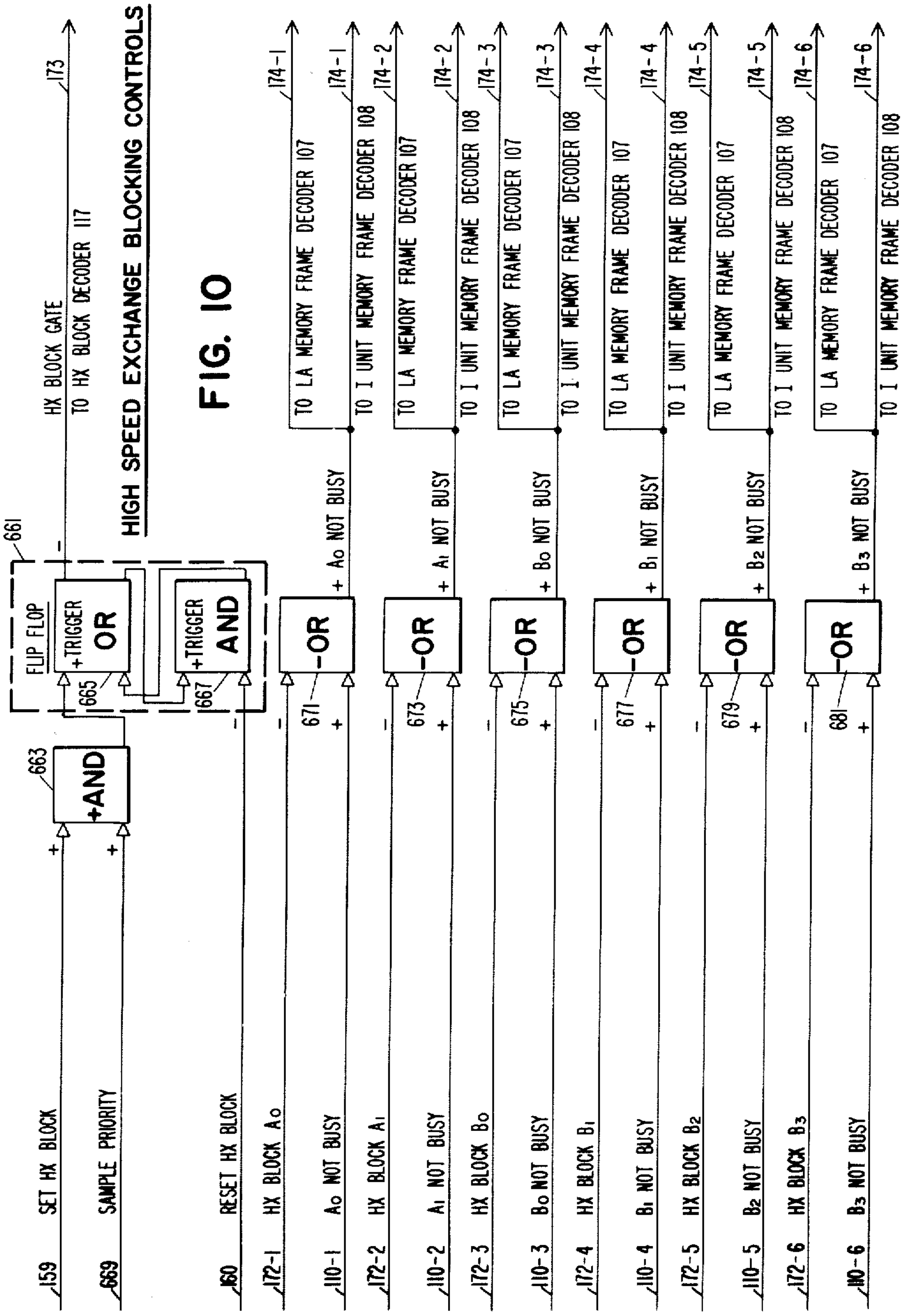

FIG. 10 is a logical diagram of the High Speed Exchange Blocking Controls shown as block 118 in FIG. 2D.

Figure 11A:
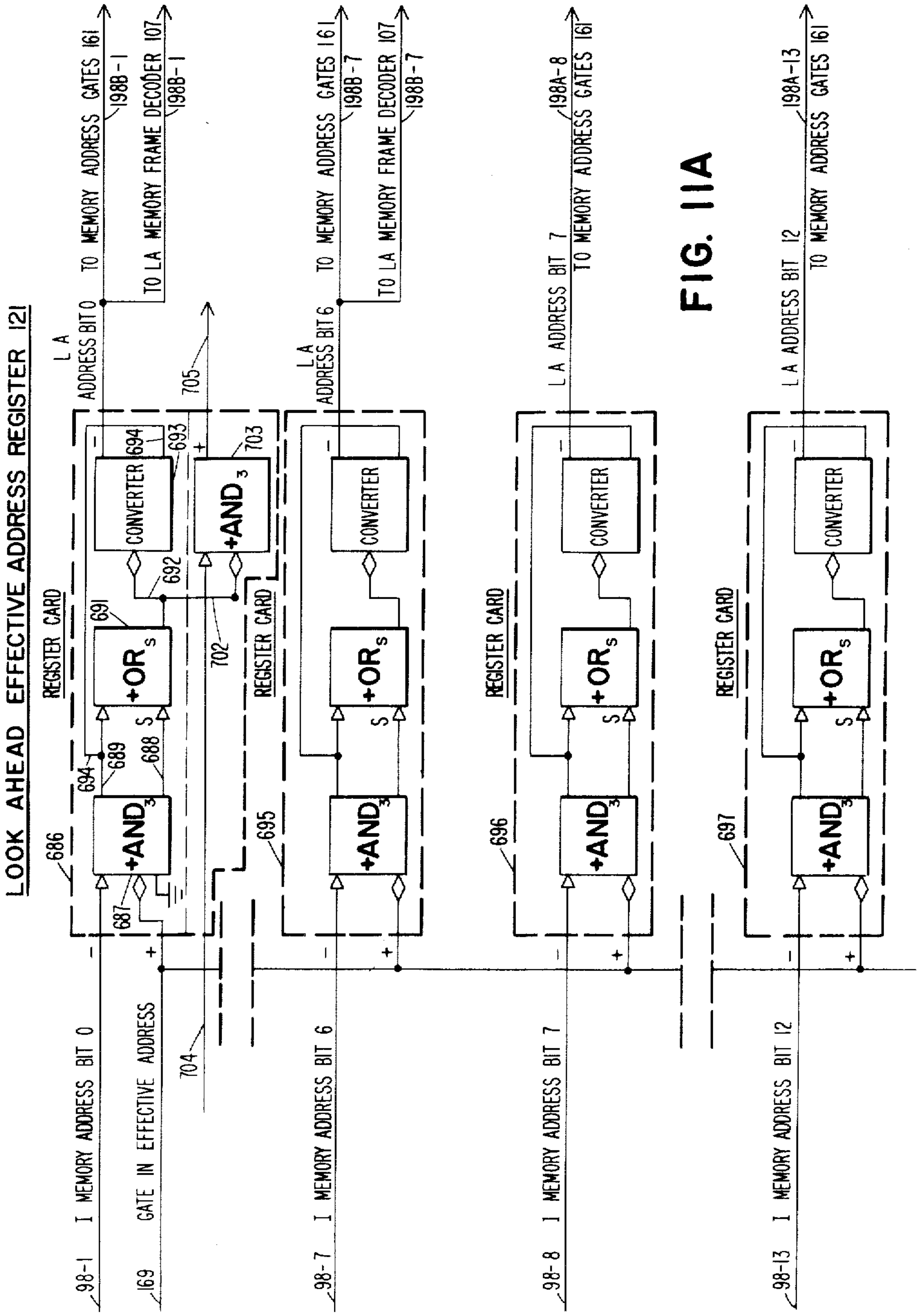
Figure 11B:
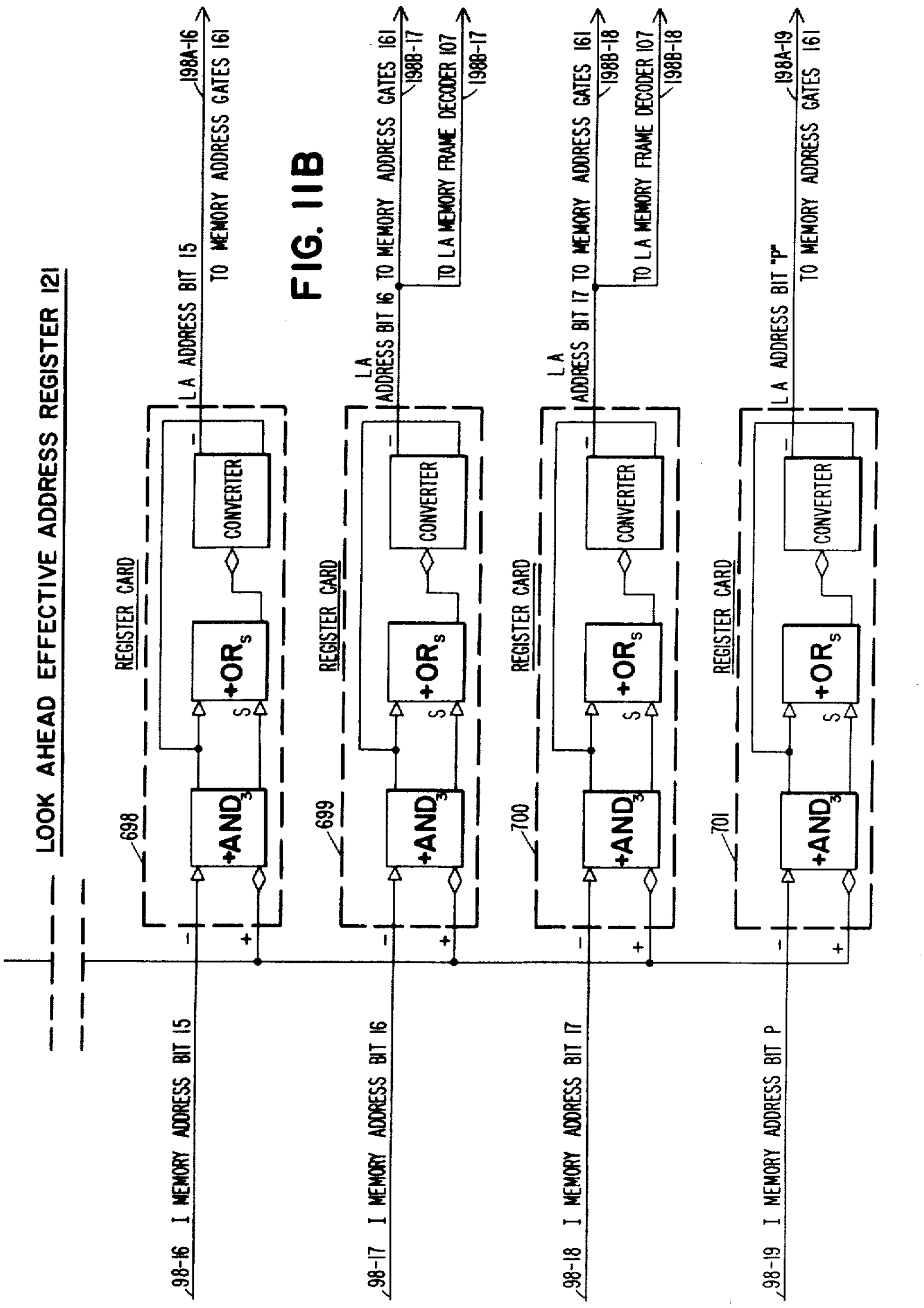

FIGS. 11A and 11B are a logical diagram of the Look Ahead Effective Address Register shown as block 121 in FIG. 2B.

Figure 2E:
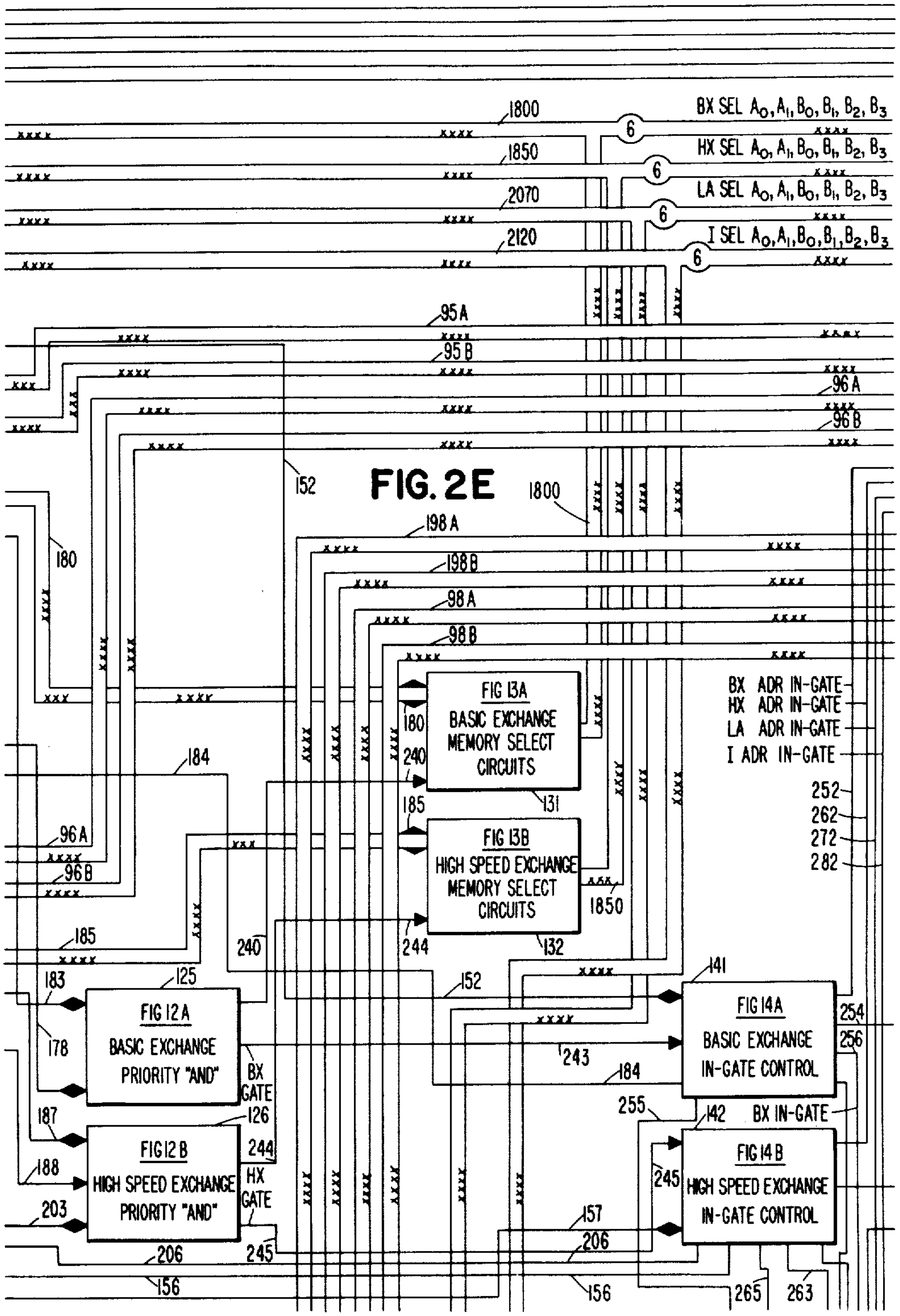
Figure 12A:
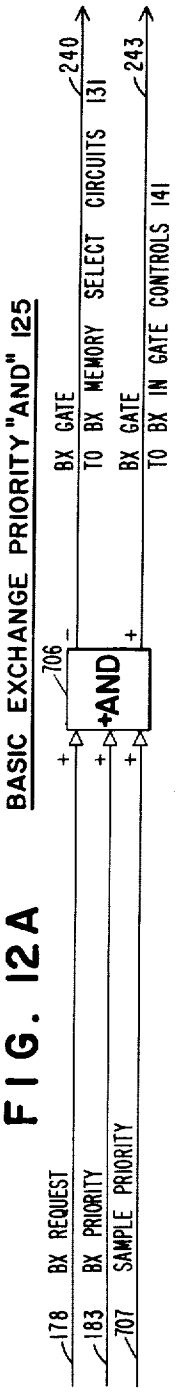

FIG. 12A is a logical diagram of the Basic Exchange Priority AND shown as block 125 in FIG. 2E.

Figure 12B:
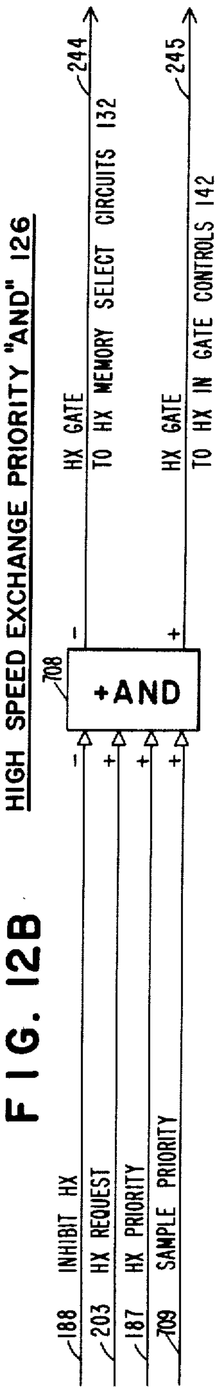

FIG. 12B is a logical diagram of the High Speed Exchange Priority AND shown as block 126 in FIG. 2E.

Figure 2F:
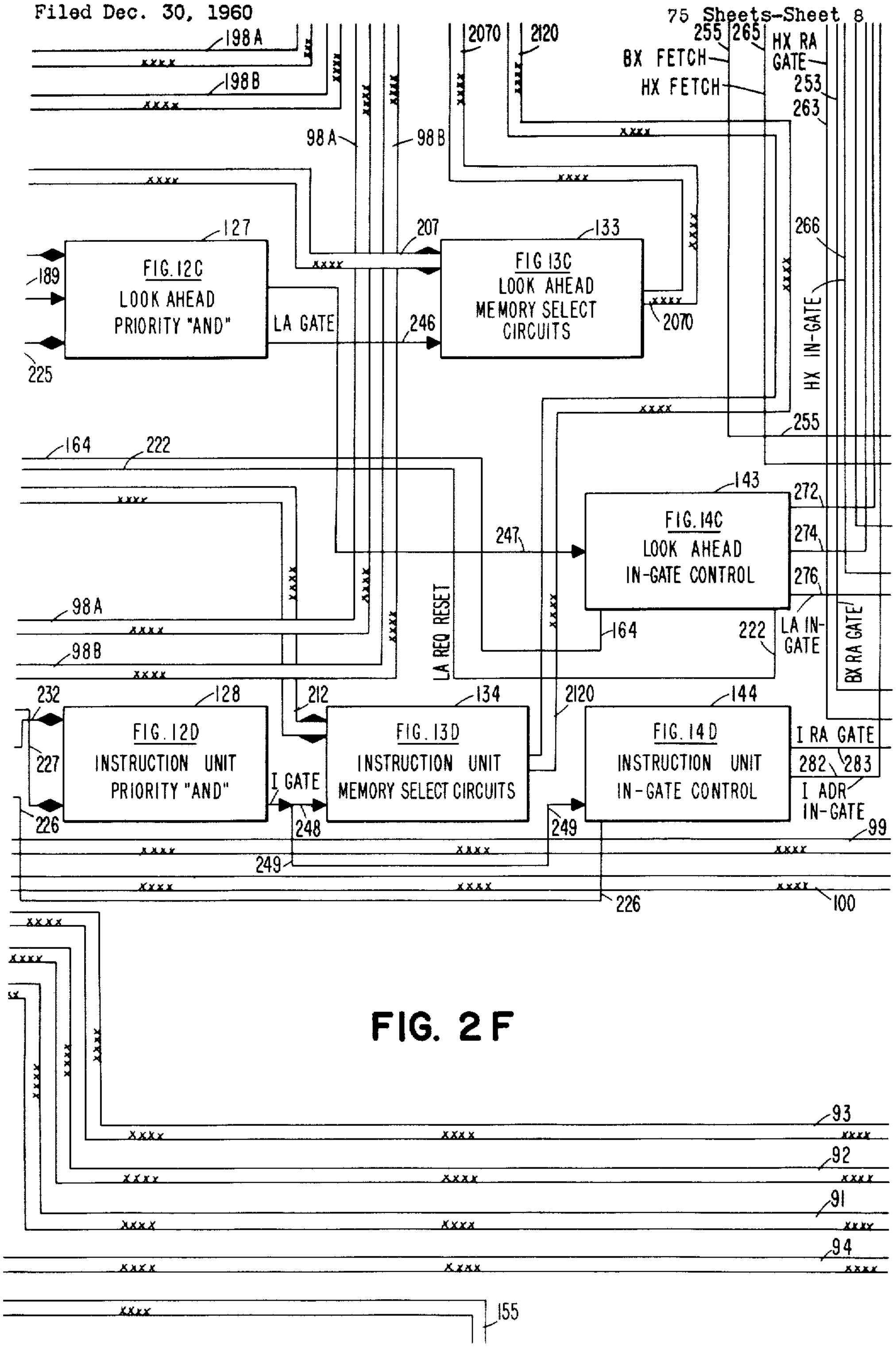
Figure 12C:
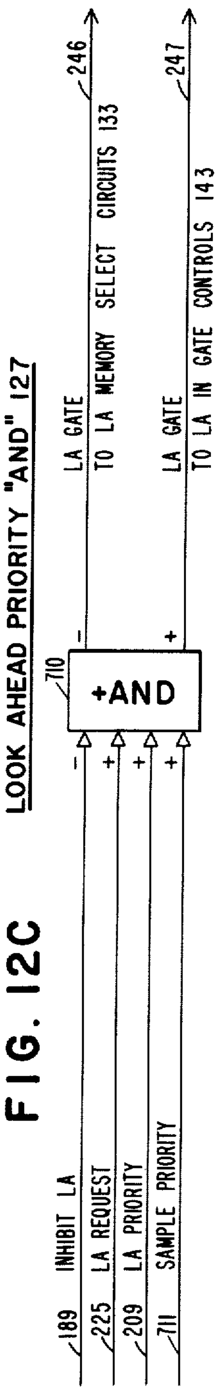

FIG. 12C is a logical diagram of the Look Ahead Priority AND shown as block 127 in FIG. 2F.

Figure 12D:
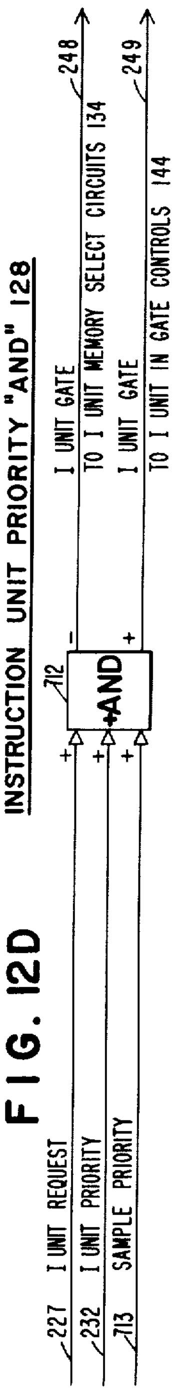

FIG. 12D is a logical diagram of the Instruction Unit Priority AND shown as block 128 in FIG. 2F.

Figure 13A:
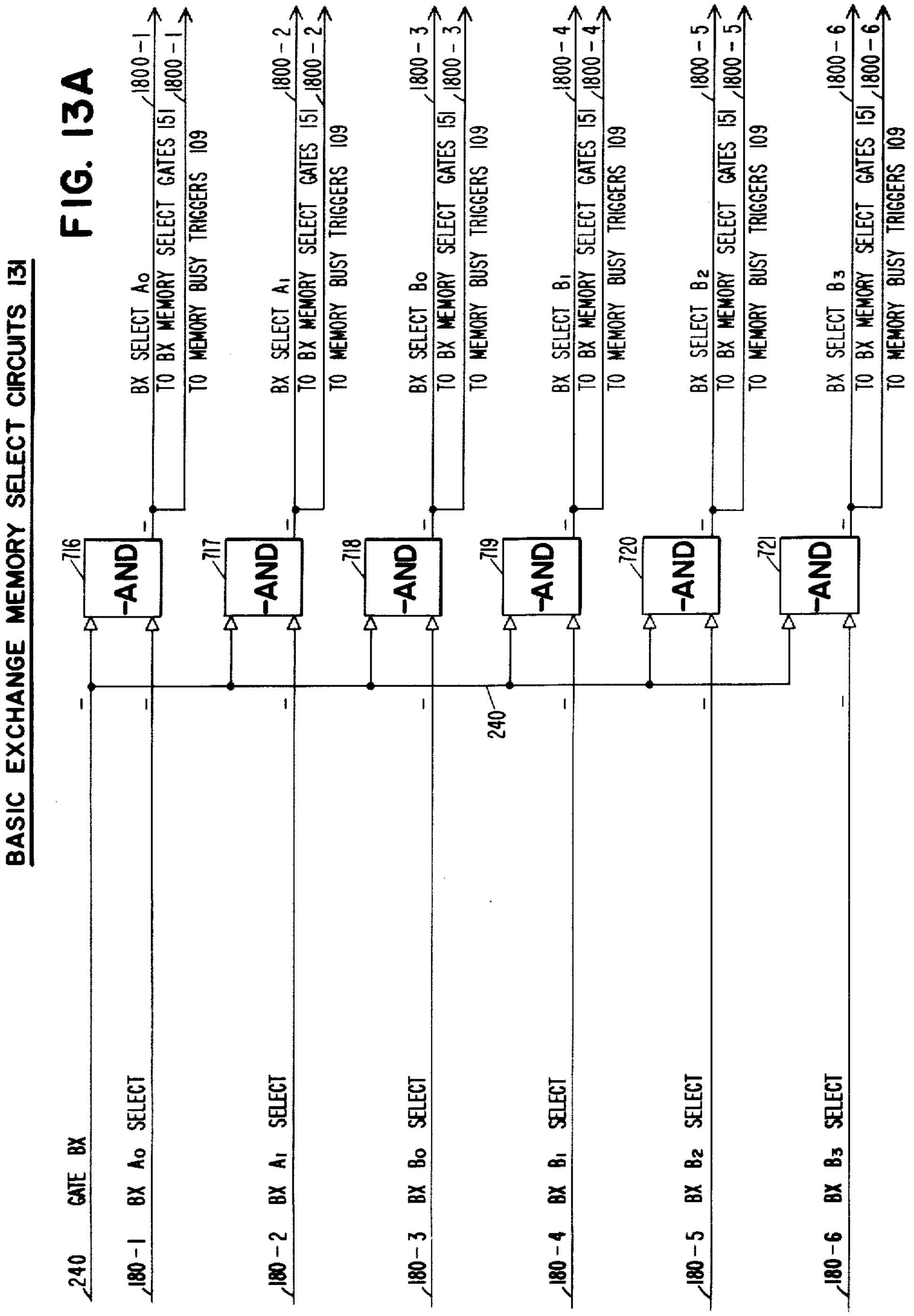

FIG. 13A is a logical diagram of the Basic Exchange Memory Select Circuits shown as block 131 in FIG. 2E.

Figure 13B:
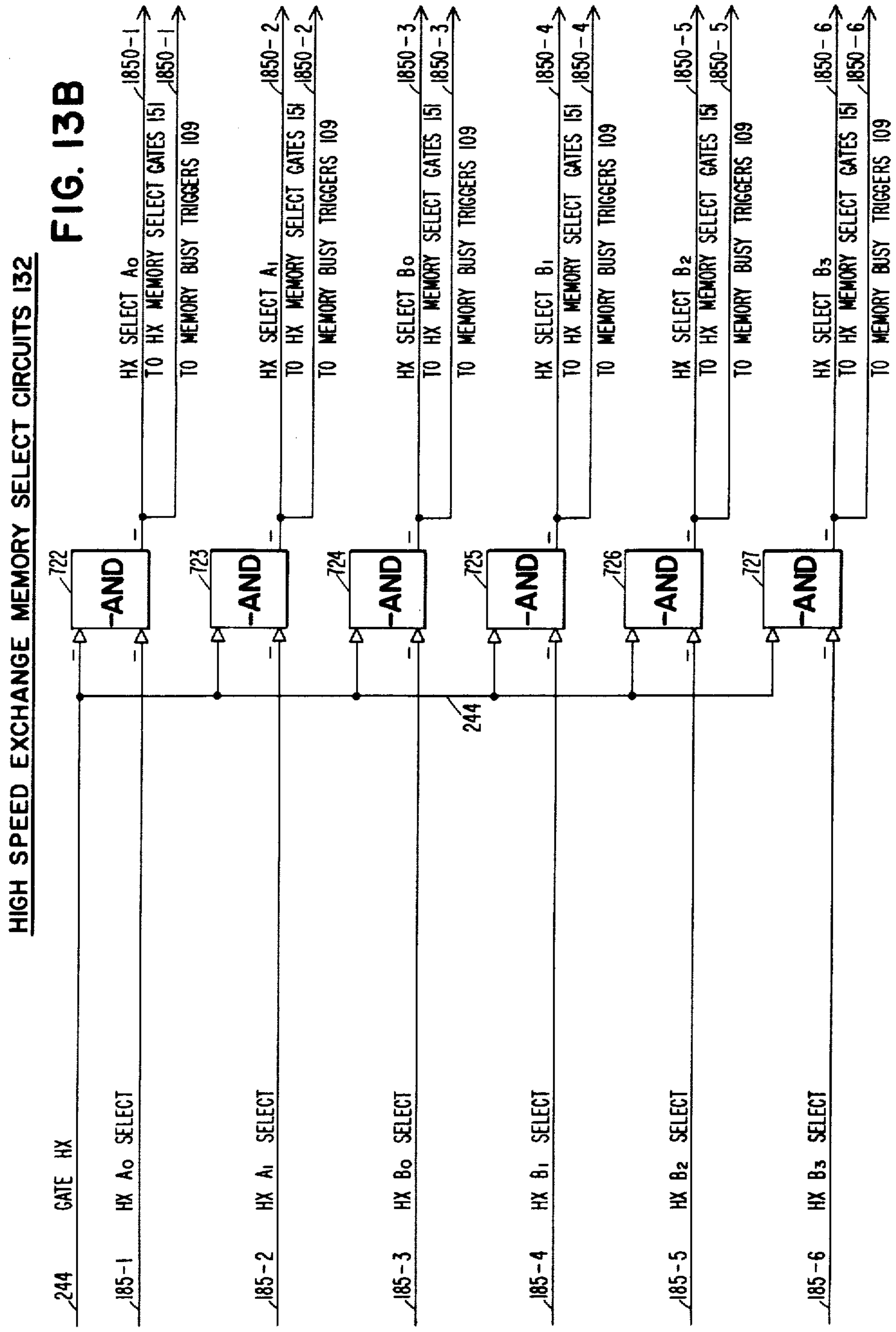

FIG. 13B is a logical diagram of the High Speed Exchange Memory Select Circuits shown as block 132 in FIG. 2E.

Figure 13C:
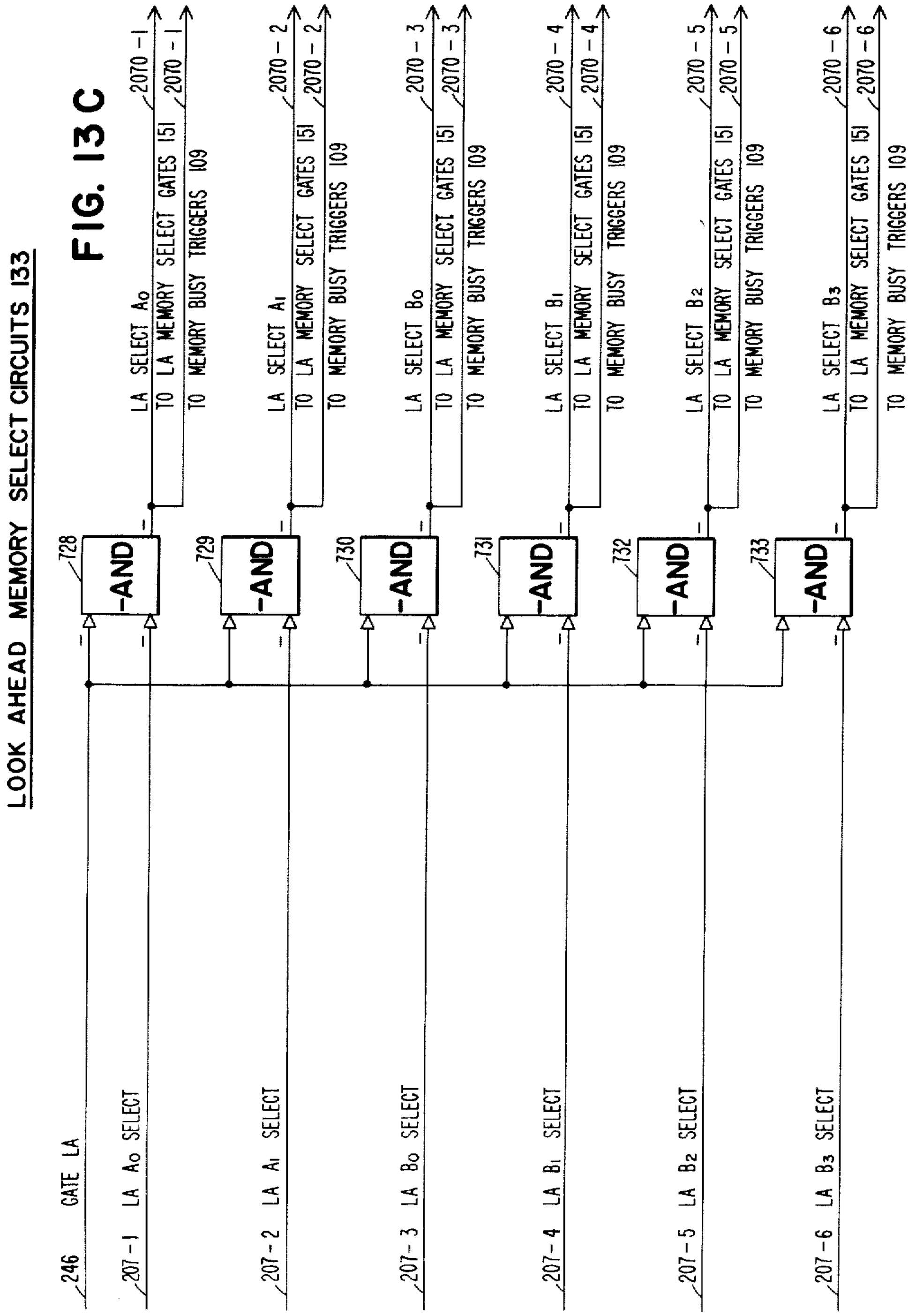

FIG. 13C is a logical diagram of the Look Ahead Memory Select Circuits shown as block 133 in FIG. 2F.

Figure 13D:
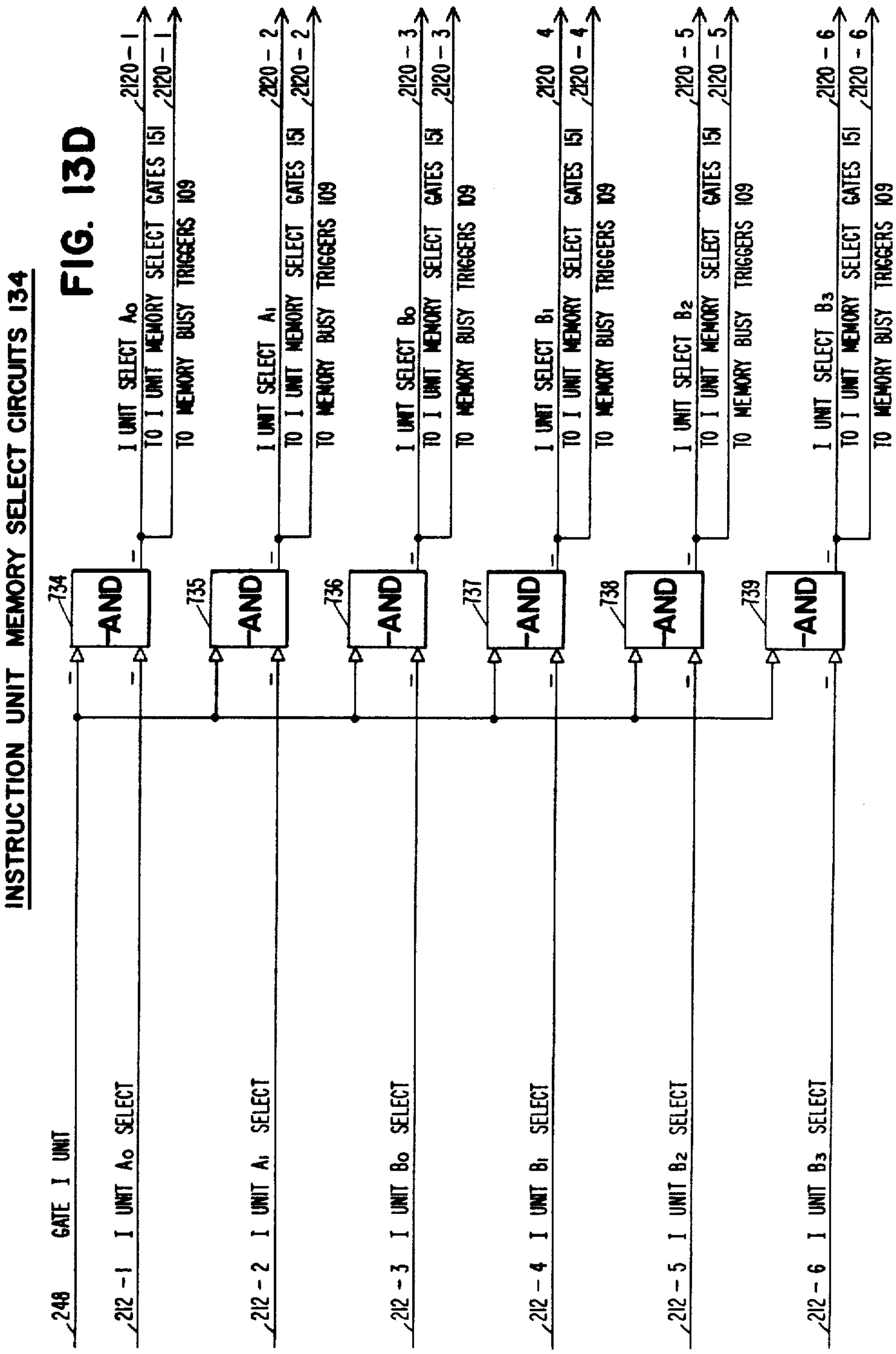

FIG. 13D is a logical diagram of the Instruction Unit Memory Select Circuits shown as block 134 in FIG. 2F.

Figure 14A:
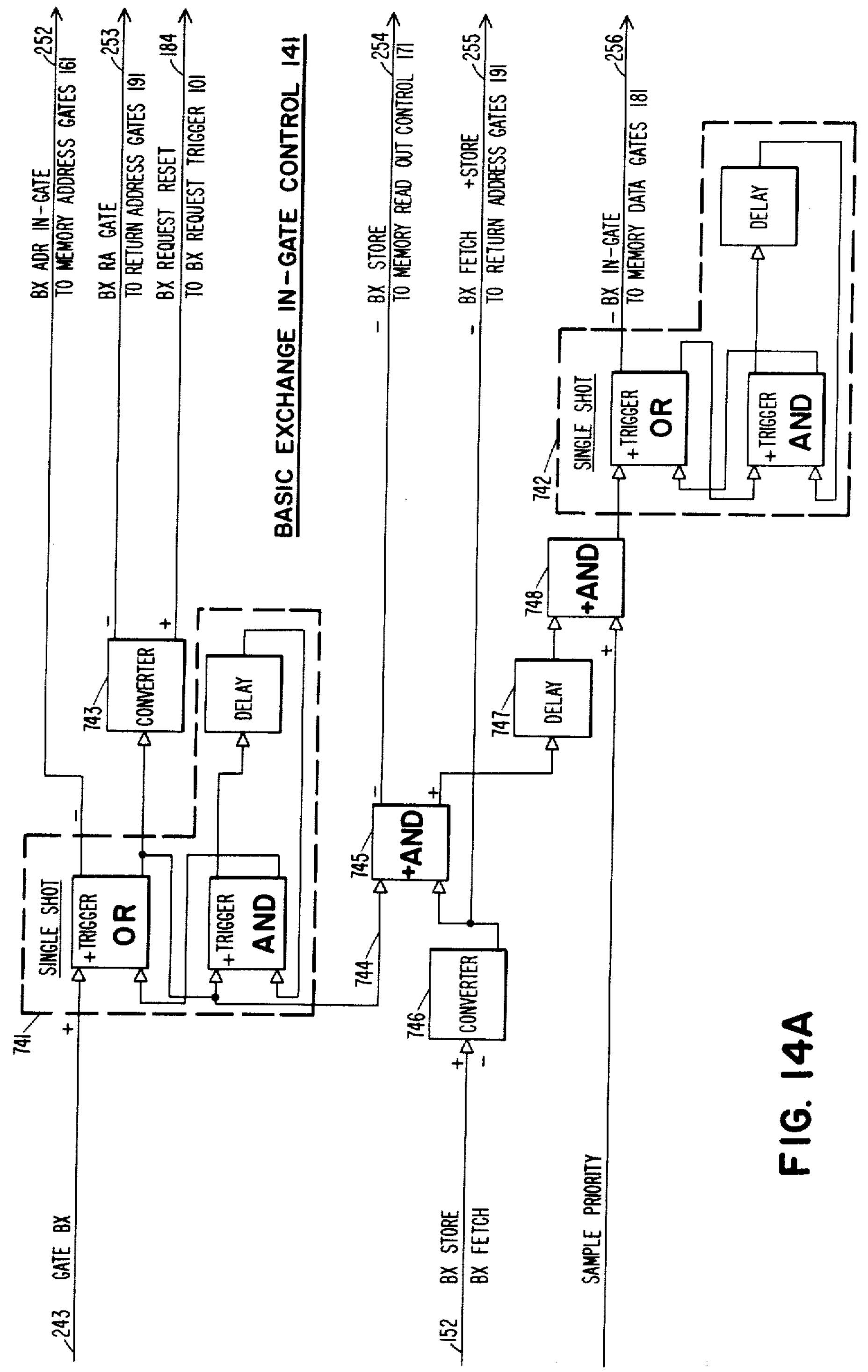

FIG. 14A is a logical diagram of the Basic Exchange In-Gate Control shown as block 141 in FIG. 2E.

Figure 14B:
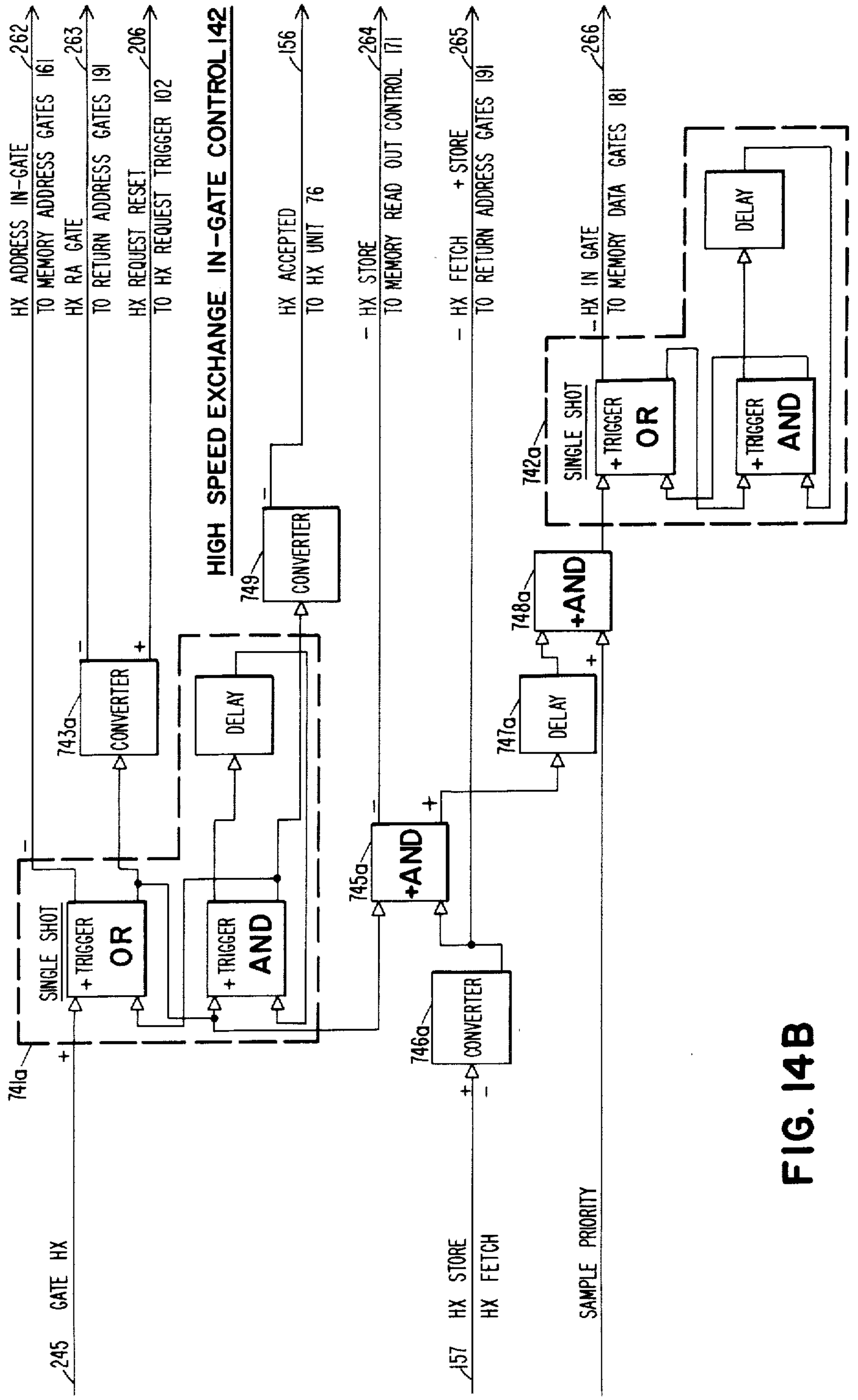

FIG. 14B is a logical diagram of the High Speed Exchange In-Gate Control shown as block 142 in FIG. 2E.

Figures 14C, 14D:
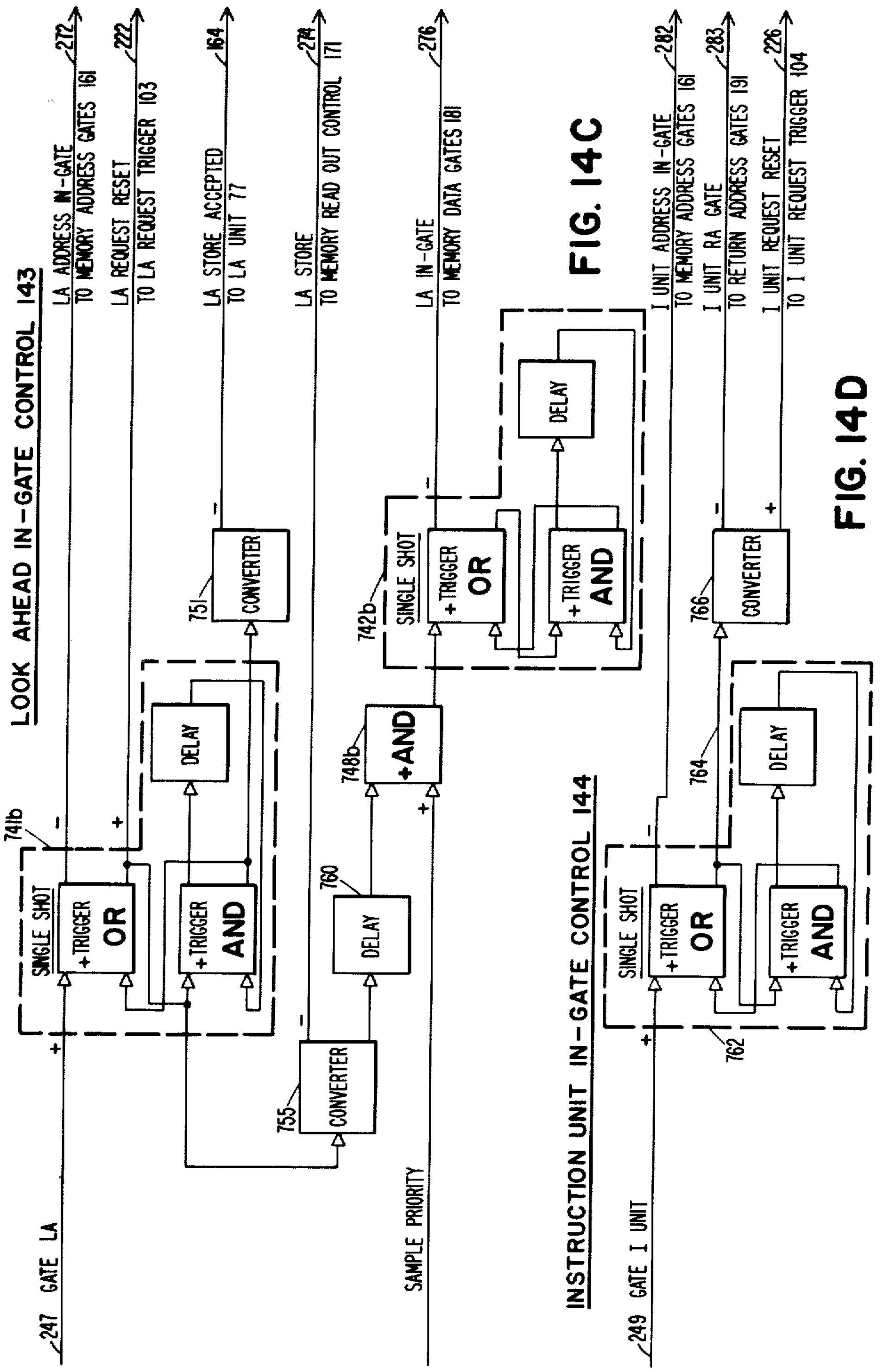

FIG. 14C is a logical diagram of the Look Ahead In-Gate Control shown as block 143 in FIG. 2F.

FIG. 14D is a logical diagram of the Instruction Unit In-Gate Control shown as block 144 in FIG. 2F.

Figure 2G:
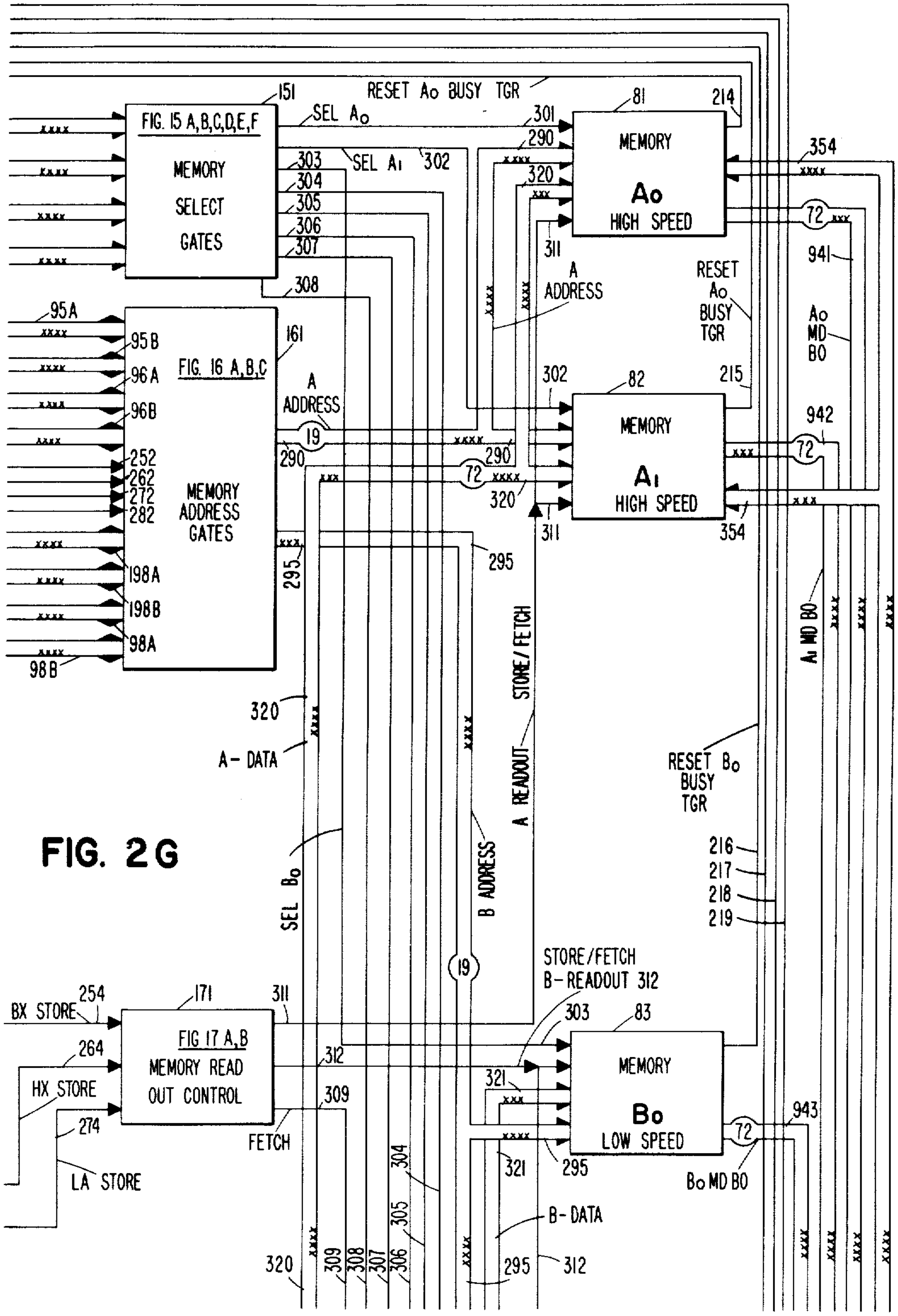
Figure 15A:
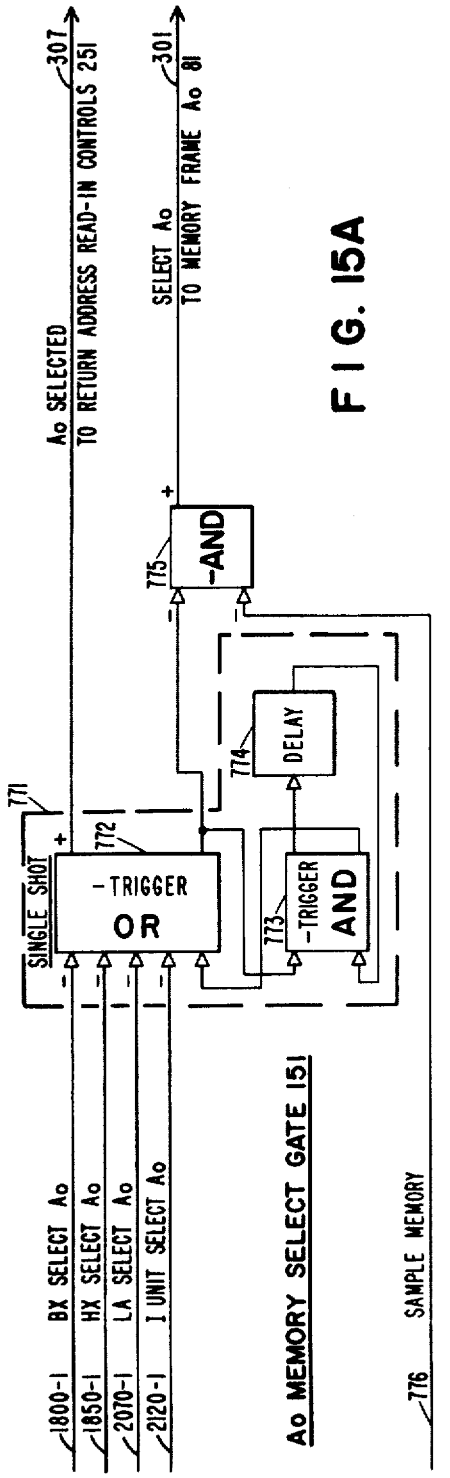

FIGS. 15A, B, C, D, E and F are logical diagrams of the Memory Select Gates shown as block 151 in FIG. 2G.

Figure 16A:
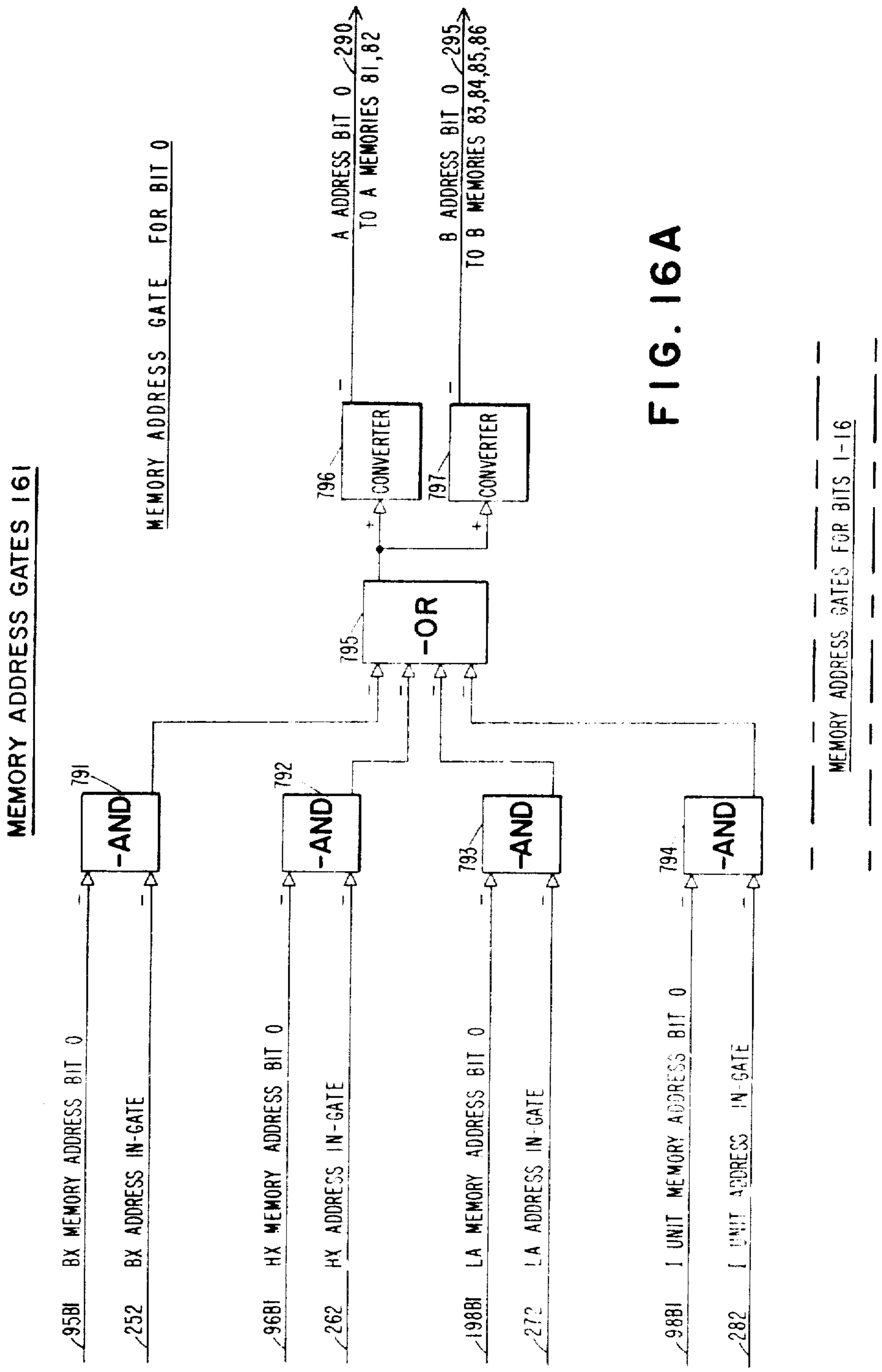
Figure 16B:
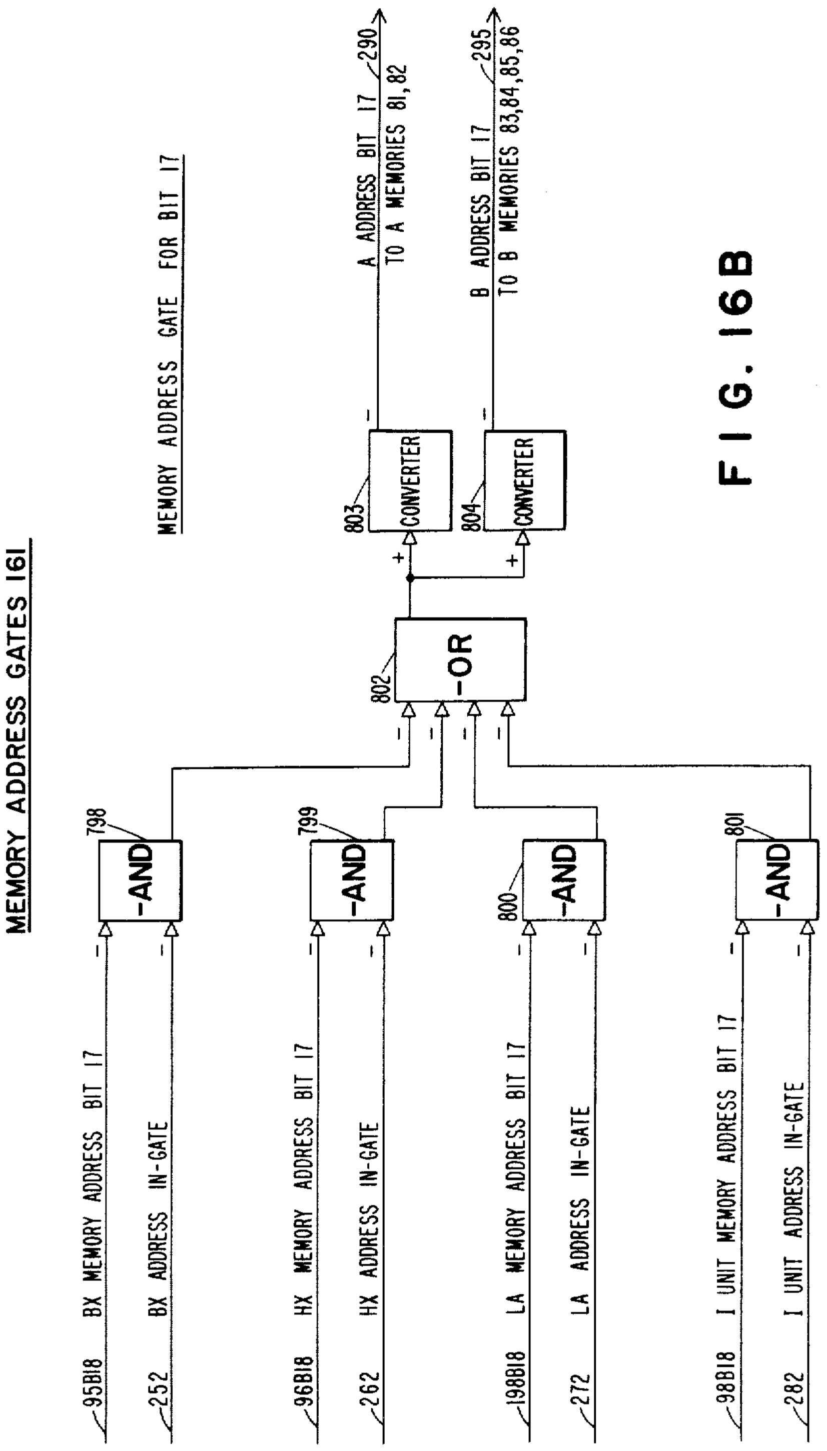
Figure 16C:
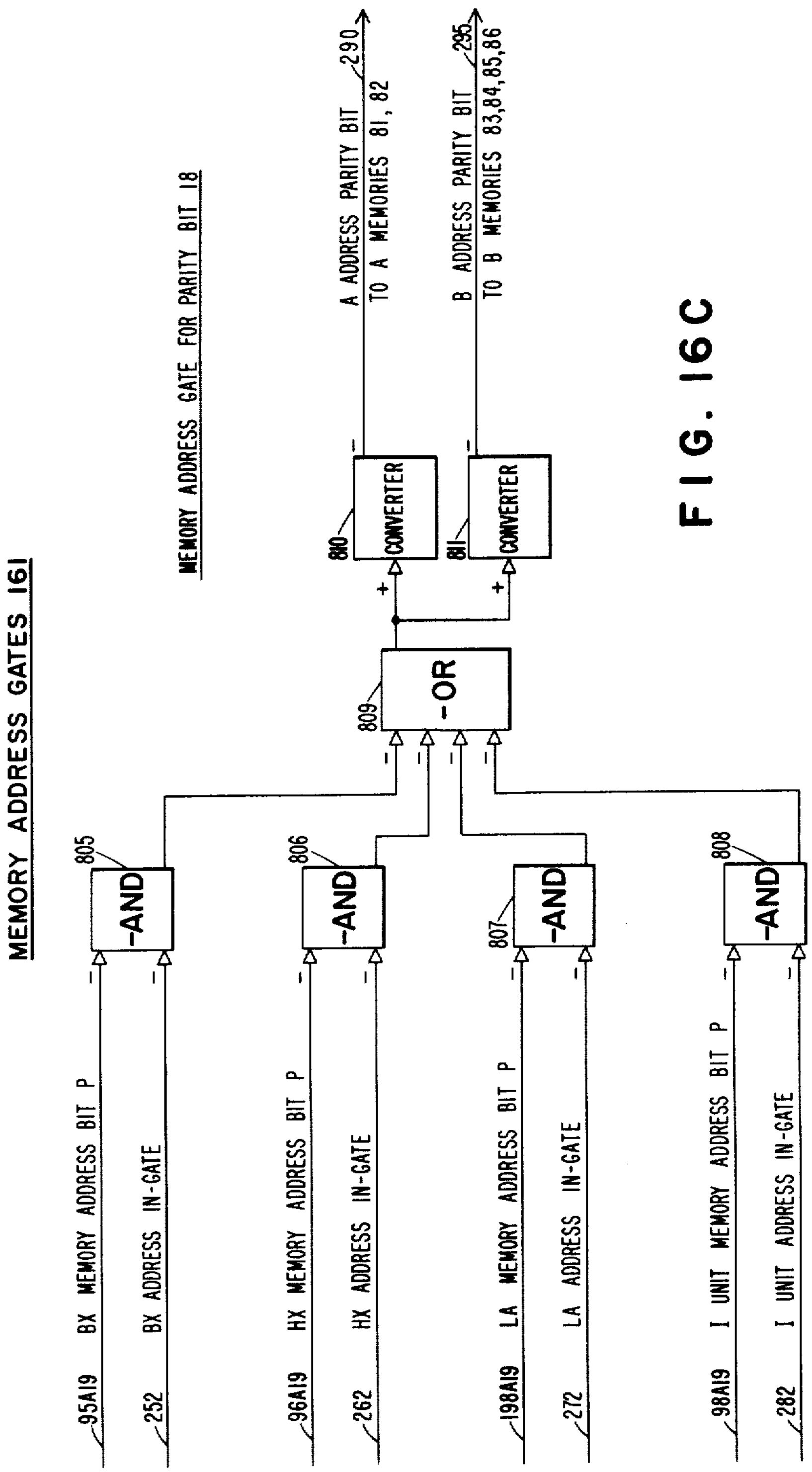

FIGS. 16A, 16B and 16C are a logical diagram of the Memory Address Gates shown as block 161 in FIG. 2G.

Figure 17A:
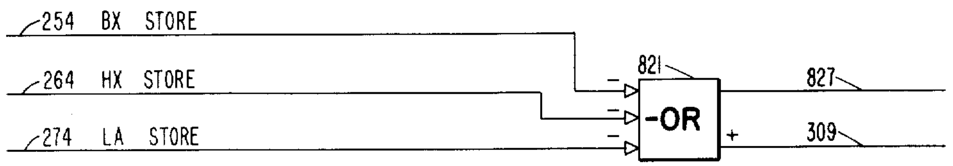
Figure 17B:
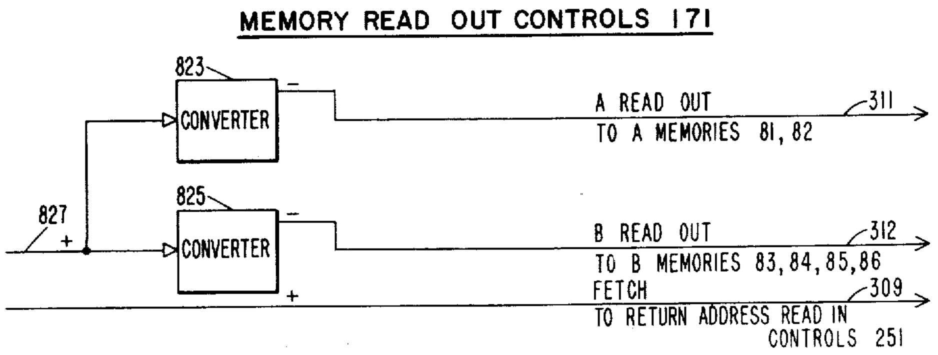

FIGS. 17A and 17B are a logical diagram of the Memory Readout Control shown as block 171 in FIG. 2G.

Figure 2H:
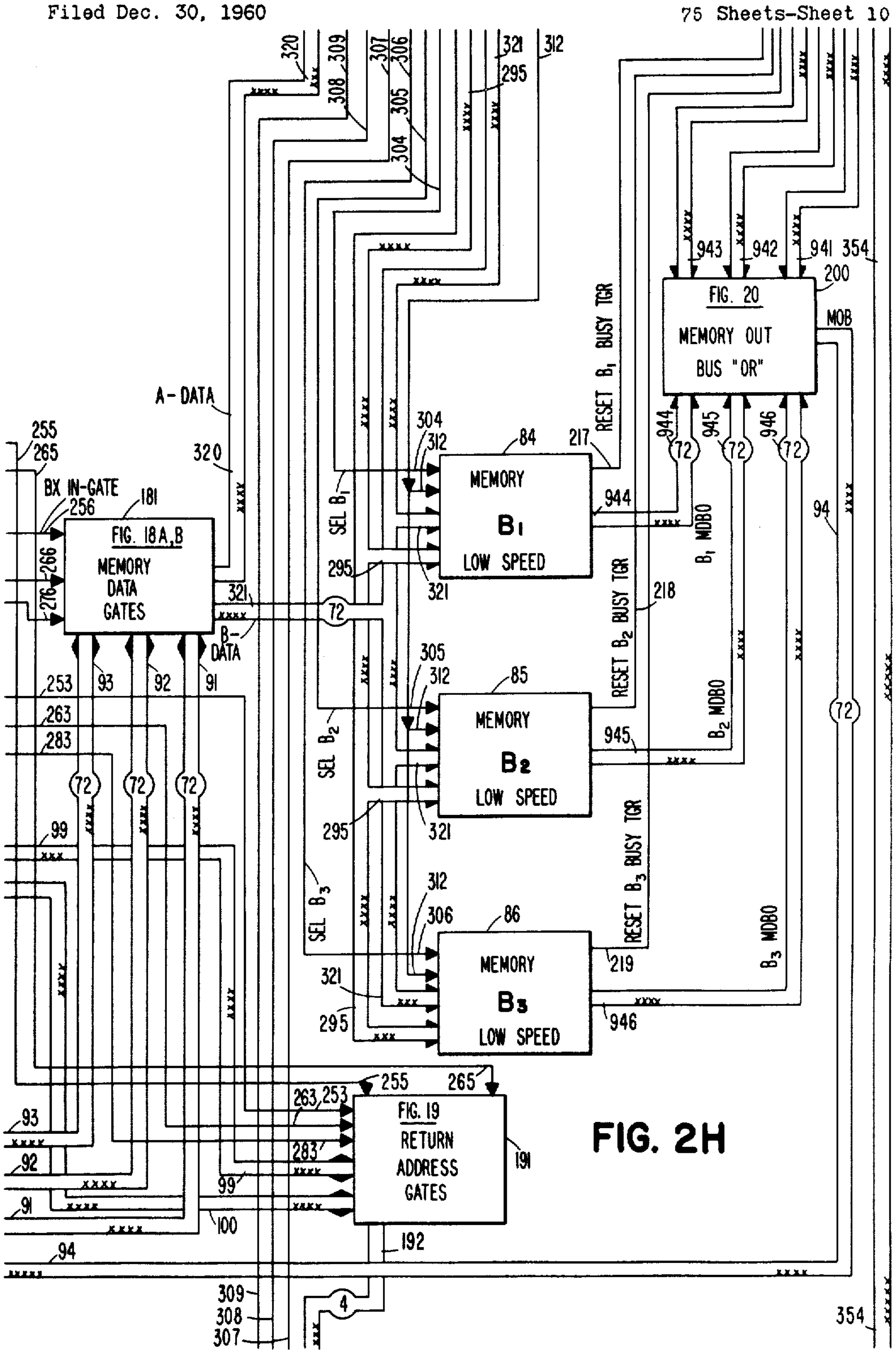
Figure 18A:
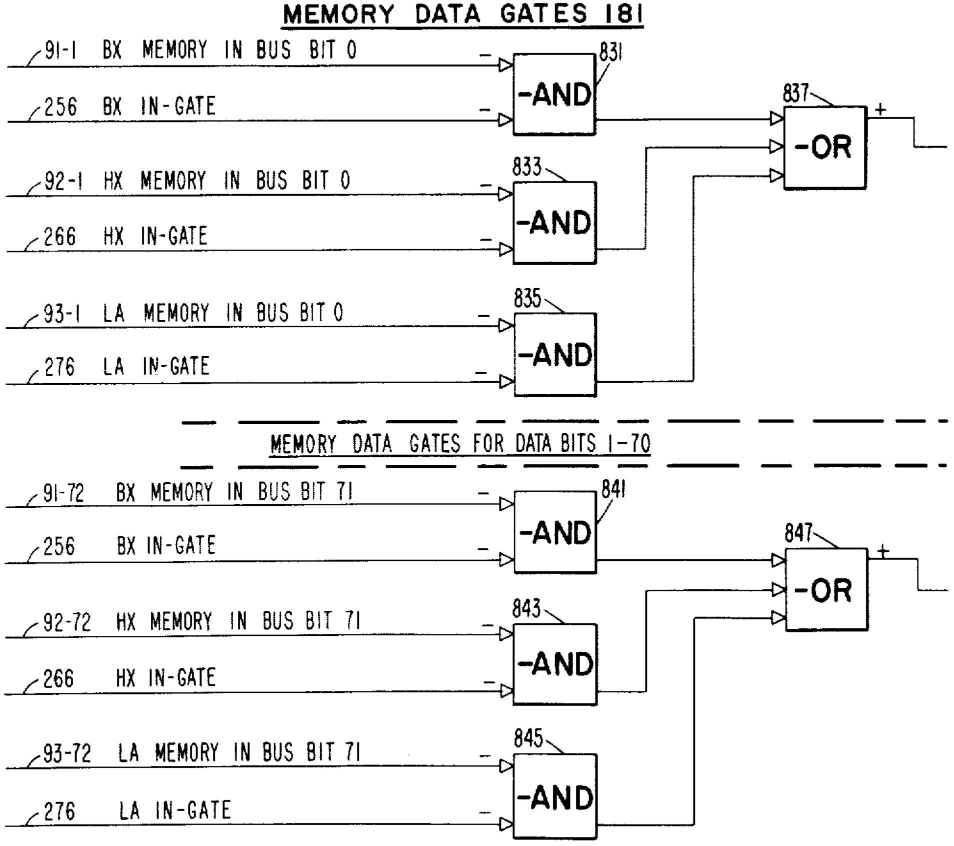
Figure 18B:
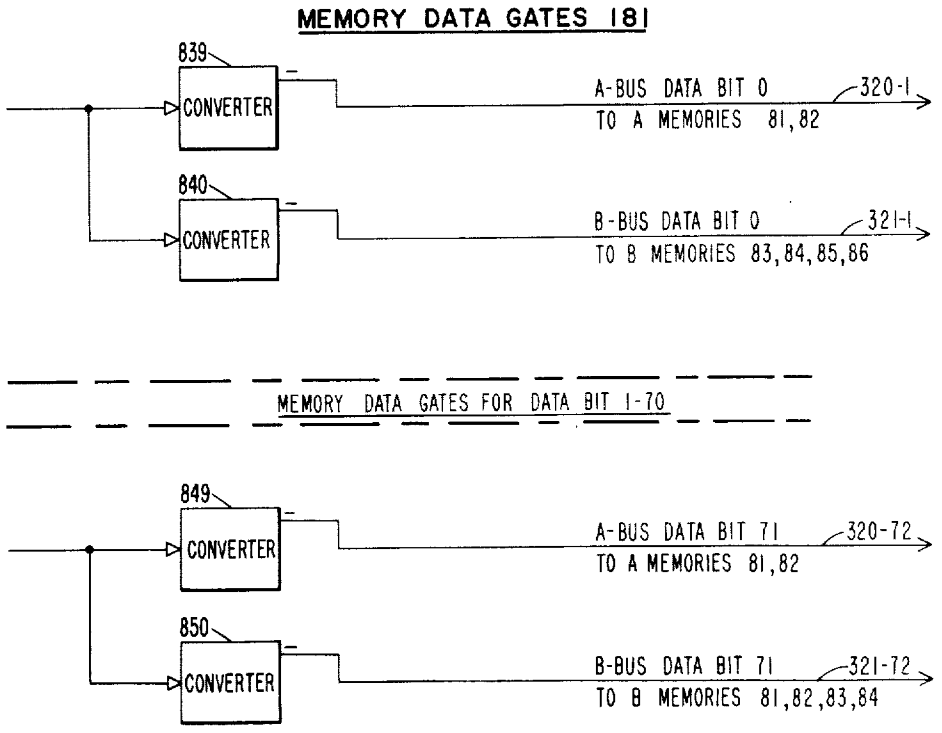

FIGS. 18A and 18B are a logical diagram of the Memory Data Gate shown as block 181 in FIG. 2H.

Figure 19:
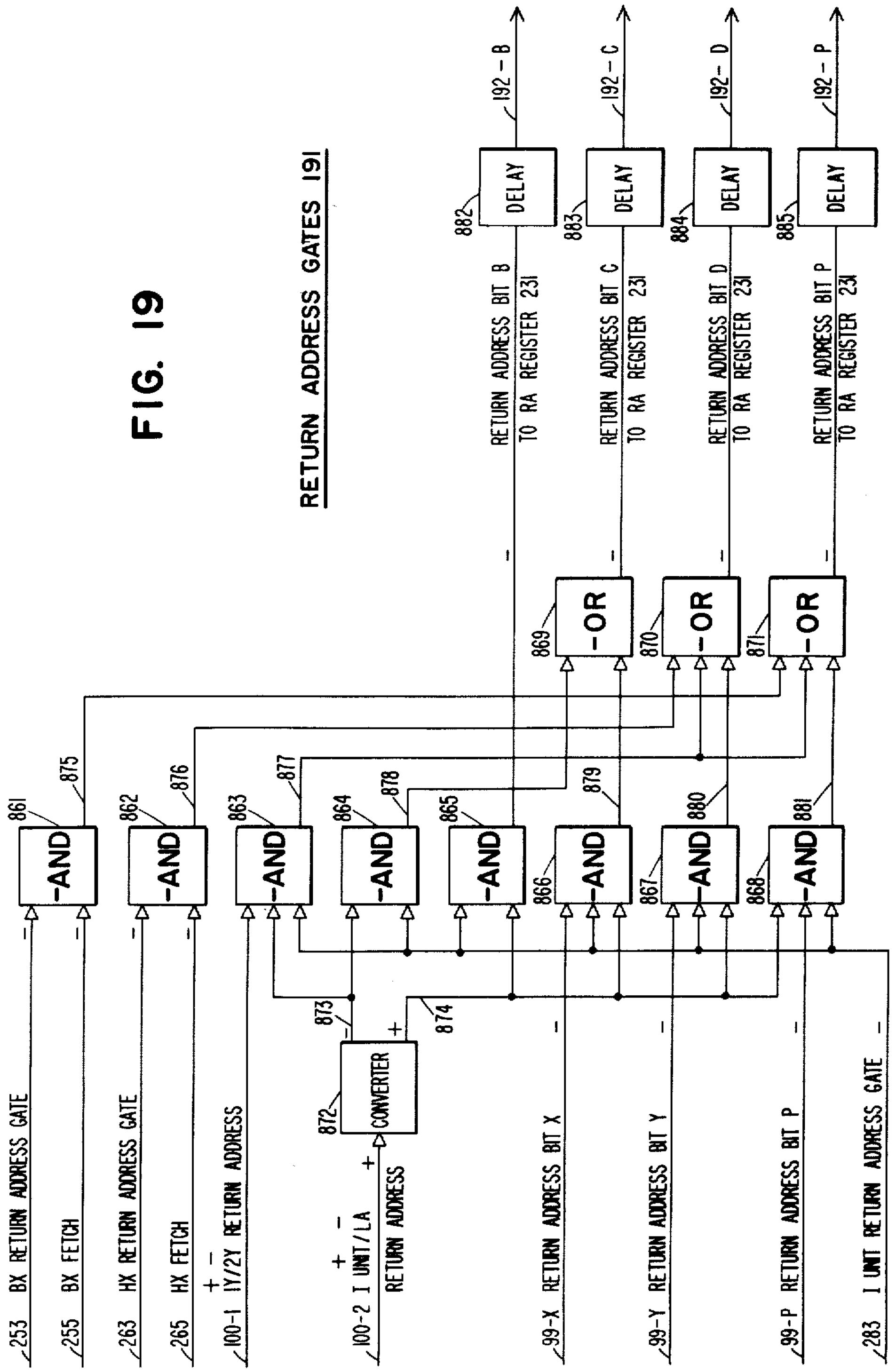

FIG. 19 is a logical diagram of the Return Address Gates shown as block 191 in FIG. 2H.

Figure 20:
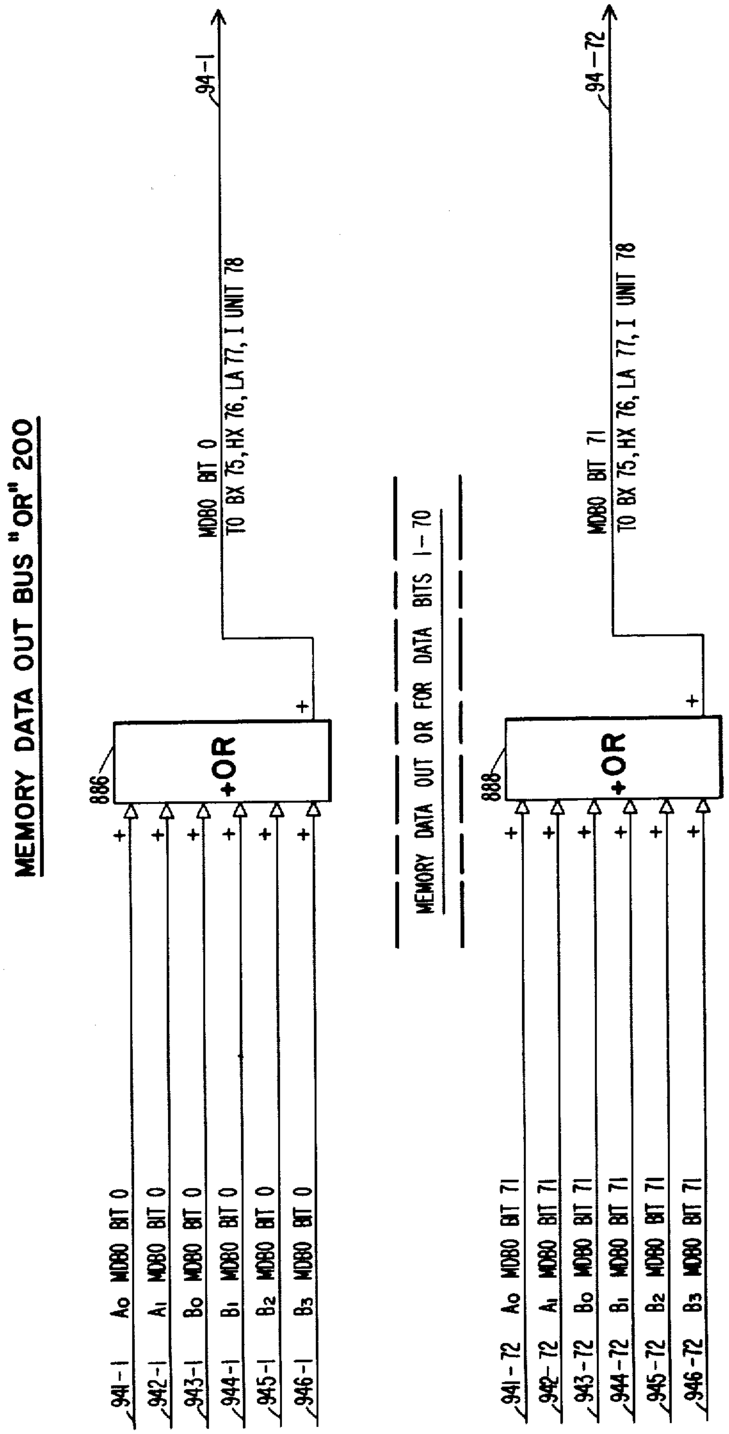

FIG. 20 is a logical diagram of the Memory Out Bus OR shown as block 200 in FIG. 2H.

Figure 21:
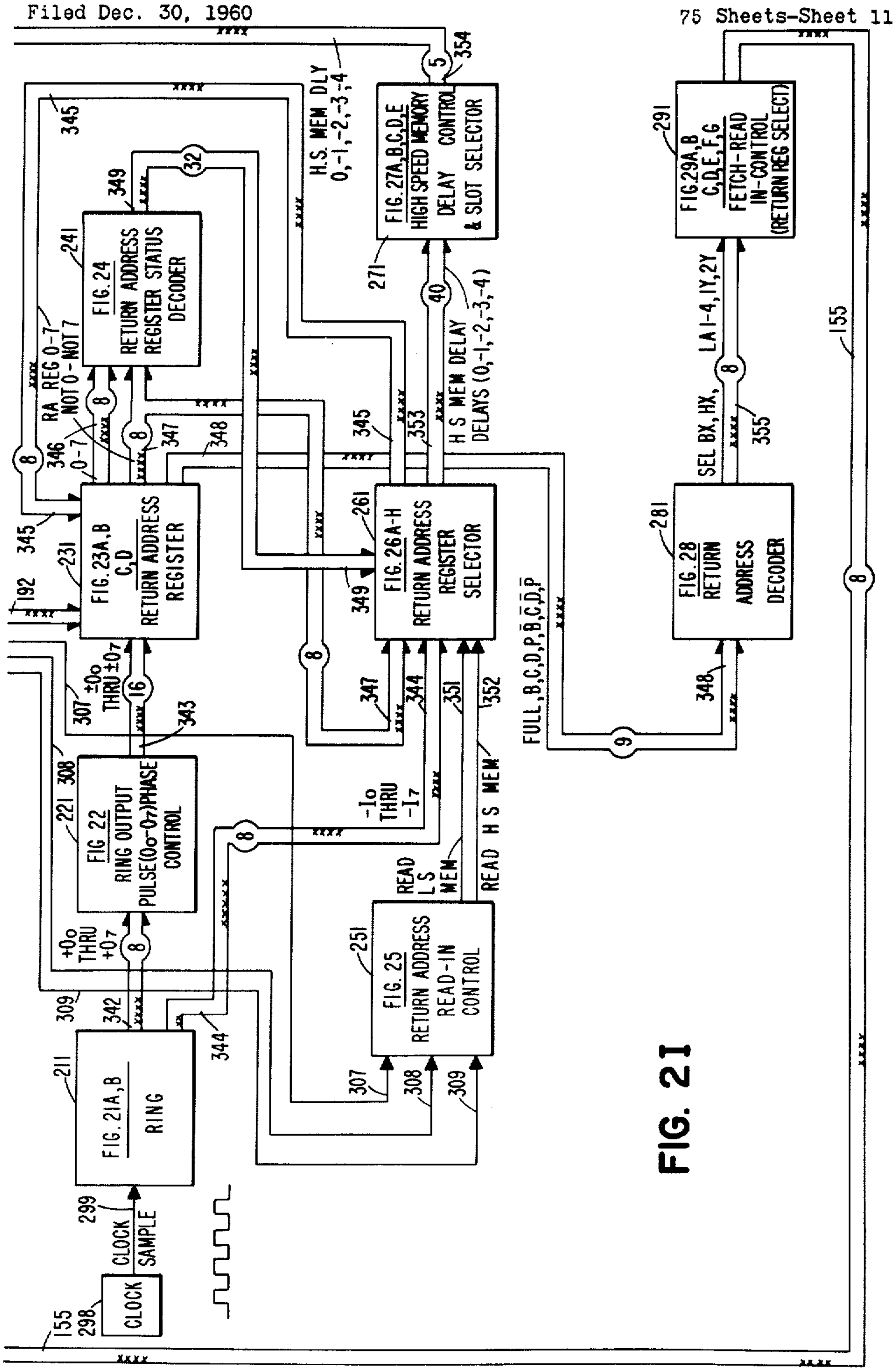
Figure 21A:
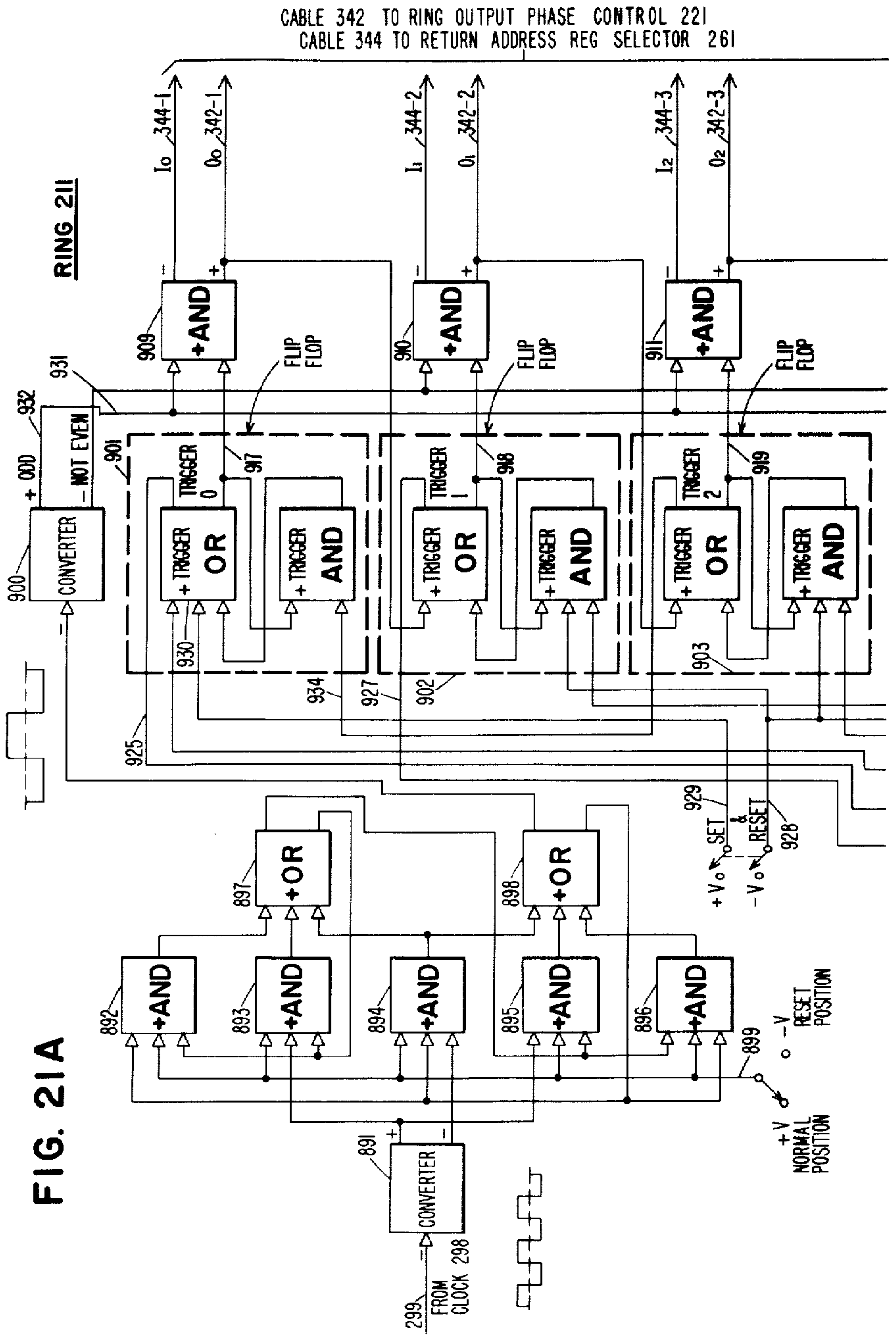
Figure 21B:
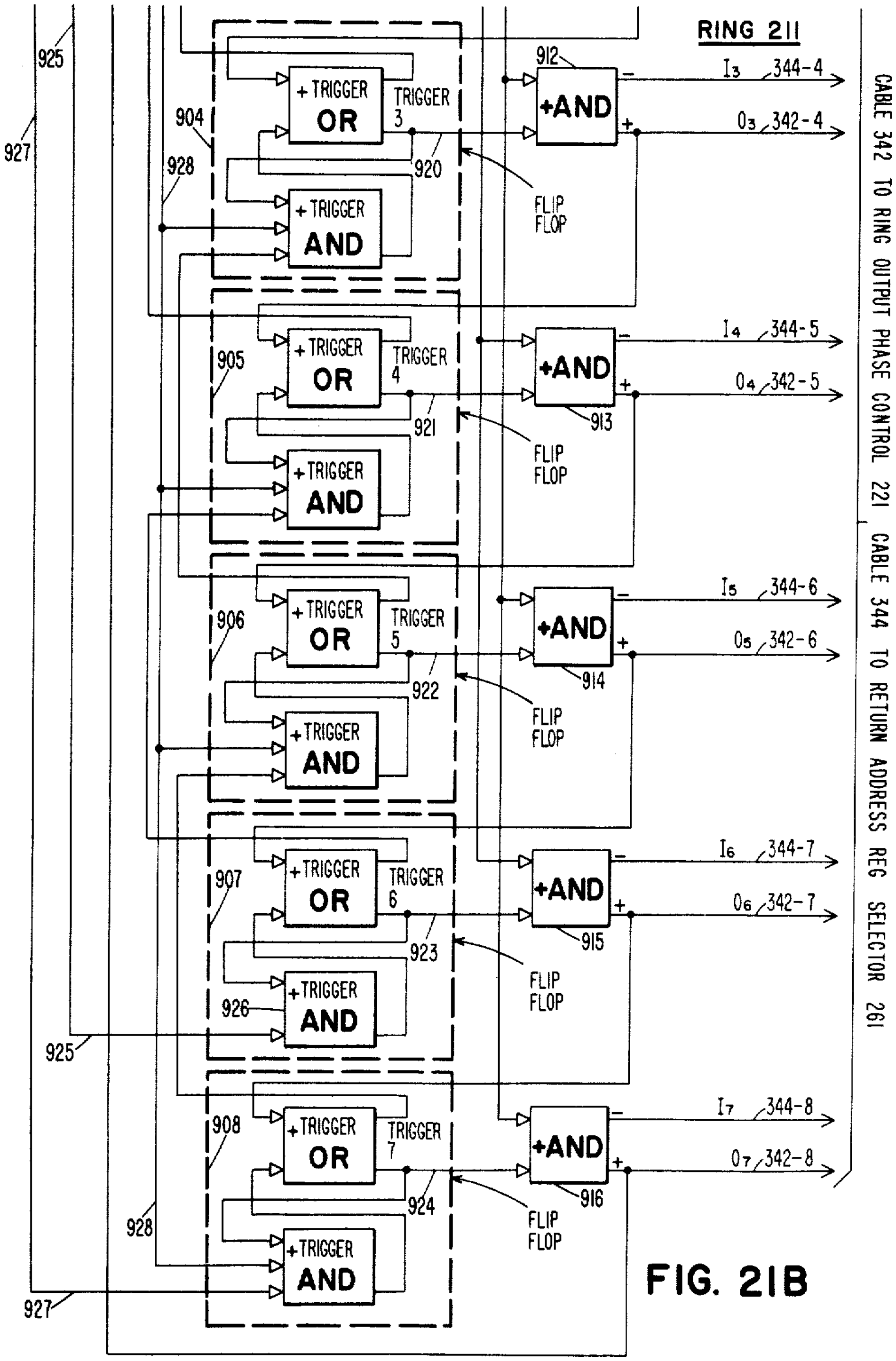

FIGS. 21A and 21B are a logical diagram of the Ring Circuits shown as block 211 in FIG. 2I.

Figure 22:
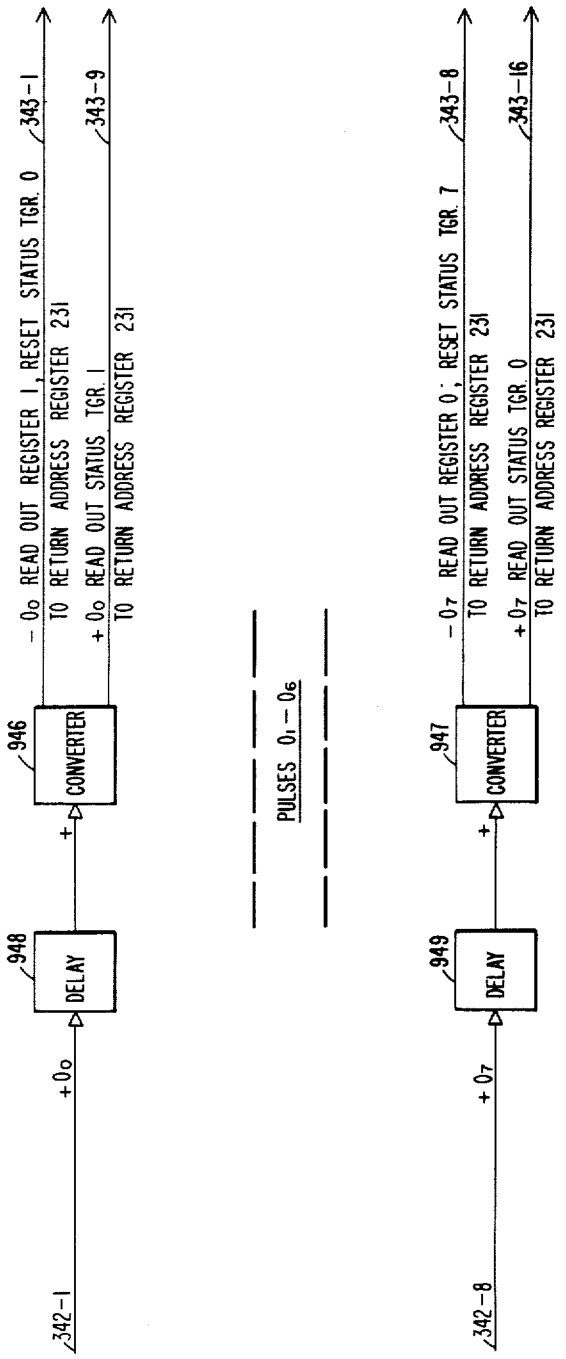

FIG. 22 is a logical diagram of the Ring Output Pulse ($O_0$–$O_7$) Phase Control shown as block 221 in FIG. 2I.

Figure 23A:
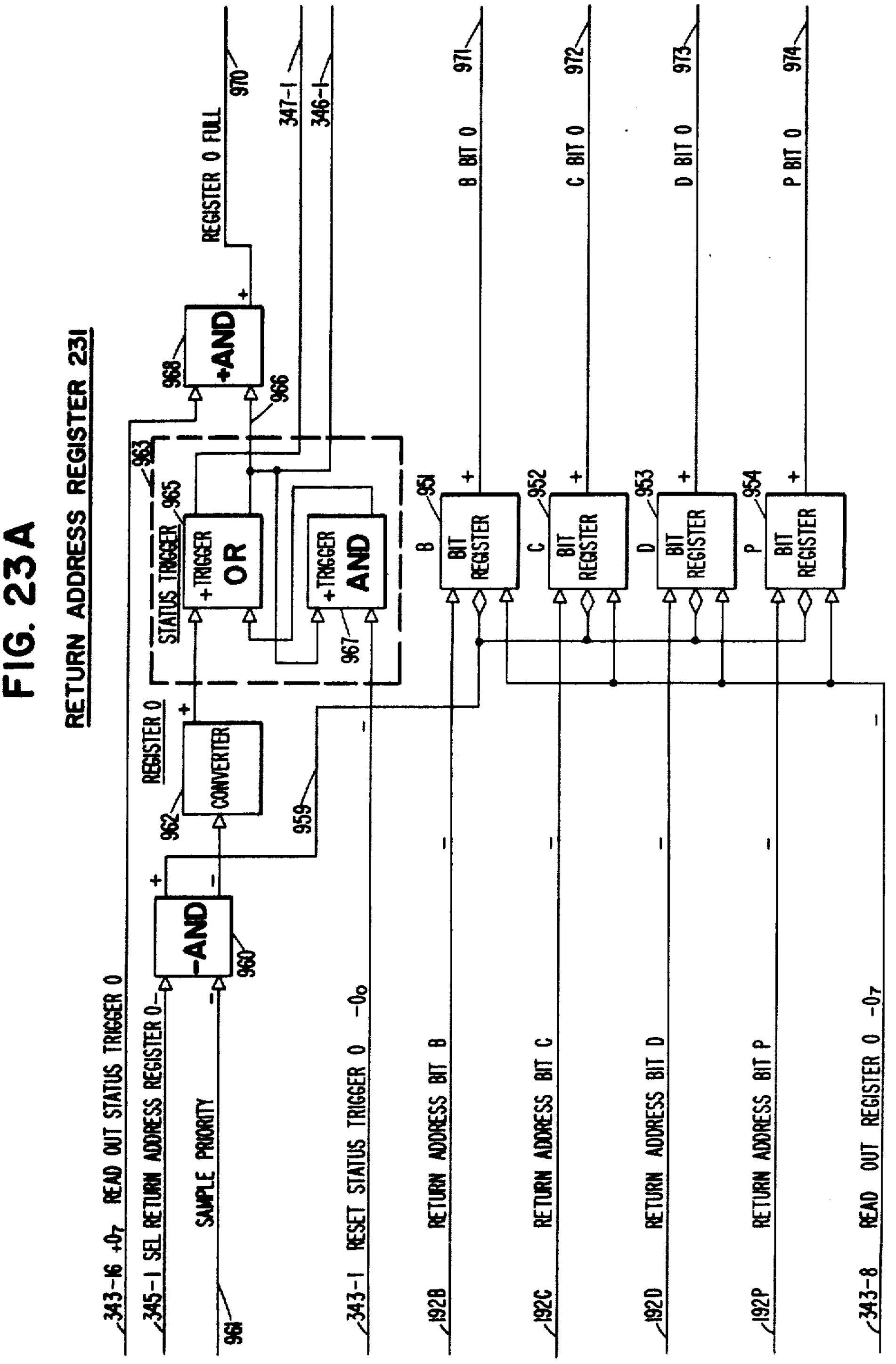

FIGS. 23A, B, C, and D are a logical diagram of the Return Address Register shown as block 231 in FIG. 2I.

Figure 24:
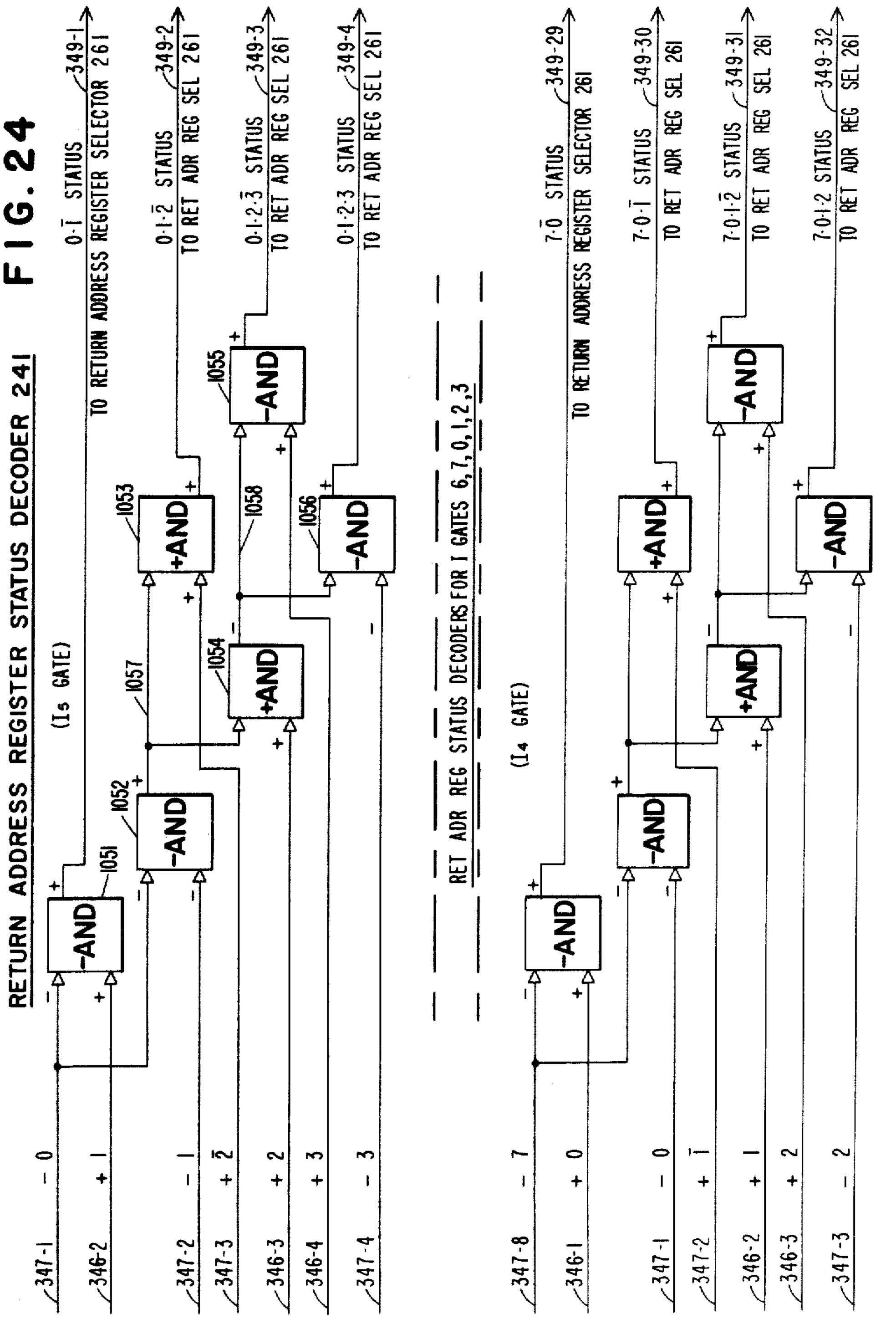

FIG. 24 is a logical diagram of the Return Address Register Status Decoder shown as block 241 in FIG. 2I.

Figure 25:
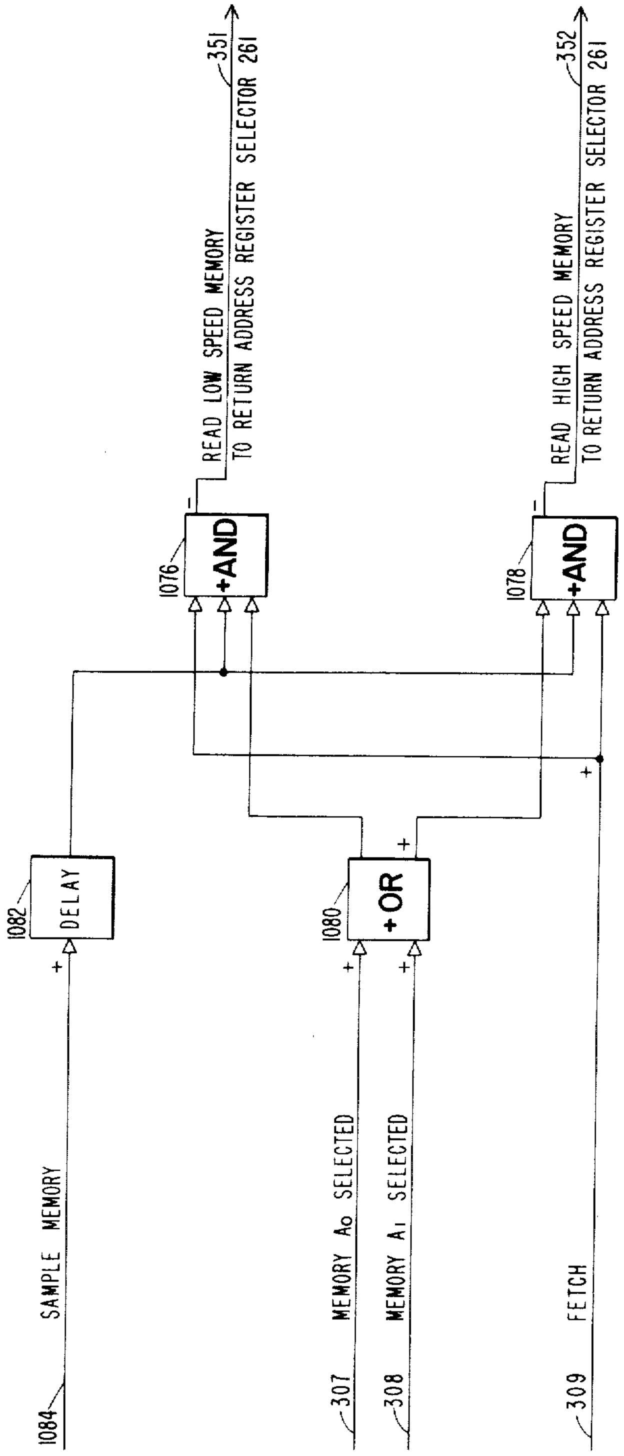

FIG. 25 is a logical diagram of the Return Address Read-In Control shown as block 251 in FIG. 2I.

Figure 26A:
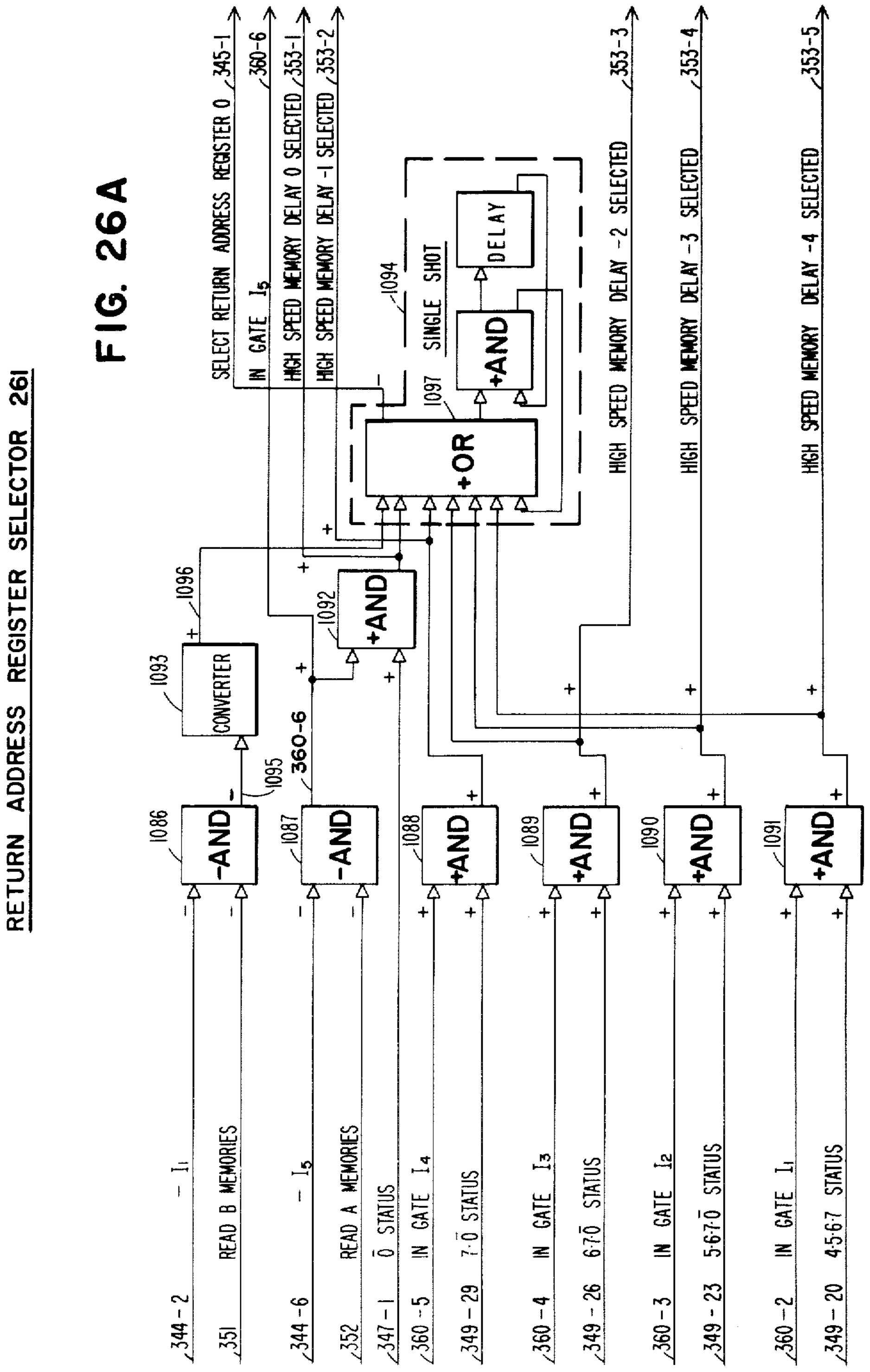

FIGS. 26A, B, C, D, E, F, G and H are logical diagrams of the Return Address Register Selector shown as block 261 in FIG. 2I.

Figure 27A:
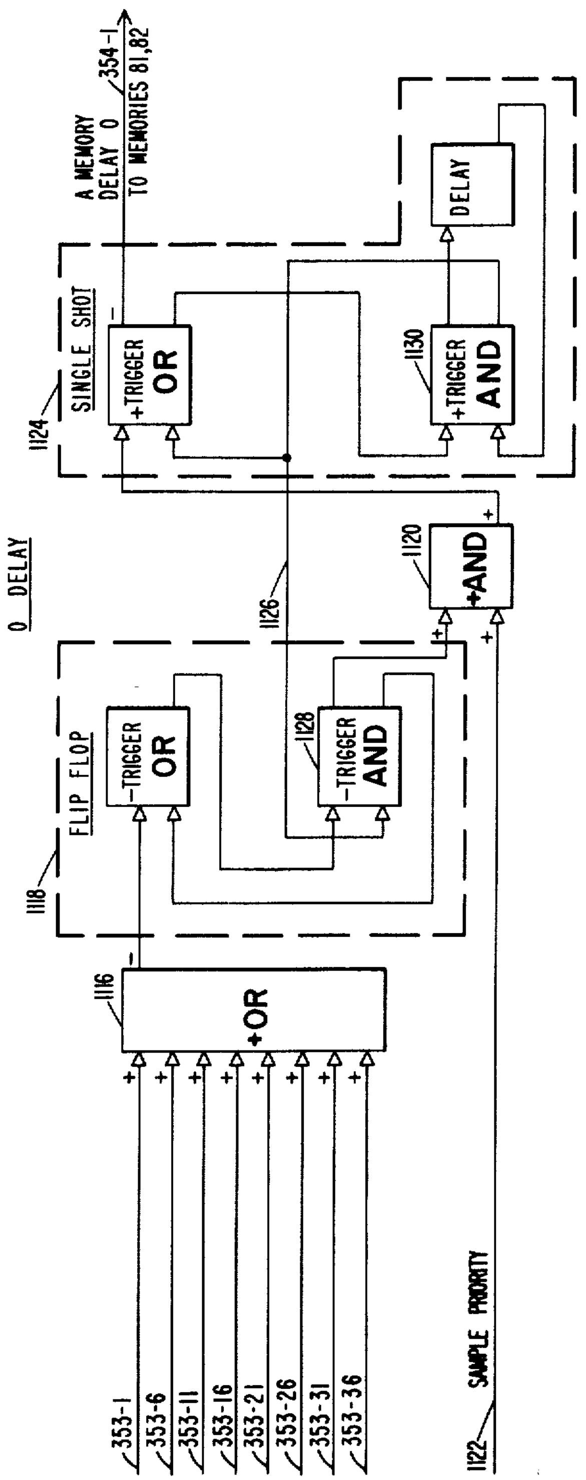

FIGS. 27A, B, C, D and E are logical diagrams of the High Speed Memory Delay Controls for the several different delay periods shown as block 271 in FIG. 2I.

Figure 28:
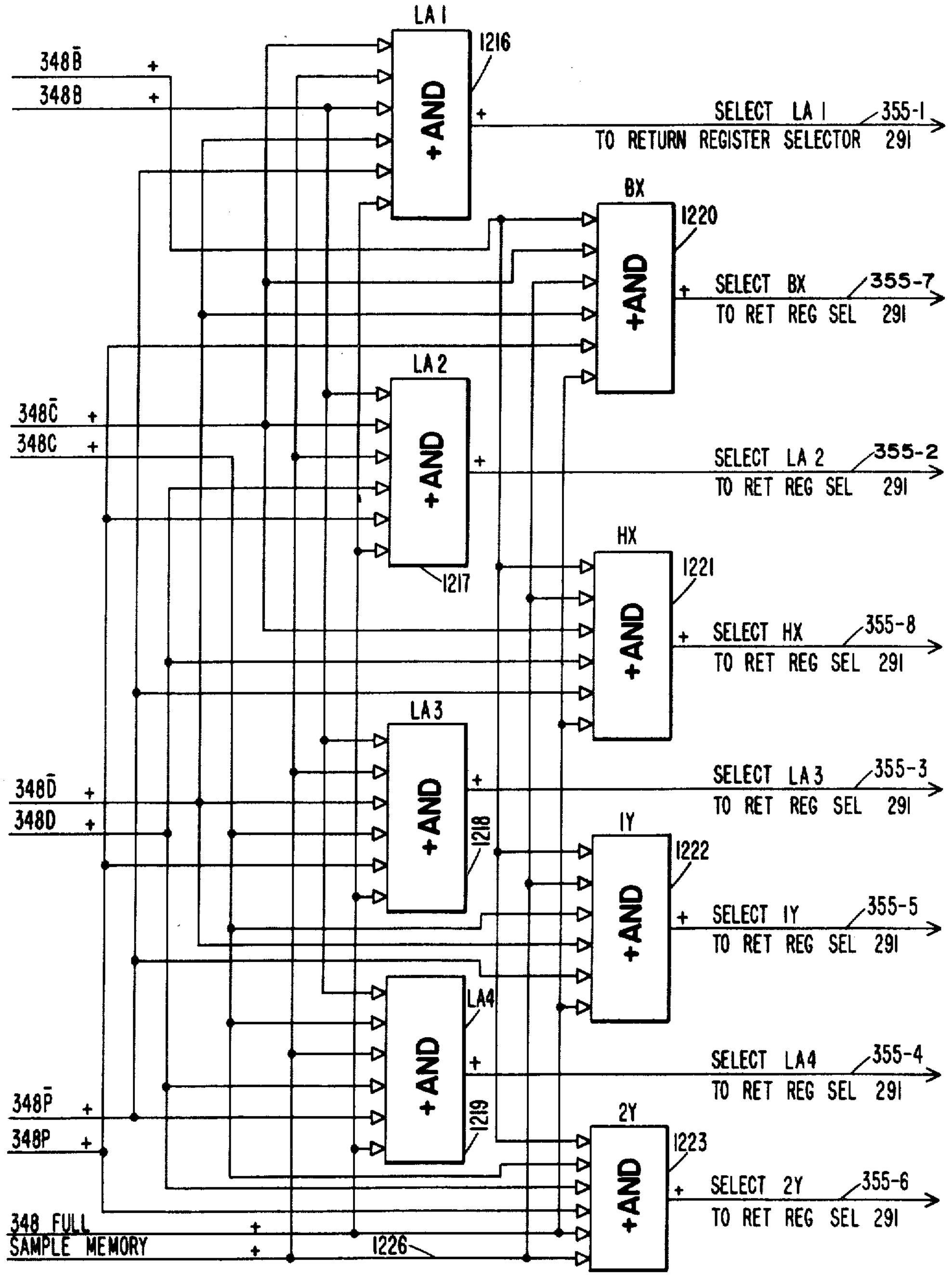

FIG. 28 is a logical diagram of the Return Address Decoder shown as block 281 in FIG. 2I.

Figure 29A:
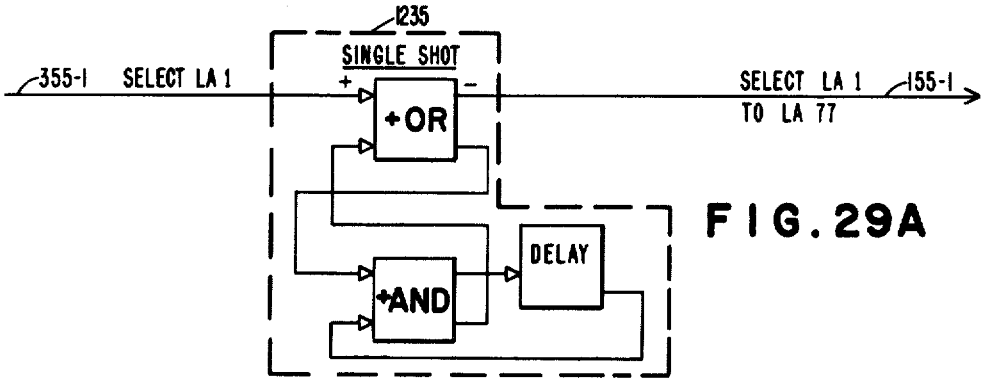
Figure 29B:
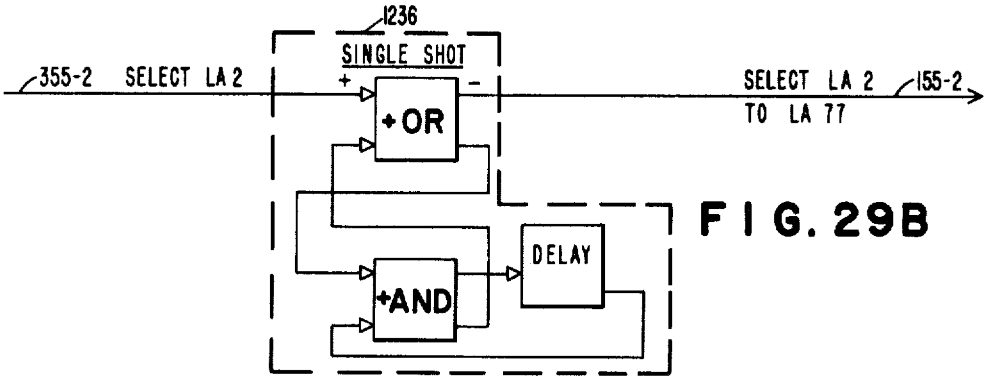
Figure 29C:
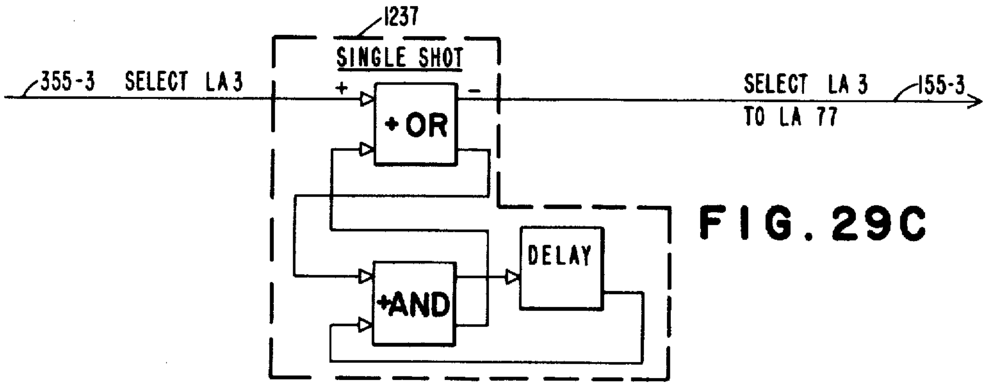
Figure 29D:
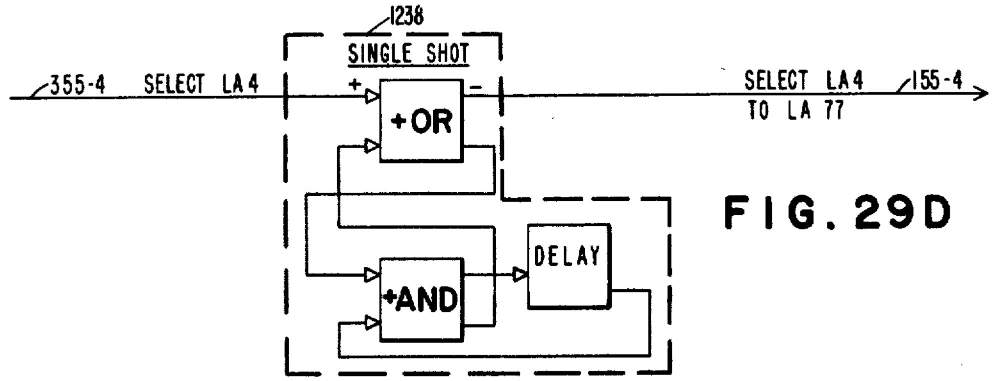
Figure 29E:
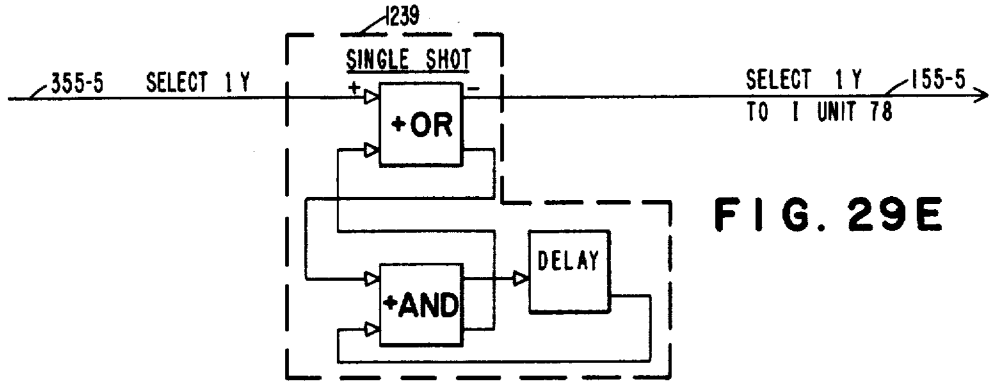
Figure 29F:
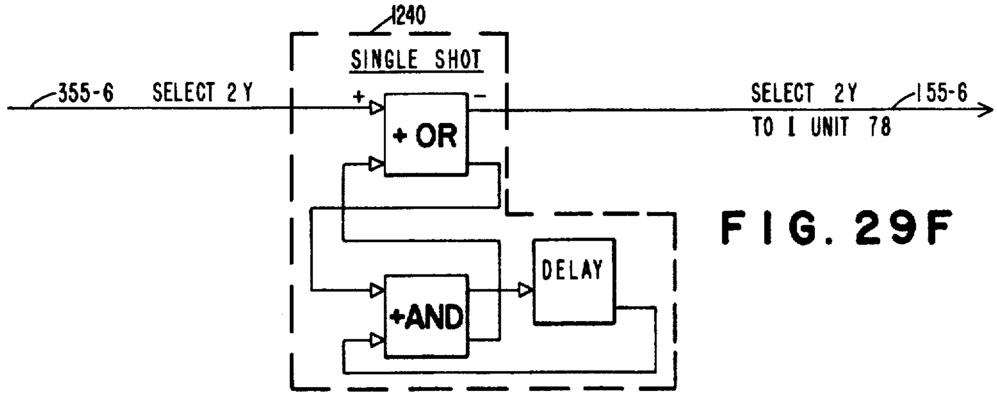

FIGS. 29A, B, C, D, E, F, and G are logical diagrams of the Fetch-Read-In Control, Return Register Select shown as block 291 in FIG. 2I.

Figure 30:
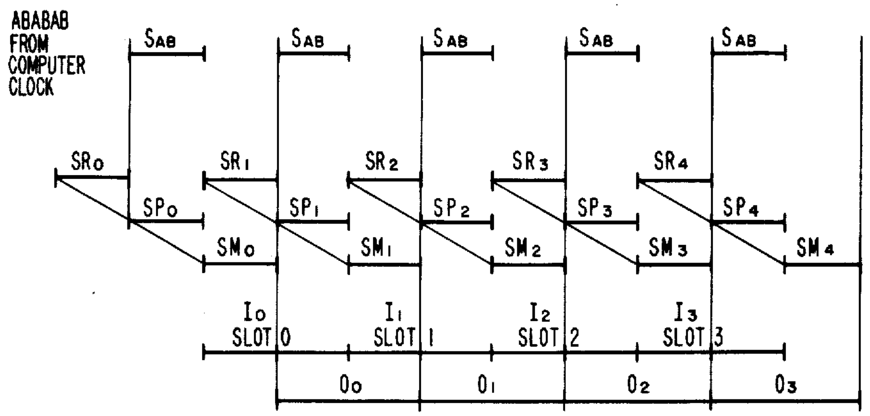

FIG. 30 is a graphic representation of the timing pulses used by the Memory Bus Control Unit.

Figure 31:
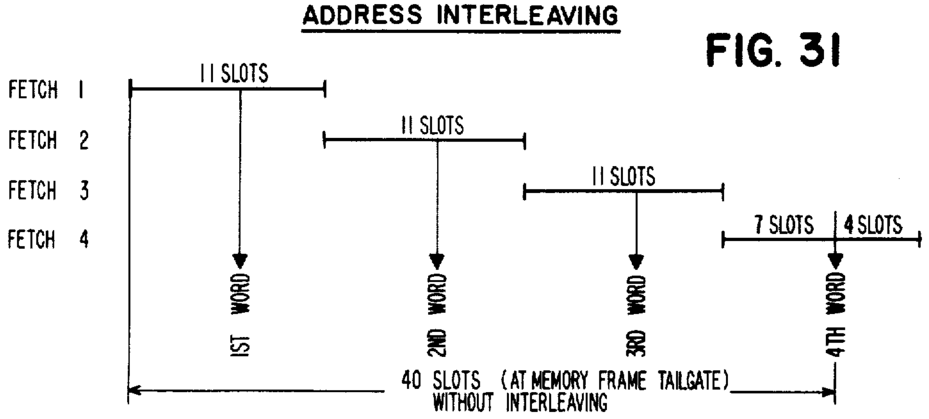
Figure 32:
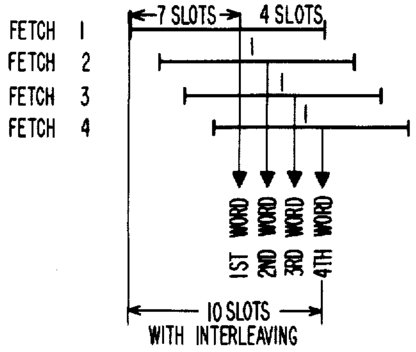

FIGS. 31 and 32 are graphic representations of memory interleaving.

Figure 33:
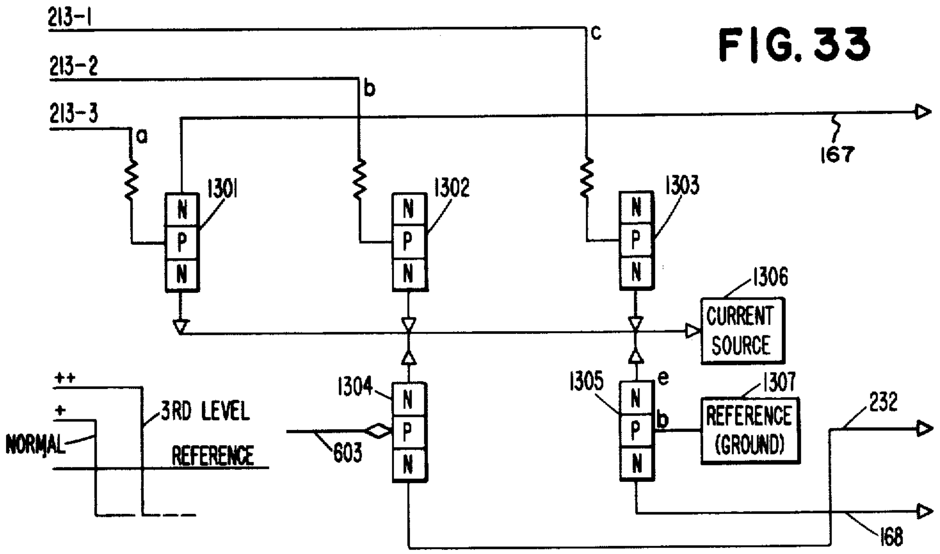

FIG. 33 is a schematic of the split level OR circuit employed in FIG. 8.

Figure 34:
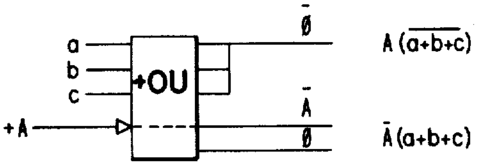

FIG. 34 is the logical representation of the Untied OR circuit shown in FIG. 33.

Figure 35:
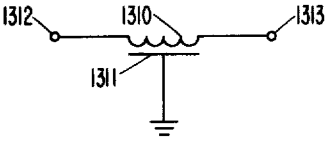

FIG. 35 is a schematic of a typical delay line.

Figure 36:
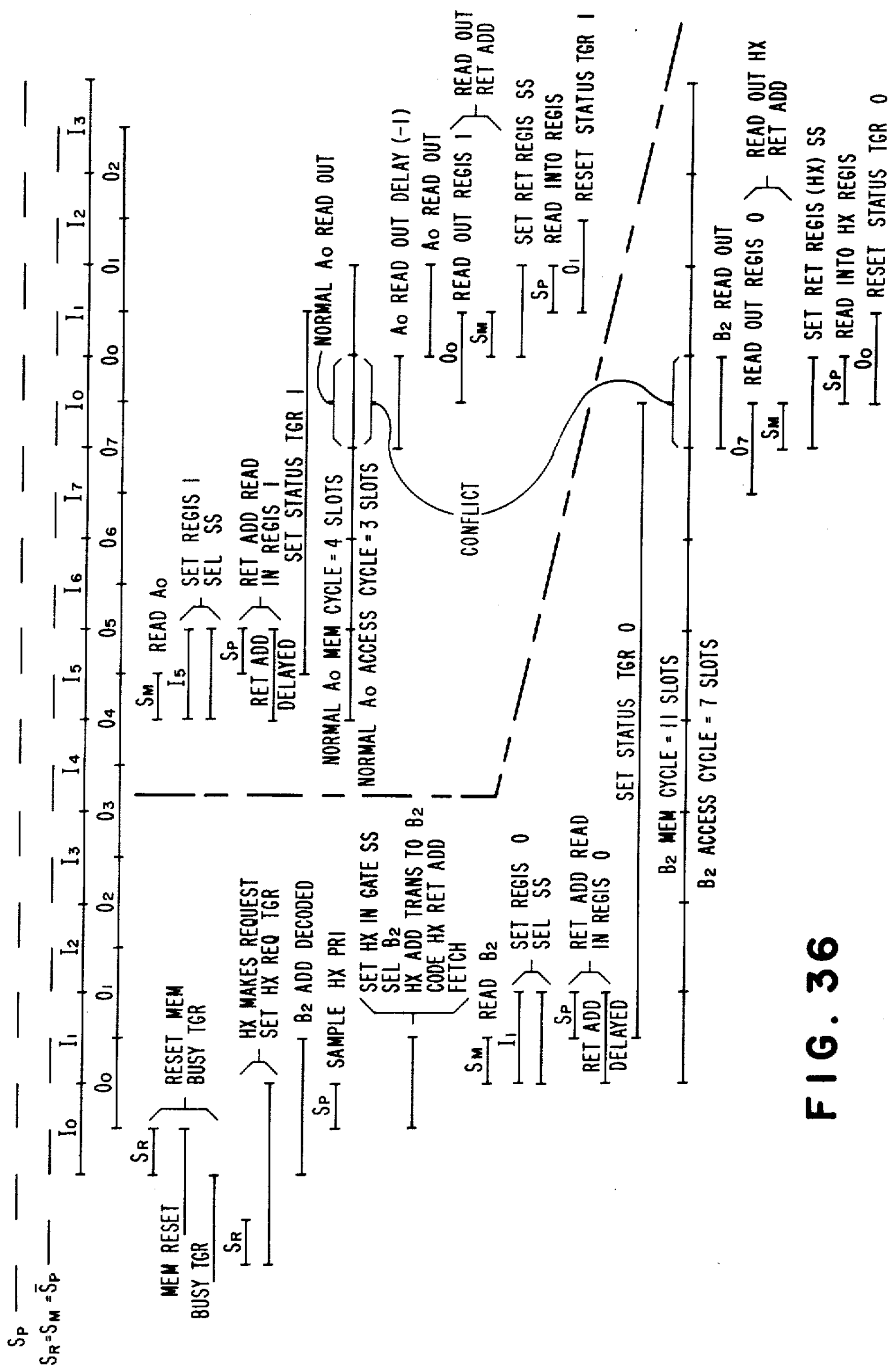

FIG. 36 is an example time sequence diagram of a fetch operation.

CONVENTIONS EMPLOYED

Through the following description and in the accompanying drawings there are certain conventions employed which are familiar to those skilled in the art. Additional information concerning those conventions is as follows:

In the block diagram figures of the drawings an arrowhead is employed on lines throughout the drawings to indicate a circuit connection and the direction of pulse travel which is also the direction of control. The diamond shaped arrowhead indicates (1) a circuit connection and (2) energization with a third level supervisory D.C. level which predominates all other inputs to the circuit applied. In FIGS. 3A through 29G the enabling polarity is shown on each line by a plus or a minus sign. A conventional arrowhead with an S thereabove indicates (1) a circuit connection and (2) energization with a pulse of greater significant magnitude than the standard pulses. The S indicates a split-level supervisory D.C. level which predominates all other inputs to the circuit applied. Cables which are used to transfer data are shown as two parallel lines with the arrowhead at one end thereof and at some point intermediate the ends of those cables, the two parallel lines are widened in the form of a circle and numbers appear within the circle. Such numbers indicate the number of conductors within the cable. The input and output lines of the block symbols are connected to the most convenient side of the block including the same side in some cases in the blocks shown in the system diagram in FIGURE 2.

In the description, the general arrangement of the apparatus of a preferred embodiment of this invention will first be described with respect both to the manner in which the various circuit components and apparatus are connected and in respect to the general overall operation which is performed by these components and apparatus. The description of the general arrangement will be followed by separate and detailed descriptions of the various components and apparatus, which so require it, and each section of the description will have a heading which indicates the apparatus about to be described. The following is an index or table of contents of the description.

TABLE OF CONTENTS

| | Column |
|---|---|
| General Arrangement | 5 |
| Timing | 6 |
| Interleaving | 7 |
| Input-Output Devices | 8 |
| Basic Exchange | 8 |
| High Speed Exchange | 8 |
| Instruction Processor of Central Computer | 8 |
| Look Ahead of Central Computer | 9 |
| Memory Devices | 9 |
| Connections to Memory Bus Control Unit | 10 |
| Memory Bus Control Unit | 13 |
| Return Address Storage and Control | 19 |
| Logic Circuits | 22 |
| Detailed System Logic Description | 22 |
| Request Triggers | 22 |
| Memory Frame Decoders | 26 |
| Memory Busy Triggers | 31 |
| Invalid Address Control | 33 |
| Inhibit Circuits | 35 |
| Instruction Unit Accept Circuits | 35 |
| Blocking Decoder | 37 |
| Blocking Controls | 39 |
| Effective Address Register | 40 |
| Priority AND Circuits | 41 |
| Memory Select Circuits | 42 |
| In-Gate Control Circuits | 43 |
| Memory Select Gates | 46 |
| Memory Address Gates | 47 |
| Memory Read Out Control | 48 |
| Memory Data Gates | 49 |
| Return Address Gates | 49 |
| Memory Out Bus OR | 51 |
| Clock | 51 |
| Ring | 51 |
| Ring Output Pulse ($O_0$–$O_7$) Phase Control | 54 |
| Return Address Register | 54 |
| Return Address Register Status Decoder | 58 |
| Return Address Read-In Control | 60 |
| Return Address Register Selector | 60 |
| High Speed Memory Delay Control | 65 |
| Return Address Decoder | 66 |
| Fetch Read-In Control (Return Register Select Circuits) | 67 |
| Time Sequence Diagram | 68 |

GENERAL ARRANGEMENT

The two prime functions of the Memory Bus Control Unit are (1) to regulate the transfers of memory addresses, store data and store/fetch commands from various accessing registers of the system to the proper memory, and (2) to regulate the transfer of fetch data from various memories to the proper receiving registers of the system.

The two prime functions of the Memory Bus Control Unit as stated above and several secondary functions are accomplished by a time sharing principle. As the communication link between a plurality of requestors and a plurality of memory devices, a single input bus is provided for transferring information to memories and a single output bus is provided for transferring information to requestors from the memories. The in bus makes the information from each requestor available to each of the memories. The out bus is connected so that the information from the memories is available to each of the requestors. The Memory Bus Control Unit of this invention provides a gating signal to the selected memory so that when the required information is in the in bus, only the selected memory will accept the available information in its input register. The bus control of this invention also provides that the proper requestor be gated to receive the proper information requested when such information is on the out bus.

It is seen that, with several devices making use of a single bus, conflicts could easily arrive. These conflicts are resolved by the use of a priority scheme which gives the input device with the longest operating cycle the highest priority and the next highest priority to the input device with the next longest operating time. Whenever a memory is requested or whenever it is busy as a result of a previous request, a memory busy trigger is activated to prevent a second requestor from obtaining use of such memory. In the case of some specific high speed requestors, a High Speed Exchange, for example, it is necessary that, in the case where the computer requests in the slot previous to the slot in which such High Speed Exchange makes its request for the same storage unit, an undue hardship would be placed on the High Speed Exchange since it would have to wait a time which would be long enough to require that it disconnect its inputs. Here the memory bus control unit must be able to anticipate a request from the central computer and block it on a signal which the High Speed Exchange sends one full memory cycle before its actual request. As a result, the computer request can not be processed until after the high speed requestor request is complete.

Since the instruction processor can operate in a very flexible manner, it has need to be informed if its requests of memory bus use are honored so that it will be able to continue its operation on another part of its program or whether it will make use of the memory bus.

It is seen that data information is available on either in bus to memory or the out bus from memory while address information is used to control the flow of data. Address information is used to operate the proper receiving register in the selected memory at the time that the selected data information is available to that memory and to select the proper register in the proper requestor at the time that data information is available on the out bus. When the access time of all of the memories is the same, the return address is delayed to coincide with the read out time of the memory by simple delay means, such as delay lines.

TIMING

The Memory Bus Control Unit is timed by a chain of free-running symmetrical sample pulses obtained directly from the clock in the central computer. The clock is shown as block 298 in FIG. 21. Various outputs of the clock are adjusted so that "sample time" occurs every where at the same time throughout the computer and memory bus areas.

As shown in FIG. 30, the Memory Bus Control Unit makes use of both the presence and the absence of the sample pulse.

The ABABABAB pulses from the computer clock provide the SAB pulse. The sample pulses are: SR, Sample Request; SP, Sample Priority; and SM Sample Memory. Each of these pulses is SAB in duration. The SP pulses occur during $\overline{SR}$ time whereas the SM pulses occur during the SP pulses. The overlap of SR and SM pulses indicates that the action created by a first SR pulse is being completed during the time of a second SR pulse.

The sample pulses are provided in either positive or negative polarity to meet the requirements of the circuit to which they are applied.

A slot as shown in FIG. 30, is of $\overline{SP}$ and SP duration, beginning with an $\overline{SP}$ signal. A slot duration is equivalent to the duration of an I pulse.

The O pulses are one half cycle delayed behind the I pulses and, therefore, are of SP and $\overline{SP}$ duration, beginning with an SP pulse.

In the illustration chosen to explain this invention, the Memory Bus Control Unit operating cycle is .2 microsecond.

INTERLEAVING

In FIGS. 31 and 32 are shown the advantage of interleaving four memory fetches from consecutive addresses. Since, for purpose of illustration, the low speed memory cycle is eleven slots long, for example, with the word being read out at the end of seven slots, it is noted that the second fetch without interleaving does not begin until the completion of the eleven slots of the first fetch. Under such a system 40 slots are required to fetch four consecutive words without interleaving. This is to say, when consecutive addresses are stored in consecutive frames in single memory the read out time is eleven slots for each word.

However, with interleaving, as shown in FIG. 32, it is seen that the second fetch can begin at the end of the first slot of the first fetch since the second fetch is from a different memory device than the first fetch. It is also noted that four words can be fetched from memory in ten slots with interleaving whereas forty slots were required without interleaving.

It is possible that the "instruction" addresses could be interleaved between the two A memories and the "data" addresses interleaved among the four B memories.

At this point a distinction between the "memory address" and the "array address within a memory frame" must be made. Memory addresses are:

(1) Sequential, beginning at address 0 and ending at address 262,143.

(2) Invalid above 98,303, for example, since this could well be a highest memory address within installed equipment.

(3) Interleaved among the various frames of memories.

The array address represents a physical intersection in the core matrix within a given memory frame. Seldom is the array address in a memory frame identical with the memory address assigned to that core intersection. An example of the interleaved addresses on the two buses will illustrate this point.

TABLE I

| (Memory Address) 10 | Memory Frame | (Array Address) 10 |
|---|---|---|
| 0000 | A0 | 0000 |
| 0001 | A1 | 0000 |
| 0002 | A0 | 0001 |
| 0003 | A1 | 0001 |
| 0004 | A0 | 0002 |
| 0005 | A1 | 0002 |
| 2044 | A0 | 1022 |
| 2045 | A1 | 1022 |
| 2046 | A0 | 1023 |
| 2047 | A1 | 1023 |
| 2048 | B0 | 512 |
| 2049 | B1 | 512 |
| 2050 | B2 | 512 |
| 2051 | B3 | 512 |
| 2052 | B0 | 513 |
| 2053 | B1 | 513 |
| 2054 | B2 | 513 |
| 2055 | B3 | 513 |
| 2056 | B0 | 514 |
| 2057 | B1 | 514 |
| 67,579 | B3 | 500 |
| 67,580 | B0 | 511 |
| 67,581 | B1 | 511 |
| 67,582 | B2 | 511 |
| 67,583 | B3 | 511 |
| 67,584 | 262,143=INVALID | |

To illustrate the advantages of address interleaving consider the following:

(1) The memory cycle is approximately eleven bus time slots in duration.

(2) On a fetch operation, the word is sent from the memory back to the memory bus control unit about seven slots after the memory is "started" by a select pulse.

Assume successive fetches to four consecutive memory addresses on the B bus under ideal conditions. Without interleaving we would have to wait eleven slots between each fetch, allowing the memory to complete its cycle before the next fetch can be initiated. Therefore, it can be seen that the total time of the four fetches would be forty bus time slots as measured at the memory. Taking advantage of interleaving, the time is reduced to ten slots as shown in FIG. 32.

Referring now to FIGS. 2A through 2I, in FIGS. 2A and 2B are shown typical input/output devices of the Memory Bus Control Unit, hereinafter designated BCU, such as Basic Exchange 75, hereinafter designated as BX, High Speed Exchange 76, hereinafter designated HX, Look Ahead 77, hereinafter designated as LA, and Instruction Processor 78, hereinafter designated I, or I box.

INPUT-OUTPUT DEVICES

*Basic Exchange 75*

Basic Exchange 75, for the purpose of the immediate description, provides up to thirty-two channels for connecting external units directly to the system. These units are of the kinds which transmit information eight bits at a time, called a "byte," at any reading or writing rate which does not, even instantaneously, exceed 67,000 bytes per second. A number of units may operate simultaneously through the BX, either reading or writing, the number depending on the speed of operation of the operating units.

Typical of the various external input-output devices which the accessing thereof in under control of BX75 are: conventional I/O units such as magnetic tape units, card readers, card punches, printers, and the like. In the event of the inclusion of manually operated input devices and low speed data links it is conceivable that the computer system would include a low speed exchange. High speed tapes and discs require a high speed exchange such as HX76 shown in FIG. 2A.

*High Speed Exchange 76*

A separate exchange is required because the higher speed does not permit as much time sharing as that in the BX75. HX76 can permit simultaneous reading and writing of two units up to a rate of about 140,000 full words per second each unit. This is about six times the rate of the faster channels of the BX. HX76 controls high speed devices such as Disc Storage units and the like.

The Central Processing Unit consists basically of three functional units: the Instruction Processor 78, Look Ahead 77, and the Arithmetic and Logic Unit, not shown. The Central Processing Unit performs arithmetic and logical operations upon operands taken from storage. Operations are specified one at a time by instructions, which are also taken from storage. Each instruction fundamentally specifies an operation and an operand. The operand specification is made up of an address and an index word address. Part of the index word contents are added to the address to obtain an effective address. The effective address actually designates the operand used. The additions needed to derive the effective address and to modify index words are performed in the instruction processor by independent arithmetic unit.

*Instruction Processor 78*

Since the Arithmetic and Logical Unit operates very rapidly, it needs to receive data and decoded and modified instructions at high speed. The decoding and modifying are performed in the Instruction Processor 78 using an Index Arithmetic Unit, while the Arithmetic and Logical Unit is executing some preceding instruction.

Several types of instruction can actually be executed in the Instruction Processor 78 without requiring the use or time of the main Arithmetic Unit.

An instruction may be one word or one-half word in length. Full and half length instructions can be intermixed without regard to word boundaries.

Instructions are taken in succession under control of an instruction counter. The Instruction Counter contents can be stored by a specific operation.

*Look-Ahead 77*

The parallelism or overlap in the modification and execution of an instruction is extended to include further overlapping of the fetching of the instructions and data from core storage. Several core storage units can be referenced for instructions and data simultaneously. The device which coordinates and controls the overlapping of instruction processing is known as the Look-Ahead.

When the Instruction Processor 78 has finished decoding and modifying an instruction, the fetch request is made to core storage for the data associated with this instruction. The instruction and its data are then loaded into one of the four Look-Ahead levels, preparatory to being executed in turn by the Arithmetic and Logical Unit. The Arithmetic and logical Unit operates very rapidly, much more rapidly than single instructions could be fetched from the relatively slow storage units. The Instruction Processor and Look-Ahead function together to maintain a reservoir of preprocessed instructions together with their data to allow the Arithmetic and Logical Unit to operate at its maximum speed. From this point of view, Look-Ahead acts as a virtual storage for the Arithmetic Unit, effectively cutting the core storage reference rate to a small fraction of the actual time required for sequential storage accesses.

If the result of an arithmetic operation is to be returned to storage, it is first placed in Look-Ahead 77, from hence it returns to storage. Frequently, subsequent instruction will require data that are already in Look-Ahead, so that data references are eliminated in these cases. In spite of the internal complexities, the overlapping of fetch, modification and execution of instruction as well as the simultaneous fetching and storage of data does not place any constraints on the programmer. The only external difference in system operation due to Look-Ahead is a higher operation speed. The Look-Ahead Unit takes care of the unusual conditions which overlapping causes, and makes the machine appear as if it were dealing with only one instruction at a time.

MEMORY DEVICES

The Memory Bus Control Unit provides for the control of a plurality of core storage units having read-write cycle times of approximately .3 microsecond for the high speed memories $A_0$ 81 and $A_1$ 82 and a read-write cycle time of approximately 2.1 microseconds for the low speed memories $B_0$ 83, $B_1$ 84, $B_2$ 85 and $B_3$ 86, shown in FIGS. 2G and 2H. A word consists of sixty-four information bits and eight nonaddressable redundancy bits. Storage and Bus transmission are checked, and any single-bit errors are automatically corrected without slowing the rate of operation.

The address space instructions provide for addressing directly any of $2^{18}$ (262,142) word locations in any operation. Storage addresses are numbered from 0 to $2^{18-1}$ consecutively, although addresses 0 to 31 are reserved for index words and other special registers. Each of the High Speed Memories 81 and 82 consists of 1,024 ($2^{10}$) words, whereas each of the low speed memories 83, 84, 85 or 86 consists of 16,384 ($2^{14}$) words. A typical system will contain several such units with each storage unit operating independently. In systems with two or more units several storage references may be in process at the same time. In order that addressing take advantage of this, successive addresses are interleaved.

All memory timing begins from the Memory Select pulse which is an output of the memory select gates 151 in FIG. 2G. Through delay lines, all required internal and external gating pulses are generated by each memory. Memory generates its own Data Select .4 microsecond, for example, after the select pulse during store cycles. Memory also generates the busy trigger reset trigger, which is applied to the Memory Busy Trigger circuits 109 in FIG. 2C, to bracket the proper sample priority pulse in the Memory Bus Control Unit. The data out gate during a fetch cycle is timed to synchronize with the central computer after passing along the memory out bus 94. Also, since memory outputs must be separated by .2 microsecond intervals, for example, at the basic control unit, memory furthest from the Basic Control Unit determines this time interval. The nearer ones add compensating delay to make up for shorter access cables.

Since the actual memory access time can be different for different memories or groups of memories, it is possible, for example, that High Speed Memory access be .6 microsecond or three .2 microsecond slots, maximum low speed memory access can be 1.4 microseconds or 7 slots, and the maximum difference can be .8 microsecond or 4 slots. In FIG. 32 the assumption is that the minimum low speed memory access time is 1.4 microseconds or 7 slots. An obvious but somewhat expensive solution to the control problems involved in fetching from memories having different access times is to use a double out bus with one type of memory on each bus. The expense arises because of the double drive and the double gate required by the receiving registers. An additional problem is the extra lines required by the double bus. Therefore, a single out bus with variable access time for high speed memory was selected for the instant computer system.

Since the accessing times of the memories can be different, an output reservation scheme is necessary. First of all, the output bus is used only in the fetching operation. An output bus slot is reserved when the fetch request is read into memory. Normally, the memory access time determines this. However, since there are two types of memories with different access times, the high speed memory can ask for an output slot already reserved by a main memory. In these cases, high speed memory yields to low speed memory and takes the first slot available. Prior reservations by either low speed memory or an earlier high speed memory request may exist.

In a computer system in which the access time of all of the memories is the same, since only one memory gates its output to the memory out bus at a single instant, an output reservation scheme of course would not be necessary since there would not be two requests for the memory out bus at any single time. It would be adequate to provide the return address to select the register in the requesting requestor during the same time slot that the data is on the out bus. This can be done by fixed delay means.

CONNECTIONS TO MEMORY BUS CONTROL UNIT

Basic Exchange 75 is in communication with the memories through the BCU by: the BX Memory Input Bus 91 for transmitting data to the memories and is connected to the Memory Data Gates 181, the Memory Out Bus 94 for receiving data from the memories and connected to Memory Out Bus OR 200 in FIG. 2H, the BX Memory Address Bus 95 through which the BX address bits are transmitted to the Memory Address Gates 161 in FIG. 2G, the BX Store line 152 which is connected to the BX In-Gate Control 141 shown in FIG. 2E, the BX Request line 153 which is connected to the BX Request Trigger 101 in FIG. 2C, the BX Program Check 154 which is connected as an output of BX Invalid Address Control 111 in FIG. 2C, and the Select BX Buffer Register line 155 which is connected as an output from the Fetch-Read-In-Control 291 in FIG. 2I.

The BX Memory Address Bus 95, with 19 leads is branched into buses 95A and 95B. In 95A are carried the BX address bits 7 through 15 and a parity bit. These ten leads are connected directly to the Memory Address gates 161. The information carried in BX Memory Address Bus 95A is the particular location in the selected memory frame as well as the parity check bit. Branch 95B carries the BX memory frame address bits 0 through 6, 16 and 17. These nine leads are connected to the BX Memory Frame Decoder 105 as well as the Memory Address Gates 161. The BX address bits in 95B determine the selection of the specific memory unit.

HX 76 is in communication with the BCU through the several inputs and outputs shown in FIG. 2A. These inputs and outputs include: the HX Memory Input Bus 92 for transmitting data to the memories, the Memory Out Bus 94 receiving data from the memories, the HX Memory Address Bus 96 through which the HX address bits are transmitted to the Memory Address Gates 161 in FIG. 2G, the HX Memory Address Bit Advance Bus 97 which is connected as an input to the HX Blocking Decoder 117 in FIG. 2B, the Select HX Line 155 which is connected as an output from the Fetch-Read-In-Control 291 in FIG. 2I, the HX Accepted Line 156 which is connected as an output of the HX In-gate Control 142 in FIG. 2E, the HX Store Line 157 which is connected as an input to the HX In-gate Control 142 in FIG. 2E, HX Request Line 158 which is connected as an input to the HX Request Trigger 102 in FIG. 2C, the Set HX Block Line 159 and the Reset HX Block Line 160 are connected as inputs to HX Blocking Controls 118 in FIG. 2D, and the HX Unit Check Line 162 which is connected as an output from HX Invalid Address Control 112 in FIG. 2C.

Look-Ahead 77 is connected to the BCU through the Memory Data Input Bus 93 which is connected as an input to the Memory Data Gates 181 in FIG. 2H and has for its use the transmission of data to the memories, the Memory Out Bus 94 for receiving data from the memories and connected as an output of Memory Out Bus OR 200 in FIG. 2H, the LA Return Address Bus 99 carrying the three bits X, Y and parity which is connected as an input to the Return Address Gates 191 in FIG. 2H. The Memory Select Look-Ahead Registers 1, 2, 3 or 4 bus 155 which is connected as an output from Fetch-Read-In-Control 291 in FIG. 2I, the LA Store Request Line 163 which is connected as an input to the LA Request Trigger 103 in FIG. 2D and the LA Store Accepted Line 164 which is connected as an output from the LA In-gate Control 143 in FIG. 2F.

The Instruction Unit 78 is connected to the BCU through the Memory Out Bus 94 which is connected as an output from the Memory Out Bus OR 200 in FIG. 2H, the I Memory Address Bus 98 which is connected in parallel as inputs to LA Effective Address Register 121 in FIG. 2B and to Memory Address Gates 161 in FIG. 2G with nine of the nineteen bits being connected as inputs through branch 98B to the I Unit Memory Frame Decoder 108 in FIG. 2D, the Select 1Y or 2Y Register Bus 155 which is connected as an output to the Fetch-Read-In-Control Unit 291 in FIG. 2I, the I Fetch Request Line 165 which is connected as an input to the I Unit Request Trigger 104 in FIG. 2D, the Block I Accept Line 166 which is connected as an input to the I Unit Accept Circuits 116 in FIG. 2D and the I Accept Line 167 which is connected as an output from I Unit Accept Circuits 116 in FIG. 2D.

High Speed Memory $A_0$ 81 shown in FIG. 2G is connected to the BCU through: the A Memory Address Bus 290 which is connected as an output of the Memory Address Gates 161 shown in FIG. 2G, the A Memory Data Bus 320 which is connected as an output to the Memory Data Gates 181 shown in FIG. 2H, the High Speed Memory Delay Bus 354 which is connected as an output of the High Speed Memory Delay Control and Slot Selector 271 shown in FIG. 2I, the Select $A_0$ Line 201 which is connected as an output of the Memory Select Gates 151, the A Memory Read Out Line 311 which is connected as an output of the Memory Read Out Control 171 shown in FIG. 2G, the Reset $A_0$ Busy Trigger 214 which is connected as an input to the Memory Busy Triggers 109 shown in FIG. 2C, and the $A_0$ Memory Data Out Bus 941 which is connected as an input to the Memory Out Bus OR 200 shown in FIG. 2H.

High Speed Memory $A_1$ 82 shown in FIG. 2G is connected to the BCU through: the A Address Bus 290 which is an output of the Memory Address Gate 161, the A Memory Data Bus 320 which is an output of the Memory Data Gate 181 shown in FIG. 2H, the High Speed Memory Delay Bus 354 shown as an output of High Speed Memory Delay and Control Slot Selector 271 in FIG. 2I, the A Memory Read Out Line 311 connected as an output from Memory Read Out Control 171 in FIG. 2G, the Select $A_1$ Memory Line 302 connected as an output from Memory Select Gates 151 in FIG. 2G, the reset $A_0$ busy trigger 215 connected as an input to the Memory Busy Trigger 109 in FIG. 2C, and the $A_1$ Memory Data Out Bus 942 connected as an input to the Memory Out Bus OR 200 shown in FIG. 2H.

The Low Speed Memory $B_0$ 83 shown in FIG. 2G is connected to the BCU through: the Select $B_0$ line 303 which is connected as an output from the Memory Select Gates 151 in FIG. 2G, the B read out line 312 connected as an output from the Memory Read Out Control 171 in FIG. 2G, the B Memory Data Bus 321 connected as an output from the Memory Data Gates 181 in FIG. 2H, the B Address Bus 295 connected as an output from the Memory Data Gates 161 in FIG. 2G, the $B_0$ Memory Data Out Bus 943 connected as an input to the Memory out bus OR in FIG. 2H, and the reset $B_0$ Busy Trigger 216 connected as an input to the Memory Busy Triggers 109 in FIG. 2C.

Low Speed Memory $B_1$ 84 is connected to the BCU through: the Select $B_1$ line 304 which is connected as an output from Memory Select Gates 151 in FIG. 2G, the B Memory Read Out Line 312 which is connected as an output from Memory Read Out Control 171 in FIG. 2G, the B Data Bus 321 which is connected as an output from Memory Data Gates 181, the B Memory Address Bus 295 connected as an output from Memory Address Gates 161 in FIG. 2G, the $B_1$ Memory Data Out Bus 944 connected as an input to the Memory Out Bus OR 200 in FIG. 2H, and the Reset $B_1$ Busy Trigger 217 connected as an input to the Memory Busy Triggers 109 in FIG. 2C.

Low Speed Memory $B_2$ 85 is connected to the BCU through the Select $B_2$ Line 305 which is connected as an output from the Memory Select Gates 151 in FIG. 2G, the B Memory Read Out Line 312 which is connected as an output from Memory Read Out Control 171 in FIG. 2G, the B Data Bus 321 which is connected as an output from Memory Data Gates 181 in FIG. 2H, the B Address Bus 295 which is connected as an output from Memory Address Gates 161 in FIG. 2G, the $B_2$ Memory Data Out Bus 945 which is connected as an input to the Memory Out Bus OR 200 in FIG. 2H and the Reset $B_2$ Busy Trigger Line 218 which is connected as an input to the Memory Busy Triggers 109 in FIG. 2C.

Low Speed Memory $B_3$ 86 is connected to the BCU through: the Select $B_3$ Line 306 which is connected as an output from the Memory Select Gates 151 in FIG. 2G, the B Memory Read Out Line 312 which is connected as an output from Memory Read Out Control 171 in FIG. 2G, the B Data Bus 321 which is connected as an output from Memory Data Gates 181 in FIG. 2H, the B Memory Address Bus 295 which is connected as an output from the Memory Address Gates 161 in FIG. 2G, the $B_3$ Memory Data Out Bus 946 which is connected as an input to the Memory Out Bus OR 200 in FIG. 2H, and the Reset $B_3$ Busy Trigger Line 219 which is connected as an input to the Memory Busy Triggers 109 in FIG. 2C.

MEMORY BUS CONTROL UNIT

In the General Arrangement and of the Memory Bus Control Unit, for the purposes of the immediate description, in response to a request from a requestor, the first structural unit encountered is the request trigger circuit: BX Request Trigger 101, HX Request Trigger 102, LA Request Trigger 103, or I Unit Request Trigger 104, the specific trigger depending upon the specific input device making use of the Memory Bus Control Unit.

In the operation of the Memory Bus Control Unit of this invention, the input/output devices such as the Basic Exchange 75 can request that the Memory Bus Control Unit fetch information from the various memory devices in the form of instructions or data, or the input/output device can request that the Memory Bus Control Unit store information into the several memory devices.

In order that the Memory Bus Control Unit perform a fetch operation, for example, for one of the input/output devices, it is necessary that: (1) the input/output device must provide an address of the memory location for the desired information, (2) the input/output device must provide a request for such fetching, (3) no store signal, and (4) priority has to be established.

For the purpose of explanation, the sequence of operations occurring in the Basic Exchange 75 makes a request of memory and will now be described. In the fetch request, Basic Exchange 75 must provide an address through the Basic Exchange Memory Address Bus 95 to the Memory Address Gates 161 in FIG. 2G. Basic Exchange 75 must also provide a request on BX Request line 153 to the BX Request Trigger 101 in FIG. 2C, and must provide no signal on the BX Store line 152 which is connected to the BX In-Gate Control 141 in FIG. 2E. The memory address on cable 95 is to be made available to the Memory Address Gates 161 until priority has been determined. In order to determine such priority, it is noted that BX Memory Address Bus 95 is split into Bus 95A and 95B. The address portion which determines which memory is to be selected, that is memory 81 through 86 in FIGS. 2G and 2H, are the nine bits contained in 95B. These memory address bits 0 through 6, 16 and 17 are connected to the Basic Exchange Memory Frame Decoder 105 in FIG. 2C. Also connected as an input to the BX Memory Frame Decoder 105 is the cable 110 which is the output of the Memory Busy Triggers 109 and contains six leads which reveal the busy condition of the six individual memories. The Basic Exchange Memory Frame Decoder 105 mixes the address portion on cable 95B with the busy condition of the memory, which has been stored in Memory Busy Triggers 109, to determine whether the memory that is desired by the Basic Exchange 75 is available.

If such desired memory is available, the request is accepted and the BX Memory Frame Decoder 105 sends an inhibit signal on connector 182 to the BX inhibit circuits 113. It is the action of the BX inhibit circuits 113 to prevent any other input/output device of lower priortiy (the High Speed Exchange, the Look-Ahead or Instruction Processor in the example) from obtaining priority since the Basic Exchange has a valid request and it has highest priority. This inhibiting action is performed by a signal through connector 188 to High Speed Exchange Inhibit circuits 114 and Look-Ahead Inhibit Circuits 115.

The Basic Exchange Memory Frame Decoder 105 also provides a BX priority signal through connector 183 to the Basic Exchange priority AND 125 in FIG. 2E. The BX Request Trigger 101 in FIG. 2C provides a further output trigger through connectors 176 and 178 to be the second input to the Basic Exchange Priority AND 125. The presence of the BX priority signal and the BX request signal causes the BX priority AND 125 to provide a BX gate pulse which is applied through connector 243 to the BX In-Gate Control 141 in FIG. 2E where a single shot oscillator is set for the duration of that priority slot. The BX request on connector 178 has been synchronized by the BX Request Triggers 101. The BX gate signal is also transmitted through connector 240 from the BX priority AND 125 to the BX Memory Select Circuits 131 in FIG. 2E. The BX Request Triggers 101 are regulated such that only one request can be obtained at any single time.

With the single shot oscillator in the BX In-Gate Control 141 now set, Basic Exchange 75 has now been determined to have priority.

The provision of a BX Address In-Gate signal through line 252, conditions the Memory Address Gates 161 in FIG. 2G to send the 19 bit BX address on both the A Address Bus 290 and the B Address Bus 295 to all six memories. The BX address, however, will be selected in by only one of the memories. This selection is provided by the BX Memory Select Circuit 131 in FIG. 2E. The BX Memory Select Circuits 131 function to combine the decoded output of the BX Memory Frame Decoder 105 in FIG. 2C, such output being received through Cable 180, and the BX Gate Line 240 which is an output of the BX Priority AND 125 in FIG. 2E. The mixing of the selected line in Cable 180, and the BX Gate 240 within BX Memory Select Circuits 131 conditions one of the six lines in output Cable 1800.

Cable 1800 is connected as an input to both the Memory Busy Triggers 109 in FIG. 2C and to the Memory Select Gates 151 in FIG. 2G. The Memory Busy Triggers 109 are informed thereby that the selected memory is busy and, therefore, no other input device can make a request of such busy memory as long as the selected trigger is activated.

The Memory Select Gates 151 in FIG. 2G include six single shot oscillators, one for each memory, which can be set by conditioned lines in Cable 1800, which represents the Basic Exchange selection, Cable 1850, which represents the High Speed Exchange selection, Cable 2070, which represents the Look-Ahead selection, or Cable 2120, which represents the Instruction Processor selection.

The particular requesting input device, the Basic Exchange in this example, obtains its memory selection by the BX Gate Signal 240 which is the output of the BX Priority AND 125 which is applied to the BX Memory Select Circuits 131.

The outputs of the Memory Select Gates 151 include: the Select $A_0$ line 301 which is connected to $A_0$ Memory 81, the Select $A_1$ line 302 which is connected to $A_1$ Memory 82, the Select $B_0$ Memory Line 303 which is connected to $B_0$ Memory 83, the Select $B_1$ Memory Line 304 which is connected to $B_1$ Memory 84, the Select $B_2$ Memory Line 305 which is connected to $B_2$ Memory 85, and the Select $B_3$ Line 306 which is connected to $B_3$ Memory 86. Line 307 is connected to the Return Address Read-in Control 251 in FIG. 2I and indicates that high speed memory $A_0$ 81 has been selected. Line 308 informs that the high speed memory $A_1$ has been selected and is also connected to the Return Address Read-In Control 251 in FIG. 2I. It is seen that lines 301 and 307 are activated simultaneously and lines 302 and 308 are activated simultaneously. The select line outputs 303 through 306 of the Memory Select Gates 151, however, are activated only one at time.

In continuation of the assumption that the Basic Exchange is requesting Memory Bus Control Unit service, it is assumed that the BX is selecting Memory $A_1$ 82. The BX Address In Gate 252, provided by BX In Gate Control 141, when applied to the Memory Address Gates 161, which have already received the BX address bits through the BX Memory Address Bus 95A and B, gates such address onto the A Address Bus 290 and the B Address Bus 295. The BX Memory Address Bits are available to all of the memories. Since only one select memory line is activated at a time, the activated select line enables the selected memory to start its memory cycle. The memories operate from a stopped clock and will begin operating as soon as the select signal arrives at such selected memory.

The address bits provided by the selecting input-output device, the Basic Exchange 75 in this example, are now on the A and B address buses and a specific memory has been selected. The remaining information to be supplied by the Basic Exchange 75 is whether the operation is to be a fetch or a store operation. If the operation is to be a store, an appropriate signal appears on line 152 and is applied to the BX In Gate Control 141 where it is mixed with the BX Gate Signal on Line 243 from the Basic Exchange Priority And 125. The output of the BX In Gate Control 141 associated with the store signal is line 254 which is connected as an input to the Memory Readout Control 171. A BX store signal on line 254 enables the Memory Readout Control 171 to provide an output signal through line 311 which is connected to the A memories and through line 312 which is connected to the B memories. These lines, 311 and 312, are: the store or fetch readout line 311 for the A memories and the store or fetch readout line 312 for the B memories. The presence of a store signal from BX 75 through line 152 provides, in effect, a signal on the store or fetch readout line 311 which says to the memories that the operation is a store operation. Conversely, the absence of a BX store signal on line 152 provides that the signal in line 311 will inform the A memories that the operation is to be a fetch operation.

In the event of a store signal from Basic Exchange 75 through line 152, the BX In-Gate Control 141 in FIG. 2E will provide a BX In-Gate signal 256 which is applied as an input to the Memory Data Gates 181 in FIG. 2H. This in-gate signal will activate the Memory Data Gates 181 to supply the A Data Bus 320 and the B Data Bus 321 with the data that the Basic Exchange 75 has provided through the Basic Exchange Memory Input Data Bus 91. With the Memory Data Gates 181 activated, the data from Basic Exchange 75 is on the A and B Data Buses 320 and 321 and will be accepted by the selected memory. It is obvious that error checking procedures can be included. However, such procedures are not a part of this disclosure. This concludes the store operation.

If the operation were a fetch operation, the absence of a signal in line 152 from Basic Exchange 75 conditions the BX In-Gate Control 141 and Memory Read-Out Control 171 to provide a signal on the store or fetch read out lines 311 and 312, respectively, to inform the memories that the operation is to be a fetch operation. Also supplied by the BX In-Gate Control 141 is a signal to connector 255 which is one of the conditioning inputs to the Return Address Gates 191 in FIG. 2H. Since the Basic Exchange has only one register, this single line 255 is sufficient to code the proper code in the Return Address Gates 191 and to bus out such address on cable 192 to the Return Address Register area in FIG. 2I. Cable 192 carries three address bits plus a parity bit to detect single error.

The Return Address Register and Control Area in FIG. 2I will be discussed later in this specification. For the purposes of the present example, it is assumed that the requested data has been made available by the memory. The memories can self gate the data out and, since each memory has an output bus, Bus 941 for Memory 81, Bus 942 for Memory 82, Bus 943 for Memory 83, Bus 944 for Memory 84, Bus 945 for Memory 85, and Bus 946 for Memory 86, each of said buses is connected as an input to the six-way Memory Out Bus OR 200 in FIG. 2H. In systems in which the memory access time is the same for all the installed memories, the timing of the data out gate in memory is determined by a delay line, set a certain amount of time from the select pulse. This means, since we select only one memory every cycle there is only one memory that could possibly be gated out every cycle. Therefore, no conflict occurs at the Memory Out Bus OR 200 during any one cycle since only one memory is gating out. The output of the Memory Out Bus OR 200 is the Memory Out Bus 94 which is connected to the gates of all of the input registers in the input/output devices, including the register in the Basic Exchange 75, the register in the High Speed Exchange 76, the four registers in Look-Ahead 77, and the two registers 1Y and 2Y in Instruction Processor 78. Since the data is sent to all of the registers, it is necessary that a select line decide which register is to accept the data.

For the purposes of this example, only the output of the Return Address Storage and Control area shown in FIG. 2I will be considered. Attention is directed to a Fetch-Read-In-Control 291 such as shown in FIG. 2I which has as an output Cable 155 with eight lines therein. Since a fetch request has been made, one of the eight lines in Cable 155 will be conditioned. For the purposes of the present example it is assumed that the Basic Exchange has made this request. As a result, the select Basic Exchange Buffer Line in Cable 155 is the conditioned line and the buffer register in the basic exchange will be conditioned thereby so as to select the data off the Memory Out Bus 94, and such data will come into the Basic Exchange and set the Basic Exchange Buffer Register. Since the Basic Exchange Buffer had been previously reset to zeros, the select line merely enables the transfer of the word from the Output Data Register in the memory back into the Basic Exchange Buffer Register.

Referring back to Memory Read-Out Control 171 in FIG. 2G, it is to be noted that the Fetch Line 309 output is to indicate that, during fetch operation, the return address storage and control area in FIG. 2I is needed. In a store operation, the store signal set on the A or B Read-Out Lines 311 and 312 gated in the same time that the memory address gates provide the address to the memories, it is a specification of the memory that the data will be gated into the Memory Data Register of the Data Buses two cycles later. That is to say, the memory has specified that data be delayed two cycles after the address has been gated in. The two cycle delay for store has been incorporated in the gate control circuits and when such two cycle delays occur, the memory data gates 181 in FIG. 2H are activated by either the Basic Exchange In-Gate Line 256, the High Speed In-Gate Line 266, or the Look Ahead In-Gate Line 276.

In the instant example of the operation of the Memory Bus Control Unit, it has been assumed that the requested memory was available, that is, the memory was not busy. In the priority operation, when it is determined that a particular channel has priority, as noted before, a select line to the memory select gates 151 and the Memory Busy Triggers 109 was activated. Such activated select line sets the appropriate busy trigger. At a specified time in the memory cycle, a reset signal is sent to the memory busy triggers 109. In the example of the operation of the Basic Exchange 75, had the Basic Exchange made a second request of the same memory that it had just been asked to fetch a word out or store a word in, the Basic Exchange would have had to wait until the memory cycle was completed and the busy trigger was reset before such second request could be honored.

The operation of the other channels in the Memory Bus Control Unit is essentially the same as set forth for the Basic Exchange 75 with the exception of the action created by the Inhibit Circuits 113, 114 and 115 and the priority AND circuits 125, 126, 127 and 128. Reference to the inhibit circuits shown in FIGS. 7A, 7B and 7C reveals a very simple priority system. Should all four channels request a particular memory, and this memory is available, the inhibit circuits will block all but the highest priority AND circuit. This means that, since the priority scheme is such that Basic Exchange, High Speed Exchange, Look Ahead, and Instruction Processor have priority in that order, a request by the Basic Exchange would result in the inhibit circuits providing access to the requested memory by the Basic Exchange only.

The Memory Address system for the computer system of this disclosure is designed for a maximum number of memories. Since the address includes 18 bits, there are many addresses provided for which exceed the installed memory capacity. Such addresses are termed invalid. In parallel with the Basic Exchange Memory Frame Decoder 105 is the Basic Exchange Invalid Address Control 111 with the connecting cable 242 carrying the three lines which indicate the Basic Exchange Invalid Address, such lines carrying 0, 1 and B bits, the B bit being either bit O, 2, 3, 4, 5 or 6. This provides for testing address validity at the same time that the Memory Frame Address is be being decoded. In the same manner that a request line conditions the operation of the memory frame decoder, and output from the Basic Exchange Request Trigger 101 through line 179 conditions the output of the Invalid Address Control 111. If the address is invalid, the request is terminated by resetting the Basic Exchange Request Trigger 101 through line 175 connected thereto. Also, a signal is sent to the Basic Exchange 75 through connector 154 which sets an indicator, in the Basic Exchange, termed a program check. This indicator informs the programmer that he has called for an address which does not exist in the installed system.

Another difference encountered in the channels other than the Basic Exchange channel described heretofore, is that the High Speed Exchange 76, the Look-Ahead 77 and the Instruction Processor 78 require some positive indication that their service request to the Memory Bus Control Unit has been accepted. For example, the High Speed Exchange 76 has second priority and, like all exchanges, must have a guaranteed maximum service, that is, the exchange must have an indication within a certain time limit or the exchange must disconnect its input/output unit. It is necessary that the High Speed Exchange 76 send an additional address a full memory cycle ahead of a service request. This advance address is used to block the lower priority channels and prevent them from making memories busy. Every time a memory is made busy, a request which follows must wait that number of cycles until the memory is free again. The Basic Exchange 75 requires no such advance address channel because the maximum time of the Basic Exchange is greater than the time lost by the worst condition that can happen and that is, if a computer made a request during the cycle just before the Basic Exchange request, the Basic Exchange would have to wait only one memory cycle before getting its request. However, the High Speed Exchange 76 could have to wait for the computer and could have to wait for the Basic Exchange because of higher priority, before the High Speed Exchange request would be honored.

To accommodate for this circumstance, High Speed Exchange Blocking Decoder 117 in FIG. 2B and High Speed Exchange Blocking Controls 118 in FIG. 2D are provided. The High Speed Exchange Advance Memory Address Bus 97 includes nine memory address bits which select the specific memory just as the nine bits in the High Speed Exchange Memory Address Bus 96B. These advance bits are applied as an input to the High Speed Exchange Decoder 117 where the selected memory which the High Speed Exchange desires next is decoded and such information is sent through Cable 172 as an input to the High Speed Exchange Blocking Controls 118 in FIG. 2D. Cable 172 includes six leads which, when activated one at a time, inform the High Speed Exchange Blocking Controls 118 which of the memories is selected and is to be blocked by the High Speed Blocking Controls. Since this blocking signal comes in advance of an actual request, the previously requested memory may still be requested. The blocking controls cannot change the previous request but can be effective in blocking the computer so that the next memory slot will be available to the High Speed Exchange in the absence of a request from the Basic Exchange. In the High Speed Exchange Blocking Controls 118 the select lines which come through Cable 172 from the High Speed Exchange Blocking Decoder 117 are connected as inputs to OR circuits to which are also connected the Memory Busy Trigger lines 110. From the standpoint of the computer, a selected memory will be indicated as being busy either, through the High Speed Exchange Blocking Decoder 117, or through the fact that the busy triggers can indicate that memories are busy.

Also connected from the High Speed Exchange 76 as inputs to the High Speed Exchange Blocking Controls 118 are the set High Speed Exchange Block line 159 and the Reset High Speed Exchange Block line 160. These lines have the same action as the request trigger action. These lines control the setting and resetting of the blocking circuits. The address may be on Cable 97 but cannot pass through the High Speed Blocking Controls 118 until the said HX Block line 159 is conditioned. This has the effect of causing the blocking controls to examine the address and block the Look-Ahead and Instruction unit. The reset High Speed Exchange Block line 160 has the effect of terminating the blocking action of the High Speed Exchange Blocking Controls 118. Another output of the High Speed Exchange Blocking Controls 118 is the High Speed Block Gate line 173 which is fed back to the High Speed Exchange Blocking Decoder 117 so that the advance address can pass from the High Speed Exchange Blocking Decoder 117 into the High Speed Exchange Blocking Controls 118.

The Look Ahead Effective Register Control 119 shown in FIG. 2B is a part of the Central Computer and is included here in block form to show that the I Unit/Look Ahead Accept line 168 which is an output of the instruction Unit Accept Circuit 116 in FIG. 2D, will, when conditioned, provide a gate-in effective address signal through connector 169 to the Look-Ahead Effective Register 121 in FIG. 2B. The instruction Unit 78 prepares the addresses which are transmitted through the instruction unit memory address bus 98 in FIG. 2B to send an address to the Memory Address Gates 161 and to the Instruction Unit Memory Frame Decoder 108 in FIG. 2D because of a fetch operation or can transfer an address from the Processing Unit 78 to the Look Ahead Effective Address Register 121. Since both addresses must go to the Memory Bus Control Unit it has been found to be convenient to use one Cable 98 to send both addresses.

There are times that the Cable 98 is used to transfer an address prepared by the Instruction Unit to the Look Ahead Effective Address Register 121, after which the Look Ahead Unit 77 will send a look ahead store request through line 163 to the Look Ahead Request Trigger 103 in FIG. 2D. This initiates operation such as the operation discussed in the example of the Basic Exchange heretofore. Since the instruction Unit 78 is more complex than the other channels, it is necessary that the Instruction Unit accept signal through Connector 167 from the Instruction Unit Accept Circuits 116 in FIG. 2D be received by the Instruction Unit somewhat earlier than the accept signal is required by the other channels. In order that this earlier accept signal be sent, the inhibit Instruction Unit signal through connector 190 is sent from the Look Ahead Inhibit Circuits 115 in FIG. 2D directly into Instruction Unit Accept Circuits 116 in FIG. 2D instead of going into the Instruction Unit Priority AND 128, as had been the practice in the other channels.

The Instruction Unit Accept Circuits 116 in FIG. 2 determine if the Instruction Unit Request has been accepted. The Instruction Unit 78 is last on the priority list and in the Instruction Unit Memory Frame Decoder 108 in FIG. 2D, a three-way output OR circuit reveals that a memory has been asked for and one of the six memories has been determined to be not busy. This information is connected from the Instruction Unit Memory Frame Decoder 108 through Cable 213 to the Instruction Unit Accept Circuits 116 in FIG. 2D. The three conditions which are necessary in order that the Instruction priority Connector 232, which is connected as an input to the Instruction Unit priority AND 128 in FIG. 2F, and the Instruction Unit Accept connector 167, which is connected as an output from Instruction Unit Accept Circuits 116 in FIG. 2D and as an input to the Instruction Processor 78 in FIG. 2B, be conditioned are (1) the instruction unit itself is not blocking the accept, that is, the block instruction accept line 166 which is an output of the Instruction Processor 78 and input to the Instruction Unit Accept Circuits 116 not be conditioned, since this line allows a means for cancelling a request after it had been made, (2) none of the higher priority channels are inhibiting the Instruction Unit Request, that is the inhibit Instruction Unit line 190 is not conditioned, and (3) the request must be made a little earlier. Inhibit instruction Unit line 190 and Block Instruction Unit Acceptance line 166 can enable a supervisory signal which would cancel the priority output through line 232 and the two accept outputs through lines 167 and 168. This action is done by a plus Untied OR circuit instead of a conventional OR circuit as is the case in the other decoders. The Untied OR circuit is a split-level OR circuit which is discussed hereinafter in connection with FIG. 8.

RETURN ADDRESS STORAGE AND CONTROL

In computer systems which include memories having different access times, it is necessary that control means be included which would insure the return of the requested information from memory to the requesting input/output device. Should information be requested to be fetched from a high speed memory at a time during the read out cycle of a lower speed memory, it is seen that the high speed memory could have its information ready for the output bus at the same time as the lower speed memory. It is, therefore, the function of the Return Address Storage and Control Unit shown in FIG. 2I to delay the gating out of data from the high speed memory to avoid conflict with the gating out of data from the low speed memory. Since the sequence of fetch request is not necessarily the sequence of availability of information fetched from memory, it is a further function of the Return Address Storage and Control Circuits to assure that the requested information is gated into the proper register in the original requestor.

These functions are provided by a time sharing principle which utilizes a fixed read out and a variable read in control for the return addresses. The fixed read out position corresponds to the time that the information will be available on the out bus. The variable read in position corresponds to the access time of the memory selected and to the availability of read out positions. That is, for a low speed memory, the read in time would be correspondingly earlier than the read in time of the high speed memory. In the example chosen for illustrating this invention, the read in time for low speed memories would be seven slots before read out time and read in time for high speed memory would be three slots before read out time. This means, then, that a particular slot for reading out information would be assigned to a low speed memory four slots before a high speed memory could ask for the same read out slot. If such slot is not available, then the position corresponding to the first available slot will be selected.

Provision is made for the prevention of two requests for the same read out time. This is accomplished by assigning the high speed memory address to the position which will be read out during the first available slot after low speed memory read out. Memory read-out delaying means are contained within the High Speed Memories 81 and 82 and such delay means response to a signal provided by the return address control circuits to delay gating out information a specific number of slots corresponding to the time of read out of the high speed memory address. The maximum access time for high speed memory is equivalent to the low speed access time. Thus, using exemplary figures of .6 microsecond access and 1.4 microseconds access for the high and the low speed memories respectively, high speed memory is read out in .6 microsecond, or three time slots in this example, but could be delayed to read out in as many as 1.4 microseconds, or seven slots if maximum conflict arises. This maximum conflict results from the consecutive requests of the four low speed memories just prior to a high speed memory request.

Since low speed memory slots reservations are always made prior to high speed memory slot requests, four slots ahead in this example discussed hereinafter, neither the access time nor the output sequence of low speed memories is affected by this reservation scheme. This is true of high speed memory only if low speed memory fetches do not interfere.

The output reservation scheme is accomplished through controlling the read-out sequence of the return address which is stored until needed in the Return Address Register 231 in FIG. 2I. The return address is a 3-bit code which specifies which register gate should read-in the data which is presented on the out Bus 94 to all registers simultaneously. The Return Address Gates 191 in FIG. 2H prepare the 3-bit code and present them through Cable 192 as an input to the return address register 231 in FIG. 2I. The 3-bit code is listed below:

| | BCDP |
|---|---|
| Basic Exchange **75** | 000–1 |
| High Speed Exchange **76** | 001–0 |
| Instruction Unit Register **1Y** | 010–0 |
| Instruction Unit Register **2Y** | 011–1 |
| Look Ahead Register **1** | 100–0 |
| Look Ahead Register **2** | 101–1 |
| Look Ahead Register **3** | 110–1 |
| Look Ahead Register **4** | 111–0 |

A fourth bit would allow for the addition of eight more return registers. The return address code is made up in the return address gate 191 in FIG. 2H when the fetch request is made. The Instruction Unit provides an enabling signal to produce the B bit whereas the Look Ahead supplies enabling signals to provide the C and D bits.

In FIG. 2I are shown the gate controls for the Out Bus 94. Assume, for the moment, that the return address out bus controls provide properly sequenced and timed return addresses. These are sampled every .2 microsecond, every slot, that is, and timed to send a computer gate select signal one slot before the corresponding data is expected at the computer register. This preselection gives the computer register time to request priority on its data check bus. Since the exchanges do not require preselection or a synchronization, the decoded gate control select pulse is delayed, for example, about .3 microsecond, that is, until a sample priority signal is present. Parity is used in the decoder to prevent gate selection if a single error is present.

The return address storage and control area in FIG. 2I also includes the return address gates 191 in FIG. 2H. These Return Address Gates 191 provide a code through Cable 192 to the Return Address Register 231 which identifies the requesting unit so that the data can be returned thereto. A Clock 298 is the clock in the central computer and one of its outputs is shown as a clock sample which is transmitted through Connector 299 to a Ring Circuit 211. Ring 211 is an eight-position closed ring in the example of this specification, used to provide commutation. The output of the Ring is made up of eight sequentially pulsed in pulses $I_0$–$I_7$ and eight simultaneous out pulses $O_0$–$O_7$. Pulses $O_0$–$O_7$ are presented through Cable 342 which includes 8 leads, one for each gate pulse, to the Ring Output Pulse $O_0$–$O_7$ Phase Control Circuit 221. Here the $O_0$–$O_7$ signals from the Ring are delayed a half cycle from the $I_0$–$I_7$ signals and are powered to provide plus and minus output signals through Cable 343 which has sixteen leads, one for each of the eight plus and minus signals ($O_0$–$O_7$) to the Return Address Register 231. It is here that the Return Address from the Return Address Gates 191 is stored until the data is available on the Memory Out Bus 94. The minus pulses $\bar{I}_0$–$\bar{I}_7$ from Ring 211 are conducted through the eight lead Cable 344 as in input to Return Address Register Selector 261.

Two of the three output cables from the Return Address Register 231 include Cable 346 which contains eight leads which carry the status information when activated that specific registers are not busy, and Cable 347, with eight lines which, when conditioned, reveal that specific registers are busy. These two cables are connected as inputs to the Return Address Register Status Decoder 241 which prepares an output which is connected through Cable 349 to the Return Address Register Selector 261. Cable 349 contains thirty-two leads which include thirty-two different decoded lines which reveal the busy status of not only individual registers but successive groups of registers up to four in a group.

Since the return address storage and control unit is used only during fetch operations of High Speed Memory 81 or 82, it is the Return Address Read In Control 251 which determines the operativeness of the Return Address Storage and Control unit. The three inputs to the Return Address Read In Control 251 are a signal from Memory Select Gates 151 on Line 307 which says that Memory 81 has been selected, a second signal from the Memory Select Gates 151 through Line 308 which says that High Speed Memory 82 has been selected. Line 309 is an output from the Memory Readout Control 171 in FIG. 2G which says that the operation is a fetch operation. The activation of either Line 307 or 308 in conjunction with Line 309 provides an output through Connector 352 which says that information is to be fetched from one of the High Speed Memories. Should neither Line 307 nor 308 be activated but Line 309 is activated, the Return Address Read-In Control 251 will produce a read low speed memory signal through Connector 351. The two read lines 351 and 352 are connected as inputs to the Return Address Selector 261.

The Return Address Register Selector 261 has for its inputs the Read Low Speed Memory Line 351 and the Read High Speed Memory Line 352 from the Return Address Read-In Control 251, the eight $-I_0$ through $-I_7$ in Cable 344 from the Ring 211, the eight lines in Cable 347 from the Return Address Register 231 which indicate which of the registers are busy, and the thirty-two line Cable 349 which is an output of the Return Address Register Status Decoder 241.

The outputs of the Return Address Register Selector 261 are the select specific Return Address Register Lines contained in Cable 345 which is connected as an input to the Return Address Register 231. These inputs function to set status triggers during an SP and to condition bit registers to receive a return address. The selection of a register and the setting of its status trigger form the basis for selecting the first available output slot for a fetch operation. For example, the condition of status triggers 7, 0, 1 and 2 determine which of five discrete slots will be used to read out the selected memory. The forty-lead Cable 353 is the other output from the Return Address Register Selector 261 and it is applied as an input to the High Speed Memory Delay Control and Slot Selector 271. The Return Address Register Selector 261 has eight sets of five AND circuits which select the first empty slot. High speed memory must be advised of this selection so that it may provide the selected delay so as to gate data into the proper output slot. This information is sent from the High Speed Memory Delay Control and Slot Selector 271 to the memories. High speed memory must also use this information to delay memory reset so that a new fetch will not interfere with the previous one.

Referring back to the Return Address Register 231, the Return Address which is read out of the registers in coded form is connected to the Return Address Decoder 281 through the nine-line Cable 348. The output of the Return Address Decoder 281 is connected to the Fetch Read In Control 291 through the eight-line Cable 355 which will have only one line activated at a time to inform which of the Return Registers, that is, the Basic Exchange, the High Speed Exchange or the four registers in Look Ahead or the two in the Instruction Processor, is selected. The output of the Fetch Read In Control (Return Register Selector) 291 is the eight-line Cable 155 which has one line for each of the requester registers so that the selected register in one of the input-output devices for the Memory Bus Control Unit will be activated.

Should the maximum difference between the minimum high speed memory access and the maximum low speed memory access be other than the illustrated four slots, then the number of registers and the size of the selector would be modified accordingly. This principle is easily modified to suit one's needs within the broad limits defined. When only one type of memory is used in a system, a delay line would provide sufficient storage, since readout times would be constant.

LOGIC CIRCUITS

The construction and operation details of the AND circuits, the OR circuits and the converter circuits shown in block form in FIGS. 3 through 29 are described in co-pending patent application Serial No. 65,560 filed by Paul S. Herwitz, et al. on October 26, 1960, entitled "Computer Indexing Apparatus," and assigned to the assignee of the present application. As shown in the drawings, the lower outputs of these circuits are the in-phase outputs, and the upper outputs from these circuits are the out-of-phase outputs. In the positive AND and the positive Trigger AND the in-phase output is positive only when all inputs are positive. The out-of-phase output is negative for the above condition. These positive AND circuits also operate as negative OR circuits. In the negative AND and the negative Trigger AND circuits the in-phase output is negative only when all inputs are negative. The out-of-phase output is positive for the above condition. These negative AND circuits also operate as positive OR circuits. In the positive OR and the positive Trigger OR circuits the in-phase output is positive if one or more input signals are positive. The out-of-phase output is negative for the above condition. These positive OR circuits operate as minus AND circuits. In the negative OR and the negative Trigger OR circuits the in-phase output is negative if one or more input signals are negative, and the out-of-phase output is positive. The converter circuits are employed to translate from one voltage level to another, or to change the amplitude of the voltage swing about the same reference level. These converter circuits frequently are used to invert the input signal. The converters employed are constructed similar to the DBZZ circuits shown in FIG. 296 of the above Herwitz et al. application.

The untied OR shown in FIGS. 8 and 33 is discussed in connection with the Instruction Unit Accept Circuits 116.

The regitser circuits shown in FIGS. 11 and 23 are discussed in connection with the Look Ahead Effective Address Register 121 and the Return Address Register 231.

DETAILED SYSTEM LOGIC DESCRIPTION

*Basic Exchange Request Trigger*

The Basic Exchange Request Trigger 101, shown in block form in FIG. 2C and in logic form in FIG. 3A, functions as a synchronizing circuit to accommodate for the random requests from the Basic Exchange which operates asynchronously with respect to the Memory Bus Control Unit. Synchronizing is accomplished by the concurrence of request signals from the Basic Exchange and a sample request signal from the clock in the central computer.

Referring now to FIG. 3A, it is noted that the three inputs thereto are the Basic Exchange Request line 153 which carries the initial request for Memory Bus Control use, the Basic Exchange Invalid Address Request Reset 175 which is an output of the Basic Exchange Invalid Address Control 111, and the Basic Exchange Request Reset line 184 which is an output of the Basic Exchange In-Gate Control 141 in FIG. 2E. The request trigger 101 includes a negative AND 365 having three inputs and one in-phase output. The lowermost shown input is the sample request line which is an output of the clock in the Central Computer which provides the three different synchronizing pulses. The BX Request 153 is a second input to the minus AND 365 and a line 366 which is an output of the second of the two flip-flop circuits 368 and 369. The BX request 153 is also applied as an input to a converter 367 which provides an out-of-phase positive output which is connected as an input to the flip-flop 369. Flip-flops 368 and 369 are interconnected with the minus AND circuit 365 in such a manner that the output BX request lines 176 and 177 will be activated upon the simultaneous application of a BX request signal 153 and a sample request signal from the computer clock until the arrival of a BX request reset line 184 or the event of the arrival of a BX invalid address request reset line 175. Flip-flop 368 includes a minus trigger OR 371 and a minus trigger AND 372. The inputs to minus trigger OR 371 are the output line 373 from the minus AND 365 and the in-phase output 379 from minus trigger AND 372. The inputs to minus trigger AND 372 are the BX invalid address request reset line 175, the BX request reset line 184, and the in-phase output 177 of the minus trigger OR 371. The out-of-phase output 374 minus trigger OR 371 is connected as an input to the plus trigger OR 375 in flip-flop 369. A second input to plus trigger OR 375 is the in-phase output 366 of a plus trigger AND 376 which makes up the second trigger circuit of the flip-flop 369. The in-phase output 377 of plus trigger OR 375 is connected as an input to plus trigger AND 376. The out-of-phase output 378 from the converter 367 is connected as the second input to the plus trigger AND circuit 376.

In the operation of the Basic Exchange Request Trigger 101, for the purpose of explanation, it is assumed that the BX Request reset line 184 has just completed its operation which results in a minus signal on line 366 which is an input to the minus AND circuit 365. When a negative BX request signal 153 occurs during the sample request negative signal, the three inputs to minus AND 365 satisfy the condition that all inputs must be negative in order that a negative in-phase output may be obtained. This negative output through connector 373 to the minus trigger OR 371 is sufficient to provide a minus in-phase output on line 177 which is the BX inhibit line and is applied to the BX inhibit circuits 113. The minus signal in connector 177 is also applied as an input to the minus trigger AND 372. In the absence of a BX invalid address request reset signal 175 and a BX request reset signal 184, the three inputs to the minus trigger AND are negative.

The out-of-phase output 374 from minus trigger OR 371 is a posiitve input to the plus trigger OR 375 which enables such trigger to provide a positive in-phase output through connector 377 to the plus trigger AND 376. The converter 367 provides a plus out-of-phase output through connector 378 as the other input to the plus trigger AND 376 during the existence of a BX request trigger 153.

Referring once more to minus trigger AND 372 in flip-flop 368, with the three inputs being negative, an out-of-phase output 176 is provided as the BX request trigger 176 and is applied to the BX priority AND 125 through connector 178 and to the BX invalid request control 111 through connector 179. The in-phase output of minus trigger AND 372 is fed as an input to the minus trigger OR 371 through connector 379. When the two inputs 377 and 378 to plus trigger AND 376 are positive, the in-phase output 366 is positive and is applied as an input to the plus trigger OR 375 in flip-flop 369 and also to the minus AND 365 to effectively disconnect the basic exchange request line 153. However, the negative input 379 to minus trigger OR circuit 371 in flip-flop 368 and the plus output through line 366 to the plus trigger OR 375 in flip-flop 369 sustain the conditions initiated by the BX request 153 until a reset signal is received. This reset signal can be either a BX invalid address request reset signal 175 from the BX invalid address control 111 or can be a BX request reset signal 184 from the BX in-gate control 141. The single positive line is effective to activate minus trigger AND 372 since such circuit performs OR logic functions to positive inputs. The out-of-phase output 176 will be negative and, therefore, ineffective as a BX request trigger. The in-phase output 379 will become positive to join with input 373 to the minus trigger OR 371 as two positive inputs. The polarity of connector 373 was changed to positive when the positive signal 366 was applied to minus AND 365. The in-phase output 177 of minus trigger OR 371 is now positive and ineffective as a request trigger. The out-of-phase output 374 is now negative.

In this reset example, the Basic Exchange 75 is no longer making a request through line 153 and as a result, the input polarity to converter 367 is now positive and the out-of-phase output 378 is now negative. This negative line 378 when applied to plus trigger AND 376, in flip-flop 369, provides a negative in-phase output 366 which is applied as an input to the plus trigger OR 375. Since the two inputs 374 and 366 to the plus trigger OR 375 are now both negative, the plus trigger OR performs as a minus trigger AND to provide a minus in-phase output through connector 377 which is applied to plus trigger AND 376.

The reset operation initiated by a BX invalid address request reset signal 175 is the same as the operation just described during the BX request reset 184 activity. However, since the BX request line 153 would still be active (that is negative), it is necessary that basic exchange invalid address control 111 notify the Basic Exchange 75 through connector 154 that an invalid address has been requested. The Basic Exchange 75 then cancels the BX request line 153 to provide all the requirements for reset operation of the Basic Exchange Request Trigger 101.

It is noted that High Speed Exchange Request Trigger 102 in FIG. 3B is identical in structure, operation and function with that of the basic exchange request trigger 101 in FIG. 3A. Obviously, the inputs and outputs are to and from high speed exchange control circuitry instead of basic exchange control circuitry.

A first minus AND circuit 381 has for its inputs the High Speed Exchange Request line 158, the Sample Request line and the line 382 which is an output the second of flip-flops 383 and 384. The output of minus AND circuit 381 is an in-phase line 385 which is connected as an input to minus trigger OR 386 in flip-flop 383. A second input to minus trigger OR 386 is output 387 from minus trigger AND 388 in flip-flop 383. The three inputs to minus trigger AND 388 are the HX Invalid Address Request Reset line 205, the HX Request Reset line 206, and the in-phase output line 202 from minus line 385 which is connected as an input to minus trigger OR 386 in flip-flop 383. A second input to minus trigger OR 386 is output 387 from minus trigger AND 388 in 384 flip-flop 383. The three inputs to minus trigger AND 388 are the HX Invalid Address Request Reset line 205, the HX Request Reset line 206, and the in-phase output line 202 from minus trigger OR 386. Output 202 is the high speed exchange request trigger line which is connected to the High Speed Exchange Inhibit Circuits 114. The out-of-phase output 389 from minus trigger OR 386 is one of the inputs to plus trigger OR 391 in flip-flop 384.

The second input plus trigger OR 391 is in-phase output 382 from plus trigger AND 392. This is the same input as input 382 to the minus AND 381. The in-phase output 393 of plus trigger OR 391 is one of the inputs of plus trigger AND 392. HX request line 158 is also connected to converter 394 and the out-phase output 395 thereof is the second input to plus trigger AND 392. The out-of-phase output 201 of minus trigger AND 388 in flip-flop 383 is the High Speed Exchange Request Trigger 201 which is connected to high speed exchange priority AND 126 through connector 203 and to the high speed exchange invalid address control 112 through connector 204.

The Look Ahead Request Trigger 103 in FIG. 3C as well as the Instruction Unit Request Trigger 104 in FIG. 3D are simpler than the previously described trigger circuits since there is no invalid address reset provision nor is any synchronizing necessary. For the look ahead Request Trigger 103, the inputs include the Look Ahead Store Request line 163 and Sample Request which are inputs to a negative AND circuit 398. The in-phase output 399 of the minus AND circuit 398 is connected as an input to the minus trigger OR 401 in flip-flop 402. The in-phase output of minus trigger 401 is the Look Ahead Request Trigger 224 which is connected to the Look Ahead Inhibit Circuits 115 and also as an input to minus trigger AND 403. The Look Ahead Request Reset line 222 is the second input to the minus trigger AND 403. The in-phase output 404 of minus trigger AND 403 is connected as an input to minus trigger 401 to complete the flip-flop structure.

The operation of the Look Ahead Request Trigger 103 is initiated by the simultaneous appearance of a Look Ahead Store Request on line 163 and a Sample Request signal applied to minus AND circuit 398. A minus output is provided to the minus trigger OR 401 in the flip-flop 402. This minus input provides a minus output 224 which is tapped as the Look Ahead Request Trigger and also a minus signal to the minus trigger AND 403. In the absence of a Look Ahead request reset signal, line 222 is negative to form the second negative input for the minus trigger 403 and to provide a negative in-phase output through connector 404 as an input to the minus trigger OR 401. This last said minus input maintains the flip-flop in trigger condition now that conductor 399 has a plus signal thereon in the absence of a Look Ahead store request line 163 or a sample request line. Upon the application of a positive look ahead request signal on line 222 minus trigger AND 403 functions as a plus OR circuit to provide a plus in-phase output through connector 404 to be the second plus input to the minus trigger OR 401. In this reset condition, the look ahead request triggers on lines 224 and 225 have been rendered ineffective.

The Instruction Unit Request Trigger 104 shown in FIG. 3D has for an input the Instruction Unit Fetch Request line 165 which is negative when a request is made, connected to a converter circuit 405 which has for an in-phase output 406 a negative input to minus trigger OR 407 in flip-flop 408. The in-phase output 409 is applied as an input to the minus trigger AND circuit 411. The second input to minus trigger AND 411 is the I unit request reset line 226. The in-phase output 412 of minus trigger AND 411 is applied as an input to minus trigger OR 407. The out-of-phase output 413 of minus trigger AND 411 is connected as one of the two inputs to a plus OR circuit 414. The second input to the plus OR circuit 414 is the out-of-phase output 415 from converter 405. The in-phase output of the plus OR circuit 414 is the instruction unit memory request trigger 227 which is connected to the instruction unit priority AND 128 in FIG. 2F.

In the operation of the instruction unit request trigger 104, a negative signal on line 165 which indicates that the instruction unit has made a fetch request provides a negative input to minus trigger OR 407 in flip-flop 408. The in-phase output 409 is applied to minus trigger AND 411 and in the absence of an Instruction Unit Request Reset signal on line 226 the polarity of line 226 is minus so that the minus trigger AND 411 provides a minus in-phase output through connector 412 as a minus input to the minus trigger OR 407, thereby maintaining a stable state. The out-of-phase output of minus trigger AND 411 provides a positive signal through connector 413 to the plus OR 414 which conditions it to produce a positive in-phase output instruction memory request trigger 227. The converter 405 had provided a plus signal through connector 415 to the plus OR 414.

*Basic Exchange Memory Frame Decoder 105*

The Basic Exchange Memory Frame Decoder 105, which is shown in block form in FIG. 2C, is illustrated in detail in FIGS. 4A and 4B. This circuit functions to mix the memory busy triggers with the memory address bits 0 through 6, 16 and 17, for example, which can determine the selected memory and can reveal the presence of addresses within such memory which do not exist. This circuit further functions to provide an inhibit line and a priority line.

A six storage unit complement is considered in FIGS. 4A and 4B which show an addressing scheme using a combination of two units in one group, the A group, and four units in the other group, the B group. Memory addresses are interleaved between units of each group as explained previously. With two units in group A, the highest address in the group, for example, 2,048. Eleven address positions, 7 through 17, are used to decode into these addresses. Because only two units are used in group A, interleaving between the two can be done by a single binary bit, in this case bit 17. Thus all even addresses from 0 to 2,048 are in the BX Memory Address bit 17 when such bit is 0 and odd when such bit is one. With bit 17 being used to decode the unit selected, bits 7 through 16 are used in the units to decode for the array address.

Addresses higher than 2,048 are in group B which contains four units. Therefore, two binary bits are needed to decode for this selected unit within the four units of the group. In group B, bits 16 and 17 are used for unit selection. Group B addresses range from 2,049 through 65,536. Therefore, bits one and two are needed to address group B. As the address increases from 2,048 in group A to 2,049 in group B, the 2 bit is set to 1. When this happens group B is designated. Group B is designated by a 1 or 2. Bit 2 is also used in decoding the array address shown in FIGS. 4A and B because bit 16 is now needed to decode the units selected and can not be used for an array address decoding. Therefore, array addresses in group B are decoded from bits 2 through 15 and bit 2 now has an array value of 512 and bit 15 a value of 1, for example. Thus the array decoding of group B, bits 2 through 15, is in effect 1 position to the left from that of group A which is bits 7 through 16.

As the address increases to the point where bit 2 is turned on, it decodes to group B and also is used as the first array address for the first unit; that is $B_0$ memory 83 in FIG. 2G. At this point bit 2 is a one and bits 3 through 17 are zeros. Therefore, bit 2 alone selects position 512 in the array of low speed memory 83. The first or lowest address in group B is in position 512 of memory 83 and addressing continues on through the rest of the array addresses and are interleaved in group B, that is memories 83, 84, 85 and 86. As the address increases to 65,535, bits 2 through 15, 16 and 17 are all ones, decoding designates that array address 16,383, effective address 65,535 is the highest position in the group B and is found in memory 86. As the address steps up one, bit 1 is to a one, 2 through 15, 16 and 17 are set to zero. Bit 1 designates group B and 2 through 15 being zero decode into array address zero. Thus the beginning part of array addresses in group B are addressed starting with effective address 65,536 and continue to 67,583. Invalid addresses start with 67,584 for the B memories which occurs when ones are in position one and two and invalid addresses start with 2,048 which is ones in either bits 0 through 6 for the A memories.

The Basic Exchange Memory Frame Decoder 105 in FIGS. 4A and B provides the memory group selection and the specific memory selection made by the Basic Exchange and also provides a check of validity of addresses available in the installed equipment.

Two input cables 110 and 95B are connected to the input of the control circuit shown in FIGS. 4A and B. Cable 110 is connected from the memory busy triggers shown in FIGS. 5A, B, C, E and F and cable 95B is connected from the Basic Exchange 75 shown in FIG. 2A. Cable 110 includes six leads which represent the busy status of each of the memories. The BX memory address cable 95B includes the nine bits that are needed to select specific memory and to determine invalid addresses.

The BX Memory Address Bus 95B is connected such that bits 0 and 2 through 6 are connected as inputs to a positive OR circuit 426. Since bits 0 and 2 through 6 are used to code only the B memories, the positive in-phase output of the positive OR 426 is an indication that the selected memory is one of the B group. Conversely, should neither bit 0 nor any of the bits 2 through 6 be a one, the positive out-of-phase output of positive OR 426 would indicate that the selected memory is one of the A group.

BX Memory Address Bit 1, 95B 2, is connected as an input to converter 427. BX Memory Address Bit 17, 95B 18, is connected as a positive input to a second converter 428. BX Memory Address Bit 16, 95B 17, is connected as a positive input to a third converter 429.

The $A_0$ memory not busy line 110–1 is connected as an input to a first positive AND circuit 431, the $A_1$ memory not busy line 110–2 is connected as a positive input to a second positive AND circuit 432, the $B_0$ memory not busy line 110–3 is connected as a positive input to a third positive AND circuit 433 and also as a positive input to a fourth AND circuit 434. The $B_1$ memory not busy line 110–4 is connected as a positive input to a fifth positive AND circuit 435 and a sixth positive AND circuit 436. The $B_2$ memory not busy line 110–5 is connected as the positive input to a seventh positive AND circuit 437 and an eighth positive AND circuit 438. The $B_3$ memory not busy line 110–6 is connected as a positive input to a ninth positive AND circuit 439 and a tenth positive AND circuit 440.

The in-phase output 441B of positive OR circuit 426, labeled plus B, is connected as an input to positive AND circuit 433, positive AND circuit 435, positive AND circuit 437 and positive AND circuit 439. The out-of phase output 441 of plus OR circuit 426, labeled plus not B, is connected as an input to the positive AND circuit 431, the positive AND circuit 432, the positive AND circuit 434, the positive AND circuit 436, the positive AND circuit 438 and the positive AND circuit 440. The in-phase output 442 of converter 427 is connected as an input to the four positive AND circuits 434, 436, 438, and 440. The out-of-phase output 443 of converter 427 is connected as an input to the six positive AND circuits 431, 432, 433, 435, 437 and 439. The in-phase output 444 of converter 428 is connected as an input to the five positive AND circuits 432, 435, 439, 436 and 440. The out-of-phase output 445 of converter 428 is connected as an input to the five positive AND circuits 431, 433, 434, 437 and 438. The in-phase output 446 of converter 429 is connected as an input to the four AND circuits 437, 438, 439 and 440. The out-of-phase output 447 of converter 429 is connected as an input to the four positive AND circuits 433, 434, 435 and 436.

The in-phase outputs 451 of positive AND circuits 431 and 432 are connected as an input to a positive OR circuit 452 in FIG. 4B. The out-of-phase output 180–1 of positive AND circuit 431 is the line which notifies the BX memory select circuits 131 that the basic exchange has selected memory $A_0$ 81 when a negative signal appears on such select line. The out-of-phase output 180–2 of positive AND circuit 432 is the line which when negative, informs the basic exchange memory select circuits 131 that the basic exchange has selected memory $A_1$ 82. The in-phase outputs 452 of positive AND circuits 433, 434, 435 and 436 are connected as a second input to the positive OR circuit 452. The in-phase output 453 of positive AND circuits 437, 438, 439 and 440 are connected as a third input to the positive OR circuit 452. The out-of-phase output 454 of positive AND circuit 433 and the out-of-phase output 455 of the positive AND circuit 434 are connected individually as the two inputs to the negative OR circuit 456 in FIG. 4A. The out-of-phase output 180–3 of the negative OR circuit 456, when negative, indicates to the Basic Exchange Memory Select Circuits 131 that the BX has selected the $B_0$ 83 memory.

The out-of-phase output 457 of the positive AND circuit 435 and the out-of-phase output 458 of the positive AND circuit 436 are connected as inputs to a second negative OR circuit 459. The in-phase output of negative OR 459 is the line 180–4, which, when negative, notifies the Basic Exchange Memory Select Circuits 131 that the Basic Exchange has selected the $B_1$ memory 84.

The out-of-phase output 461 of positive AND circuit 437 and the out-of-phase output 462 of the positive AND circuit 438 are connected as inputs to a third negative OR circuit 463. The in-phase output 180–5 of the negative OR circuits 463 is the line to the Basic Exchange Memory Select Circuit 131 which, when negative, indicates that the Basic Exchange has selected the $B_2$ memory 85.

The out-of-phase output 464 of the positive AND circuit 439 and the out-of-phase output 465 of the positive AND circuit 440 are connected as inputs to a fourth negative OR circuit 466. The in-phase output 180–6 of the negative OR circuit 466 is the line which, when negative, informs the Basic Exchange Memory Select Circuits 131 that the Basic Exchange has selected the $B_3$ memory 86.

The in-phase output 183 of positive OR circuit 452 is connected to the Basic Exchange Priority AND circuit 125 in FIG. 2E. Line 183 is the BX priority line and is effective when positive. The out-of-phase output 182 of the positive OR circuit 452 is connected to the Basic Exchange Inhibit Circuits 113 and is an enabling signal when negative.

In the operation of the Basic Exchange Memory Frame Decoder 105 as shown in FIGS. 4A and B, it is seen that one of the lines from the memory busy cable 110 is connected as an input to each of the memory select channels of this decoder. It is a requirement of this circuit that the selected memory not be busy in order that such memory can be selected. In the exemplary circuit shown, the B group of memories will be selected when a one appears on either 95B 3 which is an input to the positive OR 426 or on 95B 2 which is a positive input to the converter 427. In the absence of bit 1 or 2, the A group of memories will be selected. For the purpose of explanation, it is assumed that the busy lines 110–1 and 110–2 are positive and therefore not busy. The absence of bit 2 and all of the bits 0, 3, 4, 5 and 6 which represent addressing within the B group, provides a positive out-of-phase output through connector 441 to provide the second positive input to the A group selecting positive AND circuits 431 and 432. With the absence of bit 1 applied to the converter 427, a positive out-of-phase output through connector 443 provides the third positive input to the positive AND 431 and 432. It is bit 17 which selects memory $A_0$ or memory $A_1$ when all other conditions have been met. The presence of bit 17 as an input to converter 428 provides an in-phase positive output through connector 444 which is applied as the fourth and the enabling input to the positive AND circuit 432 which, in turn, provides an output to indicate that memory $A_1$ has been selected. Simultaneously the in-phase output 451 of the positive AND 432 provides a positive input to the positive OR 452 to enable the BX priority line 183 and the BX inhibit line 182. In the absence of bit 17 as an input to converter 428, a positive out-of-phase output through connector 445 is applied as the fourth and the enabling input to the positive AND 431. The output of circuit 431 indicates that memory $A_0$ has been selected and also a signal is sent to the positive OR 452 to enable the BX priority and inhibit lines. As is already known, when the output 444 of converter of 428 is positive and is an enabling signal, the out-of-phase output 445 is negative and is a blocking signal. And the converse is true so that only one of the positive AND circuits 431 or 432 is enabled at a time. During the time that the A group selectors have been enabled, a disabling signal from positive OR 426 through the in-phase output 441B inhibits the operation of positive AND circuits 433, 435, 437 and 439 which constitute one half of the B group select positive AND circuits. The absence of bit 1 as an input to converter 427 provides a negative in-phase output through connector 442 to inhibit the remaining four of the positive AND circuits 434, 436, 438 and 440 of the B group select circuits. The absence of bits 0, 2, 3, 4, 5 and 6 as inputs to the positive OR 426, indicates that the address of the Basic Exchange requested information is within the installed A memories.

Since the presence of bit 0 and bit 1 indicate that invalid addresses have been requested of the B memory group, it is noted that an output has been taken from line 95B 1 from BX memory cable 95B so as to provide to the basic exchange invalid address control unit 111 and indication of the presence or absence of bit 0, this line being 242–0. Also, line 242–1 is connected to line 95B 2 from BX memory address cable 95B to provide an indication of the presence of bit 1 to the BX invalid address control unit 111.

It is noted that with the appearance of bit 2 as an input to the positive OR 426, the out-of-phase positive output of the positive OR 426 is inactivated and the A group no longer provide memory select signals. Without bit 2, the presence of bit 3, 4, 5 or 6 would have introduced an invalid address signal plus B through invalid address line 242–B. This would indicate that the requested address was for a location beyond the capacity of the A group memories. Since the BX memory address bit 1 appearing on line 95B 2 provides a positive in-phase output through connector 442, the B group of memories is selected thereby since no A group memory has connector 442 for an input. Either bit 1 or bit 2, in fact, selects the B group of memories. Since bit 2 is needed as an array address decoding bit, the invalid address in the B group is signified by the presence of bit 0 and bit 1. Bits 16 and 17 are used to decode the units selected.

In order to select $B_0$ memory 83, the necessary conditions are that bit 2 be present as an input to the positive OR 426, bit 1 be absent as an input to converter 427 and that bits 16 and 17 be zeros. Positive OR 426 provides a plus output **441*b* when bit 2 is present, converter 427 provides a plus out-of-phase output through connector 443 when bit 1 is zero, converter 428 provides a positive out-of-phase output through connector 445 when bit 17 is zero, and converter 429 provides a positive out-of-phase output through connector 447 when bit 16 is zero. These four positive inputs plus the positive $B_0$ memory not busy signal 110–3 provide a negative out-of-phase output through connector 454 to the negative OR circuit 456 which, in turn, enables the Basic Exchange Priority Line 183 and the basic exchange inhibit line 182. Since bits 2, 3, 4, 5 and 6 can be used as array addresses in the B group, the OR circuits 426, which is designed primarily for A group invalid address requests, requires that the second set of five-way plus AND circuits 434, 436, 438 and 440** are included to take care of requests of the B memory group for addresses above those installed in the A group.

Had bit 2 been a zero instead of a one and had bit 1 been a one instead of a zero, positive OR circuit 426 would have provided a positive out-of-phase output through connector 441 and converter 427 would have provided a positive in-phase output through connector 442 as the two enabling signals to the positive AND circuit 434 to which already have been applied the output of converters 428 and 429 which are indicative of zeros in the bits 16 and 17. When the five inputs to the positive AND circuit 434 all positive, an out-of-phase output through connector 455 would provide an out-of-phase output from the negative OR circuit 456 to also select the $B_0$ memory. The in-phase output 452 of the positive AND 434 would also provide the enabling of the BX inhibit and priority lines 182 and 183. So it is seen the presence of a one either bit position 1 or 2 will select the B group and the presence of zeros in bits 16 and 17 will select the $B_0$ memory. The operation for selection of the $B_1$ memory 84 is identical with the operation of the selection of $B_0$ memory 83 when bit 16 is a zero and when bit 17 is a one. $B_2$ memory 85 is selected when bit 16 is a one and when bit 17 is a zero. $B_3$ memory 86 is selected when both bits 16 and 17 are ones.

The High Speed Exchange Memory Frame Decoder 106 shown in FIGS. 4C and 4D is identical with the circuit 3 and is identical in operation with the Basic Exchange Memory Frame Decoder 105 just discussed. It is noticed that the two decoders are identical except for the replacement of the High Speed Exchange connections instead of Basic Exchange connections shown in FIGS. 4A and 4B.

The Look Ahead Memory Frame Decoder 107 is shown in FIGS. 4E and 4F and the Instruction Unit Memory Frame Decoder 108 is shown in FIGS. 4G and 4H. The Look Ahead and Instruction Unit memory frame decoders are identical with each other and differ from the basic exchange and high speed exchange memory frame decoders 105 and 106 in that no provision is given for invalid addresses. This means that now the bits 1 and 2 are decoded as address information and no check of the validity of addresses is made. This provision is included in the look ahead and instruction unit memory frame decoders since the look ahead unit 77 and instruction processor 78 make up their own addresses based on available information about the installed capacities of the momories. The structural difference between the Look Ahead and Instruction Unit Memory Frame Decoders and the Basic Exchange and High Speed Exchange Memory Frame Decoders are the following: the three invalid address bits 0, 1 and B are not made available to any invalid address circuitry, and an additional positive AND circuit 471 in the Look Ahead Memory Frame Decoder and 472 in the Instruction Unit Memory Frame Decoder have been added. The positive OR circuit 473 which has for its inputs the Look Ahead Memory Address Bus 198B which includes leads 1 through 7 through which bits 0, and 2 through 6 are applied as positive inputs, has for its in-phase output a plus B line 474 which is connected as is the plus B line in the Basic Exchange and High Speed Exchange Memory Frame Decoders 105 and 106, and is additionally connected as an input to the positive AND circuit 471. The $B_0$ memory not busy line 174–3 is connected as in the previous two decoders and is connected additionally through lines 475 as a second input to the positive AND circuit 471. The third input 476 to the positive AND circuit 471 is connected as the in-phase output of the converter 477 to which Look Ahead Memory address bit 1 through connector 198B 2 is an input.

The in-phase output 478 of the positive AND circuit 471 is connected as an input to the positive OR circuit 479 which provides the Look Ahead inhibit line 208 and the Look Ahead priority line 209. The out-of-phase output 481 of the positive AND circuit 471 is connected as the third input to the negative OR circuit 482 which provides the Look Ahead $B_0$ Memory Select line 207–3.

It is to be noted that the instruction unit memory frame decoder 108 has instead of outputs which provide inhibit and priority signals, has the three outputs in cable 213 which are connected as inputs to the instruction unit accept circuits 116 in FIG. 2D, the first output being the $A_0$ or $A_1$ memory selected line 213–1, the second output being the $B_0$ or $B_1$ memory selected line 213–2, and the third output being the $B_2$ or the $B_3$ memory selected line 213–3. It is seen from the operation of the circuit that on line 213–1, for example that the in-phase output of the positive AND circuit in either the $A_0$ or $A_1$ memory select channel will provide a positive output through line 213–1. The presence of a positive output signifies that one of the two A memories has been selected and the absence of a positive output therethrough signifies that neither of the A memories has been selected.

*Memory Busy Triggers 109*

Figure 5A:
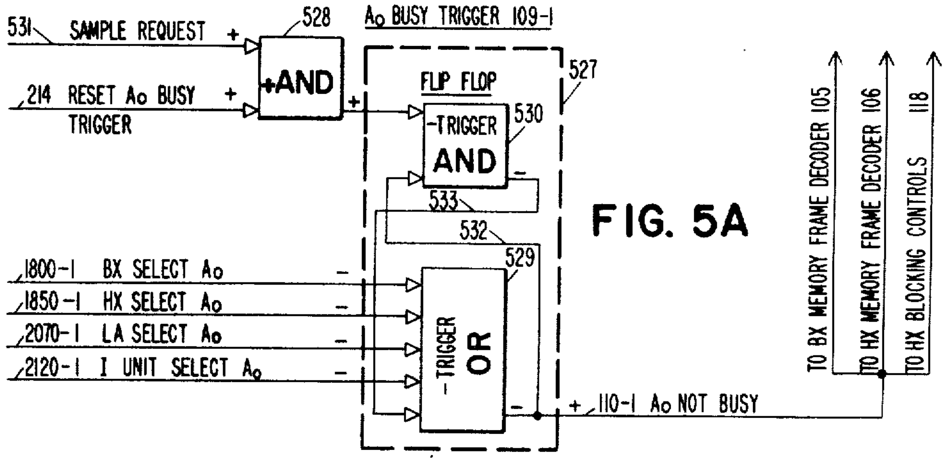
Figure 5B:
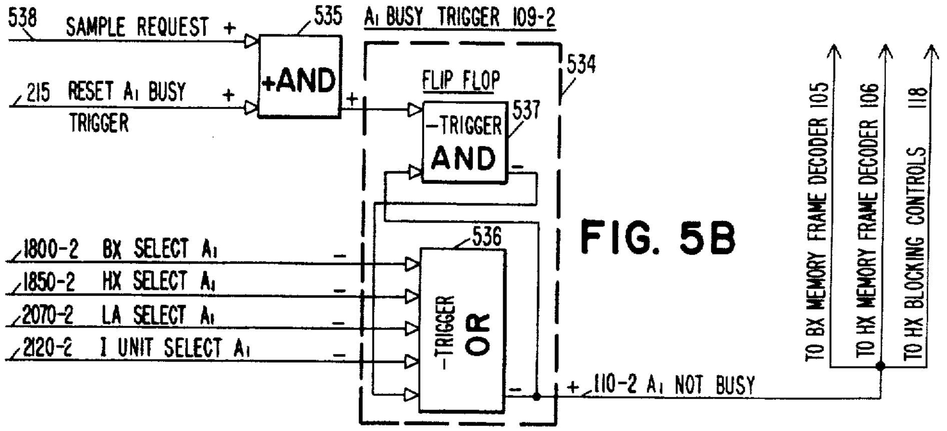

The Memory Busy Triggers 109, which are illustrated as a box in FIG. 2C, are shown in greater detail in FIGS. 5A through 5F. The Memory Busy Triggers 109 include six trigger circuits, each of which is individual to a Memory $A_0$, $A_1$, $B_0$, $B_1$, $B_2$ or $B_3$. The $A_0$ Busy Trigger 109–1 is shown in FIG. 5A, and this trigger is individual to the $A_0$ memory 81. The $A_1$ Busy Trigger 109–2 is shown in FIG. 5B, and this trigger is associated with the $A_1$ Memory 82. The $B_0$, $B_1$, $B_2$ and $B_3$ Busy Triggers 109–3 through 109–6 are shown in FIGS. 5C through 5F, respectively, and these triggers are associated with the respective $B_0$, $B_1$, $B_2$ and $B_3$ memories.

Each of the triggers illustrated in FIGS. 5A through 5F is identical except that they are associated with different ones of the memories. The $A_0$ Busy Trigger shown in FIG. 5A includes a flip-flop 527, and a positive AND circuit 528 which is connected to an input of the flip-flop 527. The flip-flop 527 includes a negative trigger OR circuit 529 and a negative trigger AND circuit 530. The OR and the AND circuits 529 and 530 are arranged to provide a flip-flop action.

Four external inputs are applied to the negative trigger OR circuit 529. These inputs are:

(1) a line 1800–1 which supplies an input signal indicating that the Basic Exchange is selecting the $A_0$ memory 81;

(2) a line 1850–1 which supplies an input signal indicating that the High Speed Exchange is selecting the $A_0$ memory;

(3) a line 2070–1 which supplies an input signal indicating that the Look Ahead Unit is selecting the $A_0$ memory; and (4) a line 2120–1 which supplies an input indicating that the Instruction Unit is selecting the $A_0$ memory.

The positive AND circuit 528 also provides an input to the flip-flop 527. This input serves to reset the flip-flop upon the coincidence of positive input signals to the AND circuit 528. These positive input signals are applied on lines 531 and 214, and they are a sample request signal and a reset $A_0$ Busy Trigger signal, respectively.

The flip-flop 527 includes a single output line 110–1 which is connected to the BX memory frame decoder 105 in FIGS. 4A and B, the HX memory frame decoder 106 in FIGS. 4C and D, and the HX blocking controls 118 in FIG. 10. The OR and the AND circuits 529 and 530 in the flip-flop 527 are interconnected by conductors 532 and 533. The conductor 532 is connected from the in-phase output of the OR circuit 529 to an input of the AND circuit 530. The conductor 533 is connected from the in-phase output of the AND circuit 530 to an input of the OR circuit 529.

The $A_0$ Busy Trigger shown in FIG. 5A stores the busy condition of the $A_0$ memory 81. This trigger is a bistable device and, therefore, it has two output conditions one of which indicates that the $A_0$ memory is busy, and the other of which indicates that the $A_0$ memory is not busy. An input signal on one of the lines 1800–1, 1850–1, 2070–1, or 2120–1 informs the trigger 109–1 that the selected memory ($A_0$) is busy by setting this trigger and this condition prevents any of the remaining input devices from making a request for the busy memory as long as this trigger is activated. The output line 110–1 of the trigger circuit supplies a positive signal to indicate that the $A_0$ memory is not busy, or a negative signal to indicate that the $A_0$ memory is busy. Positive signals applied to the AND circuit 528 through the lines 531 and 214 reset the flip-flop 527 at the proper time. After the flip-flop 527 is reset, the output signal on the output line 110–1 indicates that the $A_0$ memory is not busy.

Assuming that the Basic Exchange selects the $A_0$ memory, a negative signal is applied to the OR circuit 529 through the line 1800–1. The OR circuit 529 provides a negative output signal on the output line 110–1, and this signal indicates that the $A_0$ memory now is busy. This output signal is applied to the BX memory frame decoder 105, the HX memory frame decoder 106, and the HX blocking controls 118.

The negative output signal from the OR circuit 529 also is applied to the AND circuit 530 through the conductor 532. At this time, both the sample request signal and the reset $A_0$ busy trigger signal are not applied to the AND circuit 528. Hence, the output (in-phase) of the AND circuit 528 is negative, and this output is applied as an input to the AND circuit 530. This negative output from the positive AND circuit 528 occurs because a positive AND circuit functions as a negative OR circuit when all of its inputs are not positive. Since the AND circuit 530 now has two negative inputs, its output also is negative. The negative output from the AND circuit 530 is applied to an input of the OR circuit 529. This is a type of feedback arrangement which maintains a negative input to the OR circuit 529 to maintain a negative output from this OR circuit until the flip-flop 527 is reset.

Sample request signals occur periodically during the operation of the present system. Hence, sample request signals are applied through the line 531 to the positive AND circuit 528. However, a single positive input to this AND circuit is not sufficient to produce an output. When a reset $A_0$ busy trigger signal (positive) is received on the line 214 coincident with a sample request signal on the line 531, the AND circuit 528 provides a positive output. This positive output is applied to the AND circuit 530 in the flip-flop 527, and resets the flip-flop. The flip-flop 527 resets because the AND circuit 530 now lacks two negative coincident inputs and therefore this AND circuit provides a positive output which is applied to the OR circuit 529. Reset occurs because no negative inputs now are applied to the OR circuit 529. It should now be apparent that an external negative input to the OR circuit 529 activates the $A_0$ busy trigger 109–1 which then provides a negative busy output signal. Subsequently, coincident positive inputs to the AND circuit 528 reset the trigger which then provides a positive not busy output signal.

The $A_1$ busy trigger 109–2 is illustrated in FIG. 5B. This trigger includes a flip-flop 534 and a positive AND circuit 535 connected to an input of the flip-flop. The flip-flop 534 includes a negative trigger OR circuit 536 and a negative trigger AND circuit 537. Four external input lines 1800–2, 1850–2, 2070–2 and 2120–2 are connected to the OR circuit 536. These input lines provide BX select $A_1$, HX select $A_1$, LA select $A_1$, and I unit select $A_1$ signals, respectively. An output line 110–2 is connected from the OR circuit 536 to the BX memory frame decoder 105, the HX memory frame decoder 106 and the HX blocking controls 118. A sample request line 538 and a reset $A_1$ busy trigger line 215 are connected as inputs to the AND circuit 535.

The $A_1$ busy trigger 109–2 in 5B operates in the same manner as the trigger illustrated in FIG. 5A, except the former operates when the $A_1$ memory 82 is selected. A negative input signal to the OR circuit 536 indicates that an input device (BX, HX, LA and I) is selecting the $A_1$ memory. When one of these input devices is selecting the $A_1$ memory, the trigger 109–2 in FIG. 5B is activated and it provides a negative busy output signal on the output line 110–2. Coincidence of a sample request signal and a reset $A_1$ busy trigger signal to the AND circuit 535 reset the flip-flop 534 to provide a positive not busy output signal on the line 110–2.

Figure 5C:
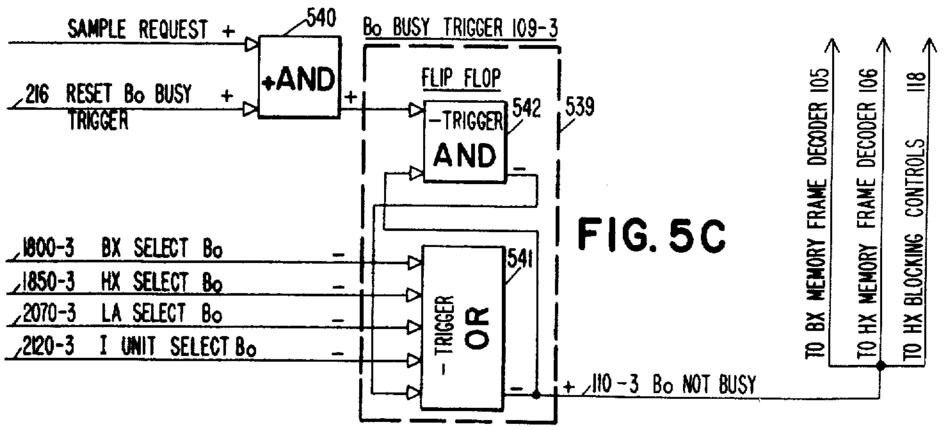

The $B_0$ busy trigger 109–3 is illustrated in FIG. 5C. This trigger circuit is associated with the $B_0$ memory 83. The circuit includes a flip-flop 539, and a positive AND circuit 540 which is connected to an input of the flip-flop 539. The flip-flop 539 comprises a negative trigger OR circuit 541 and a negative trigger AND circuit 542.

Figure 5D:
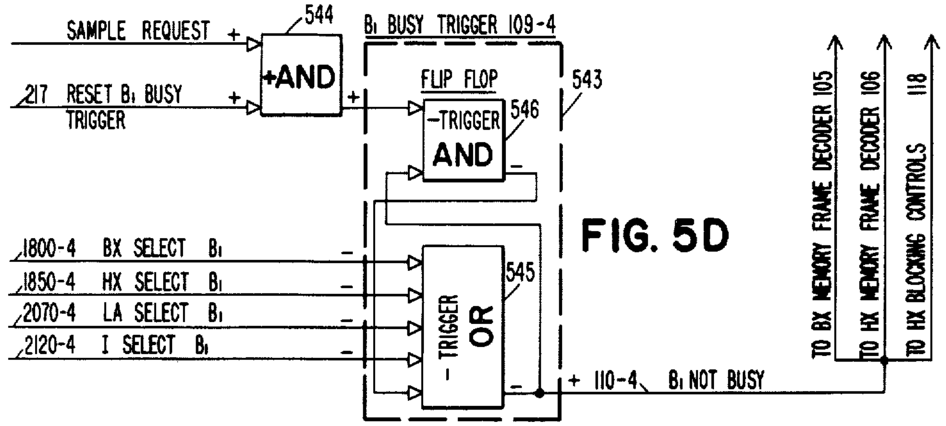
Figure 5E:
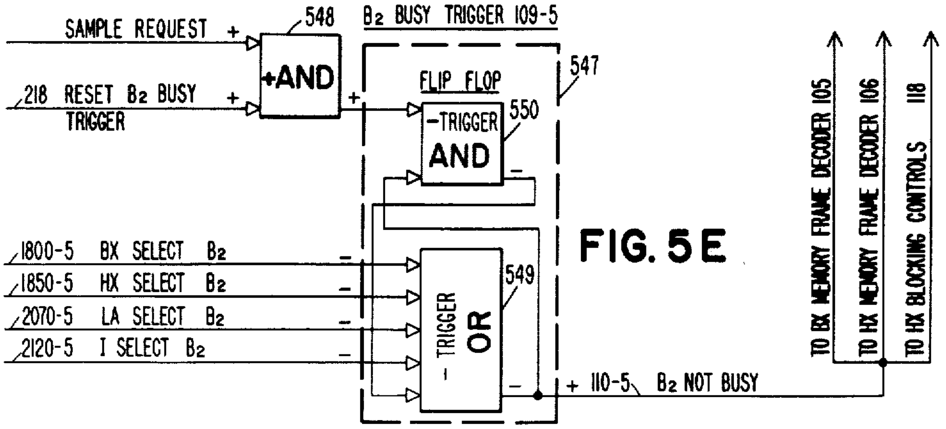
Figure 5F:
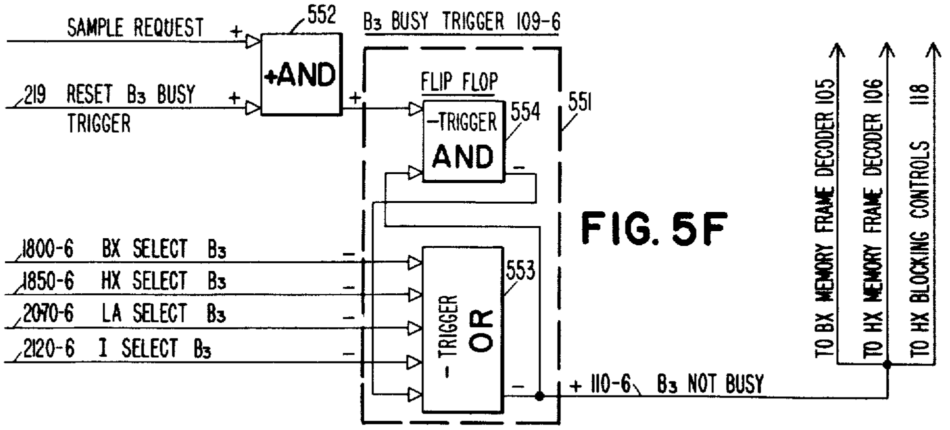

The $B_1$, $B_2$ and $B_3$ busy trigger circuits are illustrated in FIGS. 5D through 5F, respectively. The $B_1$ busy trigger circuit 109–4 includes a flip-flop 543 and a positive AND circuit 544 connected to an input of the flip-flop. The flip-flop comprises a negative trigger OR circuit 545 and a negative trigger AND circuit 546. The $B_2$ busy trigger 109–5 shown in FIG. 5E includes a flip-flop 547 and a positive AND circuit 548. The flip-flop 547 comprises a negative trigger OR circuit 549 and a negative trigger AND circuit 550. The $B_3$ busy trigger circuit 109–6 in FIG. 5F includes a flip-flop 551 and a positive AND circuit 552. The flip-flop 551 comprises a negative trigger OR circuit 553 and a negative trigger AND circuit 554.

The $B_0$, $B_1$, $B_2$ and $B_3$ busy trigger circuits shown in FIGS. 5C through 5F operate in the same manner as the $A_0$ and $A_1$ busy trigger circuits illustrated in FIGS. 5A and 5B, except that each of these trigger circuits is associated with its particular memory. Since each of these trigger circuits operates in a similar manner, it is believed that the above description of FIGS. 5A and B is sufficient for an understanding of the operation of each of the trigger circuits shown.

*Basic Exchange Invalid Address Control 111*

The Basic Exchange Invalid Address Control 111, which is shown in block form in FIG. 2C, is illustrated in detail in FIG. 6A. This control circuit functions to indicate when an invalid memory address is requested. There are a number of addresses provided which exceed the memory capacity of the present system, and these addresses are termed invalid.

Three input lines 242–2, 242–B and 242–1 are connected to the input of the control circuit shown in FIG. 6A. These input lines are connected from the Basic Exchange Memory Frame Decoder 105 shown in FIGS. 4A and B. The input lines 242–2 and 242–B are connected to the input of a positive AND circuit 555. The input line 242–1 is connected to an input of a positive OR circuit 556. The in-phase output from the positive AND circuit 555 also is connected to an input of the positive OR circuit 556. An output of the positive OR circuit 556 is connected to an input of a positive AND circuit 557. A further input line 179 to the Control 111 is connected to another input of the positive AND circuit 557. The input line 179 is connected from the Basic Exchange Request Trigger 101 shown in FIG. 3A. An output from the positive AND circuit 557 is connected to an input of a single shot 558 which operates as a delay circuit.

The single shot 558 includes a positive trigger OR circuit 559, a positive trigger AND circuit 560, and a delay circuit 561. An output line 154 from the single shot 558 is connected as an input to the Basic Exchange 75. Another output line 175 from the single shot 558 is connected as an input to the Basic Exchange Request Trigger 101 shown in FIG. 3A. The in-phase output of the positive trigger OR circuit 559 is connected to the output line 154, and to an input of the positive trigger AND circuit 560. The in-phase output of the positive trigger AND circuit 560 is connected to the output line 175, and to an input of the positive trigger OR circuit 559. A second output (out-of-phase) from the positive trigger AND circuit 560 is connected through the delay circuit 561 to a second input of this AND circuit 560.

The three input lines 242–2, 242–B and 242–1 supply signals to the AND and the OR circuits 555 and 556 indicative of a Basic Exchange Invalid Address. A signal on the input line 179 to the AND circuit 557 carries the BX request, and this signal conditions the BX invalid Address Control. This conditioning signal is positive and it is applied to one of the two inputs of the AND circuit 557. When a positive input is applied to the remaining input of the AND circuit 557 from the OR circuit 556, the single shot 558 is set, or activated. When the single shot is activated, it supplies a BX program check signal to the output line 154, and this signal is applied to the Basic Exchange 75 to indicate to the programer that an invalid address has been requested. At the same time, the single shot supplies a BX invalid address request reset signal to the output line 175, and this signal serves to reset the BX Request Trigger 101 in FIG. 3A.

Assuming that a positive BX invalid address signal is applied to both inputs of the positive AND circuit 555, or to the lower input of the positive OR circuit 556, and a positive conditioning signal is applied through the line 179 to the positive AND circuit 557, the single shot 558 is activated. Before the application of these input signals, the input to the delay circuit 561 from the AND circuit 560 is positive. This is true because both inputs to the AND circuit 560 are not positive since the output of the OR circuit 559 is negative until a positive signal is applied to one of its inputs. In other words, when the single shot 558 is in a stable state (no positive input from the AND circuit 557), both inputs to the OR circuit 559 are negative and its output is negative (the output from the AND circuit 560 on a line 562 is negative). Until both inputs to the AND circuit 560 are positive, the output to the delay circuit 561 is positive and the output on the line 562 is negative. Since the delay circuit 561 receives a positive signal, it applies this positive signal to the lower input of the AND circuit 560. Therefore, when the invalid address signals and the conditioning signal are applied to the circuit in FIG. 6A, a positive signal is applied to the OR circuit 559 which provides a positive input to the AND circuit 560. Now, both inputs to the AND circuit 560 are positive and a positive signal is applied to the output line 175 and through the line 562 to the OR circuit 559. This latter signal to the OR circuit 559 maintains the single shot 558 activated. A negative signal now is applied to the delay circuit 561 from the AND circuit 560. After a predetermined delay, the delay circuit 561 provides a negative input to the AND circuit 560 which causes the single shot 558 to revert to the deactivated state. This occurs because the AND circuit 560 now applies a negative signal to the OR circuit 559 thereby removing any positive signal to this OR circuit. It now should be apparent that upon the occurrence of particular invalid address signals and a BX request conditioning signal, the single shot 158 is activated. When the single shot 558 is activated, it provides an output signal to the Basic Exchange 75 which indicates that an error has occurred, and an output which resets the BX Request Trigger 101 in FIG. 3A.

The High Speed Exchange Invalid Address Control 112, which is shown in block form in FIG. 2C, is illustrated in detail in FIG. 6B. This control circuit is constructed and operated in the same manner as the control circuit shown in FIG. 6A.

The HX Invalid Address Control 112 in FIG. 6B includes HX invalid address bit 1 and bit 2 lines 243–2 and 243–B, respectively, which are connected to a positive AND circuit 565. The output of this AND circuit is connected to an input of a positive OR circuit 566. An HX invalid address bit 0 line 243–1 is connected to an input of the positive OR circuit 566. The output of the OR circuit 566 is connected to a positive AND circuit 567. The HX request conditioning line 204 also is connected to an input of the AND circuit 567. The output of the AND circuit 567 is connected to a single shot 568. This output is connected within the single shot 568 to a positive trigger OR circuit 569. The single shot 568 also includes a positive trigger AND circuit 570 and a delay circuit 571. The output or the OR circuit 569 is connected to an output line 162 to supply an HX unit check signal to the High Speed Exchange 76. The output of the AND circuit 570 is connected to a line 205 to provide an HX invalid address request reset signal to the HX Request Trigger 102 in FIG. 3B.

The High Speed Exchange Invalid Address Control 112 receives invalid address signals from the High Speed Exchange Memory Frame Decoder 106 in FIGS. 4C and D. When invalid address signals are applied to the control 112 along with an HX request signal on the line 204, the single shot 568 is activated to indicate to the High Speed Exchange 76 that an error has occurred, and to reset the HX Request Trigger 102. This operation is identical to that described in connection with the Control 111 in FIG. 6A and, therefore, a further detailed description of operation is not believed necessary.

*BX, HX and LA Inhibit Circuits 113–115*

The BX Inhibit Circuits 113 and the HX Inhibit Circuits 114, which are shown in block form in FIG. 2C, are illustrated in FIGS. 7A and 7B, respectively. The LA Inhibit Circuits 115, which are shown in block form in FIG. 2D, are illustrated in detail in FIG. 7C. These inhibit circuits are interconnected, and connected to other circuits in the present system, to aid in maintaining priority of operation of the input devices (BX, HX, LA and I).

The BX Inhibit Circuits 113 shown in FIG. 7A include a negative AND circuit 581. Two input lines 177 and 182 are connected to this AND circuit, and these input lines provide BX request and BX inhibit signals, respectively. The output from the AND circuit 581 is applied to the HX priority AND circuit 126 in FIG. 12B to inhibit the High Speed Exchange 76 upon the application of coincident negative input signals to the AND circuit 581. The output of this AND circuit 581 also is applied through a line 188 to the HX Inhibit Circuits 114 in FIG. 7B. Also, this output line 188 is connected to the LA Inhibit Circuits 115 in FIG. 7C.

The HX Inhibit Circuits 114 in FIG. 7B include a negative AND circuit 583 and a negative OR circuit 585. Input lines 202 and 186 are connected to the AND circuit 583 to provide HX request and HX inhibit signals. The OR circuit 585 receives an input on the line 188 from the BX Inhibit Circuits 113 in FIG. 7A. This OR circuit also receives the output of the AND circuit 583. The output of the OR circuit 585 is applied to the LA priority AND circuit 127 through a line 189. The output of the AND circuit 583 also is connected to the LA Inhibit Circuits 115 in FIG. 7C through a line 189A.

The LA Inhibit Circuits 115 shown in FIG. 7C include a negative AND circuit 593 and a negative OR circuit 595. Input lines 224 and 208 provide LA request and LA inhibit signals to the AND circuit 593. The output of the AND circuit 593 is connected to the OR circuit 595. As noted above, the outputs from the AND circuits 581 and 583 in the inhibit circuits of FIGS. 7A and 7B also are connected to the LA Inhibit Circuit in FIG. 7C, and these outputs are applied to the OR circuit 595.

If the Basic Exchange requests a memory, the Basic Exchange Memory Frame Decoder 105 in FIGS. 4A and 4B determines whether the memory is available. If the memory is available, the request is accepted and the Decoder 105 applies an inhibit signal through the conductor 182 to the AND circuit 581 in FIG. 7*A*. The BX request signal and the BX inhibit signal are both negative, and the AND circuit 581 provides a negative output on the line 188. This output is applied to the HX Priority AND circuit 126 to inhibit the High Speed Exchange 76. This output signal also is applied through the line 188 to the OR circuits 585 and 595 in the HX Inhibit Circuits 114 and the LA Inhibit Circuits 115, respectively. This operation of the BX Inhibit Circuits 113 prevents any other input-output device of lower priority (the High Speed Exchange, the Look Ahead or the Instruction Processor) from obtaining priority.

If the request is made by the High Speed Exchange instead of the Basic Exchange, and the requested memory is available, the AND circuit 583 in FIG. 7B provides a negative output to inhibit the Look Ahead Unit through the line 189 and to inhibit the Instruction Unit through the line 189A and the negative OR circuit 595. Should all four input devices request a particular memory, and this memory is available, the inhibit circuits in FIG. 7A through 7C block all but the highest priority AND circuit. Since the priority scheme is such that the Basic Exchange, the High Speed Exchange, the Look Ahead Unit, and the Instruction Processor have priority in that order, a request by the Basic Exchange results in the inhibit circuits providing access to the requested memory by only the Basic Exchange. In other words, the highest priority input device that requests a memory (if the memory is available) gains access to that memory by inhibiting the operation of the lower priority input devices.

It should be noted that the output line 190 of the LA Inhibit Circuits 115 in FIG. 7C is connected to the I Unit Accept Circuits 116 in FIG. 8 instead of to the I Unit Priority AND Circuit 128. This particular connection is made because the Instruction Unit 78 is more complex than the other input devices, and it is necessary that its accept signal from the Instruction Unit Accept Circuits 116 be received by the Instruction Unit 78 somewhat earlier than the accept signal for the other input devices.

*Instruction Unit Accept Circuits 116*

The Instruction Unit Accept Circuits 116 are shown in block form in FIG. 2D and in logic form in FIG. 8. The Instruction Unit Accept Circuits 116 function to inform the Instruction Unit of the acceptance of its request for the use of a memory, to set an effective address register control gate and to inform the Instruction Unit Priority AND 128 that the Instruction Unit has priority.

For its inputs, the three lines of cable 213 are connected at three of the inputs to a positive untied OR circuit. Line 213–1 of cable 213 indicates, when positive, that either the $A_0$ or the $A_1$ memory has been selected by the Instruction Unit. The line 213–2 of cable 213 indicates that $B_0$ memory or $B_1$ memory has been selected by the Instruction Unit. Line 213–3 of cable 213 indicates that memory $B_2$ or memory $B_3$ has been selected by the Instruction Unit. The other two inputs to the Instruction Unit Accept Circuits are the Inhibit Instruction Unit Line 190 from the Look Ahead Inhibit Circuits 115 in FIG. 7C, and the block Instruction Unit Acceptance Line 166 which comes from the Instruction Processor 78 in FIG. 2B. The Inhibit line is a priority line. The Block Instruction Unit Acceptance Line 166 is the means whereby the Instruction Processor 78 can modify its requests after they have been made and can actually cancel a request. The inhibit line and the block line are connected as inputs to negative OR circuit 602 and either input is effective when negative. The out-of-phase output 603 of negative OR circuit 602 is connected as a fourth input to the positive untied OR 601. The out-of-phase 603 is a blocking line and such blocking is indicated by the diamond instead of the conventional arrowhead. Block line 603 is considered to be a supervising signal which, when present, is more positive than any of the other inputs to the positive untied OR circuit and, as a result of discrete circuitry, dominates the other inputs.

FIG. 33 shows this discrete circuitry of the untied OR. The five NPN transistors are connected such that their emitters are connected to a current source 1306. The individual inputs 1, 2, 3 of cable 213 are connected respectively as inputs to the bases of transistors 1303, 1302 and 1301, each through a resistor. The collectors are connected to provide the out-of-phase output 167. The supervising input is applied through line 603 to the base of transistor 1304. The supervisory output is taken from the collector of transistors 1304 and as shown as lead 232. The fifth transistor 1305 is connected such that to its base is connected a reference level 1307, which could be ground, and to its collector is connected the in-phase output 168. In the absence of the supervisory signal through line 603, the transistors 1301, 1302 and 1303 function as a three-way OR circuit. The presence of the supervisory signal on the base of transistor 1304 conditions outputs in the following manner. The supervisory output 232 is the complement of the supervising signal 603, that is, a plus signal in provides a minus output. During the supervising signal, the in-phase and out-of-phase outputs are both positive.

FIG. 34 shows a logical representation of the positive untied OR circuit. The three inputs *a*, *b* and *c* and the supervisory input A denote that as an OR the inputs *a*, *b* and *c* function in the regular manner to provide the outputs $\bar{A}$ and (*a* or *b* or *c*) at the in-phase output and $\bar{A}$ and ($\bar{a}$ or $\bar{b}$ or $\bar{c}$) at the out-of-phase output.

The positive untied OR 601 is considered to be a three-level logical circuit and such circuits are discussed fully in the copending application by Martin S. Schmookler, Serial No. 22,289, filed April 14, 1960, assigned to the same assignee as the instant application, and in the copending application entitled Computer Indexing Apparatus by Paul S. Herwitz et al., cited earlier in this specification.

*High Speed Exchange Blocking Decoder 117*

The High Speed Exchange Blocking Decoder 117 shown in FIGS. 9A and B, functions to block a selected memory to anticipate a Look Ahead or Instruction Processor Request of the same storage unit. Should the Basic Exchange get priority from a simultaneous request and should the Look Ahead or the Instruction Processor make a request during the slot just before the slot of a request from the High Speed Exchange, the next available slot to the High Speed Exchange would be at a time that could require the High Speed Exchange to disconnect its input devices. To alleviate this situation, the High Speed Exchange sends through cable 97 the part of the address of its next request that determines which memory is selected as an input to the High Speed Exchange Blocking Decoder 117. The advance address bits are one full low speed memory cycle, 11 slots for example, ahead of the regular High Speed Exchange Memory Address bits sent through cable 96. To give selective control over the blocking of the select memory, the High Speed Exchange provides a block signal to the High Speed Exchange Blocking Controls 118 in FIG. 2B, as shown in detail in FIG. 10, which sets a flip-flop circuit to provide a High Speed Exchange Blocking Gate through Line 173 which is connected as an input to this decoder 117. The outputs of this decoder 117 are the six lines in cable 172 which determine the selected memory to be blocked and is sent as a select line to the High Speed Exchange Blocking Controls 118 in FIG. 2D, shown in detail in FIG. 10.

The High Speed Exchange Memory Address Advance Bit Cable 97 is connected such that bit 0A and bits 2A through 6A are connected as inputs to a positive OR circuit 611. The bit 1A in line 97–2 is connected as an input to a first converter 612. Bit 16A in line 97–17, is connected as an input to a second converter 613. Bit 17A, in line 97–18, is connected as an input to a third converter 614. There are two three-way positive AND circuits 615 and 616 for selection of the $A_0$ or $A_1$ memory, and there are eight four-way positive AND circuits 621 to 628 for decoding the B group of memories. The in-phase output 613 of the positive OR circuit 611 is connected as one of the inputs to the four positive AND circuits 625 through 628. The out-of-phase output 632 of positive OR circuit 611 is connected as an input to the A group positive AND circuits 615 and 616 and as an input to the four positive AND circuits 621 through 624. The in-phase output of converter 612 is connected as an input to the four positive AND circuits 621 through 624. The out-of-phase output 634 of the converter 612 is connected as one of the inputs to the two positive AND circuits 615 and 616 for the A group, and as an input to the four positive AND circuits 625 through 628. The in-phase output 635 converter 613 is connected as an input to the four positive AND circuits 623, 624, 627 and 628. The out-of-phase output 636 of converter 613 is connected as an input to the four positive AND circuits 621, 622, 625 and 626. The in-phase output 637 of converter 614 is connected as an input to the positive AND circuit 616 in the A group and to the four positive AND circuits 622, 626, 624, and 628. The out-of-phase output 638 of converter 614 is connected as an input to the positive AND circuit 615 in the A group and to the four positive AND circuits 621, 625, 623 and 627.

The out-of-phase output 641 of positive AND circuit 615 is connected as an input to a negative AND circuit 651. The out-of-phase output 642 of positive AND circuit 616 is connected as an input to a second minus AND circuit 652. The out-of-phase outputs 643 and 645 of positive AND circuits 621 and 625 are connected as two of the inputs to a negative exclusive OR circuit 653. The out-of-phase outputs 644 and 646 of positive AND circuits 622 and 626, respectively, are connected as inputs to a second negative exclusive OR 654. The out-of-phase outputs 645 and 647 of positive AND circuits 623 and 627 are connected respectively, as inputs to a third negative exclusive OR circuit 655. The out-of-phase outputs 646 and 648 of the positive AND circuits 624 and 628, respectively, are connected as inputs to a fourth negative exclusive OR circuit 656.

The High Speed Exchange Block Gate Line 173 is connected as the second input to each of the minus AND circuits 651 and 652 and to two of the input terminals of the special minus exclusive OR circuits 653 through 656.

The minus exclusive OR circuits 653 through 656 will provide a minus in-phase output when the signal at three of the four terminals are negative and the fourth signal is positive. Two of the required negative inputs are present when the High Speed Exchange Block Gate 173 is negative. The two positive AND circuits, for example, 621 and 625, which are associated with a particular minus exclusive OR circuit, in this example, minus exclusive OR 653, are coded in such a manner that when this particular channel is selected that the output of positive AND 621 would always be of an opposite polarity to the output of the positive AND 625. When this channel is not selected, the two outputs of the circuits 621 and 625 would be positive and the requirement of three negative input signals to the minus exclusive OR 653 would render the in-phase output ineffective as a blocking signal.

A minus exclusive OR of the type used in this decoder is disclosed as FIG. 298 and is discussed on pages 234 and 235 of the specification of a copending patent application by Paul S. Herwitz et al. entitled Computer Indexing Apparatus, cited earlier in this specification.

In the operation of the High Speed Exchange Blocking Decoder 117, it is noted that the absence of bits 0A through 6A including 1A would select the A group of memory. In such absence, bit 17A applied to converter 614, selects by its presence the positive AND 616 and, by its absence, the positive AND 615. Should either positive AND 615 or 616 have all of its inputs positive, a negative out-of-phase output through line 641 to the negative AND circuit 651 would combine with the negative High Speed Exchange Block Gate 173 to provide a negative High Speed Exchange Block signal to block memory $A_0$ 81 through line 172–1.

Should either bit 0A or any through 6A be ones, that is positive, then bits 16A and 17A would function to select individual of the B group memory block lines. When both bits 16A and 17A are zeros, memory $B_0$ 83 would be selected. When bit 16A is zero and bit 17A is one, memory $B_1$ 84 would be selected. When bits 16A is one and 17A is zero, memory $B_2$ 85 would be selected and when both bits 16A and 17A are one, memory $B_3$ 86 would be selected.

It is noted that the operation of the High Speed Exchange Blocking Decoder 117 is very similar to the Basic Exchange Memory Frame Decoder 105 in FIGS. 4A and B with the exception of the absence of the not busy inputs 110–1 through 6 and the presence of the High Speed Exchange Block Gate 173.

*High Speed Exchange Blocking Controls 118*

The High Speed Exchange Blocking Controls 118, which are shown in block form in FIG. 2D, are illustrated in detail in FIG. 10. The High Speed Exchange 76 sends an additional address ahead of a service request since this exchange must have a memory availability indication within a certain time limit as discussed heretofore. This advance address is employed to block the lower priority channels to prevent them from making memories busy.

The High Speed Exchange Blocking Controls shown in FIG. 10 include a flip-flop 661 and a positive AND circuit 663 which is connected to an input of the flip-flop 661. The flip-flop 661 includes a positive trigger OR circuit 665 and a positive trigger AND circuit 667. The OR circuit 665 and the AND circuit 667 are interconnected in the same manner as the previously discussed flip-flops to provide a bistable type operation. Input lines 159 and 669 are connected to the AND circuit 663 to provide set HX block and sample priority signals, respectively. A reset line 160 is connected to the AND circuit 667. An output line 173 is connected from the OR circuit 665 to the HX Block Decoder 117 in FIGS. 9A and 9B to provide an HX block gate signal.

The High Speed Exchange Blocking Controls in FIG. 10 also include six negative OR circuits 671, 673, 675, 677, 679 and 681. Input lines 172–1 and 110–1 are connected to the OR circuit 671 to provide HX block $A_0$ and $A_0$ not busy signals, respectively. An output line 174–1 from the OR circuit 671 is connected to the LA Memory Frame Decoder 107 and the I Unit Memory Frame Decoder 108. Input lines 172–2 and 110–2 are connected to the OR circuit 673 to provide HX block $A_1$ and $A_1$ not busy signals. The output of this OR circuit is also connected to the decoders 107 and 108 through an output line 174–2. The remaining OR circuits 675, 677, 679 and 681 have similar input lines which supply HX block and not busy signals pertaining to the $B_0$, $B_1$, $B_2$ and $B_3$ memories. Likewise, the outputs from these four OR circuits are connected to the decoders 107 and 108.

Upon the coincidence of positive input signals to the AND circuit 663, the flip-flop 661 is activated and provides a negative HX block gate signal on the line 173. The flip-flop 661 is deactivated, or reset, upon the occurrence of a reset HX block signal on the line 160. This flip-flop, when activated, applies a signal to the High Speed Exchange Blocking Decoder 117 in FIGS. 9A and B so that the advanced address may pass from this decoder into the High Speed Exchange Blocking Controls 118 in FIG. 10. When this advance address is applied to the Controls 118 in FIG. 10, one of the OR circuits 671, 673, 675, 677, 679 or 681 provides a negative output signal which is applied to the LA and I Unit Memory Frame Decoders to block the Look Ahead and Instruction Units. A reset pulse applied through the line 160 to the flip-flop 661 terminates this blocking action.

Assuming that the flip-flop 661 is activated or set and the advance address is for the $A_0$ memory, a negative signal is applied to the upper input terminal of the OR circuit 671. The OR circuit 671 provides a negative output signal which is applied through the lines 174–1 to block the LA and the I Units. These latter units also are blocked if the $A_0$ memory is busy, since in this case a negative signal exists on the input line 110–1. The remaining OR circuits 673, 675, 677, 679 and 681 may be activated one at a time in a similar manner to prevent the LA and the I Unit from obtaining a memory prior to the High Speed Exchange.

*Look Ahead Effective Address Register 121*

The Look Ahead Effective Address Register 121, shown in block form in FIG. 2B and in logic form in FIGS. 11A and B, functions to retain a memory address from the Instruction Processor 78. The inputs to this register 121 are the Cable 98 with the nineteen instruction unit memory address bits which is an output of the Instruction Processor 78, and the Gate In Effective address line 169 which is an output of the Look Ahead Effective Address Register Control 119. The gate in Effective Address is activated when the Instruction Unit Accept Circuits 116 shown in block form in FIG. 2D and in logical form in FIG. 8 provide a Instruction Unit-Look Ahead Accept Line 168 as the conditioning line for the Look Ahead Effective Address Register Controls 119. The outputs of the Look Ahead Effective Address Register 121 are the two cables 198A and 198B which contain together the 19 bits of the Look Ahead Effective Address. All nineteen bits are sent to the Memory Address Gates 161 in FIG. 2G, and Look Ahead Address bits 0 through 6, 16 and 17 are sent through cable 198B to the Look Ahead Frame Decoder 107 shown in FIG. 2D in block form and in FIGS. 4E and F in logical form.

The 19 register cards such as the register card 686 for Look Ahead Address bit 0, are identical in structure and function and it is considered that a discussion of the register card 686 will serve as a complete discussion of all of the register cards. The gate line input 169 is a third level input as discussed in connection with the Instruction Unit Accept Circuit in FIG. 8. This gate line and the line 1 of cable 98 which carries the Instruction Unit Memory address bit 0 are connected as inputs to a positive third level AND circuit 687. When the third level gate line 169 is negative, the positive AND 687 is supervised and a positive output is provided through output 688 to supervise a positive split level OR circuit 691. The in-phase output 692 of positive OR 691 is connected as an input to a converter 693. The in-phase output 694 from converter 693 is positive and is fed back as a second input to the positive OR 691. This leaves positive OR 691 conditioned so as to maintain current flow through the positive OR 691, output 692, converter 693 and line 694. When the third level gate line 169 is positive, the positive AND circuit 687 then functions as a normal positive AND circuit or a negative OR circuit. The out-of-phase output 689 of positive AND 687 is connected along with line 694 as an input to the positive OR 691.

With the third level gate line 169 positive, it is first assumed that the bit 0 line 98–1 is positive. Positive AND circuit 687 is then conditioned such that an out-of-phase output through connector 689 is negative and the in-phase output 688 is also negative since it is always the complement of the in gate 169. The positive OR circuit 691 then functions as a negative AND circuit to provide a negative in-phase output through connector 692 which provides a negative output through connector 694 to provide a negative input which, with negative input 688 maintains the current flow discussed when the gate 169 is negative.

Assume now, that the third level gate line 169 is still positive but the instruction unit memory address bit 0 on line 98–1 is not present, and the line is negative. The positive AND 687 then functions to provide a minus output through output 688 since this must be the complement of the positive third level gate line 169, and since the polarity of the two inputs are of opposite polarity the positive AND 687 functions as a negative OR to provide a positive out-of-phase output through connector 689. With one of its inputs now positive, and with input 688 not supervising, the positive OR circuit 691 functions as a normal positive OR circuit and provides a positive output through the in-phase output 692. The converter 693 now provides a positive in-phase output through connector 694 and a negative out-of-phase output on line 198B–1. The negative output through lines 198B–1 are maintained until the bit line 98–1 becomes positive or the third level gate 169 becomes negative.

It is seen that the gate line 169 functions, when negative, to clear the register and when the gate line 169 becomes positive, the presence or absence of bit 0 conditions the register so that the output of the register is of the same polarity as the polarity of the instruction unit memory address bit applied thereto.

The third level AND circuit and the split level OR circuit are discussed fully in the co-pending applications to Schnookler and Herwitz et al. cited heretofore.

The additional circuitry, which includes: connector 702 connected from connector 692 as an input to the third level AND circuit 703, a second input connector 704 for third level AND 703, with the out-of-phase output 705 are discussed hereinafter as a part of the discussion of the Return Address Register 231 shown in FIG. 23. This additional circuitry is not used in the Look Ahead Effective Address Register 121.

*BX, HX, LA and I Unit Priority And Circuits 125–128*

The Basic Exchange, the High Speed Exchange, the Look Ahead and the Instruction Unit Priority AND circuits 125 through 128, which are shown in block form in FIGS. 2E and 2F, are illustrated in detail in FIGS. 12A through 12D, respectively. Each of these circuits includes an AND circuit which, upon the coincidence of a plurality of positive inputs, provides an output gate signal for memory selection.

The BX priority AND shown in FIG. 12A includes a positive AND circuit 706. Three input lines 178, 183 and 707, and two output lines 240 and 243 are provided for the AND circuit 706. The input line 178 is connected from the Basic Exchange Request Trigger 101 in FIG. 3A. This line carries a BX request signal. The input line 183 is connected from the BX Memory Frame Decoder 105 in FIGS. 4A and B, and this line carries a BX Priority signal. The input line 707 is connected from the central computer and this line carries sample priority signals. The output line 240 is connected to the BX Memory Select Circuits 131 in FIG. 13A, and the output line 243 is connected to the BX IN-Gate Controls 141 in FIG. 14A. These output lines provide gate signals. Upon the coincidence of positive input signals to the AND circuit 706, a negative output gate signal appears on the line 240 and a positive output gate signal appears on the line 243.

BX Exchange Priority AND shown in FIG. 12B includes a positive AND circuit 708. An input line 188 is connected from the BX Inhibit circuits 113 in FIG. 7A to the AND circuit 708. An input line 203 is connected from the HX Request Trigger 102 in FIG. 3B to the AND circuit 708. An input line 187 is connected from the HX Memory Frame Decoder 106 in FIGS. 4C and D to the AND circuit 708. A sample priority line 709 also is connected to the AND circuit. Output lines 244 and 245 from the AND circuit 708 are connected to the HX Memory Select Circuits 132 and the HX IN-Gate Controls 142, respectively.

The operation of the HX AND 126 is similar to the operation of the BX AND shown in FIG. 12A. However, the HX AND includes an additional input which is the HX Inhibit line 188. This line normally supplies a positive signal which represents the absence of an HX inhibit demand. When the BX Inhibit Circuits 113 in FIG. 7A provide an inhibit output signal on the line 188, this signal is negative. When this signal is negative, the AND circuit 708 does not provide HX gate output signals. Upon the coincidence of positive inputs on the lines 188, 203, 187 and 709, the AND circuit 708 provides a negative output on the line 244 and a positive output on the line 245. These output signals are HX gate signals which aid in memory selection.

The Look Ahead Priority AND in FIG. 12C includes a positive AND circuit 710. The AND circuit 710 includes input lines 189, 225, 209 and 711 which provide LA inhibit, LA request, LA priority and sample priority signals, respectively. The line 189 is connected from the HX Exchange Inhibit Circuits 114 in FIG. 7B. The line 225 is connected from the LA Request Trigger 103 in FIG. 3C. The line 209 is connected from the LA Memory Frame Decoder 107 in FIGS. 4E and F. The AND circuit 710 includes two output lines 246 and 247 which are connected to the LA Memory Select Circuits 133 in FIG. 13C and to the LA In-Gate Controls 143 in FIG. 14C, respectively. The AND circuit 710 operates in the same manner as the AND circuit 708 shown in FIG. 12B.

The Instruction Unit Priority AND shown in FIG. 12D includes a positive AND circuit 712. Three input lines 227, 232 and 713 are connected to the AND circuit 712, and these input lines provide I Unit request, I Unit priority and sample priority signals, respectively. The input line 227 is connected from the I Unit Request Trigger 104 in FIG. 3D. The input line 232 is connected from the I Unit Accept Circuits 116 in FIG. 8. The AND circuit 712 includes two output lines 248 and 249 which are connected respectively to the I Unit Memory Select Circuits 134 in FIG. 13D and the I Unit In-Gate Controls 144 in FIG. 14D. This AND circuit operates in the same manner as the AND circuit 706 shown in FIG. 12A.

*BX, HX, LA and I Unit Memory Select Circuits 131–134*

The Basic Exchange, the High Speed Exchange, the Look Ahead and the Instruction Unit Memory Select Circuits 131 through 134, which are shown in block form in FIGS. 2E and 2F, are illustrated in detail in FIGS. 13A through 13D, respectively. These circuits serve to condition the Memory Select Gates 151 and the Memory Busy Triggers 109 when one of the input devices (BX, HX, LA or I Unit) selects one of the memories ($A_0$, $A_1$, $B_0$, $B_1$, $B_2$ or $B_3$).

The Basic Exchange Memory Select Circuits 131 in FIG. 13A include six negative AND circuits 716 through 721. Each of these AND circuits has two inputs. One of these inputs is through a line 240 which is connected from the BX Priority AND 125 in FIG. 12A. Input lines 180–1 through 180–6 are connected individually to the AND circuits 716 through 721, respectively. These input lines carry the memory addresses ($A_0$, $A_1$, $B_0$, $B_1$, $B_2$, or $B_3$) selected by the Basic Exchange 75. These input lines are connected from the BX Memory Frame Decoder 105 in FIGS. 4A and B. The outputs from the AND circuits 716 through 721 are connected through lines 1800–1 through 1800–6 to the BX Memory Select Gates 151 in FIGS. 15A through F and to the Memory Busy Triggers 109 in FIGS. 5A through F.

The AND circuit 716 supplies a BX select $A_0$ signal, the AND circuit 717 supplies a BX select $A_1$ signal, the AND circuit 718 supplies a BX select $B_0$ signal, etc. Assuming that the Basic Exchange desires the $A_0$ memory, the line 180–1 supplies a negative signal to the AND circuit 716. Upon the occurrence of a gate BX signal (negative) on the line 240, the AND circuit 716 gates the BX select $A_0$ memory signal to the output lines 1800–1. This signal is applied through the line 1800–1 to the BX Memory Select Gates 151 and indicates that the Basic Exchange selects the $A_0$ memory. Also, this output signal is applied through the line 1800–1 to the Memory Busy Triggers 109 and indicates that the $A_0$ memory is busy. The AND circuit 717 operates in a similar manner if the Basic Exchange selects the $A_1$ memory. Likewise, the AND circuits 718 through 721 operate to gate the BX signals for the $B_0$, $B_1$, $B_2$ and $B_3$ memories.

The High Speed Exchange Memory Select Circuits 132 in FIG. 13B include negative AND circuits 722 through 727. These select circuits are constructed and operated like the select circuit shown in FIG. 13A, except the memory select signals are supplied from the HX Memory Frame Decoder 106 in FIGS. 4C and D, and the gate HX signal is supplied from the HX Priority AND 126 in FIG. 12B. Hence, these select circuits operate to select the memory desired by the High Speed Exchange 76.

The Look Ahead Memory Select Circuits 133 shown in FIG. 13C include negative AND circuits 728 through 733. These select circuits are constructed and operated like the select circuits shown in FIGS. 13A and B except the memory select signals are supplied from the LA Memory Frame Decoder 107 in FIGS. 4E and F and the gate LA signal is supplied from the LA Priority AND 127 in FIG. 12C. The select circuits in FIG. 13C operate to select the memory desired by the Look Ahead Unit 77.

The Instruction Unit Memory Select circuits 134 illustrated in FIG. 13D include negative AND circuits 734 through 739. These AND circuits are constructed and operated like those discussed above, except the memory select signals are supplied by the I Unit Memory Frame Decoder 108 in FIGS. 4G and H and the Gate I unit signal is supplied from the I Unit Priority AND 128 in FIG. 12D. These AND circuits operate to select the memory desired by the Instruction Unit 78.

*BX, HX, LA and I Unit In-Gate Controls 141–144*

The Basic Exchange, the High Speed Exchange, the Look Ahead and the Instruction Unit In-Gate Controls 141 through 144, which are illustrated in block form in FIGS. 2E and 2F, are shown in detail in FIGS. 14A through 14D respectively. These controls provide the necessary signals to gate in or gate out data between the input devices and the memories.

The Basic Exchange In-Gate Control shown in FIG. 14A includes two single shots 741 and 742, and their associated input and output circuits. These single shots are constructed and operated in the same manner as those shown in the invalid address control circuits in FIGS. 6A and 6B. An input line 243 is connected from the Basic Exchange Priority AND 125 in FIG. 12A to the single shot 741. This input line 243 provides a gate BX input signal to set, or activate, the single shot 741. One output from the single shot 741 is connected to the Memory Address Gates 161 in FIGS. 16A through C through an output line 252. This output line 252 provides a BX address in-gate signal when the single shot 741 is set. Another output from the single shot 741 is connected through a converter 743 to lines 253 and 184. The line 253 is connected to the Return Address Gates 191 in FIG. 19 to provide a BX return address gate signal. The line 184 is connected to the BX Request Trigger 101 in FIG. 3A to supply a BX request reset signal to that trigger.

A third output from the single shot 741 is connected through a line 744 to a positive AND circuit 745. A line 152 is connected from the Basic Exchange 75 through a converter 746 to the positive AND circuit 745. The output of the converter 746 also is connected through a line 255 to the Return Address Gates 191 in FIG. 19. The upper, or out-of-phase, output of the AND circuit 745 is connected through a line 254 to the Memory Read Out Control 171 in FIGS. 17A and B, and this line provides a BX store signal. The line 255 provides a BX fetch signal which is a conditioning input to the return address gates 191.

The lower, or in-phase, output from the AND circuit 745 is connected through a delay circuit 747 to one input of a positive AND circuit 748. A sample priority input is applied to the remaining input of the AND circuit 748. The output (in-phase) of the AND circuit 748 is connected to the input of the single shot 742. The output of the single shot 742 is connected to the Memory Data Gates 181 in FIGS. 18A and B through a line 256. The line 256 carries a BX in-gate signal which controls the gating of data into the desired memory.

When the Basic Exchange 75 makes a request and establishes priority, the BX Priority AND 125 in FIG. 12A provides a positive gate BX signal input to the single shot 741. This input signal sets the single shot which provides a BX address in-gate signal to the Memory Address Gates 161. The single shot 741 also supplies BX return address gate and BX request reset signals through the converter 743. The single shot 741 supplies a positive signal through the line 744 to the AND circuit 745. The Basic Exchange provides a positive (store) input to the converter 746 which supplies a positive input to the AND circuit 745. Since both inputs to the AND circuit 745 now are positive, this AND circuit provides a BX store signal through the line 254 to the Memory Read Out Control 171. The AND circuit 745 also provides a positive signal through the delay circuit 747 to the positive AND circuit 748. A positive sample priority signal also is applied to the AND circuit 748. Hence, the AND circuit 748 supplies a positive input signal to the single shot 742 which, in turn, sends a BX in-gate signal through the line 256 to the Memory Data Gates 181 to gate data into a memory.

If the Basic Exchange supplies a fetch signal (negative) to the line 152, the converter 746 provides a negative output. This negative output is applied through the line 255 to the Return Address Gates 191 to condition these gates. In this case, the AND circuit 745 does not provide a negative BX store signal through the line 254 to the Memory Read Out Control 171. In either the store or the fetch mode, after a predetermined delay (determined by the delay circuits within the single shots 741 and 742), the single shots revert to their initial quiescent state.

The High Speed Exchange In-Gate Control 142 shown in FIG. 14B is identical to the control illustrated in FIG. 14A with one exception. The control in FIG. 14B includes an additional output which indicates to the High Speed Exchange 76 that its command is accepted. An input line 245 is connected to a single shot 741*a* from the HX Priority AND 126 in FIG. 12B. A first output of the single shot 741*a* is connected through a line 262 to the Memory Address Gates 161 in FIGS. 16A through C. A second output from the single shot 741*a* is connected through a converter 743*a* to output lines 263 and 206. The output line 263 is connected to the Return Address Gates 191 in FIG. 19. The output line 206 is connected to the HX Request Trigger 102 in FIG. 3B. A third output from the single shot 741*a* is connected to the input of a positive AND circuit 745*a*. A fourth output, not employed in the BX In-Gate Control in FIG. 14A, from the single shot 741*a* is connected through a converter 749 to the High Speed Exchange 76 through a line 156. This output indicates to the High Speed Exchange that its command is accepted.

A line 157 is connected from the High Speed Exchange 176 through a converter 746*a* to the AND circuit 745*a*. The output of the converter 746*a* also is connected through a line 265 to the Return Address Gates 191 in FIG. 19. The upper output of the AND circuit 745*a* is connected through a line 264 to the Memory Read Out Control 171 in FIGS. 17A and B. The lower output from the AND circuit 745*a* is applied through a delay circuit 747*a* to a positive AND circuit 748*a*. A sample priority line also is connected to the AND circuit 748*a*. The output from the AND circuit 748*a* is connected to the input of a single shot 742*a*. The output from the single shot 742*a* is connected through a line 266 to the Memory Data Gates 181 in FIGS. 18A and B.

The operation of the HX in-gate control shown in FIG. 14B is similar to that of the control in FIG. 14A except that the gate, store and fetch signals are initiated by the High Speed Exchange instead of the Basic Exchange. Also, the control in FIG. 14B provides a signal to the High Speed Exchange to indicate that its command has been accepted.

The construction and operation of the Look Ahead In-Gate Control in FIG. 14C is somewhat similar to the control in FIG. 14B. However, the Look Ahead In-Gate Control does not need an input store signal, and it does not provide a return address gate signal such as is provided by the line 263 in the HX In-Gate Control in FIG. 14B. A line 247 is connected from the LA Priority AND 127 in FIG. 12C to a single shot 741*b*. A first output of the single shot 741*b* is connected through a conductor 272 to the Memory Address Gates 161 in FIGS. 16A through C. A second output from the single shot 741*b* is connected through a line 222 to the LA Request Trigger 103 in FIG. 3C. No output return address gate signal is supplied from the single shot 741*b* to the Return Address Gates 191 in FIG. 19 since the Look Ahead In-Gate Control does not operate in the fetch mode.

A third output from the single shot 741*b* is applied through a converter 751 to an output line 164. The output line 164 is connected to the Look Ahead Unit 77, and this line supplies a signal that the Look Ahead store is accepted. A fourth output from the single shot 741*b* is applied to a converter 755. The upper output of the converter 755 is connected through a conductor 274 to the Memory Read Out Control 171 in FIGS. 17A and B. This line supplies a LA store signal. The lower output from the converter 755 is connected through a delay circuit 760 to a positive AND circuit 748*b*. A sample priority line also is connected to the positive AND circuit 748*b*. The output of the AND circuit 748*b* is connected to a single shot 742*b*. The output of the single shot 742*b* is connected through a line 276 to the Memory Data Gates 181 in FIGS. 18A and B. This line provides an LA in-gate signal to gate data into a desired memory.

When a gate LA signal is applied to the single shot 741*b* through the line 247, the single shot provides an LA address in-gate signal on the line 272, an LA request reset signal on the line 222, and a LA store accepted signal through the converter 751 on the line 164. Also, the single shot 741*b* supplies an LA store signal through the converter 755 to the line 274. The converter 755 provides a positive signal (in-phase) to the delay circuit 760 which supplies the signal to the AND circuit 748*b*. A sample priority signal is applied to the AND circuit 748*b*, and this AND circuit sets the single shot 742*b*. The single shot 742*b* supplies an LA in-gate signal to the line 276. After a predetermined delay (which is determined by the delay in the single shots 741*b* and 742*b*) the single shots each revert to their initial quiescent state.

The Instruction Unit In-Gate Control shown in FIG. 14D includes a single shot 762 and a converter 766. An output of the single shot 762 is connected through a line 764 to the converter 766. A line 249 is connected from the I Unit Priority AND 128 in FIG. 12D to the input of the single shot 762. A second output of the single shot 762 is connected through a line 282 to the Memory Address Gates 161 in FIGS. 16A through C. The outputs of the converter 766 are connected through lines 283 and 226 to the return Address Gates 191 in FIG. 19 and to the I Unit Request Trigger 104 in FIG. 3D, respectively.

The single shot 762 is activated by an input gate I Unit signal on the line 249. When the single shot 762 is activated, or set, it provides a I Unit address in-gate signal on the line 282, and a positive signal on the line 764 to the converter 766. The converter 766 supplies an I unit Return Address Gate Signal on the line 283 and an I Unit Request Reset Signal on the line 226.

*Memory Select Gates 151*

The Memory Select Gates 151, which are shown in block form in FIG. 2G are illustrated in detail in FIGS. 15A through 15F. These gates select the particular memory requested by an input device.

The $A_0$ Memory Select Gate 151 shown in FIG. 15A includes a single shot 771 and a negative AND circuit 775. The single shot 771 includes a negative trigger OR circuit 772, a negative trigger AND circuit 773 and a delay circuit 774. This single shot is constructed and operated in the same manner as the single shots in FIGS. 6A and B described previously, except that the polarities of the input and output signals are reversed. Four input lines 1800–1, 1850–1, 2070–1, 2120–1 are connected to the single shot 771 from the BX, the HX, the LA and the I Unit Memory Select Circuits, respectively. These input lines provide BX select $A_0$ memory, HX select $A_0$ memory, LA select $A_0$ memory, and I Unit select $A_0$ signals, respectively. A first output line 307 from the single shot 771 is connected to the Return Address Read-in Controls 251 in FIG. 25. This output line provides a signal that indicates that the $A_0$ memory has been selected when the single shot 771 is activated. A second output from the single shot 771 is connected to the negative AND circuit 775. A sample memory input line 776 also is connected to the AND circuit 775. The out-of-phase output of the AND circuit 775 is connected through a line 301 to the $A_0$ memory 81. This line supplies a select $A_0$ memory signal when the single shot 771 is activated, or set.

When one of the input devices selects the $A_0$ memory 81, the single shot 771 is set, or activated, to provide an output signal on the line 301 to select the $A_0$ memory, and an output signal on the line 307 to indicate that the $A_0$ memory has been selected. Assuming that the Basic Exchange 75 selects the $A_0$ memory, a signal is applied to the single shot 771 through the line 1800–1. This signal activates, or sets, the single shot 771. The single shot 771 applies an output signal through the line 307 to indicate that the $A_0$ memory has been selected, and an output negative signal to the AND circuit 775. The sample memory line 776 also supplies a negative signal to the AND circuit 775. The AND circuit 775 supplies an output signal to select the $A_0$ memory. After a delay which is determined by the delay circuit 774, the single shot 771 is deactivated and returns to its quiescent state.

Figure 15B:
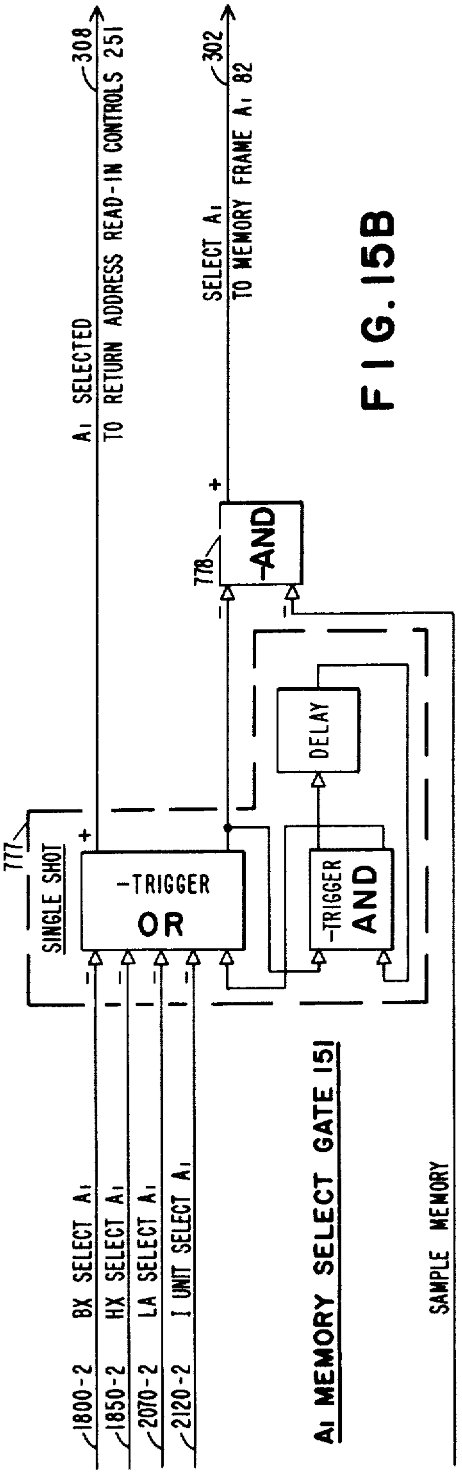
Figure 15C:
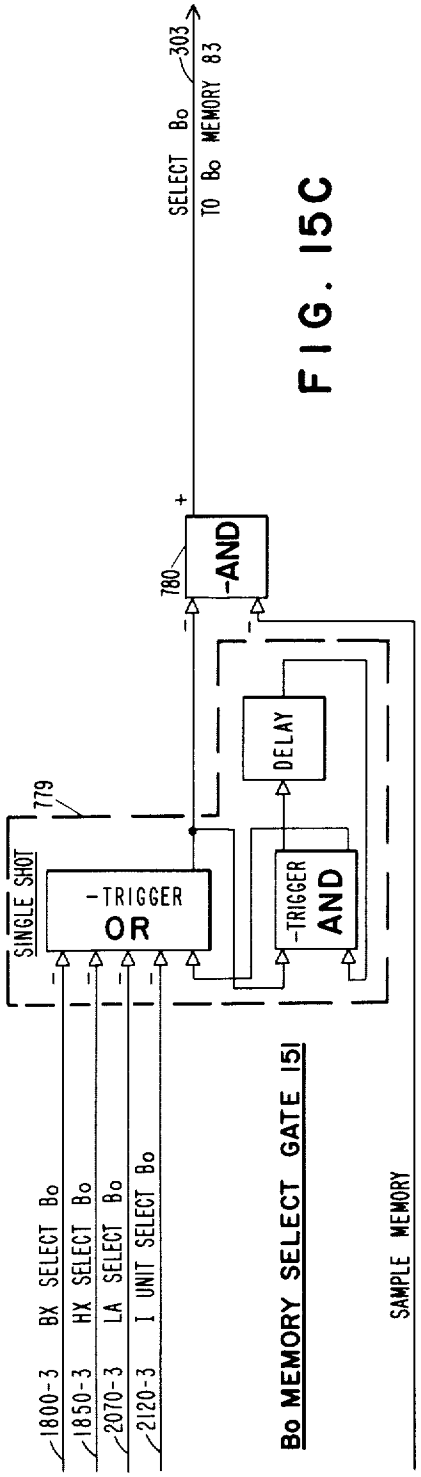
Figure 15D:
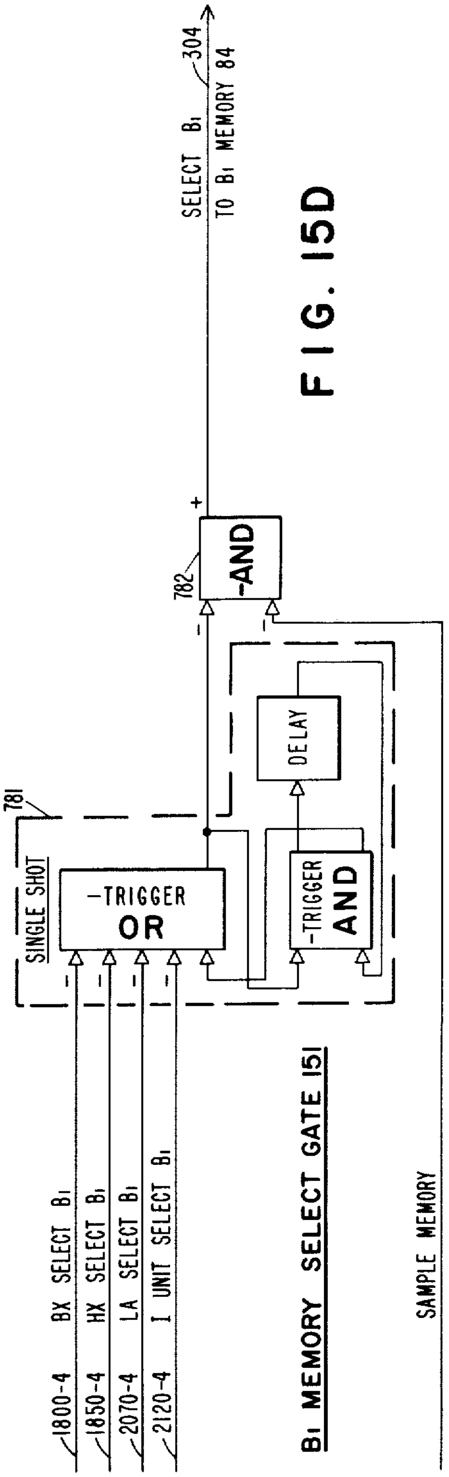
Figure 15E:
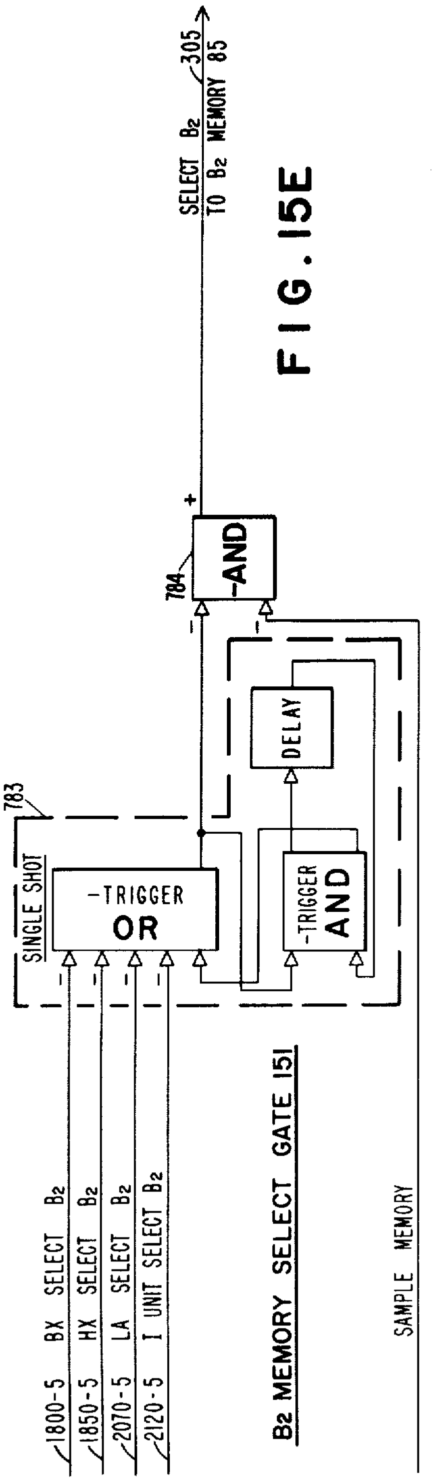
Figure 15F:
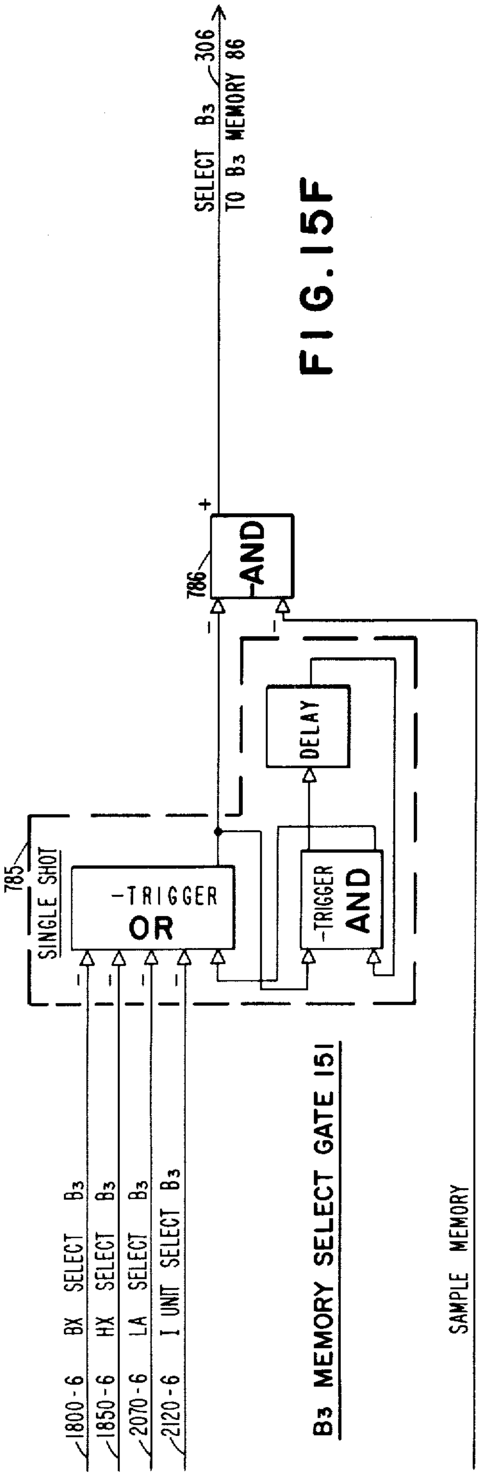

The $A_1$ Memory Select Gate shown in FIG. 15B is constructed and operated in the same manner as the gate shown in FIG. 15A. However, the gate in FIG. 15B gates a select signal to the $A_1$ memory instead of the $A_0$ memory. This $A_1$ Memory Select Gate includes a single shot 777 and a negative AND circuit 778. Input lines 1800–2, 1850–2, 2070–2 and 2120–2 are connected from the BX, the HX, the LA, and the I Unit Memory Select Circuits, respectively, to the single shot 777. The single shot 777 provides an output through a line 308 to the Return Address Read-In Controls 251 in FIG. 25. This output line carries a signal which indicates that the $A_1$ memory has been selected. The single shot 777 also is connected to the negative AND circuit 778. Also, a sample memory line is connected to the AND circuit 778. The output of the AND circuit 778 is connected through a line 302 to the $A_1$ memory 82. This line 302 provides a signal to select the $A_1$ memory. This $A_1$ Memory Select Gate operates in the same manner as the gate shown in FIG. 15A.

The $B_0$, the $B_1$, the $B_2$ and the $B_3$ Memory Select Gates shown in FIGS. 15C through 15F, respectively, are constructed and operated in the same manner as the gates shown in FIGS. 15A and 15B, except no output signal indicative that these memories have been selected is applied to the Return Address Read-In Controls 251 as in the former gates (FIGS. 15C through 15F). The $B_0$ Memory Select Gate shown in FIG. 15C includes a single shot 779 and a negative AND circuit 780. The $B_1$ Memory Select Gate shown in FIG. 15D includes a single shot 781 and a negative AND circuit 782. The $B_2$ Memory Select Gate shown in FIG. 15E includes a single shot 783 and a negative AND circuit 784, and the $B_3$ Memory Select Gate shown in FIG. 15F includes a single shot 785 and a negative AND circuit 786. These four gates provide select signals to the $B_0$, $B_1$, $B_2$ and $B_3$ memories, respectively.

*Memory Address Gates 161*

The Memory Address Gates 161, which are shown in block form in FIG. 2G, are illustrated in detail in FIGS. 16A through 16C. These gates operate to gate into the six memories memory addresses from the input devices. FIG. 16A illustrates the Memory Address Gate for bit 0, FIG. 16B illustrates the Memory Address Gate for bit 17 and FIG. 16C illustrates the the Memory Address Gate for a parity bit 18 (if desired). These three gates are identical in construction and operation. The gates for bits 1 through 16 also are identical in construction and operation, and these gates are not shown for this reason. It is believed that a description of the gates in FIGS. 16A through 16C will provide a complete understanding of the construction and operation of all gates.

The Memory Address Gate for bit 0 in FIG. 16A includes four negative AND circuits 791 through 794 the in-phase outputs of which are connected to a negative OR circuit 795. Input lines 95B1 and 252 are connected to the AND circuit 791 from the Basic Exchange 75 and the Basic Exchange In-Gate Control 141, respectively. Input lines 96B1 and 262 are connected to the AND circuit 792 from the High Speed Exchange 76 and the High Speed Exchange In-Gate Control 142, respectively. Input lines 198B1 and 272 are connected to the AND circuit 793 from the Look Ahead Effective Address Register 121 and the Look Ahead In-Gate Control 143, respectively. Input lines 98B1 and 282 are connected to the AND circuit 794 from the Instruction Processor 78 and the Instruction Unit In-Gate Control 144, respectively. The lines 95B1, 96B1and 98B1 are connected through converters, not shown. These converters serve to invert signals applied to their inputs. The output from the OR circuit 795 is connected to converters 796 and 797. The output (out-of-phase) from the converter 796 is connected through a conductor 290 to the High Speed Memories 81 and 82. The output from the converter 797 is connected through a line 295 to the low speed memories 83 through 86.

When a memory address bit 0 is applied to one of the AND circuits 791 through 794 from one of the input devices (BX, HX, LA, or I Unit) and an address in-gate signal is applied to one of these AND circuits from the input device, the OR circuit 795 provides an output signal which is powered and inverted by the converters 796 and 797. The output signals from the converters 796 and 797 are the high speed memory and the low speed memory address bits 0. In other words, the Memory Address Gate for the bit 0 gates the memory address for bit 0 from the input device to the six memories. This same operation takes place for any other bits 1 through 18 which indicate the particular memory address. For example, a particular memory address may be indicated by negative bits 0, 6 and 8. In this case, these bits are gated through the gates for the bits 0, 6 and 8 upon the application of address in-gate signals. In the gate for the bit 0 in FIG. 16A the AND circuit 791 provides an output to the OR circuit 795, which sends this address for bit 0 to the high and the low speed memories through the converters 796 and 797.

The Memory Address Gate for bit 17 in FIG. 16B includes four negative AND circuits 798 through 801 which are connected to a negative OR circuit 802. The output of the OR circuit 802 is connected through converters 803 and 804 to output lines 290 and 295. Memory address lines 95B18, 96B18, 198B18 and 98B18 are connected to one of a respective one of the AND circuits 798 through 801. Lines 95B18, 96B18, 96B18 are connected through converters, not shown. Address in-gate lines 252, 262, 272 and 282 also are connected to their respective AND circuits 798 through 801. This gate is constructed and operated in the same manner as the gate shown in FIG. 16A.

The Memory Address Gate for parity bit 18 in FIG. 16C includes four negative AND circuits 805 through 808 which are connected to a negative OR circuit 809. The output of the OR circuit 809 is connected through converters 810 and 811 to output lines 290 and 295. Memory address bit P lines 95A19, 96A19, 198A19 and 98A19 are connected to the AND circuits 805 through 808, respectively. Lines 95A19, 96A19 and 98A19 are connected through converters, not shown. Address in-gate lines 252, 262, 272 and 282 also are connected to respective AND circuits 805 through 808. This gate is constructed and operated in the same manner as the gates shown in FIGS. 16A and B, except that the address gated is for a parity bit.

*Memory Read Out Control*

The Memory Read Out Control 171, which is shown in block form in FIG. 2G, is illustrated in detail in FIGS. 17A and 17B. This control applies signals to the six memories and the Return Address Read-In Controls 251 to indicate whether a store or a fetch operation is desired. These controls includes a negative OR circuit 821 which is connected to a pair of converters 823 and 825 through a conductor 827. An input line 254 is connected from the BX In-Gate Control 141 in FIG. 14A to the OR circuit 821. An input line 264 is connected from the HX In-Gate Control 142 in FIG. 14B to this OR circuit. An input line 274 is connected from the LA In-Gate Control 143 in FIG. 14C to the OR circuit 821. An output line 309 is connected from the OR circuit 821 to the Return Address Read-In Controls 251 in FIG. 25. The output from the converter 823 is connected through a line 311 to the $A_0$ and $A_1$ memories. The output of the converter 825 is connected through a line 312 to the $B_0$, $B_1$, $B_2$ and $B_3$ memories.

When one of the input devices BX, HX or LA indicates a store operation, the OR circuit 821 provides a store output signal (negative) through the converters 823 and 825 on the lines 311 and 312, respectively. The OR circuit 821 also provides a signal (negative) on the line 309 to indicate that a fetch operation is not requested. If no store signals are applied to the OR circuit 821, it provides fetch signals through the converters 823 and 825 to the lines 311 and 312. Also, the OR circuit 821 provides a fetch signal (positive) on the line 309.

*Memory Data Gates*

The Memory Data Gates 181, which are shown in block form in FIG. 2H, are illustrated in detail in FIGS. 18A and 18B. These gates operate during a store operation to gate data from an input device to the A and B memory data buses 320 and 321, respectively. The gates for bits 0 and 71 are illustrated in detail. The gates for bits 1 through 70 are identical to the gates shown and, therefore, a showing of these gates has been omitted for simplicity of illustration.

The Memory Data Gate for bit 0 includes three negative AND circuits 831, 833 and 835 which are connected to a negative OR circuit 837. An input line 91–1 is connected to the AND circuit 831 from the Basic Exchange 75. An input line 256 is connected to the AND circuit 831 from the BX In-Gate Control 141 in FIG. 14A. The line 91–1 supplies the data bit 0 from the Basic Exchange. The line 256 provides an in-gate signal to gate the bit 0 to the A and B memory data buses 320 and 321. Input lines 92–1 and 93–1 are connected to the AND circuits 833 and 835 from the High Speed Exchange 76 and the Look Ahead Unit 77, respectively. In put lines 266 and 276 are connected from the HX In-Gate Control 142 in FIG. 14B and from the LA In-Gate Control 143 in FIG. 14C to the respective AND circuits 833 and 835.

The OR circuit 837 is connected through converters 839 and 840 to respective output lines 320–1 and 321–1. The lines 320–1 and 321–1 carry the gated data bit 0 through the data buses 320 and 321 to the respective A and B memories.

Assuming that the data bit 0 is to be gated from the Basic Exchange to the data busses, the input line 91–1 supplies a negative signal to the negative AND circuit 831. The input line 256 supplies a negative signal to the AND circuit 831. The AND circuit 831 applies a negative signal to the OR circuit 837 which in turn supplies a positive signal to the converters 839 and 840. The converters 839 and 840 invert the positive data signal and supply negative data signals through the lines 320–1 and 321–1 to the A and B memories. In a like manner, a data bit 0 may be gated from the High Speed Exchange or the Look Ahead Unit. Also, the data bits 1 through 70 are gated in the same manner.

The Memory Data Gate for the data bit 71, shown in the lower portion of FIGS. 18A and B includes three negative AND circuits 841, 843 and 845. These negative AND circuits are connected to a negative OR circuit 847. The OR circuit 847 is connected through converters 849 and 850 to output lines 320–72 and 321–72. In put lines 91–72, 92–72 and 93–72 are connected from the BX, the HX and LA input devices to the respective AND circuits 841, 843 and 845. These input lines carry the data bit 71. Input gate lines 256, 266 and 276 are connected to the AND circuits to provide signals for gating the data bit 71 into the data buses 320 and 321. This gate for the bit 71 operates in the same manner as the gate for the bit 0, described above.

*Return Address Gates* 191

The Return Address Gates 191, which are shown in block form in FIG. 2H, are illustrated in detail in FIG. 19. These gates produce a 4-bit code and transmit it to the Return Address Register 231 in FIGS. 23A through D to identify the requesting input/output device so that data may be returned to that device. The gates include eight negative AND circuits 861 through 868 and three negative OR circuits 869 through 871.

An input line 253 is connected to the AND circuit 861 from the BX In-Gate Control 141 in FIG. 14A. An input line 255 also is connected to the AND circuit 861 from the control 141. Input lines 263 and 265 are connected to the AND circuit 862 from the HX In-Gate Control 142 in FIG. 14B. The input lines 255 and 265 are BX and HX fetch conditioning input lines, respectively. The lines 253 and 263 are BX and HX return address gate lines, respectively. An input line 100–1 is connected to the AND circuit 863 from the Instruction Unit 78. An input line 100–2 is connected to a converter 872 from the Instruction Unit 78. The upper, or out-of-phase, output of the converter 872 is connected through a line 873 to the AND circuits 863 and 864. The lower, or in-phase, output of the converter 872 is connected through a line 874 to the AND circuits 865 through 868.

Input lines 99–X, 99–Y and 99–P are connected to the respective AND circuits 866 through 868 from the Look Ahead Unit 77. A gate line 283 is connected to the AND circuits 863 through 868 from the I Unit In-Gate Control 144 in FIG. 14D. The output of the AND circuit 861 is connected through a line 875 to an input of the OR circuit 871. The output of the AND circuit 862 is connected through a line 876 to an input of the OR circuit 870. The output of the AND circuit 863 is connected through a line 877 to inputs of the OR circuits 870 and 871. The output of the AND circuit 864 is connected through a line 878 to an input of the OR circuit 869. The output of the AND circuit 865 is connected through a delay circuit 882 to a line 192–B. This line is connected to the Return Address Read-In Control 251 in FIG. 25. The output of the AND circuit 866 is connected through a line 879 to another input of the OR circuit 869. The output of the AND circuit 867 is connected through a line 880 to another input of the OR circuit 870, and the output of the AND circuit 868 is connected through a line 881 to another input of the OR circuit 871. The output of the OR circuits 869 through 871 are connected through respective delay circuits 883 through 885 to conductors 192–C, 192–D and 192–P. These conductors are connected to the Return Address Read-In Control 251 in FIG. 25.

In the operation of the Return Address Gates in FIG. 19, particular signals on the input lines 153 and 255 or 263 and 265 provide delayed coded outputs on the lines 192B, C, D and P which identify the requesting unit as the Basic Exchange or the High Speed Exchange, respectively. Particular input signals on the input lines 100–1 and 100–2 produce delayed coded outputs on the lines 192–B, C, D and P to identify the registers 1Y or 2Y within the Instruction Unit 78. These latter input signals are accompanied by a gating signal on the line 283. Particular input signals on the lines 99–X, Y and P, along with a gating signal on the line 283, provide delayed coded output signals on the lines 192–B, C, D and P which identify one of the four requesting registers in the Look Ahead Units 77. The output code is delayed so that it is available to the Return Address Register 231 (FIG. 23) during a sample priority pulse.

Assume, for example, that the Basic Exchange makes a fetch request. A negative conditioning input signal is applied through the line 255 to the AND circuit 861. A negative gating signal is applied through the line 253 to the AND circuit 861. This AND circuit provides a negative output signal through the line 875 to the OR circuit 871. The OR circuit 871 provides a negative output signal on the line 192–P. No other request is made at this time and, therefore, a positive signal appears on the lines 192–B, C and D. The operation is similar when the High Speed Exchange makes a fetch request, except that the line 192–D is negative and the lines 192–B, C and P are positive.

Assume that the Instruction Unit makes a fetch request to its register 2–Y. The line 100–1 applies a negative signal to the AND circuit 863. The line 100–2 applies a positive signal to the converter 872. The converter 872 supplies a negative signal on the line 873 to the AND circuits 863 and 864, and a positive signal through the line 874 to the AND circuits 865 through 868. The line 283 supplies a negative signal to the AND circuits 863 through 868. All of the inputs of only the AND circuits 863 and 864 are negative. The AND circuit 863 supplies a negative signal on the line 877 to the OR circuits 870 and 871. The AND circuit 864 supplies a negative signal on the line 878 to the OR circuit 869. The OR circuits 869 through 871 supply negative signals to the lines 192–C, D and P. The line 192–B is positive. If the register 1Y is requested, the line 100–1 supplies a positive signal to the AND circuit 863. In this case the OR circuits 870 and 871 do not apply negative signals to the lines 192–D and P. Hence, only the line 192–C is negative, and the lines 192–B, D and P are positive. In discsussing the lines 192–B, C, D and P a negative signal is taken to mean a one and a positive signal is taken to mean a zero. Other conventions could be employed if desired.

The addressing of the Look Ahead Registers 1 through 4 is accomplished in a similar manner. The particular input signals applied to the lines 99–X, Y and P, along with a gating signal on the line 283, and a negative signal on the line 100–2, determines which register is addressed, i.e., determines the coded output on the lines 192–B, C, D and P. If the Look Ahead Register 1 is addressed, the lines 99–X, Y and P are positive and the line 283 is negative. These inputs provide a negative signal on the line 192–B, and positive signals on the lines 192–C, D and P. If the Look Ahead Register 2 is addressed, the line 99–X is positive and the lines 99–Y, 99–P and 283 are negative. This provides a negative signal on the lines 192–B, D and P, and a positive signal on the line 192–C. When the Look Ahead Register 3 is addressed, the lines 99–X, 99–P and 283 are negative and the line 99–Y is positive. This provides a negative signal on the lines 192–B, C and P, and a positive signal on the line 192–D. When the Look Ahead Register 4 is addressed, the lines 99–X, 99–Y and 283 are negative and the line 99–P is positive. This provides a negative output on the lines 192–B, C and D, and a positive signal on the line 192–P.

*Memory Data Out Bus 200*

The Memory Data Out Bus OR 200, which is shown in block form in FIG. 2H, is illustrated in detail in FIG. 20. This circuit includes a positive OR circuit for each of the bits 0 through 71. Only the OR circuits 886 and 888 for the bits 0 and 71, respectively, are illustrated. The OR circuits for the bits 1 through 70 are identical in construction and operation. Six input lines are applied to each of the OR circuits, and each of these lines carries a data bit from one of the six memories. Each of the OR circuits has one output conductor which is connected to each of the input/output devices (BX, HX, LA and I Unit) through cable 94. For example, the OR circuit 886 has an input line 941–1 for the data bit 0 from the $A_0$ memory 81, an input line 942–1 for the data bit 0 from the $A_1$ memory 82, etc. This OR circuit has an output line 94–1 for the data bit 0. A positive signal indicative of a bit (such as a positive signal on the line 941–1 indicative of the bit 0 from the memory $A_0$) is applied to the OR circuit, and the OR circuit supplies this data bit to the input devices. Each of the OR circuits for the data bits 0 through 71 operate in the same manner, except each supplies a particular data bit.

*Ring Circuit 211*

The Ring Circuit 211 which is shown in block form in FIG. 21 is illustrated in detail in FIGS. 21A and B. This Ring Circuit includes a frequency divider which is connected to a ring of trigger circuits. Each trigger circuit is connected to an output AND circuit. This Ring Circuit is employed to provide commutation. Eight trigger circuits are employed since there are eight registers in the Return Address Register 231 in FIG. 23.

The frequency divider includes a converter 891 which is connected to five positive AND circuits 892 through 896. These AND circuits are connected to a pair of positive OR circuits 897 and 898. An input line 299 is connected from the clock 298 (in the computer) in FIG. 21 to the converter 891. The clock sample signal from the clock 298 is delayed by delay circuit, not shown. The delay is adjustable so that output I pulses from the ring begin with sample request signals. The clock sample is a train of receiving positive and negative pulses. The AND circuits 892 through 896 and the OR circuits 987 and 898 operate on these pulses to provide a train of recurring positive and negative pulses from the OR circuits 898. One output pulse is produced for each two input clock pulses.

The upper, or out-of-phase output of the converter 891 is connected to the AND circuits 893 and 895. The lower, or in-phase, output of the converter 891 is connected to the AND circuit 894. A reset line 899 is connected to the input of each of the AND circuits 892 through 896. This line is connected to a switch on the computer control panel, and it is normally connected to a source of positive potential. When desired, such as at the end of the day, the line 899 may be switched to a negative potential source to reset the circuit.

The outputs of the AND circuits 892 through 894 are connected to the OR circuit 897. The outputs of the AND circuits 894 through 896 are connected to the OR circuit 898. The upper ouput of the OR circuit 897 is connected to the AND circuits 895 and 896. The lower output of the OR circuit 897 is connected to the AND circuits 892 and 893. The lower output of the OR circuit 898 is connected to the AND circuits 892, 894 and 896. The upper output of the OR circuit 898, which is the output of the frequency divider, is connected to a converter 900.

The AND circuits 892 through 896 and the OR circuits 897 and 898 are interconnected in a manner to provide an output pulse from the OR circuit 98 upon the receipt of each two input pulses from the clock 298. These output pulses are a train of alternating positive and negative pulses. The line 899 supplies a positive signal to one of the three inputs of each of the AND circuits 892 through 896. Assuming that the first clock pulse is negative, the converter 891 supplies a positive signal to the AND circuits 893 and 895, and a negative signal to the AND circuit 894. No inputs to the OR circuit 897 are positive and, therefore, its upper, or out-of-phase, output is positive. This output is applied to the AND circuits 895 and 896. Hence, the three inputs to the AND circuit 895 are positive and this circuit supplies a positive signal to the OR circuit 898. This OR circuit supplies a positive signal from its lower, or in-phase, output to the AND circuits 892, 894 and 896. The three inputs to the AND circuit 896 now are positive, and this circuit also supplies a positive, signal to the OR circuit 898. Since none of the inputs to the OR circuit 897 is positive, this circuit supplies a negative signal from its lower terminal to the AND circuits 892 and 893. The OR circuit 898 now supplies a negative signal to the converter 900.

Upon the receipt of the next clock pulse (positive) the converter 891 supplies a negative signal to the AND circuits 893 and 895, and a positive signal to the AND circuit 894. Since one of the three inputs to the AND circuit 895 now is negative, this AND circuit ceases to supply a positive signal to the OR circuit 89. This condition of the AND circuit 895 may be termed the off condition of the circuit. All three inputs to the AND circuit 894 now are positive, and this circuit supplies a positive signal to the OR circuits 897 and 898. This condition of the AND circuit 894 may be termed the on condition. When the OR circuit 297 turns on, it supplies a positive input to the AND circuit 892. All inputs to the AND circuit 892 are positive, and this circuit turns on. Since the OR circuit 897 is now turned on, it supplies a negative signal from its upper terminal to the AND circuit 896 which turns off. After the first clock pulse (negative) the AND circuits 895 and 896 and the OR circuit 898 were turned on. At this time (after the first positive clock pulse) the AND circuits 892 and 894, and the OR circuits 898 and 897 are turned on. The AND circuits 893, 895 and 896 are off. The OR circuit 898 supplies a negative pulse during these two clock pulses. During the next two clock pulses the OR circuit 898 will supply a positive pulse to the converter 900, then a negative pulse, a positive pulse, etc.

The third clock pulse (negative) leaves only the AND circuit 893 and the OR circuit 897 on. The fourth clock pulse leaves none of the AND or the OR circuits on. The fifth clock pulse (minus) operates the circuit in the same manner as the first clock pulse, and leaves the AND circuits 895 and 896, and the OR circuit 898 on. This operation continues as long as clock pulses are received and the line 899 remains positive. The operation of this circuit may be stopped and reset by momentarily applying a negative signal to the line 899.

The Ring Circuit 211 also includes eight trigger circuits (flip-flops) 901 through 908, and eight positive AND circuits 909 through 916. The trigger circuits 901 through 908 provide sequential positive output conditioning signals which are applied to the AND circuits 909 through 916. These AND circuits are strobed, or gated, by alternating even and odd positive signals from the converter 900. The trigger circuits 901 through 908 operate in the same manner as the flip-flops 369 and 384 in FIGS. 3A and B. Hence, a further detailed explanation of the operation of each of these trigger circuits is not believed necessary.

The conditioning outputs of the trigger circuits 901 through 908 are connected through respective lines 917 through 924 to the AND circuits 909 through 916, respectively. A reset output from each flip-flop 901 through 908 is connected to a preceding flip-flop for reset purposes. For example, the reset output of the flip-flop 901 is applied through a line 925 to a positive trigger AND circuit 926 in the flip-flop 907. When the flip-flop 901 is set or activated, it supplies a negative signal through the line 925 to the AND circuit 926 to reset the flip-flop 907. A reset line 927 is connected from the flip-flop 902 to the flip-flop 908. The remaining flip-flops have similar reset connections. An external reset line 928 is connected to the flip-flops 902, 903, 904, 905, 906 and 908. An external set line 929 is connected to a positive trigger OR circuit 930 in the flip-flop 901. The line 929 is pulsed with a positive signal and the line 928 is pulsed with a negative signal to set the flip-flop 901 and reset the remaining flip-flops in order to initiate operation of the Ring Circuit.

An odd output line 932 from the converter 900 is connected to the AND circuits 909, 911, 913 and 915. An even output line 931 from the converter 900 is connected to the AND circuits 910, 912, 914 and 916. As the train of negative and positive signals is applied to the converter 900, the lines 932 and 931 provide positive output gating signals. That is, when a negative signal is applied to the converter 900, the odd output line 932 is positive, and when a positive signal is applied to the converter 900, the even line 931 is positive.

To initiate operation of the Ring 211 the lines 929 and 928 are pulsed with a positive signal and a negative signal, respectively. This operation resets the flip-flops 902, 903, 904, 905, 906 and 908, and sets the flip-flop 901 which in turn resets the flip-flop 907. A train of negative and positive pulses is applied to the converter 900. These pulses provide sequential pulses on the odd line 932 and the even line 931. These positive pulses gate and AND circuit that is conditioned from a flip-flop, and that AND circuit sets the next flip-flop. With the flip-flop 901 set, the line 917 supplies a positive conditioning signal to the AND circuit 909. A positive odd pulse is applied to the AND circuit 909 which provides two outputs: (1) a positive out gate pulse $O_0$ which is applied through a line 342–1 to the Ring Powering and Phase Control 221; and (2) a negative in gate pulse $I_0$ which is applied through a line 344–1 to the Return Address Register Selector 261. The positive out gate pulse on the line 342–1 also is applied to set the flip-flop 902.

Upon the occurrence of a positive even pulse on the line 931, the AND circuit 910 provides a positive out pulse $O_1$ and a negative in gate pulse $I_1$ on the respective lines 342–2 and 344–2. The AND circuit 910 also provides a positive pulse to set flip-flop 903. As the flip-flop 903 sets, it provides a negative reset signal through a line 934 to the flip-flop 901. The next positive odd pulse gates the AND circuit 911 which provides a positive out signal $O_2$ and a negative in signal $I_2$ on lines 342–3 and 344–3, respectively. This AND circuit 911 sets the flip-flop 904 which in turn resets the flip-flop 902. This operation continues sequentially through the ring of flip-flop circuits 901 through 908 until such time as the clock sample pulses from the clock 298 cease, or the circuits reset. The negative in pulses (−I) are applied through cable 344 to the Return Address Register Selector 261 in FIG. 26. The positive out pulses (plus O) are supplied through cable 342 and through the Ring Output Powering and Phase Control 221 to the Return Address Register 231.

*Ring Output Pulse ($0_0$–$0_7$) Phase Control 221*

The Ring Output Pulse Phase Control 221 is shown in detail in FIG. 22. This control includes converters 946 and 947. The converter 946 receives a plus $0_0$ signal on a line 342–1 from the Ring 211. This converter provides an in-phase output plus $0_0$ signal on a line 343–9 to the Return Address Register 231. This plus $0_0$ output signal is a read out status trigger 1 signal. The converter 946 also supplies a $-0_0$ signal on a line 343–1 to the return address register 231, and this output signal is employed to read out register 1 and reset the status trigger 0. A delay circuit 948 is employed between the input line 342–1 and the converter 946. This delay circuit provides a ½ cycle delay to make 0 pulses lag the I pulses by ½ cycles. The converter and the delay circuits for the pulses $0_0$ through $0_7$ are alike and, therefore, these circuits for pulses $0_1$ through $0_6$ are not illustrated for simplicity of illustration.

The converter 947 receives a plus $0_7$ signal through an input line 342–8 and a delay circuit 949. The converter 947 provides output $-0_7$ and plus $0_7$ signals on output lines 343–8 and 343–16, respectively. These signals are applied to the Return Address Register 231. Each converter (for the pulses $0_0$ through $0_7$) receives a ½ cycle delayed plus 0 signal and supplies an in-phase plus 0 read out status trigger signal and an out-of-phase −0 read out register and reset status trigger signal.

*Return Address Register 231*

The Return Address Register 231, which is shown in block form in FIG. 21, is illustrated in detail in FIGS. 23A through 23D. This Register 231 includes eight registers (registers 0 through 7) which each include four bit registers for return address bits B, C, D and P, i.e., there are four bit registers (for bits B, C, D and P) in each of the registers 0 through 7. The registers 0 through 7 are utilized to store return addresses until data is available on the memory out bus 94. Since the access cycle of the low speed memories is seven slots, eight registers (0 through 7) are employed.

Figure 23B:
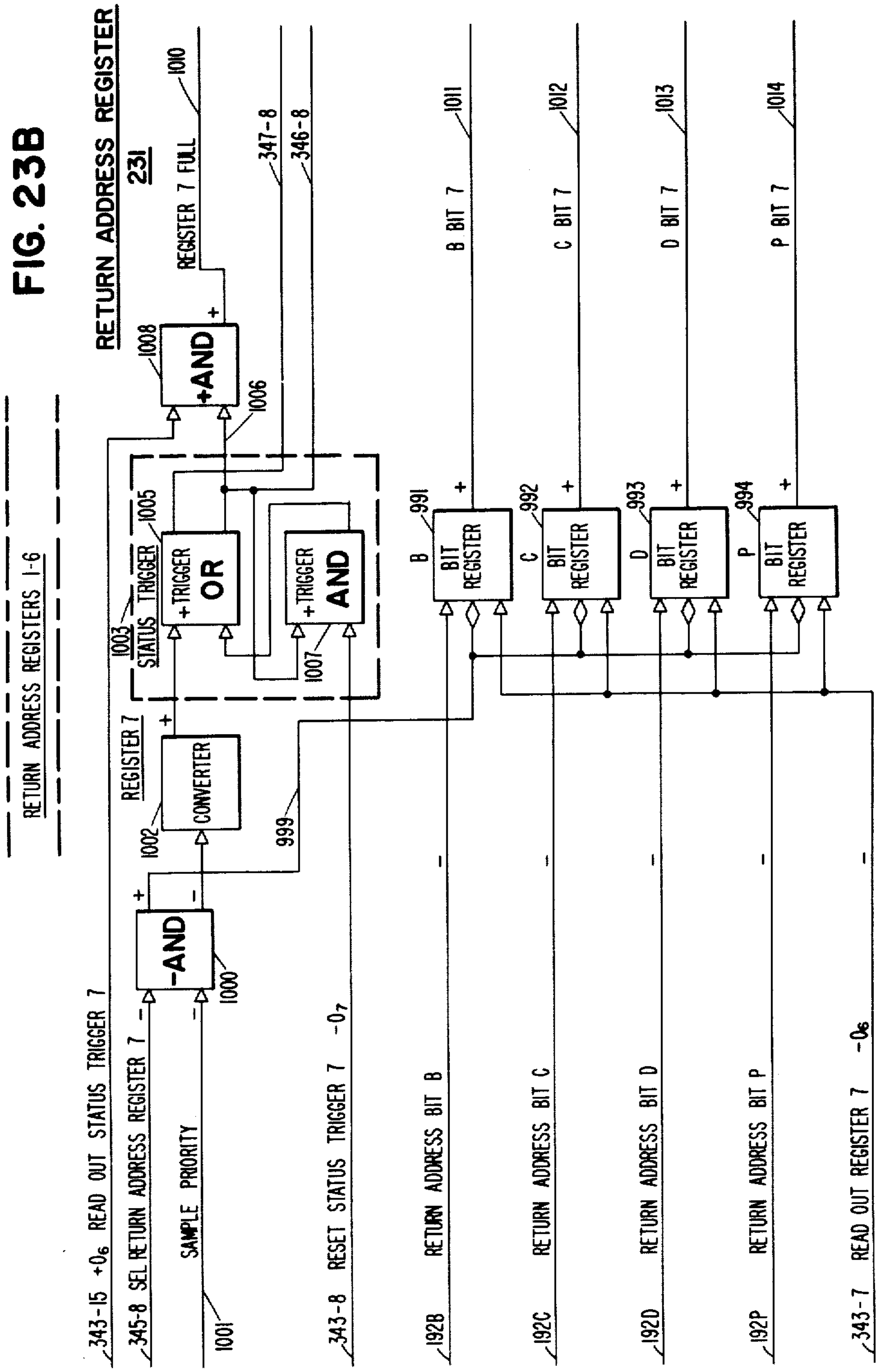

The register 0 and the register 7 are illustrated in FIGS. 23A and 23B, respectively. The registers 1 through 6 have been omitted from the drawings for simplicity of illustration. Each of these registers 0 through 7 is identical in construction and operation, except they operate at different times.

The register 0 in FIG. 23A includes four bit registers 951 through 954 for the respective bits B, C, D and P. These bits are supplied to the bit registers 951 through 954 on input lines 192B, C, D and P. A conditioning line 959 is connected from a negative AND circuit to the bit registers 951 through 954. Input lines 345–1 and 961 are connected to the AND circuit 960, and these lines provide select return address register 0 and sample priority signals, respectively. The lower output, or in-phase output, of the AND circuit 960 is connected through a converter 962 to the input of a status trigger 963. This status trigger, or flip-flop, is constructed and operated in the same manner as the flip-flops described previously. A line 343–1 is connected to the reset input of the flip-flop 963 from the Ring Output Powering and Phase Control 221 in FIG. 22. The flip-flop 963 includes a positive trigger OR circuit 965 and a positive trigger AND circuit 967. The lower, or in-phase, output of the OR circuit 965 is connected through a line 966 to a positive AND circuit 968. An input line 343–16 is connected from the Ring Output Powering and Phase Control 221 in FIG. 22 to the AND circuit 968. The upper, or out-of-phase, output of the OR circuit 965 is connected through a line 347–1 to the Return Address Register Status Decoder 241 in FIG. 24. The in-phase output of the OR circuit 965 is connected through a line 346–1 to the Decoder 241.

Figure 23C:
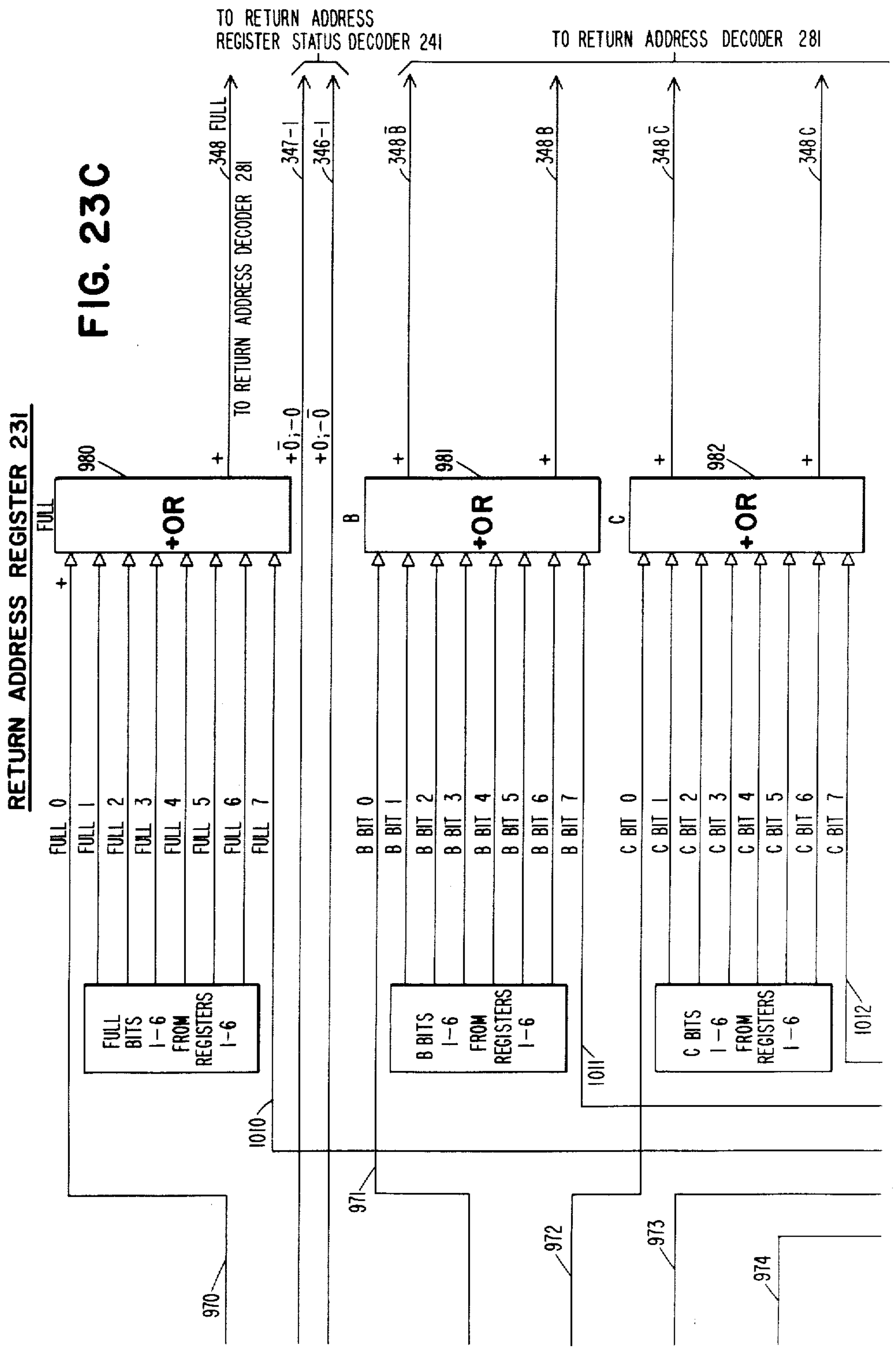
Figure 23D:
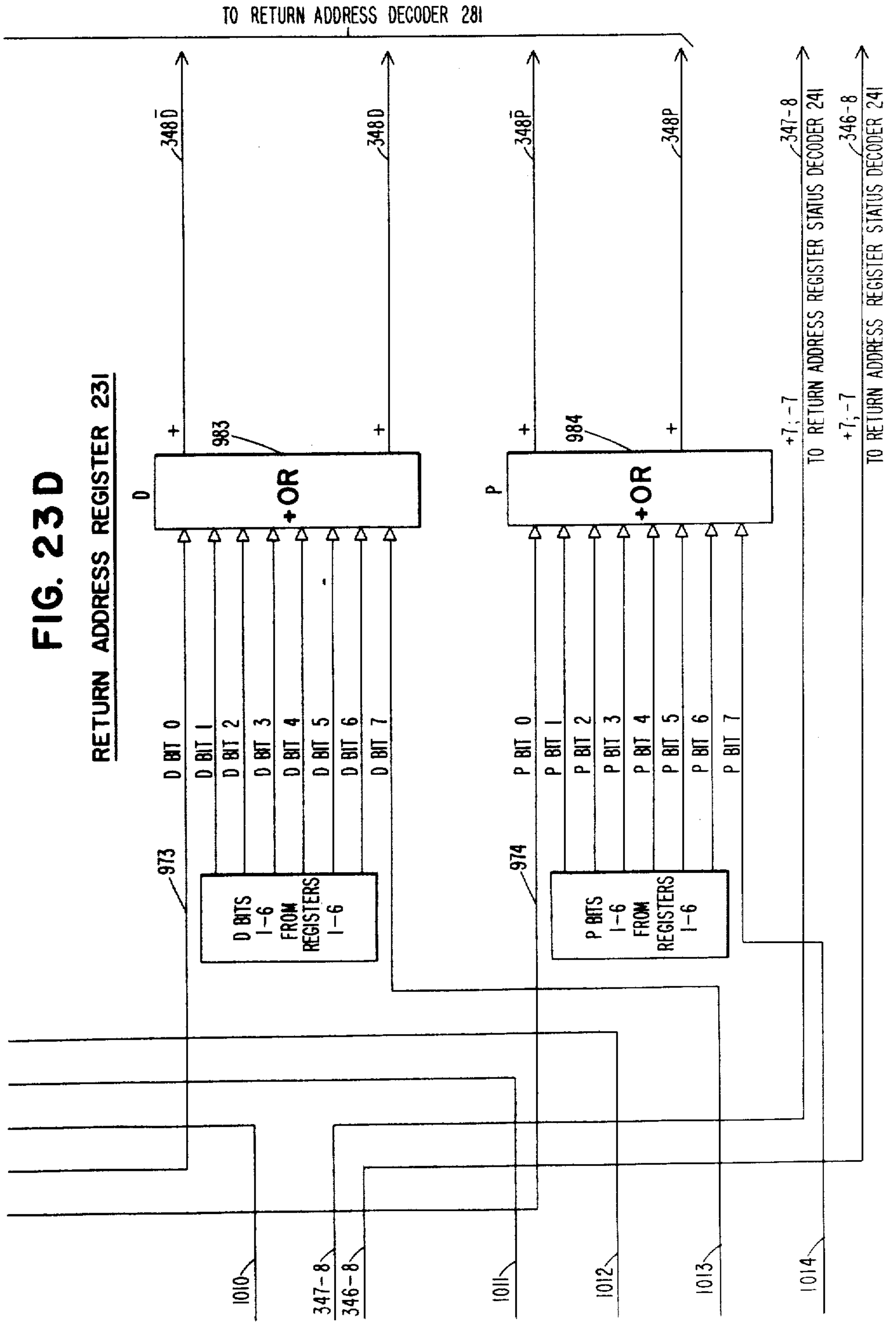

The outputs from the bit registers 951 through 954 are supplied on respective lines 971 through 974 to positive OR circuits 981 through 984, respectively, as shown in FIGS. 23C and 23D. The outputs of the OR circuits 981 through 984 are connected through lines 348$\bar{B}$, B, $\bar{C}$, C, $\bar{D}$, D, $\bar{P}$, and P to the Return Address Decoder 281 in FIG. 28. The output of the AND circuit 968 is connected through a line 970 to a positive OR circuit 980. The in-phase output of the OR circuit 980 is connected through a line 348 to the Decoder 281.

The register 7 shown in FIG. 23B includes four bit registers 991 through 994. Input lines 192B, C, D, and P from the Return Address Gates 191 in FIG. 19 supply return address bits B, C, D and P to the bit registers 991 through 994, respectively. A conditioning line 999 is connected from a negative AND circuit 1000 to the bit registers 991 through 994. Input lines 345–8 and 1001 are connected to the AND circuit 1000. The in-phase output of the AND circuit 1000 is connected through a converter 1002 to a status trigger 1003. The status trigger 1003 includes a positive OR circuit 1005, and a positive AND circuit 1007. This status trigger 1003 is a flip-flop and is constructed and operated in the same manner as the flip-flops discussed previously. The in-phase output of the OR circuit 1005 is connected through a line 1006 to a positive AND circuit 1008. An input line 343–15 is connected from the Control 221 in FIG. 22 to the AND circuit 1008. The upper, or out-of-phase, output of the OR circuit 1005 is connected through a line 347–8 to the Return Address Register Status Decoder 241 in FIG. 24. The in-phase output of the OR circuit 1005 is connected through a line 346–8 to the Decoder 241.

The outputs of the bit registers 991 through 994 are connected through respective lines 1011 through 1014 to the OR circuits 981 through 984 in FIGS. 23C and D. The lines 1011 through 1014 carry respective bits B, C, D and P from the register 7 in FIG. 23B. The output of the AND circuit 1008 is connected through a line 1010 to the OR circuit 980 in FIG. 23C. The registers 1 through 6, not shown, also supply bits B, C, D and P to the OR circuits 981 through 984, respectively, and full signals to the OR circuit 980. Each of registers 1 through 6 receive input lines 192B, C, D and P, and sample priority lines, such as, 961 in FIG. 23A. Each of these registers receives four input lines: three 343 lines (read out status trigger, reset status trigger and read out register lines), and a 345 line which supplies a select return address register signal. These lines are as follows:

Register 1:
- Line 343–9—Read out status trigger 1—plus $0_0$
- Line 345–2—Select return address register 1
- Line 343–2—Reset status trigger 1—minus $0_1$
- Line 343–1—Read out register 1—minus $0_0$ Register 2:
- Line 343–10—Read out status trigger 2—plus $0_1$
- Line 345–3—Select return address register 2
- Line 343–3—Reset status trigger 2—minus $0_2$
- Line 343–2—Read out register 2—minus $0_1$ Register 3:
- Line 343–11—Read out status trigger 3—plus $0_2$
- Line 345–4—Select return address register 3
- Line 343–4—Reset status trigger 3—minus $0_3$
- Line 343–3—Read out register 3—minus $0_2$ Register 4:
- Line 343–12—Read out status trigger 4—plus $0_3$
- Line 345–5—Select return address register 4
- Line 343–5—Reset status trigger 4—minus $0_4$
- Line 343–4—Read out register 4—minus $0_3$ Register 5:
- Line 343–13—Read out status trigger 5—plus $0_4$
- Line 345–6—Select return address register 5
- Line 343–6—Reset status trigger 5—minus $0_5$
- Line 343–5—Read out register 5—minus $0_4$ Register 6:
- Line 343–14—Read out status trigger 6—plus $0_5$
- Line 345–7—Select return address register 6
- Line 343–7—Reset status trigger 6—minus $0_6$
- Line 343–6—Read out register 6—minus $0_5$ The Return Address Register 231 shown in FIGS. 23A through 23D operates to store a return address (bits B, C, D and P) for a certain period of time. This period of time is determined by *when* the address is read into the register. The address is read into the register under control of the Return Address Register Selector 261 in FIG. 26. A register, such as register 0 in FIG. 23A, receives an input select register signal, a return address, and a sample priority signal. The return address is stored in the bits registers. The status trigger indicates the busy condition of the register to the Status Decoder 241 in FIG. 24. A read out register signal is applied to the bit registers, and they supply the return address through the output OR circuits 981 through 984 to the Return Address Decoder 281 in FIG. 29. When the read out signal is applied to the bit registers, a read out status trigger signal in combination with the output from the set status trigger indicates the full condition of the register to the Return Address Decoder 281 in FIG. 28. This full signal conditions the Decoder 281 to allow it to decode the return address during a sample memory signal. When the next succeeding register, such as register 1, is read out in a similar manner, a reset signal is applied to the status trigger in the preceding register, such as the register 0. When the status trigger is reset, it supplies not busy information to the Status Decoder 241.

Assuming that a return address for the Look Ahead register 1 (address 1000) is to be stored in the return address register 0 in FIG. 23A, the input bit line 192B is negative and the input bit lines 192C, D and P are positive (a minus signal is taken to indicate a bit 1). Select return address register 0 and sample priority signals are received on the respective lines 345–1 and 961 to provide a conditioning signal on the line 959 which conditions the bit registers 951 through 954 to store the address. The status trigger 963 is set, and signals on the lines 346–1 and 347–1 indicate that the register 0 is busy. A read out status trigger 0 signal plus $0_7$ and a read out register 0 signal minus $0_7$ are applied together to the respective input lines 343–16 and 434–8. The AND circuit 968 provides a register 0 full signal through the line 970, the OR circuit 980 and the line 348 to the Decoder 281. This full signal conditions the Decoder 281 in FIG. 28 to decode the return address. When the read out register 0 signal is applied to the line 343–8, the address is read out of the bit registers 951 through 954 through the lines 971 through 974 to the OR circuits 981 through 984. The OR circuit 981 provides a positive signal on the output line 348B, and the OR circuits 982 through 984 provide negative signals on the respective output lines 348C, D and P. The storage and read out of the return address has the effect of complementing the address since the address is still 1000 but the output signal indicative of this address now is + — — —, In other words, a binary bit 1 is taken to be positive at the output of the Return Address Register 231, and at the input to the Return Address Decoder 281. When the next succeeding register, register 1, is read out, a reset status trigger 0 signal $-0_0$ is applied to the register 0 to reset the status trigger 963. The status trigger 963 then provides not busy information on the lines 346–1 and 347–1 to the status decoder 241 in FIG. 24. The other return addresses (for the Look Ahead registers 2 through 4, the instruction unit registers 1Y and 2Y, the BX and the HX) may be stored in any of the registers 0 through 7, and read out in the same manner described above.

Each bit of the registers (such as 951 through 954 in Register 0, FIG. 23A) employed in the Return Address Register 231 in FIGS. 23A–B is constructed like the register card 686 in FIG. 11A. The third level AND circuit 703 shown in the lower portion of the register card 686 is not utilized in the operation of the Register 121 in FIG. 11A, but it is utilized in the bit registers in FIGS. 23A–B. The bit registers include the entire register card 686 shown in heavy dashed lines in FIG. 11A. Each of the bit registers is identical in construction and operation. The bit register includes a third level AND circuit 687 (FIG. 11A), a split level OR circuit 691, a converter 693 and a third level AND circuit 703. The AND circuit 687, the OR circuit 691 and the converter 693 are discussed in the description of FIG. 11A. The output of the OR circuit 691 is connected to the converter, as described previously, and also is connected to the AND circuit 703. An input line 704 is connected to the AND circuit 703. An out-of-phase line 705 is connected from the AND circuit 703.

Referring to the bit register 951 in FIG. 23A, the input line 959 is equivalent to the line 169 in FIG. 11A, the input line 192B is equivalent to the line 98–1 in FIG. 11A, the input line 343–8 is equivalent to the line 704 in FIG. 11A, and the output line 971 is equivalent to the output line 705 in FIG. 11A. When the input line 959 is positive and the input line 192B is negative, the AND circuit 687 (FIG. 11A) provides a negative in-phase output on the line 688 and a positive out-of-phase output on the line 689. The OR circuit 691 provides an in-phase positive output. This positive output is applied through the converter 693 back to the input of the OR circuit 691. Since the split level OR circuit 691 operates in its own unique manner as described above in connection with FIG. 11A, the positive signal at its in-phase output on line 692 remains until the register card (bit register) is reset. The bit register is reset only when another bit is read into the register, for example, a positive signal on the line 192B along with a conditioning positive signal on the line 959. A positive signal on the line 959 is required to read information into the register, and the bit register is reset by reading in new information.

The bit register is read out by applying a negative signal on the line 343–8 in FIG. 23A (which corresponds to the line 704 in FIG. 11A). The positive signal from the OR circuit 691 is applied through a line 702 to the AND circuit 703. At this time, a positive output signal is provided by the AND circuit 703 on the line 705. If a negative signal had been applied to the bit register on the line 192B, during read in time, a negative output signal would be present at the output of the OR circuit 691. This negative signal would be applied through the line 702 to the AND circuit 703. Whenever the line 702 is negative, the output of the AND circuit 703 on the line 705 is negative. Hence, a bit (1 or 0) is read into the register by applying a minus or a positive signal on the line 192B while the line 959 is positive. The OR circuit 691 (FIG. 11A) then provides a positive output which remains until the bit register is reset by reading in a new bit while the line 959 (FIG. 23A) is positive. The bit register is read out by applying a negative signal on the line 704 to the AND circuit 703 (FIG. 11A). The remaining bit registers are constructed and operated in the same manner.

RETURN ADDRESS REGISTER STATUS DECODER 241

The Return Address Register Status Decorder 241, shown in FIG. 21 in block diagram and in logical representation in FIG. 24. The Return Address Register Status Decoder functions to combine the status information provided by the Return Address Register shown in FIGS. 23A through D to reveal the status of successive Return Address Registers. It is to be noted that the inputs to this status decorder 241 are the individual leads of the cables 346 and 347. Cables 346 and 347 carry complementary outputs of the status trigger flip-flop in each of the Return Address Registers 0 through 7 shown in FIG. 23. For example, lines 346–1 and 347–1 are complementary outputs of status trigger flip-flop 963 in register 0. When one of the lines of cable 346 is positive, the register associated therewith is not busy. When one of the lines of cable 347 is positive, the register associated therewith is busy.

Since this Return Address Register Status Decoder 241 functions to inform the Return Address Register Selector 261 which is the first available register for selection, this circuit reveals through output cable 349 the availability of successive registers up to four registers. The 347 cable lines are also connected as a direct input into the Return Address Register Selector 261 shown in FIG. 26 from the Return Address Register 231 shown in FIGS. 23A, B, C and D so that when a requested register is not busy, but is available, the Return Address Register Selector 261 can function to select such register and not provide memory delay. In the example shown in FIG. 24, this is pointed up by the absence of line 347–1 which reveals that the 0 register is not busy and is available.

There are eight return address status decoders, one for each of the gates $I_0$–$I_7$. Illustrated in FIG. 24 are the decoders for gates $I_5$ and $I_4$.

The Return Address Status Decoder 241 for gate $I_5$ includes four negative AND circuits and two positive AND circuits. The first negative AND circuit 1051 has for its inputs line 347–1 which is coded to indicate that when negative, the zero register is busy. The second input to negative AND 1051 is line 346–2 which is coded to indicate that register 1 is busy when such line is plus. When register 1 is no longer busy, line 346–2 becomes negative and an out-of-phase output 349–1 of negative AND 1051 becomes positive to indicate that the zero register is busy and the one register is not busy. The Return Address Register Selector 261 now knows that during $I_5$ slot, it is necessary to provide a one slot delay until a register becomes available.

The two negative inputs to the second minus AND circuit 1052 are the 347–1 line which says that register 0 is busy and the 347–2 line which says that register 1 is busy to give a positive out-of-phase output through connector 1057 as one of the inputs to the first positive AND circuit 1053. The second input to the positive AND 1053 is the 347–3 line which indicates that register 2 is not busy when positive.

The two positive inputs to positive AND 1053 provide a positive in-phase output 349–2 which informs the Return Address Register Selector 261 that the zero and the one registers are busy but the two register is available. That is, the first available register requires a two slot delay at $I_5$ time. The two inputs to the second positive AND 1054 are the positive out-of-phase output 1057 from the negative AND 1052 and the 346–3 line which says that register 2 is busy when positive.

The two positive inputs to the positive AND 1054 provide a negative out-of-phase output through connector 1058 as one of the inputs of the third negative AND 1055. The second input to negative AND 1055 is the line 346–4 which, when positive, indicates that register 3 is busy. When 346–4 becomes negative as it does when register 3 is not busy, the then two negative inputs to the negative AND 1055 provide a plus out-of-phase output 349–3 which reveals to the Return Address Register Selector 261 that the first available register is Number 3 and that delays will have to be provided while register 0, 1 and 2 are busy.

The two negative inputs to the fourth negative AND 1056 are the negative out-of-phase output 1058 of plus AND 1054 and line 347–4 which indicates, when negative, that register 3 is busy. The two negative inputs combined to provide a positive out-of-phase output 349–4 from the negative AND 1056 to inform the Return Address Register Selector 261 that registers 0, 1, 2 and 3 are busy and that, in the example of providing a maximum delay of four slots, that the first available register will be number 4.

When a register is busy, the two outputs of its status trigger which are used as inputs to this decoder, are so constituted that the 346 line output will be negative and the 347 line will be positive. To illustrate, when registers 0 and 1 are busy, the output on line 349–1 is not properly conditioned. However, if register 2 is not busy, the lines 347–1 and 347–2 which indicate that registers 0 and 1 are busy are combined to properly condition, along with the 347–3 register 2 not busy line, the positive AND 1053 to provide a properly conditioned output on line 349–2 to reveal the status of the three registers 0, 1 and 2. It is seen that the signal on line 346–3 which indicates that register 2 is busy when positive, would be negative and no properly conditioned output would be provided from the positive AND 1054.

Now let us assume that register 0, 1 and 2 are busy and register 3 is not busy. Lines 347–1 and 347–2 would provide a properly conditioned output from negative AND 1052 which would combine with line 346–3 to provide a properly conditioned output from positive AND 1054. However, lines 346–2 and lines 347–3 would prevent the properly conditioned outputs from negative AND 1051 and positive AND 1053. Since register 2 is considered to be busy, the properly conditioned line 1057 from the negative AND 1052 combines with line 346–3 to provide a properly conditioned output from positive AND 1054. Since register 3 was considered to be not busy, it is seen that line 346–4 would provide a negative input to the negative AND 1055 to join with the negative input on connector 1058 from positive AND 1054 which has been previously conditioned to provide an output on line 349–3 which informs the Return Address Register Selector 261 that registers 0, 1 and 2 are busy, but 3 is available. To assume that all of the register 0, 1, 2 and 3 are busy would provide the same action as the previous assumption except for the provision of line 347–4 to join with the output 1058 of the positive AND circuit 1054 which was previously conditioned to condition the negative AND 1056 to provide a positive output on line 349–4 to inform the Return Address Register Selector 261 that the four registers 0, 1, 2 and 3 are busy.

The Return Address Register Status Decoders for positions 1 through 6 which are not shown in FIG. 24, are identical with the decoder shown for registers 0 through 3, except that such decoders are for registers 1 through 4, 2 through 5, 3 through 6, 4 through 7, 5 through 0 and 6 through 1, respectively. The decoder for registers 7 through 2 is shown at the bottom of FIG. 24. The in gates associated with the omitted decoders are $I_6$, $I_7$, $I_0$, $I_1$, $I_2$ and $I_3$ respectively. The input lines for the individual decoders which are not illustrated are, taken in the same top to bottom order used in FIG. 24, are shown in table 2. Table 3 shows the outputs for the omitted decoders in the same order as the inputs.

TABLE 2 (INPUTS)

| $I_6$ Gate | $I_7$ Gate | $I_0$ Gate | $I_1$ Gate | $I_2$ Gate | $I_3$ Gate |
|---|---|---|---|---|---|
| 347–2 | 347–3 | 347–4 | 347–5 | 347–6 | 347–7 |
| 346–3 | 346–4 | 346–5 | 346–6 | 346–7 | 346–8 |
| 347–3 | 347–4 | 347–5 | 347–6 | 347–7 | 347–8 |
| 347–4 | 347–5 | 347–6 | 347–7 | 347–8 | 347–1 |
| 346–4 | 346–5 | 346–6 | 346–7 | 346–8 | 346–1 |
| 346–5 | 346–6 | 346–7 | 346–8 | 346–1 | 346–2 |
| 347–5 | 347–6 | 347–7 | 347–8 | 347–1 | 347–2 |

TABLE 3 (OUTPUTS)

[Cable 349 leads]

| $I_6$ Gate | $I_7$ Gate | $I_0$ Gate | $I_1$ Gate | $I_2$ Gate | $I_3$ Gate |
|---|---|---|---|---|---|
| 5 $1\cdot\bar{2}$ | 9 $2\cdot\bar{3}$ | 13 $3\cdot\bar{4}$ | 17 $4\cdot\bar{5}$ | 21 $5\cdot\bar{6}$ | 25 $6\cdot\bar{7}$ |
| 6 $1\cdot2\cdot\bar{3}$ | 10 $2\cdot3\cdot\bar{4}$ | 14 $3\cdot4\cdot\bar{5}$ | 18 $4\cdot5\cdot\bar{6}$ | 22 $5\cdot6\cdot\bar{7}$ | 26 $6\cdot7\cdot\bar{0}$ |
| 7 $1\cdot2\cdot3\cdot\bar{4}$ | 11 $2\cdot3\cdot4\cdot\bar{5}$ | 15 $3\cdot4\cdot5\cdot\bar{6}$ | 19 $4\cdot5\cdot6\cdot\bar{7}$ | 23 $5\cdot6\cdot7\cdot\bar{0}$ | 27 $6\cdot7\cdot0\cdot\bar{1}$ |
| 8 $1\cdot2\cdot3\cdot4$ | 12 $2\cdot3\cdot4\cdot5$ | 16 $3\cdot4\cdot5\cdot6$ | 20 $4\cdot5\cdot6\cdot7$ | 24 $5\cdot6\cdot7\cdot0$ | 28 $6\cdot7\cdot0\cdot1$ |

*Return Address Read-in Control 251*

The Return Address Read-In Control 251 which is shown in block form in FIG. 2I is shown in detail in FIG. 25. These controls 251 control the Return Address Register Selector 261 to read the high speed memories or the low speed memories. This Control includes a pair of positive AND circuits 1076 and 1078. A positive OR circuit 1080 and a delay circuit 1082 are connected to the AND circuits 1076 and 1078. A line 307 is connected to the OR circuit 1080 from the Memory Select Gates 151 in FIGS. 15A through F. This line supplies a memory $A_0$ select signal (positive). A line 308 also is connected to the OR circuit 1080 from the Memory Select Gates. This line supplies a memory $A_1$ select signal (positive). An input line 309 is connected to the AND circuits 1076 and 1078 from the Memory Read Out Control 171 in FIGS. 17A and B. This line supplies a signal to indicate a fetch operation. An input line 1084 is connected to the delay circuit 1082. This input line supplies sample memory signals through the delay circuit 1082 to AND circuits 1076 and 1078.

When either an $A_0$ or $A_1$ select signal (positive) is applied to line 307 or line 308 in conjunction with a fetch signal (positive) on the line 309, along with a sample memory signal on the line 1084, the AND circuit 1078 provides a read high speed memory on a line 352. If neither an $A_0$ nor an $A_1$ select signal is applied to the OR circuit 1080, but fetch and sample signals are applied to the lines 309 and 1084, the AND circuit 1076 provides a read low speed memory signal on a line 351. The lines 351 and 352 are connected to the Return Address Register Selector 261 in FIG. 26.

*Return Address Register Selector 261*

The Return Address Register Selector 261 is shown in block form in FIG. 21 and in logic form in FIGS. 26A through H. Each of the eight selectors 261 function in response to read memory requests, timing pulses, in gates, and status information to select at discrete times particular registers in the Return Address Register 231, to provide an in gate signal to other return address register selectors of the group and to select the necessary memory delay so that the proper return address will be read out of the Return Address Register 231 when the proper information is gated from memory to the Out Bus 94.

The circuit includes two negative AND circuits 1086 and 1087, respectively, and five positive AND circuits 1088, 1089, 1090, 1091 and 1092, respectively. Also included are a converter 1093 and a single shot 1094. The single shot 1094 is identical in structure and operation with the single shot 558 shown in FIG. 6A. The inputs include the read high speed memory line 352 and the read low speed memory line 351 from the Return Address Read In Control shown in FIG. 25, the in gate lines $-I_0$ through $-I_7$ in Cable 344 which is an output of the Ring 211 shown in FIG. 21, the eight lines of cable 347 which indicate the status of the individual registers in the Return Address Register 231 shown in FIGS. 23A, B, C, and D, and the thirty-two lines of cable 349 which is an output of the Return Address Register Status Decoder 241 shown in FIG. 24, which indicates the status of successive groups of registers in the Return Address Register 231. The outputs include a specific return address register select line in Cable 345 which is connected as an input to the Return Address Register 231 to select a register, the in gate line labeled 360 which is connected as an input to the four return address register selectors for the next four succeeding register selectors. Such in gate selects minus 1 delay in the first succeeding selector, minus 2 delay in the second succeeding selector, minus 3 in the third and minus four delay in the fourth succeeding selector. The other outputs of the individual selectors are the high speed memory delay selected lines in cable 353 which is connected as an input to the High Speed Memory Delay and Slot Selector 271 shown in FIGS. 27A, B, C, D and E.

The two inputs to the minus AND circuit 1086 are the line $I_1$ numbered 344–2 and the read B memory lines 351. These two inputs are effective when negative to provide a minus in-phase output 1095 which is connected as an input to converter 1093 which provides a positive out-of-phase output 1096 which is connected as one of the seven inputs to the positive OR circuit 1097 in the single shot 1094. Any positive signal applied as an input to the positive OR 1097 provides a negative out-of-phase output through the line 345–1 which informs the return address register 231 that register 0 has been selected.

The two inputs to the negative AND circuit 1087 are the in gate $I_5$ on line 344–6 and the read A memories line 352.

The two inputs to positive AND 1092 are the out-of-phase output 360–6 of the negative AND 1087 and the register 0 status line 347–1. The two inputs to the positive AND circuit 1088 are the in gate $I_4$ line 360–5 which is the out-of-phase output of a negative AND circuit 1098 in the return address register selector for register 7 shown in FIG. 26H. The second input to the positive AND 1088 is the register 7 busy and register 0 not busy status line 349–29 which is an output of the Return Address Register Status Decoder 241 shown in FIG. 24.

Figure 26B:
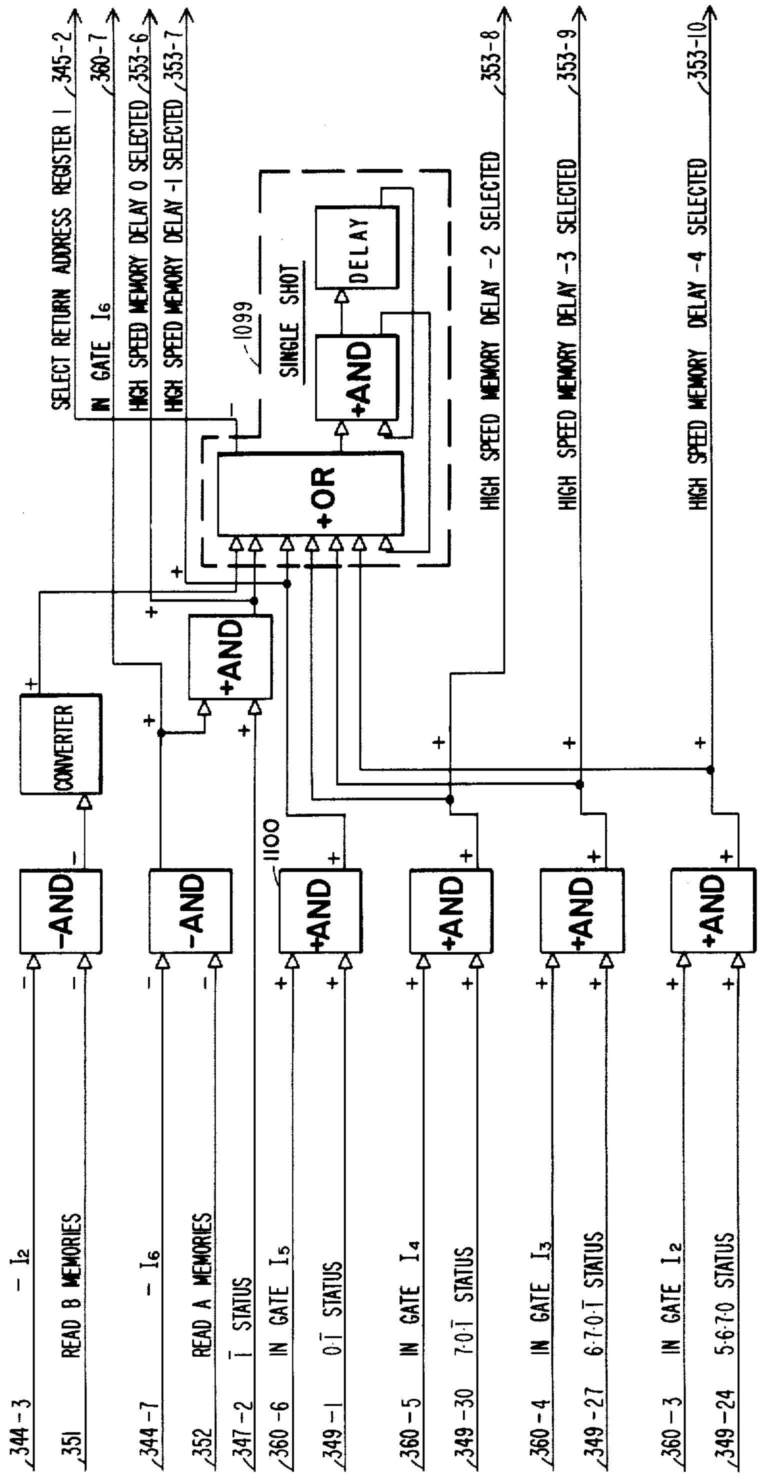
Figure 26C:
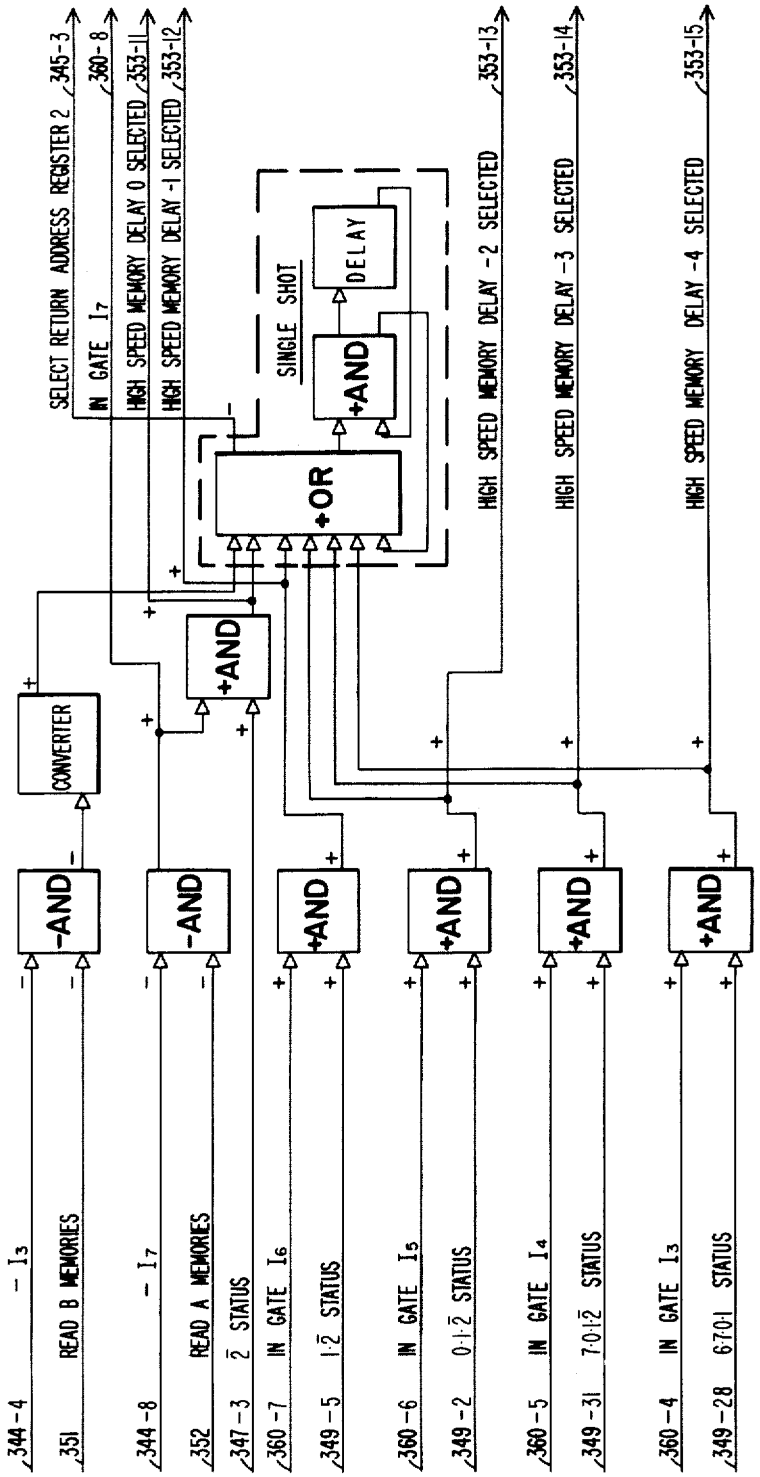
Figure 26D:
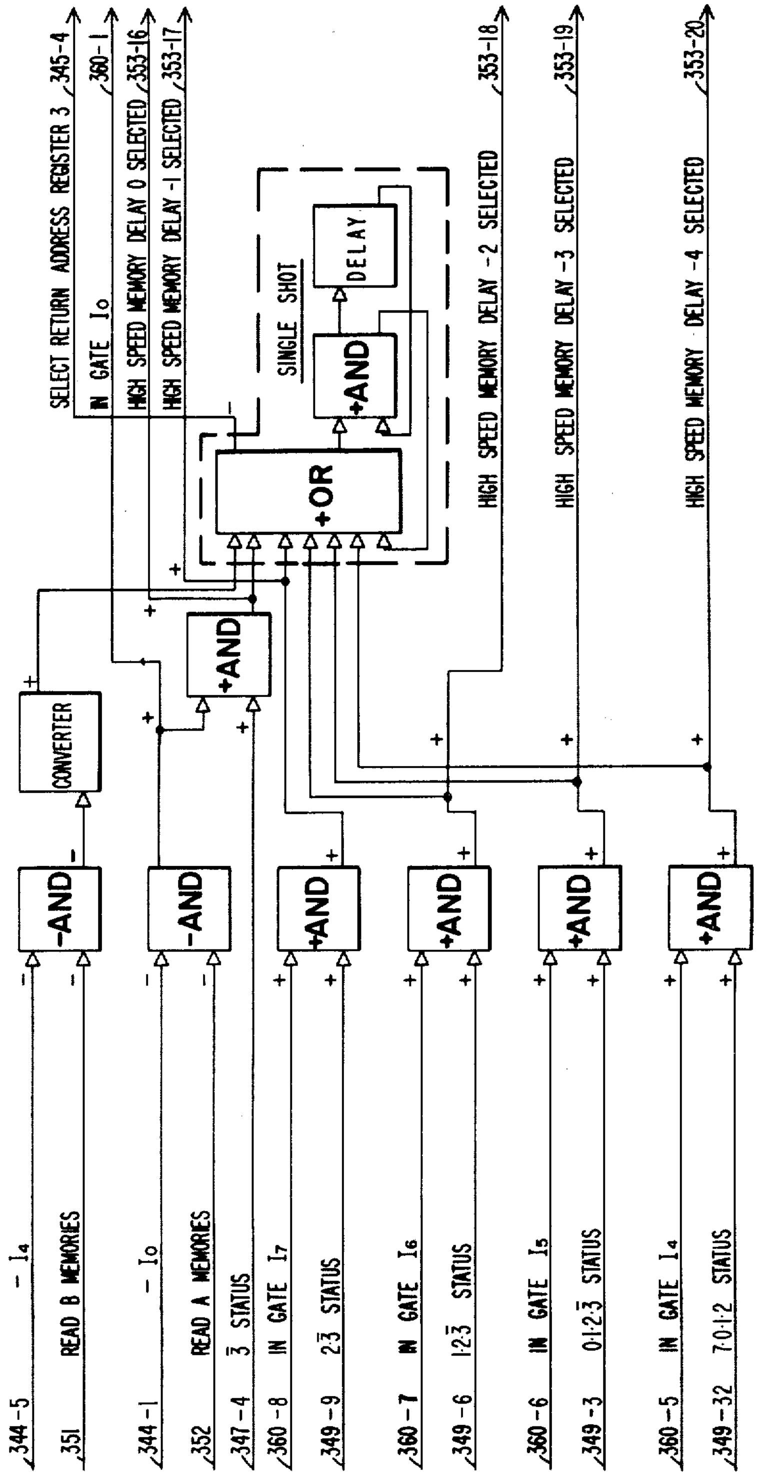
Figure 26E:
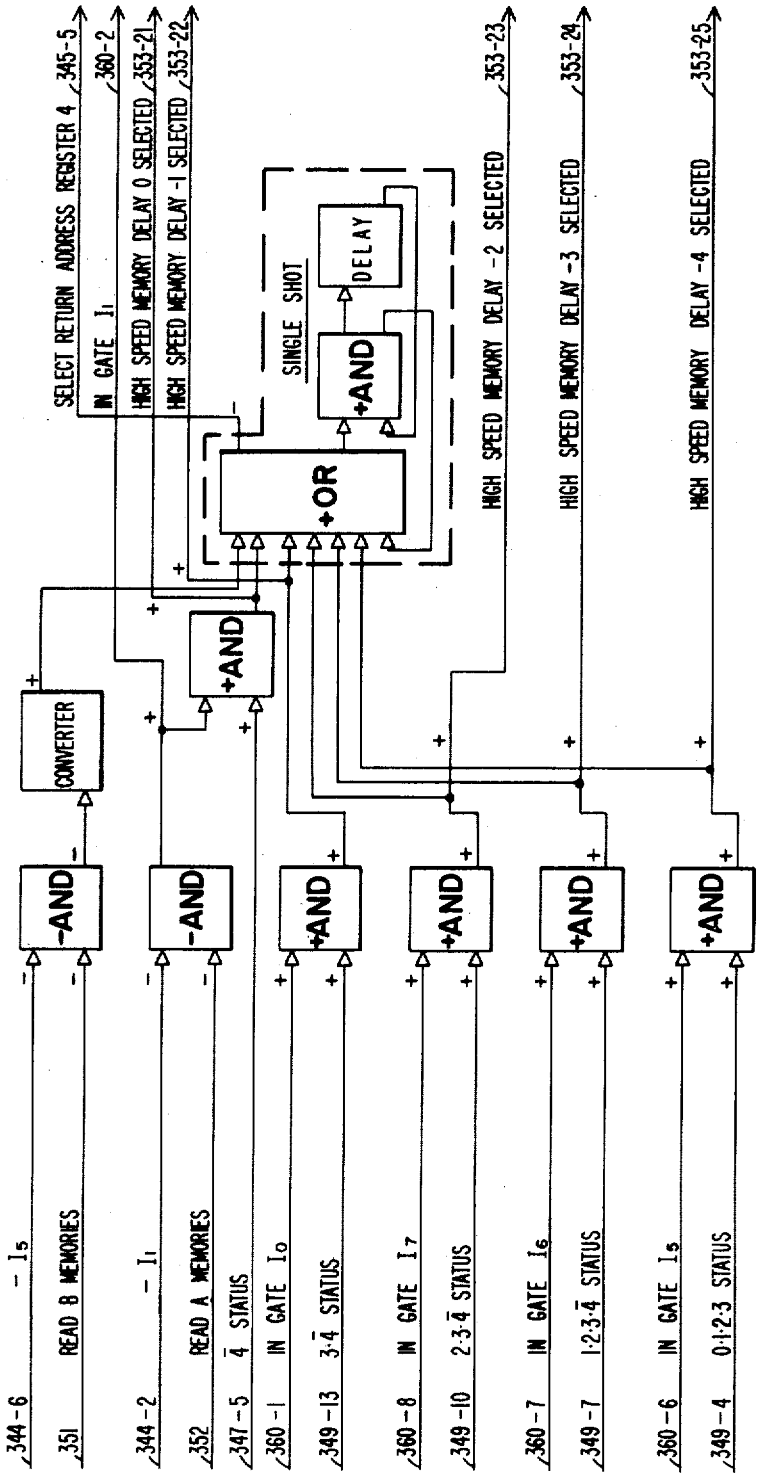
Figure 26F:
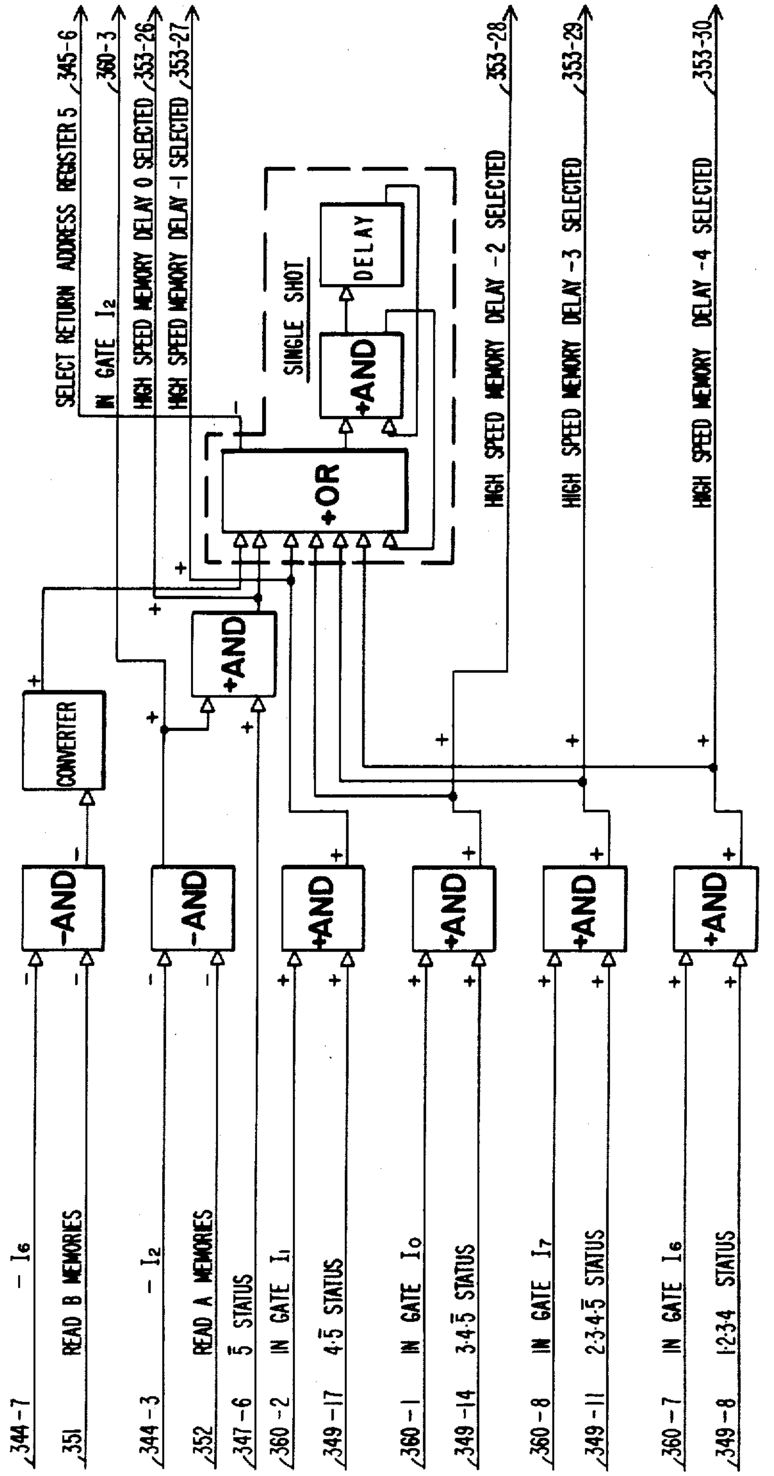
Figure 26G:
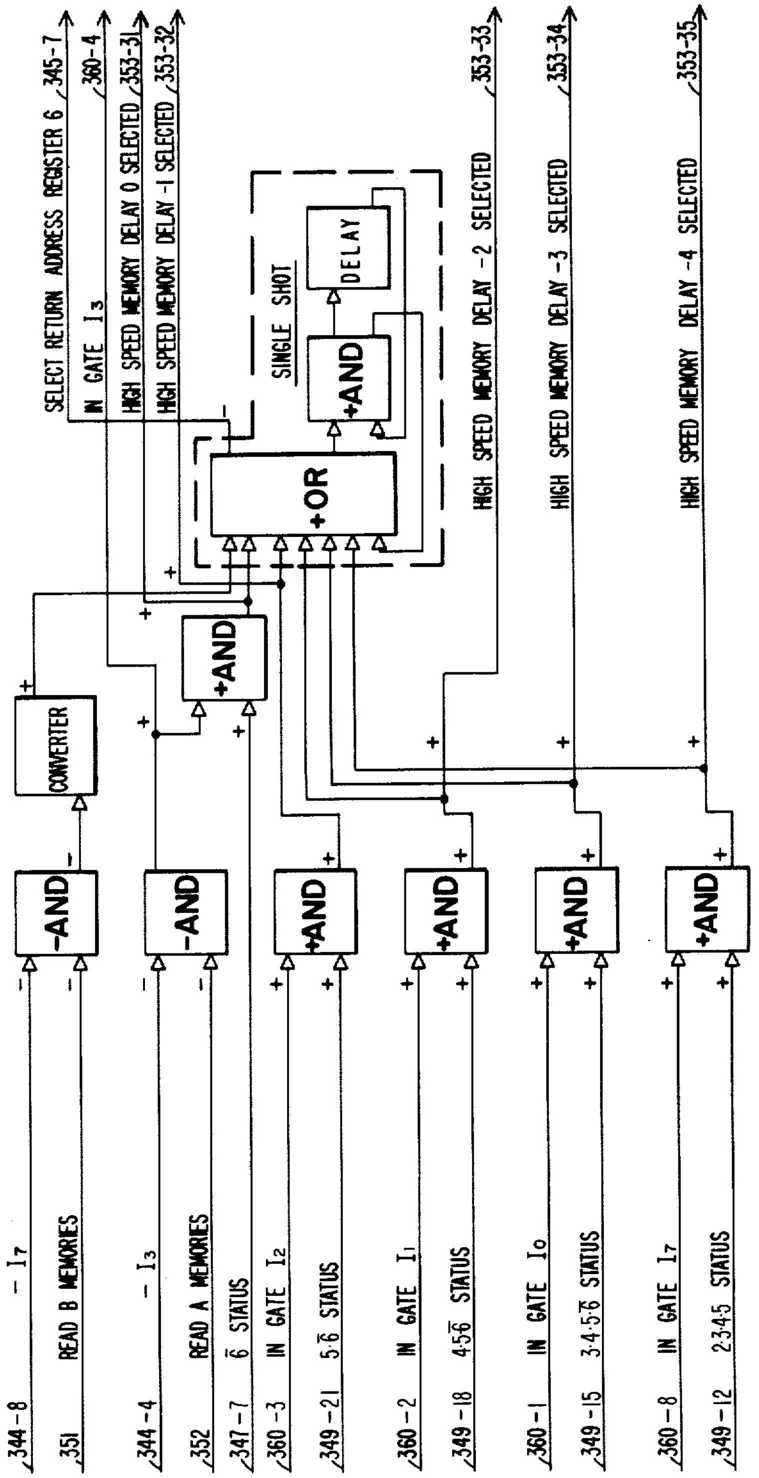

A first input to positive AND circuit 1089 is the in gate $I_3$ line 360–4 which is an output of the return address register selector for selecting register 6 shown in FIG. 26G. A second input to the positive AND 1089 is the register 6 and 7 busy and register 0 not busy status line 349–26 which is one of the outputs of the Return Address Register Status Decoder 241.

One of the inputs of the positive AND circuit 1090 is the in gate $I_2$ line 360–3 which is an output from the return address register selector for register 5 shown in FIG. 26F. The other input to the positive AND 1090 is the registers 5, 6 and 7 busy and register 0 not busy status line 349–23 from the Return Address Register Status Decoder 241.

One of the inputs to the positive AND 1091 is the in gate $I_1$ line 360–2 which is an output of the return address register selector for register 4 shown in FIG. 26E. The second input to the positive AND 1091 is the registers 4 and 5 and 6 and 7 busy status line 349–20 from the Return Address Register Status Decoder 241.

The in-phase outputs of the five positive AND's 1088 through 1092 are connected as inputs to the positive OR 1097 in the single shot 1094. The in-phase output of positive AND 1092 is connected to a single line 1 of Cable 353 which informs the High Speed Memory Delay Control and Slot Selector 271 that a high speed memory delay of 0 has been selected by the register 0 selector The in-phase output of positive AND 1088 is also connected as lead 353–2 which carries the information that the high speed memory delay of minus one slot has been selected by the register 0 return address selector. The in-phase output of positive AND 1089 is also connected as lead 353–3 to inform the high speed memory delay control and slot selector 271 that a high speed memory delay of minus two has been selected by the register 0 return address selector. The in-phase output of positive AND 1090 is also connected as lead 353–4 which informs that a high speed memory delay of minus 3 has been selected by the register 0 return address selector. The in-phase output of the positive AND 1091 is also connected as line 353–5 which informs the high speed memory delay control and slot selector 271 that a high speed memory delay of minus 4 slots has been selected by the register 0 return address selector.

The structure of the eight register selectors 261 is the same. The recitation of inputs, for the sake of convenience, will begin at the top and proceed consecutively to the bottom of the left hand side of the drawing. For FIG. 26B, the inputs are line 343–3 which is $-I_2$, line 351 read B memory, line 344–7 which is $-I_6$, line 352 read A memories, line 347–2 $\bar{1}$ status, 360–6 in gate $I_5$, 349–1 which is $0\cdot\bar{1}$ status, 360–5 in gate $I_4$, 349–30 which is $7\cdot0\cdot\bar{1}$ status, 360–4 in gate $I_3$ 349–27 which is $6\cdot7\cdot0\cdot\bar{1}$ status, 360–3 in gate $I_2$ and 349–24 which is $5\cdot6\cdot7\cdot0$ status. The outputs of FIG. 26B are the select return address register 1 line 345–2, in gate $I_6$ line 360–7, high speed memory delay 0 selected 353–6, high speed memory delay —1 selected 353–7, high speed memory delay —2 selected 353–8, high speed memory delay —3 selected 353–9 and high speed memory delay —4 selected 353–10.

In FIG. 26C is shown the Return Address Register Selector for register 2. The inputs, in the top to bottom order are line 344–4 which is the $-I_3$ line, line 351 read B memories, 344–8 the $-I_7$ line, 352 read A memories, 347–3 the $\bar{2}$ status, 360–7 in gate $I_6$, 349–5 the $1\cdot\bar{2}$ status, 360–6 in gate $I_5$, 349–2 the $0\cdot1\cdot\bar{2}$ status, 360–5 in gate $I_4$, 349–31 the $7\cdot0\cdot1\cdot\bar{2}$ status, 360–4 in gate $I_3$, and 349–28 the $6\cdot7\cdot0\cdot1$ status line. The outputs for FIG. 26C are the select return address register 2 line 345–3, the in gate $I_7$ line 360–8, high speed memory delay 0 selected 353–11, high speed memory delay —1 selected 353–12, high speed memory delay —2 selected 353–13, high speed memory delay —3 selected 353–14 and high speed memory delay —4 selected 353–15.

In FIG. 26D is shown the return address register selector for register 3. The inputs include, in top to bottom order, 344–5 the $-I_4$ line, 351 read B memories, 344–1 the $-I_0$ line, 352 read A memories, 347–4 the $\bar{3}$ status, the 360–8 in gate $I_7$, 349–9 the $2\cdot\bar{3}$ status, 360–7 in gate $I_6$, 349–6 the $1\cdot2\cdot\bar{3}$ status, 360–6 in gate $I_5$, 349–3 the $0\cdot1\cdot2\cdot\bar{3}$ status, 360–5 in gate $I_4$ and 349–32 the $7\cdot0\cdot1\cdot2$ status. The outputs for FIG. 26D are the select return address register 3 line 345–4, the in gate $I_0$ 360–1, high speed memory delay 0 selected 353–16, high speed memory delay —1 selected 353–17, high speed memory delay —2 selected 353–18, high speed memory delay —3 selected 353–19 and high speed memory delay —4 selected 353–20.

In FIG. 26E is shown the return address register selector for register 4. The inputs, in top to bottom order, are 344–6 the $-I_5$ line, 351 read B memories, 344–2 the $I_1$ line, 352 read A memories, 347–5 the $\bar{4}$ status, 360–1 in gate $I_0$, 349–13 the $3\cdot\bar{4}$ status, 360–8 in gate $I_7$, 349–10 the $2\cdot3\cdot\bar{4}$ status, 360–7 in gate $I_6$, 349–7 the $1\cdot2\cdot3\cdot\bar{4}$ status, 360–6 in gate $I_5$ and 349–4 the $0\cdot1\cdot2\cdot3$ status. The output lines for FIG. 26E are the select turn address register four 345–5, in gate $I_1$, 360–2, high speed memory delay 0 selected 353–21, high speed memory delay —1 selected 353–22, high speed memory delay, —2 selected 353–23, high speed memory delay —3 selected 353–24 and high speed memory delay —4 selected 353–25.

In FIG. 26F is shown the return address register selector for register 5. The inputs, in top to bottom order, are: 344–7 the $—I_6$ line, 351 read B memories, 344–3 the $—I_2$ line, 352 read A memories, 347–6 the $\bar{5}$ status, 360–2 in gate $I_1$, 349–17 the $4\cdot\bar{5}$ status, 360–1 in gate $I_0$, 349–14 the $3\cdot4\cdot\bar{5}$ status, 360–8 in gate $I_7$, 349–11 the $2\cdot3\cdot4\cdot\bar{5}$ status, 360–7 in gate $I_6$ and 349–8 the $1\cdot2\cdot3\cdot4$ status line. The outputs of FIG. 26F are select return address register 5 line 345–6, in gate $I_2$ 360–3, high speed memory delay 0 selected 353–26, high speed memory delay —1 selected 353–27, high speed memory delay —2 selected 353–28, high speed memory delay —3 selected 353–29 and high speed memory delay —4 selected 353–30.

FIG. 26G shows the return address register selector for register 6. The inputs, in top to bottom order, are: 344–8 the $—I_7$ line, 351 read B memories, 344–4 in gate $I_3$, 352 read A memories, 347–7 the $\bar{6}$ status, 360–3 in gate $I_2$, 349–21 the $5\cdot\bar{6}$ status, 360–2 in gate $I_1$, 349–18 the $4\cdot5\cdot\bar{6}$ status, 360–1 in gate $I_0$, 349–15 $3\cdot4\cdot5\cdot\bar{6}$ status, 360–8 in gate $I_7$, and 349–12 the $2\cdot3\cdot4\cdot5$ status. The outputs of FIG. 26G are: select return address register 6 line 345–7, in gate $I_3$ 360–4, high speed memory, delay 0 selected 353–31, high speed memory delay —1 selected 353–32, high speed memory delay —2 selected 353–33, high speed memory delay —3 selected 353–34 and high speed memory delay —4 selected 353–35.

Figure 26H:
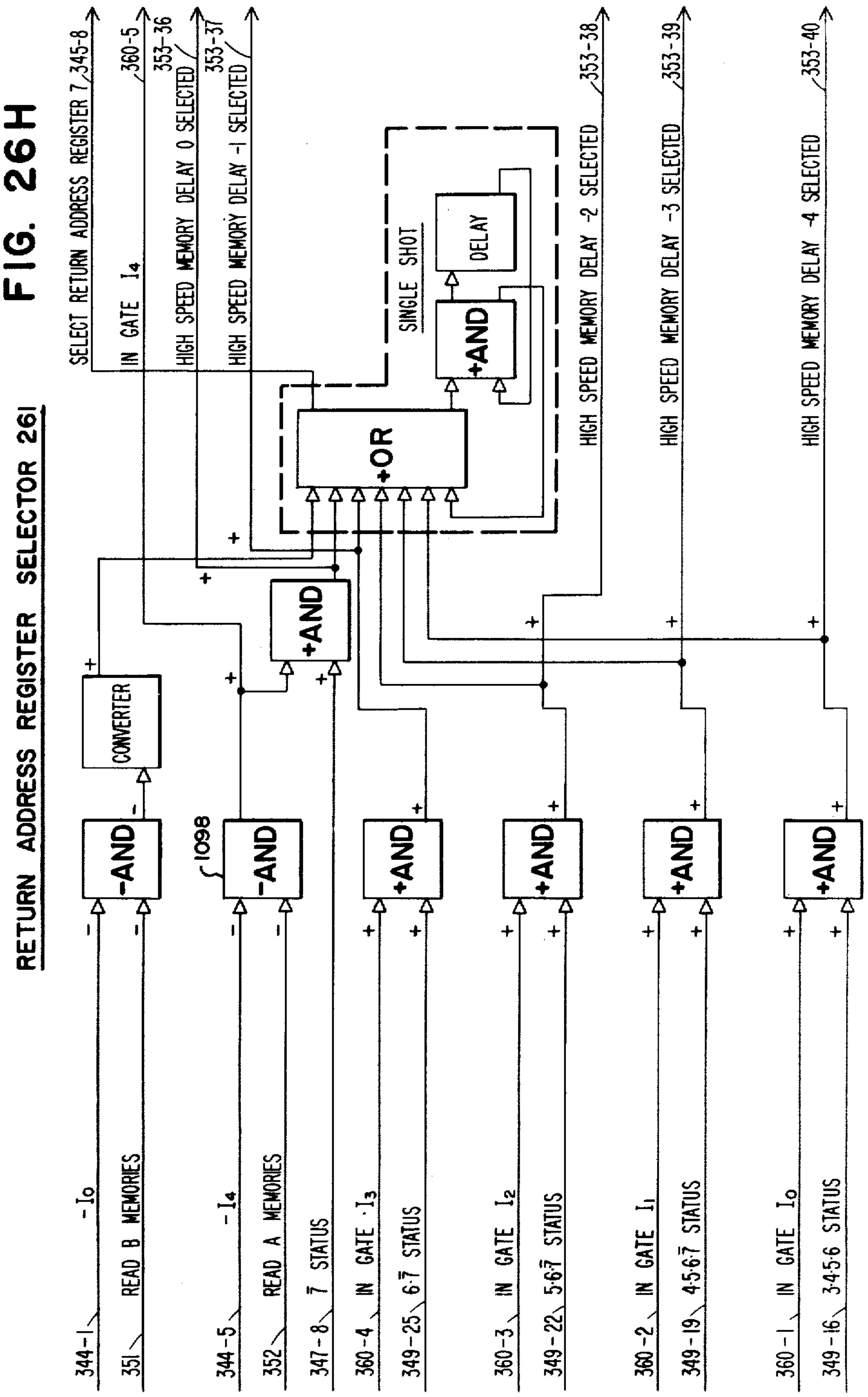

FIG. 26H shows the return address register selector for register 7. The inputs, in top to bottom order, are: 344–1 the $—I_0$ line, 351 read B memories, 344–5 the $—I_4$ line, 352 read A memories, 347–8 the $\bar{7}$ status, 360–4 in gate $I_3$, 349–25 the $6\cdot\bar{7}$ status, 360–3 in gate $I_2$, 349–22 the $5\cdot6\cdot\bar{7}$ status line, 360–2 in gate $I_1$, 349–19 the $4\cdot5\cdot6\cdot\bar{7}$ status, 360–1 in gate $I_0$, and 349–16 the $3\cdot4\cdot5\cdot6$ status. The outputs of FIG. 26H are: select return address register 7 line 345–8, in gate $I_4$ 360–5, high speed memory delay 0 selected 353–36, high speed memory delay —1 selected 353–37, high speed memory delay —2 selected 353–38, high speed memory delay —3 selected 353–39 and high speed memory delay —4 selected 353–40.

formation is on the out bus. This necessitates, in the selection of register 0, that the access time of the high speed memory plus any delay which may be necessary to avoid conflict with the read out of a low speed memory determines which time register 0 is obtained. In the case where a one slot conflict is encountered, the conflict can be resolved with one delay of the read out of memory and such delay can be provided by in gate $I_4$ for register 0.

A read high speed memory request at $I_1$ time would select register 0 only if registers 4, 5, 6 and 7 are busy to require that a four slot delay of the read out of the high speed memory be given so that the memory would read out at $I_0$ time instead of $I_4$ time which would have been the case had an $I_1$ time read high speed memory request have obtained the register 4. The digaonal disposition of identical slot times, $I_5$ in this example, illustrates that read high speed memory requires are honored by the selection of the register that will have its return address read out at the proper time to gate into the requester the requested information from the requested memory. These requests are honored in response to status information which reveals the first available slot in which memory read out conflicts do not occur.

To illustrate the operation of the Return Address Register Selectors 261 in FIGS. 26A through H, it is first assumed that a request to read one of the B memories at $I_1$ time has been made. In FIG. 26A, it is seen that at $I_1$ time, line 344–2 and the read B memory line 351 provide enabling inputs to the —AND 1086. The single shot 1094 then provides a select return address register 0 signal through line 345–1 to the Return Address Register 231 in FIG. 23. The 347–1 line in FIG. 23 informs the Return Address Register Status Decoder 241 in FIG. 24 register 0 is busy. In this illustration it is assumed that register 1 is not busy. With register 0 busy and all other registers that could conflict are not busy, the only enabled output line from Return Address Register Status Decoder 241 would be the $0\cdot1$ status line 349–1 during $I_5$ time. This reveals that a request for an A memory during $I_5$ time would conflict with the B memory request at $I_1$ time. To resolve the conflict it is noted that the $0\cdot1$ status line 349–1 is connected only as an input to the selector for register 1 in FIG. 26B.

Assume an A memory request at $I_5$ time. In FIG. 26A,

TABLE 4

| | Reg 0 | Reg 1 | Reg 2 | Reg 3 | Reg 4 | Reg 5 | Reg 6 | Reg 7 | Equivalent Memory Access |
|---|---|---|---|---|---|---|---|---|---|
| Read Low Speed Memory. | $I_1$ | $I_2$ | $I_3$ | $I_4$ | $I_5$ | $I_6$ | $I_7$ | $I_0$ | 7 cycles. |
| Read High Speed Memory: | | | | | | | | | |
| With no delay | $I_5$ | $I_6$ | $I_7$ | $I_0$ | $I_1$ | $I_2$ | $I_3$ | $I_4$ | 3 cycles. |
| IN GATES | | | | | | | | | |
| With 1 delay | $I_4$ | $I_5$ | $I_6$ | $I_7$ | $I_0$ | $I_1$ | $I_2$ | $I_3$ | 4 cycles. |
| With 2 delay | $I_3$ | $I_4$ | $I_5$ | $I_6$ | $I_7$ | $I_0$ | $I_1$ | $I_2$ | 5 cycles. |
| With 3 delay | $I_2$ | $I_3$ | $I_4$ | $I_5$ | $I_6$ | $I_7$ | $I_0$ | $I_1$ | 6 cycles. |
| With 4 delay | $I_1$ | $I_2$ | $I_3$ | $I_4$ | $I_5$ | $I_6$ | $I_7$ | $I_0$ | 7 cycles. |
| Read Out Return Address. | $O_7$ | $O_0$ | $O_1$ | $O_2$ | $O_3$ | $O_4$ | $O_5$ | $O_6$ | |
| Reset Status Trigger | $O_0$ | $O_1$ | $O_2$ | $O_3$ | $O_4$ | $O_5$ | $O_6$ | $O_7$ | |
| Read Out Memory | $I_0$ | $I_1$ | $I_2$ | $I_3$ | $I_4$ | $I_5$ | $I_6$ | $I_7$ | |

The above table 4 shows the times at which individual registers of the Return Address Register shown in FIG. 23 are selected by the Return Address Register Selector in FIG. 26. For example, register 0 is selected at $I_1$ time by a request to read a low speed memory. If there is on conflict in the selection of register 0, a read high speed memory request at $I_5$ time would select register 0 with no delay. It is to be noted that the storage of a return address in register 0 would be read out at a time to correspond with reading out a memory at $I_0$ time so that a proper receiving register would be gated when the inline 344–6 the $I_5$ pulse and line 352 the Read A Memories signal properly condition the minus AND 1087 to provide an In Gate $I_5$ signal 360–6. Since the B memory request at $I_1$ time has set Register 0 in a busy status, line 347–1 $\bar{0}$ Status would not be positive. As a result, the positive AND 1092 would not provide an output to trigger the single shot 1094. Return address register 0 is not available for selection and is not selected. The only output provided by the Register 0 selector in FIG. 26A would be the In Gate $I_5$ signal through connector 360–6 to the four succeeding selectors for registers 1, 2, 3 and 4. Of the four registers 1, 2, 3, and 4, the selected one is the first available register as determined by the Status Decoder 241 in FIG. 24. In the example where B request is at $I_1$ time and an A request is at $I_5$ time, it is seen that the unique coincidence of In Gate $I_5$ in line 360-6 and the status information that register 0 is busy while register 1 is not busy is found in FIG. 26B as the two enabling inputs to positive AND 1100.

The resulting output of positive AND 1100 conditions the single shot 1099 in FIG. 26B to select return address register 1 in FIG. 23 through connector 345-2. Positive AND 1100 also conditions the high speed memory delay −1 selected line 353-7 to inform the selected A memory that it must delay gating its requested information onto the outbus one time slot.

Referring again to Table 4, it is assumed that the four B memories make consecutive requests at $I_1$ through $I_4$ times and registers 0 through 3, respectively, are selected. A request for an A memory at $I_5$ time would select Register 4 and would notify the selected A memory that a −4 delay in gating onto the out bus is required. Hence, the four B memories would read out at $I_0$ through $I_3$ times respectively, and the A memory would read out at $I_4$ time.

*High Speed Memory Delay Control and Slot Selector* 271

The High Speed Memory Delay Control and Slot Selector 271, which is shown in block form in FIG. 21, is illustrated in detail in FIGS. 27A through 27E. This delay control receives signals from the eight register selectors in the Return Address Register Selector 261 in FIGS. 26A and B to indicate a 0, −1, −2, −3, or −4 slot delay to the High Speed Memories 81 and 82.

The 0 delay control in FIG. 27A includes an input positive OR circuit 1116 which is connected to a flip-flop 1118. The output of the flip-flop 1118 is connected to a positive AND circuit 1120. A sample priority line 1122 also is connected to the AND circuit 1120. The output of the AND circuit 1120 is connected to a single shot circuit 1124. A reset line 1126 is connected from the single shot 1124 to a negative trigger AND circuit 1128 in the flip-flop 1118. The output of the single shot 1124 is connected through a line 354-1 to the High Speed Memories 81 and 82.

The flip-flop 1118 and the single shot 1124 operate in the same manner as the previously discussed flip-flops and single shots. When a delay 0 is selected for the High Speed Memories by one of the register selectors in FIG. 26, one of the input lines (353-1, 6, 11, 16, 21, 26, 31 or 36) supplies a positive signal to the OR circuit 1116. The OR circuit 1116 supplies a negative signal to the flip-flop 1118. This signal sets, or activates, the flip-flop 1118. The AND circuit 1128 maintains the flip-flop 1118 set since the reset line 1126 supplies a negative signal to the AND circuit 1128 (the single shot 1124 is ni a quiescent state at this time and the positive trigger AND circuit 1130, provides a negative signal on the reset line 1126). When the flip-flop 1118 is set, the AND circuit 1128 supplies a positive signal to the AND circuit 1120. Upon the occurrence of a positive simple priority signal on the line 1122, the AND circuit 1120 supplies a positive signal to the single shot 1124. The single shot 1124 provides a positive delay 0 signal on the line 354-1 to the High Speed Memories 81 and 82. This output signal exists until the single shot 1124 resets (determined by the delay of the single shot).

Figures 27B, 27C:
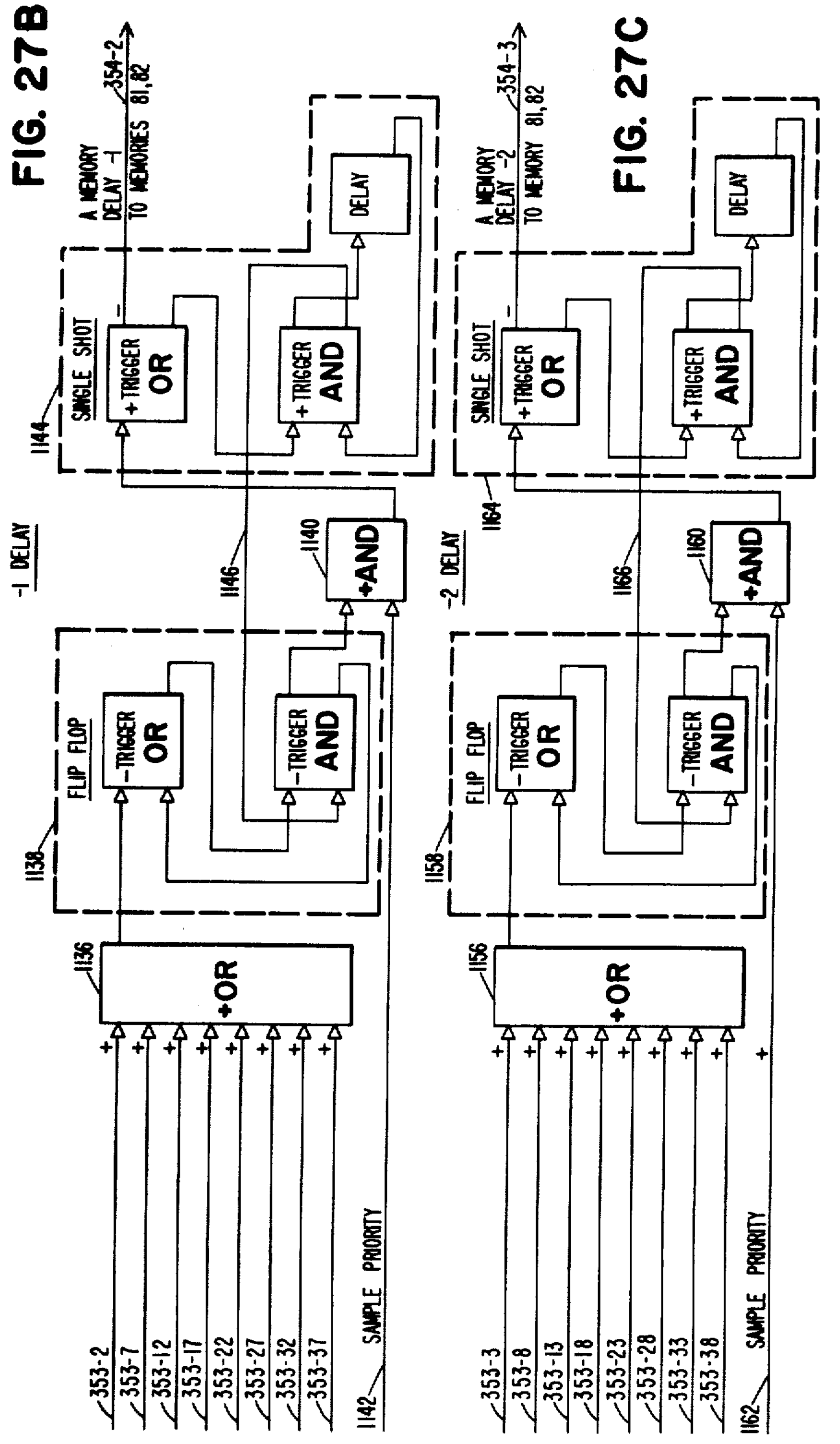

The delay control in FIG. 27B is constructed and operated in the same manner as the one in 27A. However, the former delay control supplies a −1 delay signal to the High Speed Memories. The delay control circuit in FIG. 27B includes an input positive OR circuit 1136 which is connected to a flip-flop 1138. The output of the flip-flop 1138 is connected to a positive AND circuit 1140. A sample priority line 1142 also is connected to the AND circuit 1140. This AND circuit is connected to a single shot circuit 1144, and a reset line 1146 is connected from the single shot 1144 to the flip-flop 1138. The output of the single shot 1144 is connected through a line 354-2 to the High Speed Memories 81 and 82.

Input lines 353-2, 7, 12, 17, 22, 27, 32 and 37 in FIG. 27B are connected from the eight register selectors in FIGS. 26A through H to the OR circuit 1136. Any one of these input lines may initiate a −1 delay signal from the single shot 1144. When this occurs, the delay control in FIG. 27B operates in the same manner as the delay control in FIG. 27A except the former supplies a delay −1 signal to the High Speed Memories on the output line 354-2.

Figures 27D, 27E:
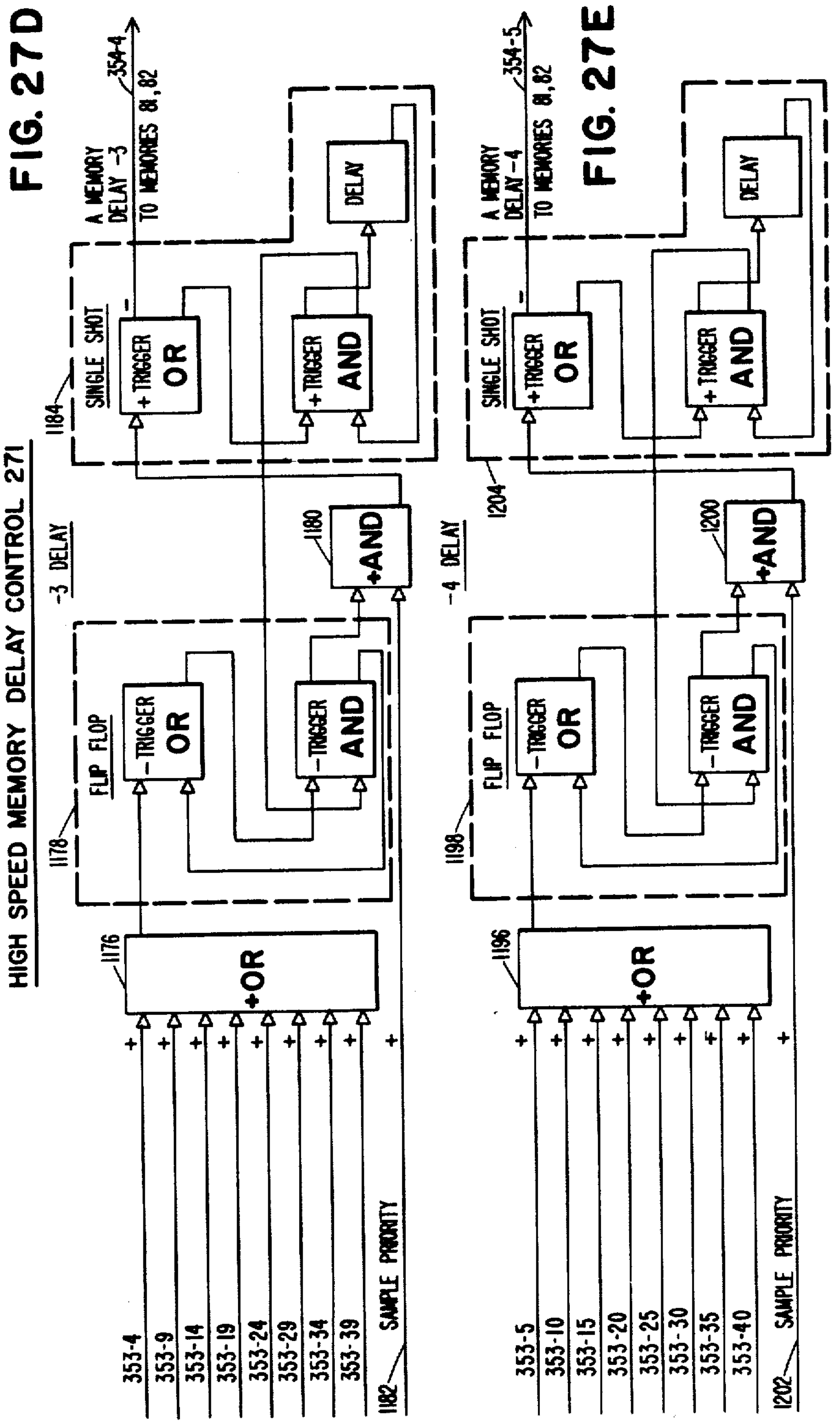

The −2, −3, and −4 delay control circuits shown in FIGS. 27C through E, respectively, are constructed and operated in the same manner as the delay control circuits in FIGS. 27A and B, described above. The delay control circuits in FIGS. 27C through E supply respective delay −2, delay −3 or delay −4 signals to the High Speed Memories. The −2 delay circuit in FIG. 27C includes an input positive OR circuit 1156 connected to a flip-flop 1158. The output of the flip-flop 1158 and a sample priority line 1162 are connected to a positive AND circuit 1160. The output of the AND circuit 1160 is connected to a single shot 1164, and a reset line 1166 is connected from this single shot to the flip-flop 1158. Input lines 353-3, 8, 13, 18, 23, 28, 33 and 38 supply delay −2 select signals to the OR circuit 1156, and the single shot 1164 supplies an output −2 delay signal on a line 354-3 to the High Speed Memories. The −3 delay control circuit in FIG. 27D includes a positive OR input circuit 1176 which is connected to a flip-flop 1178. The output from the flip-flop 1178 and a sample priority line 1182 are connected to a positive AND circuit 1180. The output of the AND circuit 1180 is connected to a single shot 1184. Inputs to the OR circuit 1176 are supplied by the High Speed Memory Delay −3 select lines. The single shot 1184 provides a −3 delay output signal on a line 354-4 to the High Speed Memories. The −4 delay control circuit in FIG. 27E includes a positive input OR circuit 1196 which is connected to a flip-flop 1198. The output of the flip-flop 1198 and a sample priority line 1202 are connected to a positive AND circuit 1200. The output of the AND circuit 1200 is connected to a single shot 1204. Inputs to the OR circuit 1196 are supplied by the High Speed Memory Delay −4 select lines in the Return Address Register Selector 261 in FIG. 26. The single shot 1204 provides a −4 delay signal on a line 354-5 to the High Speed Memories 81 and 82. As noted above, each of the delay control circuits in FIGS. 27A through E operates in the same manner and, therefore, the above detailed description of the delay controls in FIGS. 27A and B is believed sufficient to enable those skilled in the art to understand the operation of each of the delay control circuits.

*Return Address Decoder 281*

The Return Address Decoder 281 shown in block form in FIG. 21 is illustrated in detail in FIG. 28. This decoder 281 decodes the return address which is stored in the Return Address Register 231 in FIGS. 23A through D. The address is a four bit code that is supplied from the Return Address Gates 191 in FIG. 19 as discussed previously.

The decoder 281 in FIG. 28 includes eight positive AND circuits 1216 through 1223. Upon the application of a coded input (four bits, B, C, D and P), these AND circuits provide an output to select the Basic Exchange, the High Speed Exchange, one of the Look Ahead Registers 1 through 4, or one of the Instruction Unit registers 1Y and 2Y. Input lines 348 supply the return address (a four bit code) to the AND circuits 1216 through 1223. Output lines 355-1 through 355-8 provide select output signals to the Fetch Read In Control 291 in FIGS. 29A through G.

The input line 348$\overline{B}$ is connected to the AND circuits 1220 through 1223. The input line 348B is connected to the AND circuits 1216 through 1219. The input line 348$\overline{C}$ is connected to the circuits 1216, 1217, 1220 and 1221. The input line 348C is connected to the AND circuits 1218, 1219, 1222 and 1223. The input line 348$\overline{D}$ is connected to the AND circuits 1216, 1218, 1220 and 1222. The input line 348D is connected to the AND circuits 1217, 1219, 1221 and 1223. The input line 348$\overline{P}$ is connected to the AND circuits 1216, 1219, 1221 and 1222. The input line 348P is connected to the AND circuits 1217, 1218, 1220 and 1223. These input lines supply positive or negative signals to the AND circuits. For example, if a $\overline{B}$ input is applied to the decoder 281, the line 348$\overline{B}$ supplies a positive signal to the AND circuits 1220 through 1223, and the line 348B supplies a negative signal to the AND circuits 1216 through 1219. If a B input is applied to the decoder 281, the line 348B supplies a positive signal to the AND circuits 1216 through 1219, and the line 348$\overline{B}$ supplies a negative signal to the AND circuits 1220 through 1223.

In order to address the Basic Exchange 75 the BX AND circuit 1220 supplies a positive signal on the output line 355–7. The input code, as discussed in connection with the Return Address Gate 191 in FIG. 19, employed to select the Basic Exchange is 0001 (four bits BCD and P, respectively). This is equivalent to $\overline{B}$, $\overline{C}$, $\overline{D}$ and P. This byte (a group of bits) is supplied to the decoder 281 by positive signals on the input lines 348$\overline{B}$, 348$\overline{C}$, 348$\overline{D}$, and 348P. In this case, the input lines 348B, 348C, 348D and 348$\overline{P}$ are negative. An output select BX signal is provided on the output line 355–7 when the decoder is gated by the application of positive signals to the line 348 Full and a sample memory line 1226. In this case all inputs to only the AND circuit 1220 are positive. Hence, the AND circuit 1220 provides a positive output signal (in-phase output). All of the inputs to each of the remaining AND circuits are not positive and, therefore, these remaining AND circuits do not provide positive outputs.

The AND circuit 1216 provides a positive signal to select the Look Ahead register 1, the AND circuit 1217 provides a positive signal to select the Look Ahead register 2, etc. The AND circuit 1216 provides a positive output when the lines 348B, 348$\overline{C}$, 348$\overline{D}$ and 348$\overline{P}$ are positive. The AND circuit 1217 provides a positive output when the lines 348B, 348$\overline{C}$, 348D and 348P are positive. These outputs are provided only when the lines 348 and 1226 are positive, of course. The remaining AND circuits provide outputs to address the remaining input/output devices in a similar manner.

*Return Register Select 291*

The Return Register Select 291 shown in block form in FIG. 2I is illustrated in detail in FIGS. 29A through 29G. The register select signals from the Return Address Decoder 281 in FIG. 28 are applied through the return register select circuits in FIGS. 29A through 29G to the input/output devices (BX, HX, LA 1 through 4 registers and the I Unit 1Y and 2Y registers). Each of the register select circuits is composed of a single shot circuit. Each of these single shot circuits is constructed and operated in a manner similar to those shown in FIGS. 6A and 6B.

Input lines 355–1 through 355–8 are connected to respective single shots 1235 through 1242 in FIGS. 29A through 29G, respectively. These input lines supply register select signals from the Return Address Decoder 281 in FIG. 28. Output lines 155–1 through 155–8 are connected from respective single shots 1235 through 1242 to the registers of the input/output devices. The register select signal applied to any of the single shots 1235 through 1242 is available at the output of the single shot for a period of time determined by the single shot delay, and this signal is applied to a register of the input/output device.

The single shots 1241 and 1242 which are employed to select the Basic Exchange and the High Speed Exchange, respectively, also include positive AND circuits 1243 and 1244, and delay circuits 1245 and 1246. The output of the BX single shot 1241 is connected to an input of the AND circuit 1243. The output of the HX single shot 1242 is connected to an input of the AND circuit 1244. A sample priority line 1247 is connected to the remaining inputs of the AND circuits 1243 and 1244. The AND circuit 1243 is connected through a delay circuit 1245 to an output line 155–7. This output line is connected to the Basic Exchange 75. The AND circuit 1244 is connected through the delay circuit 1246 to an output line 155–8. This output line is connected to the High Speed Exchange 76. The sample priority line 1247 and AND circuits 1243 and 1244 are employed to synchronize the selection of the BX and the HX because the computer clock is not connected to the BX and the HX. The select BX and select HX signals are not applied immediately to the Basic Exchange and the High Speed Exchange upon setting the single shot as are the other select signals (LA 1 through 4, 1Y and 2Y). The select BX or the select HX signals are gated out upon the application of a positive signal on the sample priority line 1247. For example, upon the application of a positive select BX signal to the line 355–7, the single shot 1241 applies a positive signal to the AND circuit 1243. Upon the occurrence of a positive sample priority on the line 1247, the AND circuit 1243 provides a positive output signal through the delay circuit 1245 to the line 155–7. This signal is applied to select the Basic Exchange. The select HX circuit operates in a similar manner.

The delay circuits shown throughout FIGS. 3 through 29 may be constructed as shown in FIG. 35. The delay circuit in FIG. 35 is a delay line and includes an inductance 1310 and a capacitance 1311. The values of the inductance 1310 and the capacitance 1311 are chosen to give a desired delay. A signal applied to a terminal 1312 results as a delayed signal at an output terminal 1313. Although a particular type of delay circuit is illustrated in FIG. 35, it is to be understood that other type delay circuits, such as, RC circuits, single shots, or transistorized delay circuits, may be employed where the circuit use warrants their application.

FIG. 36 is an exemplary timing diagram of two fetch operations. For purposes of illustration the high speed exchange makes a fetch request from the $B_2$ memory 85. Subsequently, an input device makes a fetch request from the $A_0$ memory which normally would read out (in the example illustrated) at the same time that the $B_2$ memory would read out. However, this represents a conflict (only one memory can read out during a given slot) and, therefore, the $A_0$ memory is delayed one slot. Hence, in the example illustrated, the $B_2$ memory reads out during a slot and then the $A_0$ memory reads out during the following slot.

The sample priority ($S_p$), the sample request ($S_r$) and the sample memory ($S_m$) pulses are shown at the top of FIG. 36. The $S_r$ and $S_m$ pulses occur during the absence of the $S_p$ pulses and, therefore, the former pulses may be termed not $S_p$ pulses. These S pulses are supplied by the computer clock. Also, the I and the O pulses, or slots, are shown at the top of FIG. 36. The I pulses are supplied by the Ring 211 and the O pulses (delayed ½ cycle from the I pulses) are supplied by the Ring Output Pulse Phase Control 221. The timing diagrams are shown below the O pulses in FIG. 36. The HX fetch $B_2$ memory sequence is shown on the left of FIG. 36, and a fetch $A_0$ memory sequence is shown on the right of FIG. 36.

These two sequence diagrams are separated by a dashed line in FIG. 36.

In considering the left hand diagram in FIG. 36 from top to bottom and assuming that the $B_2$ memory is busy, the first occurrence is the memory reset signal from the $B_2$ memory along with an $S_r$ pulse. These signals reset the memory busy trigger 109–5 in FIG. 5E. Previous to this, the High Speed Exchange makes a request, and during an $S_r$ pulse the $H_x$ request trigger 102 in FIG. 3B is set. As noted above, it is assumed that in this example that the high speed exchange is making a fetch request from the $B_2$ memory. After the memory busy trigger in FIG. 5 is reset, the high speed exchange memory frame decoder 106 in FIGS. 4C and D decodes the address supplied to it by the High Speed Exchange 76. Now the $B_2$ address is decoded. At this same time and during an $S_p$ the HX priority is sampled in the high speed exchange priority AND circuit 126 in FIG. 12B. It is assumed for purposes of illustration that the HX does have priority. During this $S_p$ time the single shot 741A in the high speed exchange in-gate control 142 in FIG. 14B is set. When it is determined that the HX has priority, the $B_2$ memory is selected by the high speed exchange memory select circuits 132 in FIG. 13B. Also during this time, the HX address is transferred to the $B_2$ memory by the memory address gates 161 in FIGS. 16A through C; the HX return address is coded by the return address gates 191 in FIG. 19; and a fetch signal is applied to the memory read out control 171 in FIGS. 17A and B which sends a fetch signal to the $B_2$ memory and to the return address read-in control 251 in FIG. 25.

During the next $S_m$ pulse a read $B_2$ memory signal is supplied to the return address register selector. The $B_2$ access cycle is seven slots which are slots $I_1$ through $I_7$ in this example. The total $B_2$ memory cycle is eleven slots. During the $I_1$ slot, the register 0 select single shot in FIG. 26 is set. The return address is delayed in the return address gates 191 in FIG. 19, and during the next $S_p$ pulse this return address is read into register 0 in FIG. 23A. Also during this $S_p$ pulse, the status trigger 0 in FIG. 23 is set. At the end of the seventh slot ($I_7$), the $B_2$ memory starts reading out.

Figure 29G:
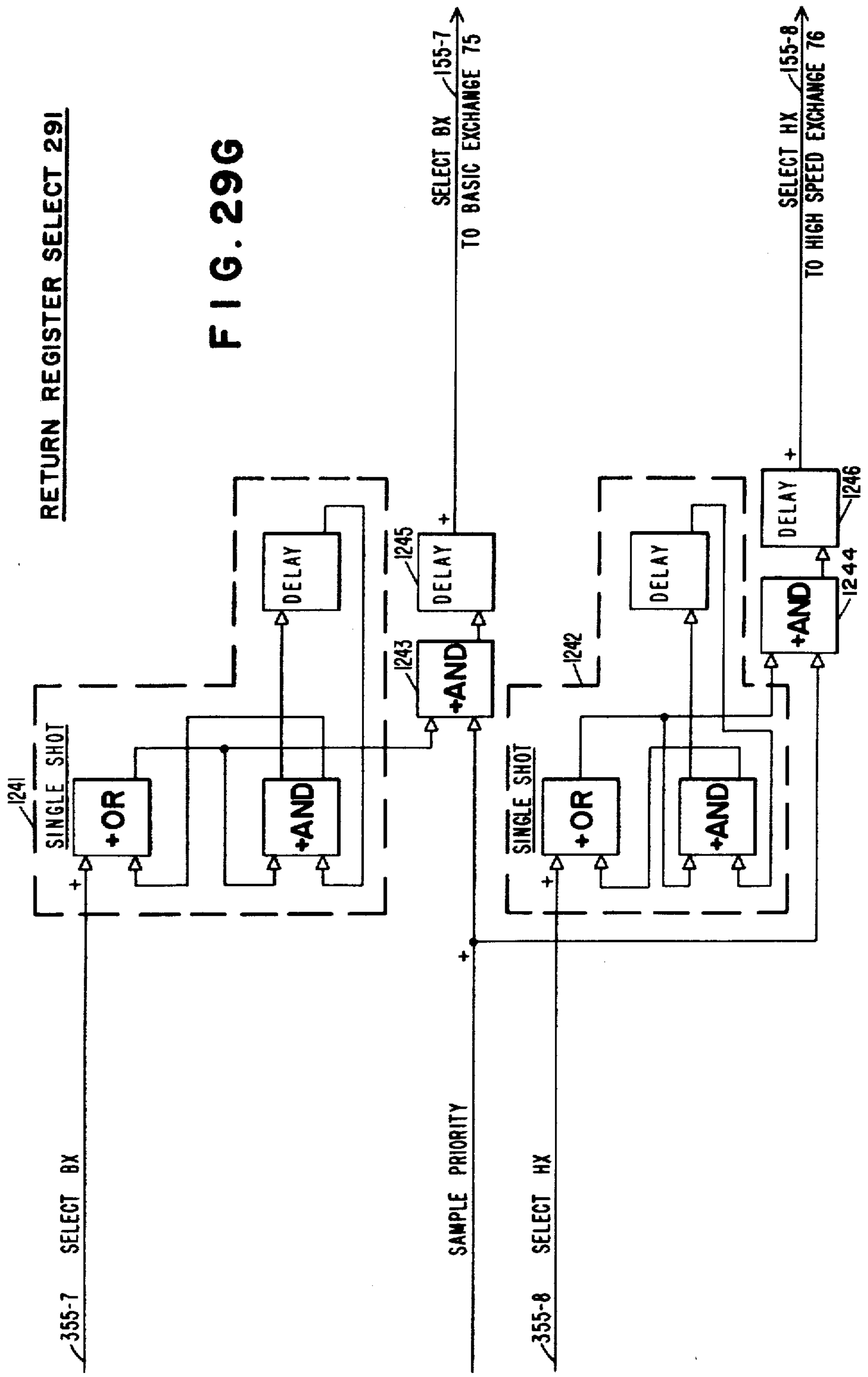

During slot $O_7$, the register 0 in FIG. 23 is read out, and upon the occurrence of an $S_m$ pulse during the last part of the $O_7$ pulse the HX return address is read out of the return address decoder 281 in FIG. 28. Also during this $S_m$ pulse, the return register select HX single shot 1243 in FIG. 29G is set. During the next $S_p$ pulse data is read into the register in the high speed exchange 76. The status trigger 0 in FIG. 23 is reset during the $O_0$ slot.

Assuming that an input device makes a fetch request of the $A_0$ memory 81 as shown on the right in FIG. 36, a conflict occurs. In this example, a conflict occurs only when a high speed memory ($A_0$ in FIG. 36) is selected (read $A_0$) during the $I_5$ slot. This conflict occurs because the normal read out of the $A_0$ memory is during the $I_0$ slot in this example. However, the $B_2$ memory is being read out during this $I_0$ slot. Hence, the read out of the $A_0$ memory must be delayed one slot. This delay is directed by the return address register selector 261 in FIG. 26.

In the time diagram on the right side of FIG. 36, the initial timing sequences have been omitted and it is assumed that an input device has already made a fetch request of the $A_0$ memory and this memory has been selected by the memory select circuits in FIG. 13. Hence, at the $S_m$ time shown in FIG. 36 the $A_0$ memory starts its cycle. During the $I_5$ slot the register 1 select single shot in FIG. 26 is set. The return address is delayed by the return address gates 191 in FIG. 19 as described previously. During the $S_p$ pulse, the return address is read into the register 1 and the status trigger 1 is set in FIG. 23.

The normal access time of the $A_0$ memory is three slots and, therefore, the normal read out of the $A_0$ memory is during the fourth slot (the $I_0$ slot in FIG. 36). This operation would cause a conflict with the $B_2$ memory as described above. Hence, the read out of the $A_0$ memory must be delayed one slot (—1). This delay is controlled in the return address selector 261 in FIG. 26. The return address may not be written into the register 0 in FIG. 23 because that register is busy. The first register in FIG. 23 that is not busy is the register 1 and therefore, when the return address register selector 261 selects the register 1, it also selects a delay of —1. Since the $A_0$ memory read out is delayed one slot, this memory reads out during the $I_1$ slot. The register 1 in FIG. 23 is read out during the $O_0$ slot. During the $S_m$ pulse which occurs during the last half of the $O_0$ slot as shown in FIG. 36, the return address is read out of the return address decoder 281 in FIG. 28. Also during this time, the return select single shot in FIG. 29 is set. During the next $S_p$ pulse, the data is read into the register of the requesting input device. The status trigger 1 in FIG. 23 is reset during the $O_1$ slot.

In the above illustration, the described conflict occurs only when the $A_0$ memory (or the $A_1$ memory) is selected during the $I_5$ slot, because only the $B_2$ memory is being employed in the above example. No conflict occurs if one of the high speed memories is requested during any other slot. If more than one low speed memory is being utilized at a time, conflicts occur when requesting the high speed memories. In these cases delays of up to —4 may be necessary. These delays are selected by the return address register selector 261 in FIG. 26 as described previously. For example, if the $B_0$ memory is selected followed in order by the $B_1$, $B_2$, $B_3$ and $A_0$ or $A_1$ memories, the high speed memory ($A_0$ or $A_1$) must be delayed four slots. In this case the normal read out of the high speed memory occurs during the read out slot for the $B_0$ memory. This necessitates a —1 delay. However, in this example, a $B_1$ memory is read out during the next slot after the $B_0$ memory is read out, the $B_2$ memory is read out during the next slot after the $B_1$ memory is read out, and the $B_3$ memory is read out during the next slot after the $B_2$ memory is read out. The high speed memory can not read out until the $B_3$ memory is read out. Hence, a delay of —4 is required in this particular situation. Other delays are directed by the return address register selector 261 depending on low speed memory activity.

It is to be understood that checking and parity schemes and circuits may be added to the present system, if desired. Checking and parity arrangements are well known to those skilled in the art and, therefore, a detail discussion is not deemed necessary. Additionally, indicators may be employed in the present system to indicate any desired condition. To accomplish this, lines may be connected from any of the various circuits to lights or meters on the console of the central computer, for example.

While this disclosure discusses memories having .6 and 1.4 ms. memory access times, the principles can be extended to *n* types of memory having accept speed ranges from about 0.2 ms. to about 2 ms. (with present circuits) or more generally, about a ten-to-one speed range.

While the invention has been particularly shown and described with reference to a preferred embodiment thereof, it will be understood by those skilled in the art that various changes in form and details may be made therein without departing from the spirit and scope of the invention.

What is claimed is:

1. In a data handling system, first and second memory devices having a plurality of storage registers accessible in a predetermined time interval, the access time of information stored in said first memory device being shorter than the access time of information stored in said second memory device, means coupled to said memory devices for selecting a given memory device and addressing a given storage register therein for reading information therefrom, a plurality of load devices, a single output bus coupling both of said memory devices to all of said load devices, means for selecting one of said load devices to receive the information from a selected storage register, and a circuit coupled to said first memory device and said last means for delaying the read-out of information therefrom whenever said first and second memory devices seek simultaneous utilization of said single output bus.

2. A data handling system including first and second memory devices having a plurality of storage registers accessible in a predetermined time interval, the access time of information stored in said first memory device being different in duration from the access time of information stored in said second memory device, means coupled to said memory devices for selecting a given memory device and for addressing a given storage register therein for reading information therefrom, a plurality of output devices, a single output bus coupling both of said memory devices to all of said output devices, and a control circuit coupled to said first memory device which detects a conflict between said first and second memory devices for simultaneous use of said single output bus and delays the transfer of information from one memory device to the plurality of output devices until the completion of a transfer from the other memory device to the plurality of output devices.

3. In a data handling system, a first and a second memory device, said memory devices having a plurality of storage registers therein for storing information, each of said registers being accessible in a predetermined interval, the access time of information from said first memory device being shorter than the access time of information from said second memory device, means for selecting one of said memory devices, means for addressing each of said storage registers to read-out information contained therein, a plurality of output devices, means for selecting an output device to receive said information, a single output bus means coupling both of said memory devices to said output devices, and a control circuit coupled between said first and second memory devices for delaying the information read from one of said memory devices until the other memory device has completed transferring information on the single output bus to a selected output device.

4. A system including a plurality of memory devices having a plurality of storage registers therein for storing information, the information in each of said memory devices having a predetermined access time, the access time for information from a first one of said memory devices being shorter than the access time for information from others of said memory devices, a plurality of output devices, a single output bus coupling said memory devices to said output devices, a first circuit means for selecting a given one of said memory devices and for selecting an output device to receive information therefrom, and a second circuit means coupled to said memory devices and said first circuit means for reserving time slots on the single output bus for the transfer of information from said memory devices to said selected output devices, whereby only one memory device may utilize the single output bus at any given time.

5. A system including a plurality of memory devices having a plurality of storage registers therein for storing information, the information in each of said memory devices having a predetermined access time, the access time for information from a first one of said memory devices being shorter than the access time for information from others of said memory devices, a plurality of output devices, each output device supplying signals representative of a return address to a selected output device, a single output bus coupling said memory devices to said output devices, a first circuit means for selecting a given one of said memory devices, and a second circuit means coupled to said first circuit means, said memory devices, and said output devices for receiving signals representative of a return address, said second circuit means reserving time slots on the single output bus for the transfer of information from said memory devices to said selected output device, said second circuit means having a return address register means, a return address register selector means, and a variable delay control and slot selector means, said return address register means being connected to said return address register selector means, said return address register selector means being connected to said variable delay control and slot selector means, and said variable delay control and slot selector means connected to said first memory device whereby said second circuit provides the proper delay to the first memory device to resolve conflicts with said other memory devices and provide transfer of information from only one memory device during any single time slot.

6. A system including a plurality of memory devices having a plurality of storage registers therein for storing information, the information in each of said memory devices having a predetermined access time, the access time for information from a first one of said memory devices being shorter than the access time for information from others of said memory devices, a plurality of output devices, each output device supplying signals representative of a return address to a selected output device, each of said memory devices having a busy trigger circuit coupled between the associated memory device and each one of the plurality of output devices, said busy triggers indicating whether the associated memory device is busy or not, a single output bus coupling said memory devices to said output devices, a first circuit means for selecting a given one of said memory devices, and a second circuit means coupled to said first circuit means, said memory devices, and said output devices for receiving signals representative of a return address, said second circuit means reserving time slots on the single output bus for the transfer of information from said memory devices to said selected output device, said second circuit means having a return address register means, a return address register selector means, and a variable delay control and slot selector means, said return address register means being connected to said return address register selector means, said return address register selector means being connected to said variable delay control and slot selector means, and said variable delay control and slot selector means connected to said first memory device.

7. A device for handling data including at least a first memory and a second memory, said first and second memories being operable to perform fetch operations and each of said memories having a plurality of storage locations for storing information, first means coupled to said first and second memories operable to initiate fetch operations of information stored therein, fetch operations in said first memory being completed in a shorter period of time than fetch operations in said second memory, a plurality of output devices coupled to said first means which operate said first means to initiate fetch operations in both said first and second memories, a common output bus coupling fetched information from said first and second memories to all of said plurality of output devices, and a control circuit coupled to the first means and the first and second memories for delaying the transfer of data from said first memory to the common output bus if the first and second memories seek simultaneous use of the common output bus.

8. A device for handling data including at least a first memory and a second memory, said first and second memories being operable to perform fetch operations and each of said memories having a plurality of storage locations for storing information, first means coupled to said first and second memories operable to initiate fetch operation of information stored therein, fetch operations in said first memory being completed in a shorter period of time than fetch operations in said second memory, a plurality of output devices coupled to said first means which asynchronously operate said first means to initiate fetch operations in both said first and second memories, a common output bus coupling fetched information from said first and second memories to each one of said plurality of output devices, and a control circuit coupled to the first means and the first and second memories for delaying the completion of a fetch operation of data from said first memory to the common output bus in case the first and second memories seek simultaneous use of the common output bus, said control circuit including variable delay means for providing a minimum time delay in incremental units including zero incremental time delay when said first and second memories do not seek simultaneous use of the common output bus.

9. A device for handling data including at least a first memory and a second memory, said first and second memories being operable to perform fetch operations and each of said memories having a plurality of storage locations for storing information, first means coupled to said first and second memories operable to initiate fetch operations of information stored therein, fetch operations in said first memory being completed in a shorter period of time than fetch operations in said second memory, a plurality of output devices coupled to said first means which operate said first means to initiate fetch operations in both said first and second memories, a common output bus coupling fetched information from said first and second memories to all of said plurality of output devices, each of said memory devices having a busy trigger circuit coupled between the associated memory device and each one of the plurality of output devices, said busy trigger indicating whether the associated memory device is busy or not, and a control circuit coupled to the first means and the first and second memories for delaying the transfer of data from said first memory to the common output bus if a conflict exists between the first and second memories for the use of the common output bus.

10. A data handling system including a plurality of memory devices for storing data, some of said memory devices having an access time for retrieving stored information which is shorter than the access time for retrieving stored information in other memory devices, a plurality of input devices for supplying signals representative of data, a common input bus coupled between each input device and each one of the plurality of memory devices, a plurality of output devices for receiving signals representative of data, a common output bus coupled between each output device and each one of the plurality of memory devices, means included with each input device and each output device for supplying address signals to each one of the plurality of memory devices for selecting a given storage location, a memory selection decoder included with each input device and each output device for supplying a select signal to a chosen memory device, each memory device including a trigger circuit for indicating whether the memory device is busy or not busy, the trigger circuit for each memory device being coupled between its associated memory device and each one of the memory selection decoders, and priority control means coupling the plurality of memory devices to the input and the output devices for controlling the order of access of the input devices and output devices to the memory devices, circuit means coupled to said memory devices, said input devices, said output devices and said memory selection decoder of each input device and each output device, said input devices and said output devices supplying signals representative of a return address to a selected input device or output device, said circuit means reserving time slots on the common output bus for the transfer of information from said memory devices to selected output devices, said circuit means having a return address register means, a return address register selector means, and a variable delay control and slot selector means, said return address register selector means being connected to said variable delay control and slot selector means, and said variable delay control and slot selector means being connected to said first memory device, whereby said circuit means provides incremental time delays for the readout of information from the memory devices having a shorter access time for retreiving stored information thereby to avoid conflicts with said other memory devices and provide the transfer of information from only one memory device during any single time slot.

11. A device for handling data including a plurality of memory devices each being operable to perform a fetch operation and each having a plurality of storage locations for storing information, first means coupled to said memory devices operable to initiate fetch operations of information stored therein, the period of time required to operate each memory device to fetch signals representative of information being different in duration from the time required to fetch signals representative of information from each of the other memory devices, a plurality of output devices coupled to said first means for randomly operating said first means to initiate fetch operations in said memory devices, a common output bus coupling said plurality of memory devices to all of said plurality of output devices for conveying fetched information from any one of said memory devices to any one of said plurality of output devices, and a control circuit coupled to the first means and said plurality of memory devices for delaying in a determined order the transfer of data from said memory devices to the common output bus if more than one memory device is ready to transfer data at the same time.

12. A device for handling data including a plurality of memory devices each being operable to perform a fetch operation and each having a plurality of storage locations for storing information, first means coupled to said memory devices operable to initiate fetch operations of information stored therein, the period of time required to operate each memory device to fetch signals representative of information being different in duration from the time required to fetch signals representative of information from each of the other memory devices, a plurality of output devices coupled to said first means for randomly operating said first means to initiate fetch operations in said memory devices, a common output bus coupling said plurality of memory devices to all of said plurality of output devices for conveying fetched information from any one of said memory devices to any of said plurality of output devices, and a control circuit coupled to the first means and said plurality of memory devices for delaying in a determined order the transfer of data from said memory devices to the common output bus if more than one memory device is ready to transfer data on the common output bus, said control circuit including means to delay said data transfers in incremental units of time.

13. In a data handling system, first and second memory devices having a plurality of storage registers accessible in a predetermined time interval, the access time of information stored in said first memory device being shorter than the access time of information stored in said second memory device, a plurality of destination means, first means coupled between each destination means and said first and second memory devices for selecting one of said first and second memory devices, for addressing a given storage register in the selected memory device, and for indicating the destination means requesting information from the first or second memory devices, a single output bus coupling said first and second memory devices to all of said plurality of destination means, second means coupled to said plurality of destination means for selecting one of said plurality of destination means at a time to receive information from the selected one of said first or second memory devices when the requested information becomes available, third means coupled to said second means and said first memory device for determining if said first and second memory devices are ready to utilize simultaneously the single output bus to transfer information to said plurality of destination means and said third means including further means for delaying the transfer of information from the first memory device along said single output bus to a selected destination means if said second memory device needs to use the single output bus.

References Cited by the Examiner

UNITED STATES PATENTS

| | | | |
|---|---|---|---|
| 3,029,414 | 4/1962 | Schrimpf | 340—172.5 |
| 3,056,110 | 9/1962 | Cypser et al. | 340—172.5 |
| 3,061,192 | 10/1962 | Terzian | 235—157 |
| 3,079,082 | 2/1963 | Schotten et al. | 235—157 |
| 3,094,610 | 7/1963 | Humphrey et al. | 235—157 |

OTHER REFERENCES

"Honeywell 800 Programmer's Manual," 1960.

ROBERT C. BAILEY, *Primary Examiner.*

IRVING L. SRAGOW, MALCOLM A. MORRISON, *Examiners.*

P. J. HENON, *Assistant Examiner.*